US011477434B2

(12) United States Patent
Valli et al.

(10) Patent No.: US 11,477,434 B2
(45) Date of Patent: Oct. 18, 2022

(54) MULTIFOCAL PLANE BASED METHOD TO PRODUCE STEREOSCOPIC VIEWPOINTS IN A DIBR SYSTEM (MFP-DIBR)

(71) Applicant: PCMS Holdings, Inc., Wilmington, DE (US)

(72) Inventors: Seppo T. Valli, Espoo (FI); Pekka K. Siltanen, Helsinki (FI)

(73) Assignee: PCMS Holdings, INC., Wilmington (DE)

( * ) Notice: Subject to any disclaimer, the term of this patent is extended or adjusted under 35 U.S.C. 154(b) by 0 days.

(21) Appl. No.: 16/981,167

(22) PCT Filed: Mar. 20, 2019

(86) PCT No.: PCT/US2019/023149
§ 371 (c)(1),
(2) Date: Sep. 15, 2020

(87) PCT Pub. No.: WO2019/183211
PCT Pub. Date: Sep. 26, 2019

(65) Prior Publication Data
US 2021/0136354 A1 May 6, 2021

Related U.S. Application Data

(60) Provisional application No. 62/647,568, filed on Mar. 23, 2018.

(51) Int. Cl.
*G02B 30/52* (2020.01)
*H04N 13/128* (2018.01)
(Continued)

(52) U.S. Cl.
CPC ....... *H04N 13/366* (2018.05); *G02B 27/0093* (2013.01); *G02B 27/0172* (2013.01);
(Continued)

(58) Field of Classification Search
None
See application file for complete search history.

(56) References Cited

U.S. PATENT DOCUMENTS 5,793,985 A    8/1998  Natarajan
7,116,324 B2  10/2006  Kaye
(Continued)

FOREIGN PATENT DOCUMENTS

CA     2950429 A1  12/2015
CN   103634588 A    3/2014
(Continued)

OTHER PUBLICATIONS

"Oculus Rift Vs. HTC Vive Vs. PlayStation VR" http://www.tomshardware.com/reviews/vive-rift-playstation-vr-comparison,4513-3.html. May 16, 2016 last accessed Dec. 13, 2021 (16 pages).
(Continued)

*Primary Examiner* — Patricia I Young
(74) *Attorney, Agent, or Firm* — Invention Mine LLC

(57) ABSTRACT

Some embodiments of an example method may include receiving an input image with depth information; mapping the input image to a set of focal plane images; orienting the set of focal plane images using head orientation information to provide stereo disparity between left and right eyes; and displaying the oriented set of focal plane images. Some embodiments of another example method may include: receiving a description of three-dimensional (3D) content; receiving, from a tracker, information indicating motion of a viewer relative to a real-world environment; responsive to receiving the information indicating motion of the viewer, synthesizing motion parallax by altering multi-focal planes of the 3D content; and rendering an image to the multi-focal plane display using the altered multi-focal plane rendering.

27 Claims, 100 Drawing Sheets

(51) Int. Cl.

| | |
|---|---|
| *H04N 13/156* | (2018.01) |
| *H04N 13/261* | (2018.01) |
| *H04N 13/366* | (2018.01) |
| *H04N 13/395* | (2018.01) |
| *H04N 13/167* | (2018.01) |
| *G02B 27/00* | (2006.01) |
| *G02B 27/01* | (2006.01) |
| *H04N 13/00* | (2018.01) |

(52) U.S. Cl.
CPC ......... *G02B 27/0179* (2013.01); *G02B 30/52* (2020.01); *H04N 13/128* (2018.05); *H04N 13/156* (2018.05); *H04N 13/167* (2018.05); *H04N 13/261* (2018.05); *H04N 13/395* (2018.05); *G02B 2027/014* (2013.01); *G02B 2027/0134* (2013.01); *G02B 2027/0187* (2013.01); *H04N 2013/0081* (2013.01)

(56) References Cited

U.S. PATENT DOCUMENTS

| | | | |
|---|---|---|---|
| 8,120,547 B2 | 2/2012 | Seymour | |
| 8,432,434 B2 | 4/2013 | Veeraraghavan | |
| 8,576,276 B2 | 11/2013 | Bar-Zeev | |
| 8,717,423 B2 | 5/2014 | Vesely | |
| 8,730,354 B2 | 5/2014 | Stafford | |
| 9,030,749 B2 | 5/2015 | Lescure | |
| 9,077,986 B2 | 7/2015 | Singh | |
| 9,213,405 B2 | 12/2015 | Perez | |
| 9,223,138 B2 | 12/2015 | Bohn | |
| 9,362,994 B2 | 6/2016 | Seol | |
| 9,407,904 B2 | 8/2016 | Sandrew | |
| 9,437,038 B1 | 9/2016 | Costello | |
| 9,547,174 B2 | 1/2017 | Gao | |
| 9,667,327 B2 | 5/2017 | Lee | |
| 9,804,395 B2 | 10/2017 | Wu | |
| 2005/0190180 A1 | 9/2005 | Jin | |
| 2006/0088211 A1 | 4/2006 | Kusakabe | |
| 2007/0183675 A1 | 8/2007 | Morohashi | |
| 2008/0123738 A1 | 5/2008 | Katsavounidis | |
| 2008/0252556 A1 | 10/2008 | Tseng | |
| 2009/0003714 A1 | 1/2009 | Subramaniam | |
| 2009/0034616 A1 | 2/2009 | Abe | |
| 2009/0125291 A1 | 5/2009 | Mohandas | |
| 2010/0034480 A1 | 2/2010 | Rao | |
| 2011/0075257 A1 | 3/2011 | Hua | |
| 2011/0273466 A1 | 11/2011 | Imai | |
| 2012/0127062 A1 | 5/2012 | Bar-Zeev | |
| 2012/0127284 A1 | 5/2012 | Bar-Zeev | |
| 2012/0128244 A1 | 5/2012 | Singh | |
| 2012/0307108 A1 | 12/2012 | Forutanpour | |
| 2013/0113984 A1 | 5/2013 | Shimamoto | |
| 2013/0183021 A1 | 7/2013 | Osman | |
| 2014/0192281 A1 | 7/2014 | Smithwick | |
| 2014/0292812 A1 | 10/2014 | Fink | |
| 2014/0355707 A1 | 12/2014 | Kim | |
| 2015/0153559 A1 | 6/2015 | Sato | |
| 2015/0235467 A1 | 8/2015 | Schowengerdt | |
| 2015/0243102 A1 | 8/2015 | Schowengerdt | |
| 2015/0277121 A1* | 10/2015 | Fridental | H04N 13/322 348/54 |
| 2015/0331237 A1 | 11/2015 | Itani | |
| 2015/0341093 A1 | 11/2015 | Ji | |
| 2015/0346495 A1 | 12/2015 | Welch | |
| 2016/0014350 A1 | 1/2016 | Osman | |
| 2016/0148416 A1 | 5/2016 | Wu | |
| 2016/0191893 A1 | 6/2016 | Gewickey | |
| 2016/0277725 A1 | 9/2016 | Ellsworth | |
| 2017/0039686 A1 | 2/2017 | Miura | |
| 2017/0102545 A1 | 4/2017 | Hua | |
| 2017/0181132 A1 | 6/2017 | Xiao | |
| 2017/0301313 A1 | 10/2017 | Perreault | |
| 2018/0039084 A1 | 2/2018 | Schowengerdt | |
| 2018/0048882 A1* | 2/2018 | Eash | H04N 13/122 |
| 2018/0075659 A1* | 3/2018 | Browy | G06F 1/1686 |
| 2018/0098051 A1 | 4/2018 | Emberger | |
| 2019/0339526 A1 | 11/2019 | Welch | |

FOREIGN PATENT DOCUMENTS

| | | |
|---|---|---|
| CN | 106233189 A | 12/2016 |
| CN | 106875436 A | 6/2017 |
| CN | 107272199 A | 10/2017 |
| EP | 3149939 A1 | 4/2017 |
| WO | 0135154 A1 | 5/2001 |
| WO | 2008038205 A2 | 4/2008 |
| WO | 2009155688 A1 | 12/2009 |
| WO | 2012175939 A1 | 12/2012 |
| WO | 2017055894 A1 | 4/2017 |

OTHER PUBLICATIONS

"Oculus Rift vs HTC Vive VR headset" http://www.avadirect.com/blog/oculus-rift-vs-htc-vive-vs-rift/ Jan. 26, 2016 last accessed Dec. 13, 2016 (9 pages).

List, U. H. "Nonlinear prediction of head movements for helmet-mounted displays" Air Force Human Resources Lab Brooks AFB TX, 1983 (24 pages).

NVIDIA Announces GamesWorks VR Branding, Adds Mutli-Res Shading, last accessed Dec. 16, 2017, available at https://web.archive.org/web/20171216213416/https://www.anandtech.com/show/9305/nvidia-announces-gameworks-vr-branding-adds-multires-shading , May 31, 2015 (6 pages).

"Samsung Gear VR Headset Lens Review & QR Code" last accessed Nov. 4, 2017, available at https://web.archive.org/web/20171104201025/http//www.sitesinvr.com/viewer/gearvr/index.html (7 pages).

La Rosa, F. et al., "Optical Image Stabilization (OIS)." STMicroelectronics, available online: http://www. st. com/resource/en/white_paper/ois_white_paper. pdf last accessed on Oct. 12, 2017 2015 (26 pages).

Aflaki, M., et al. "Rendering stereoscopic video for simultaneous 2D and 3D presentation," 2013 3DTV Vision Beyond Depth (3DTV-CON), 2013, pp. 1-4. Available online at: https://ieeexplore.ieee.org/document/6676658 (4 pages).

Crayola, "Color Alive" Last accessed May 9, 2019, [http://www.crayola.com/splash/products/ColorAlive].

International Preliminary Report on Patentability for PCT/US2019/040187 dated Jan. 14, 2021 (8 pages).

Wikipedia, "Depth of field" last accessed Mar. 8, 2018, available at https://web.archive.org/web/20180308123938/https://en.wikipedia.org/wiki/Depth_of_field (29 pages).

Honnungar, S. et al., "Focal-sweep for Large Aperture Time-of-Flight Cameras", IEEE International Conference on Image Processing (ICIP), 2016, (5 pages).

Zhuo, S. et al., "Defocus map estimation from a single image", Pattern Recognition 44, Mar. 4, 2011, (19 pages).

Narayanan, P. J., et al., "Depth+ Texture Representation for Image Based Rendering." In Centre for Visual Information Technology, International Institute of Information Technology, 2004 (6 pages).

Pertuz, S et al., "Generation of all-in-focus images by noise-robust selective fusion of limited depth-of-field images." EEE Transactions on Image Processing 22, No. 3 (2012, (10 pages).

Billiot, B. et al., "3D image acquisition system based on shape from focus technique." Sensors 13, No. 13, 2013 pp. 5040-5053 (14 pages).

Llull, P., et al. "Design and optimization of a near-eye multifocal display system for augmented reality." Applied Industrial Optics: Spectroscopy, Imaging and Metrology. Optical Society of America, 2015 (3 pages).

Itoh Y., et al. "Occlusion Leak Compensation for Optical See-Through Displays using a Single-layer Transmissive Spatial Light Modulator", IEEE Transactions on Visualization and Computer Graphics, vol. 23, No. 11, Nov. 2017, pp. 2463-2473 (11 pages).

Padmanaban, N., et al. "Optimizing virtual reality for all users through gaze-contingent and adaptive focus displays." Proceedings of the National Academy of Sciences vol. 114 No. 9, Feb. 28, 2017 pp. 2183-2188 (6 pages).

(56) References Cited

OTHER PUBLICATIONS

Oskiper, T. et al., "Augmented reality binoculars." IEEE transactions on visualization and computer graphics 21, No. 5, 2015, (10 pages).

Maimone, A. et al., "Computational augmented reality eyeglasses." In 2013 IEEE International Symposium on Mixed and Augmented Reality (ISMAR), IEEE, 2013 (10 pages).

Wilson, A., et al., "Design and prototype of an augmented reality display with per-pixel mutual occlusion capability." Optics express vol. 25, No. 24, Nov. 2017 pp. 30539-30549 (11 pages).

Bos, P. J., et al., "A Simple Method to Reduce Accommodation Fatigue in Virtual Reality and Augmented Reality Displays", SID 2016, (4 pages).

Jamali, A., et al., "Design of a large aperture tunable refractive Fresnel liquid crystal lens", Applied Optics, vol. 57, No. 7, 2018, (10 pages).

Yamaguchi, Y., et al., "See-through integral imaging display with background occlusion capability", Applied Optics vol. 55, No. 3, Jan. 20, 2016, (6 pages).

Kiyokawa, K., et al., "An occlusion-capable optical see-through head mount display for supporting co-located collaboration", ISMAR 2003 (9 pages).

Grubert, J., et al., "A Survey of Calibration Methods for Optical See-Through Head-Mounted Displays", IEEE Transactions on Visualization and Computer Graphics, Early Access Article available in IEEE Xplore, vol. 13 No. 9, 2017 (14 pages).

Itoh, Y., et al., "Semi-parametric color reproduction method for optical see-through head-mounted displays." IEEE transactions on visualization and computer graphics vol. 21, No. 11, Nov. 2015, pp. 1269-1278 (10 pages).

Tatham, E., "Getting the best of both real and virtual worlds," Communications of the ACM, vol. 42 No. 9, 1999, pp. 96-98 (3 pages).

Crecente, B., "Magic Leap: Founder of Secretive Start-Up Unveils Mixed-Reality Goggles" last accessed Mar. 30, 2018, available at https://web.archive.org/web/20180330030004/https://www.rollingstone.com/glixel/features/lightwear-ntroducing-magic-leaps-mixed-reality-goggles-w514479 (30 pages).

Wang, Y. J., et al., "Augmented reality with image registration, vision correction and sunlight readability via liquid crystal devices." Scientific reports 7, No. 1, 2017, pp. 1-12 (12 pages).

Wang, X., "Different multi-focal-plane method" Dec. 8, 2016, available at https://wp.optics.arizona.edu/optomech/wp-content/uploads/sites/53/2016/12/Tutorial_Wang_Xuan.pdf. (8 pages).

Wagner, D., et al., "Real-Time Detection and Tracking for Augmented Reality on Mobile Phones", IEEE Trans. on Visualization and Computer Graphics, vol. 16, No. 3, May/Jun. 2010, pp. 355-368 (14 pages).

Balram, N., "Fundamentals of light field imaging and display systems." Display Week 2016, (210 pages).

Liu, S., et al., "3-1: A Multi-plane Volumetric Optical See-through Head Mounted 3D Display " In SID Symposium Digest of Technical Papers, vol. 47, No. 1, 2016 (3 pages).

"Rendering" (https://developer.oculus.com/design/latest/concepts/bp-rendering/ Original date unknown); archived at Wayback Machine (https://web.archive.org/) citing a capture dated Feb. 18, 2018, last visited Apr. 7, 2022.

International Search Report and Written Opinion of the International Searching Authority for PCT/US2019/023149, dated Jun. 18, 2019, 10 pages.

International Search Report and Written Opinion of the International Searching Authority for PCT/US2019/040187 dated Sep. 23, 2019, 12 pages.

Akeley, K et al., "A Stereo Display Prototype with Multiple Focal Distances", ACM Transactions on Graphics (TOG), vol. 23 No. 3, Aug. 2004, pp. 804-813 (10 pages).

J. P. Rolland, M. Krueger, and A. Goon (2000), "Multifocal planes head-mounted displays," Appl. Opt. 39, 3209-3215, 2000, pp. 3209-3215.

Liu, S. et al., "A systematic method for designing depth-fused multi-focal plane three-dimensional displays", Optics Express 11562, vol. 18, No. 11, 2010 (12 pages).

Watt, S. J., et al., "Real-world stereoscopic performance in multiple-focal-plane displays: How far apart should the image planes be?." Stereoscopic Displays and Applications XXIII, vol. 8288, p. 82881E. International Society for Optics and Photonics, 2012 (11 pages).

Johnson, P. V. et al., "Dynamic lens and monovision 3D displays to improve viewer comfort", Optics express, vol. 24 No. 11, 2016 pp. 11808-11827 (20 pages).

Narain, R. et al., "Optimal presentation of imagery with focus cues on multi-plane displays." ACM Transactions on Graphics (TOG) vol. 34, No. 4 Article 59, Aug. 2015 (12 pages).

W. Wu et al., "Content-adaptive focus configuration for near-eye multi-focal displays", Proc. IEEE Int. Conf. Multimedia Expo (ICME), Jul. 2016 (6 pages).

Liu, S. et al., "A Novel Prototype for an Optical See-Through Head-Mounted Display with Addressable Focus Cues", IEEE Transactions On Visualization and Computer Graphics, vol. 16, No. 3, May/Jun. 2010, pp. 381-393 (14 pages).

Cheng, D. et al., "Design of an optical see-through head-mounted display with a low f-number and large field of view using a freeform prism." Applied optics vol. 48 No. May 14, 2009 pp. 2655-2668 (14 pages).

Xinda Hu (2014), "Development of the Depth-Fused Multi-Focal-Plane Display Technology", PhD Thesis, University of Arizona, 2014, (130 pages).

Hu, X. et al., "Design and assessment of a depth-fused multi-focal-plane display prototype" Journal of Display Technology. vol. 10 No. 4, pp. 308-316 (9 pages).

Mackenzie, K. et al., "Accommodation to multiple-focal-plane displays: Implications for improving stereoscopic displays and for accommodation control." Journal of vision 10, No. 8, 2010 (20 pages).

Brunet, F. "Contributions to parametric image registration and 3d surface reconstruction." European Ph. D. in Computer Vision, Université dAuvergne, Clérmont-Ferrand, France, and Technische Universitat Munchen, Germany, Nov. 2010 (234 pages).

Hu, X et al., "High-resolution optical see-through multi-focal-plane head-mounted display using freeform optics" Optics Express 13896, vol. 22, No. 11, May 2014 (8 pages).

Sheng Liu, et al., "Time-multiplexed dual-focal plane head-mounted display with a liquid lens", Optics Letters vol. 34, No. 11, Jun. 1, 2009, published on May 21, 2009.

Sheng Liu, et al. "An Optical See-Through Head Mounted Display with Addressable Focal Planes", IEEE International Symposium on Mixed and Augmented Reality Sep. 15-18, 2008, pp. 33-42 (10 pages).

International Search Report and Written Opinion of the International Searching Authority for PCT/US2019/013803 dated Apr. 18, 2019, (11 pages).

International Preliminary Report on Patentability for PCT/US2019/013803 dated May 7, 2020, (11 pages).

International Search Report and Written Opinion of the International Searching Authority for PCT/US2019/039746 dated Oct. 9, 2019, 11 pages.

Chang, Jen-Hao, et al., "Towards Multifocal Displays with Dense Focal Stacks". ARXIV.ORG, Cornell University Library, ACM Transactions on Graphics, vol. 37, No. 6, Art. 198, Nov. 2018, pp. 198:1-198:17.

International Preliminary Report on Patentability for PCT/US2019/039746 dated Jan. 12, 2021, 7 pages.

International Preliminary Report on Patentability PCT/US2019/023149 dated Sep. 29, 2020, 7 pages.

Wikipedia "3D Projection". Wikipedia article modified on Jul. 11, 2017, available at: https://en.wikipedia.org/w/index.php?title=3D_projection&oldid=790065385 (5 pages).

Linwei, Z. et al., "View-spatial-temporal post-refinement for view synthesis in 3D video systems", Signal Processing Image Communication 28, 2013, pp. 1342-1357 (16 pages).

Xuyuan, X et al., "Depth map misalignment correction and dilation for DIBR view synthesis", Signal Processing mage Communication 28, 2013, pp. 1023-1045 (23 pages).

(56) References Cited

OTHER PUBLICATIONS

Kristoph F., A 3D-TV Approach Using Depth-Image-Based Rendering (DIBR), Proceedings of VHP vol. 3 No. Sep. 3, 2003 (6 pages).

Hong, H., "Enabling Focus Cues in Head- Mounted Displays", Proceedings of the IEEE 2017 (18 pages).

Kramida, G. et al., "Resolving the Vergence-Accommodation Conflict in Head-Mounted Displays", IEEE transactions on visualization and computer graphics. 2015 (20 pages).

Suyama, S. et al., "Apparent 3-D image perceived from luminance-modulated two 2-D images displayed at different depths". Vision Research, vol. 44, 2004, pp. 785-793 (9 pages).

Lee, C. et al., "View Synthesis using Depth Map for 3D Video", Asia-Pacific Signal and Information Processing Association, 2009 Annual Summit and Conference, International Organizing Committee, Sapporo, Japan, Oct. 2009, pp. 350-357 (9 pages).

Watt, S. J. et al., "Achieving near-correct focus cues in a 3-D display using multiple image planes", In Human vision and electronic imaging X, vol. 5666, pp. 393-401 International Society for Optics and Photonics, 2005 (9 pages).

Shibata, T. et al., "The zone of comfort: Predicting visual discomfort with stereo displays." Journal of vision 11(8):11, 2011, pp. 1-29 (29 pages).

Huang, F. C. et al., "The Light Field Stereoscope—Immersive Computer Graphics via Factored Near-Eye Light Field Displays with Focus Cues" SIGGRAPH emerging technologies, 2015 (12 pages).

Pan, H. et al., "3D video disparity scaling for preference and prevention of discomfort." Stereoscopic Displays and Applications XXII, vol. 7863, International Society for Optics and Photonics, 2011 (8 pages).

Zannoli, M. et al., "Blur and the perception of depth at occlusions." Journal of Vision 16, No. 6 (2016):17 pp. 1-25 (25 pages).

Hong, H., "Advances in Head-Mounted Light-Field Displays for Virtual and Augmented Reality", Information Display 4/16, SID 2016, pp. 14-21 (8 pages).

Liu, S. et al., "A Novel Prototype for an Optical See-Through Head-Mounted Display with Addressable Focus Cues", EEE Transactions On Visualization and Computer Graphics, vol. 16, No. 3, May/Jun. 2010, pp. 381-393 (13 pages).

Baker, E. "144Hz Monitor vs 60Hz Monitor- See The Difference" https://www.144hzmonitors.com/other/144hz-monitor-vs-60hz-monitor-see-the-difference (last accessed Nov. 4, 2017).

Lee, Namjeong., et al., "A New Codebook Structure for Enhanced Multi-User MIMO Transmission in mmWave Hybrid-Beamforming System". IEEE Globecom Workshops (GC Wkshps), (2015), pp. 1-6.

Sukhanov, S. A., "3D content production" St. Petersburg Electrotechnical University, St. Petersburg, Russia, Mar. 12, 2011 https://www.slideshare.net/mikhailvink/sergey-a-sukhanov-3d-content-production last accessed on Feb. 26, 2019 (12 pages).

Lavalle, S. M., et al., "Head tracking for the Oculus Rift." In 2014 IEEE International Conference on Robotics and Automation (ICRA),IEEE, 2014 (8 pages).

"VR AR Judder is Visible Latency" https://medium.com/silicon-valley-global-news/vr-ar-judder-is-visible-atency-2631aa393ebf, Apr. 9, 2016 last accessed Dec. 13, 2021 (6 pages).

Wikipedia, "Multiscopy" last accessed Feb. 1, 2019, available at https://web.archive.org/web/20190201002402/https://en.wikipedia.org/wiki/Multiscopy (3 pages).

Wikipedia, "Light field" last accessed May 29, 2018, available at https://web.archive.org/web/20180529074855/https://en.wikipedia.org/wiki/Light_field (8 pages).

Wikipedia Commons, "File: 2D plus depth.png" last accessed Feb. 22, 2019, available at https://commons.wikimedia.org/w/index.php?curid=5489771 (3 pages).

Shibata,T. et al., "Visual discomfort with stereo displays: effects of viewing distance and direction of vergenceaccommodation conflict." In Stereoscopic Displays and Applications XXII, vol. 7863, p. 78630P. International Society tor Optics and Photonics, 2011 (9 pages).

Wikipedia, "Photographic Filter" last accessed on May 3, 2019, available at: https://en.wikipedia.org/wiki/Photographic_filter#Diffusion.

Siltanen, Sanni, "Theory and Applications of Marker-Based Augmented Reality". VTT Science 3, Espoo, (2012), (246 pages).

\* cited by examiner

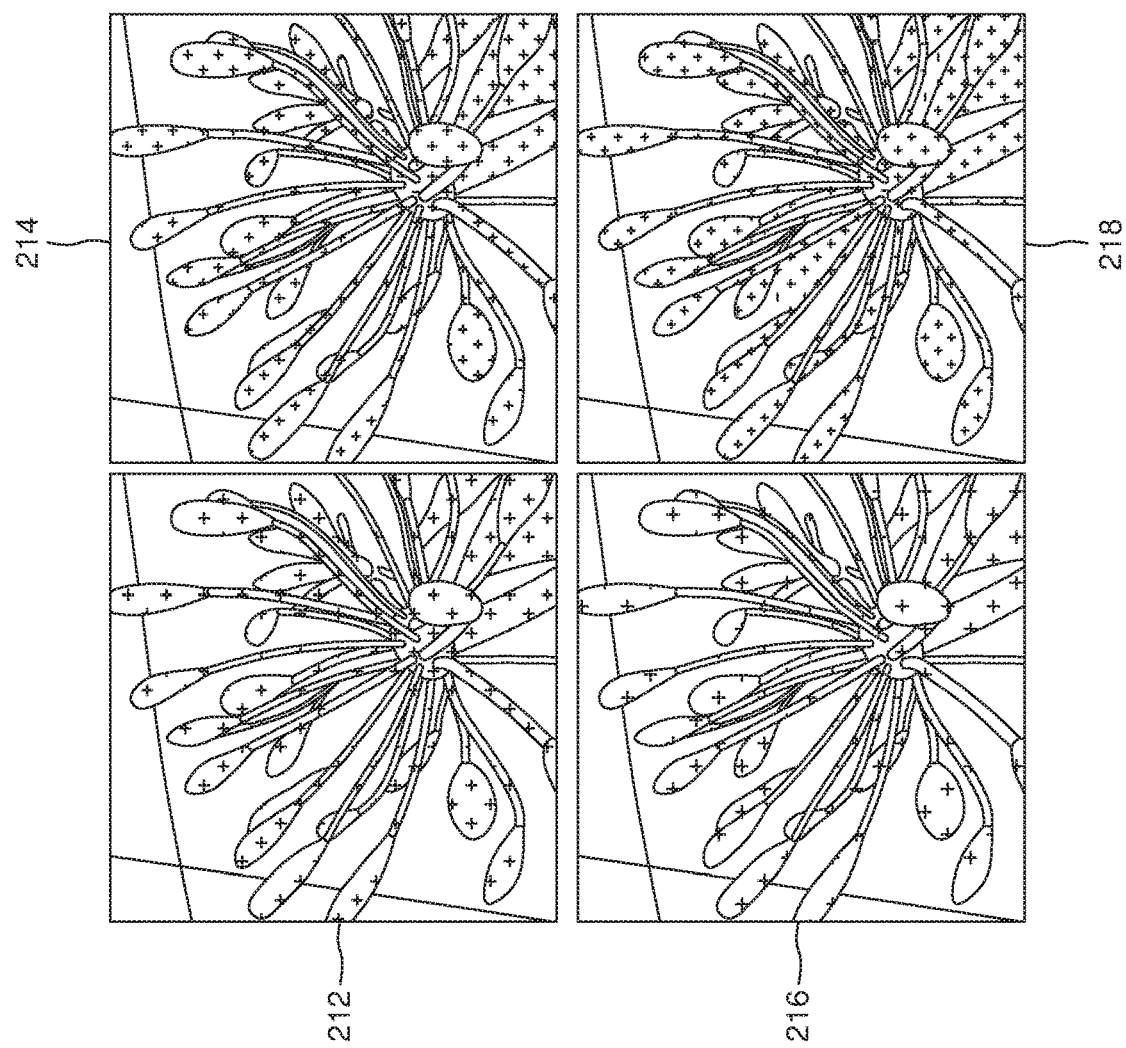
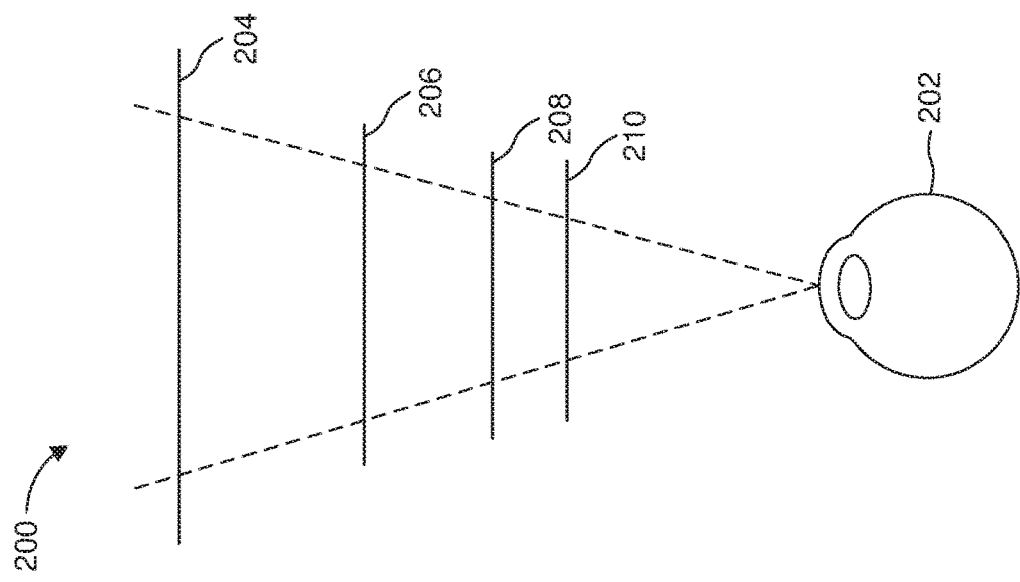
FIG. 2B
FIG. 2A

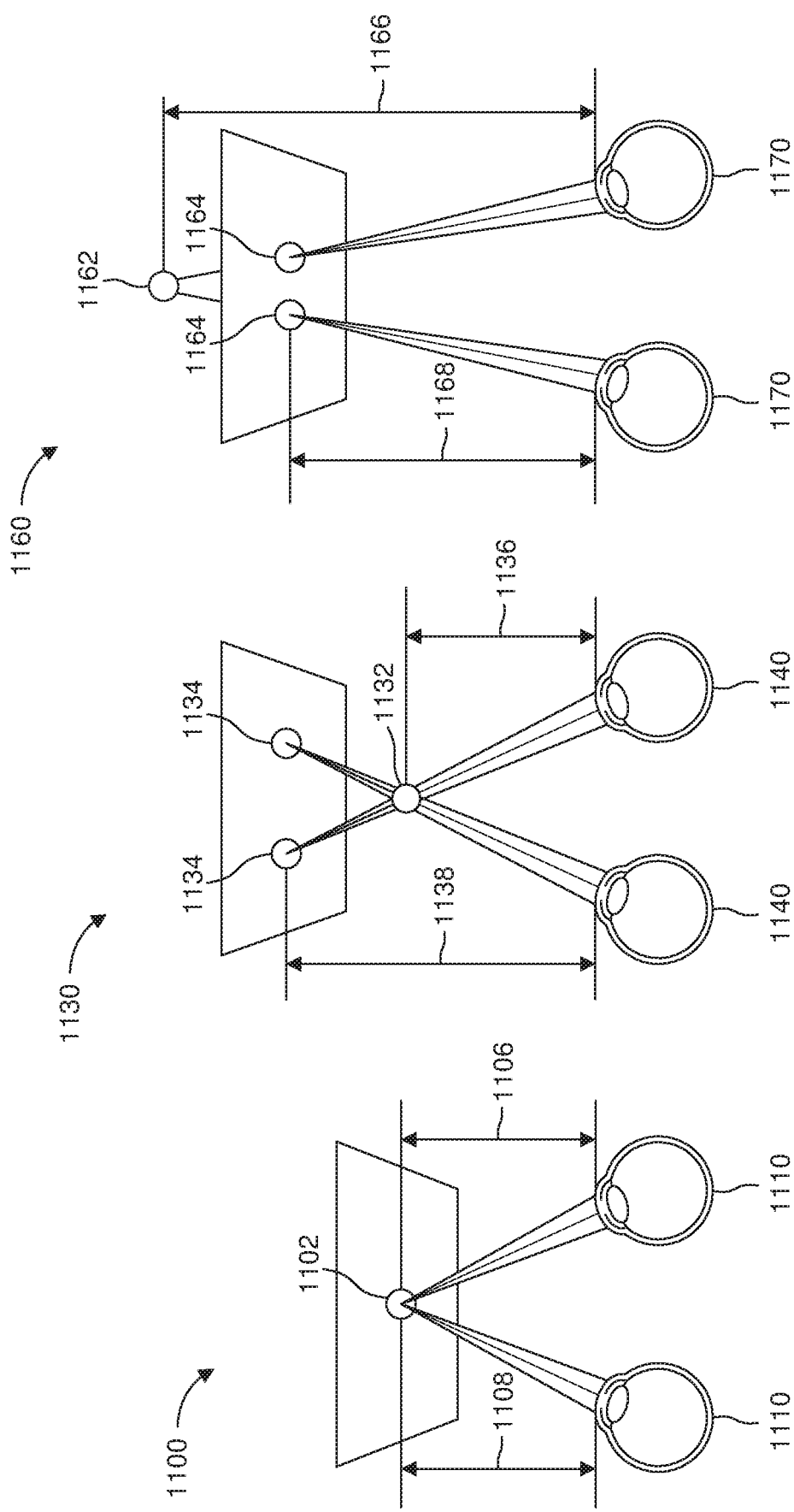

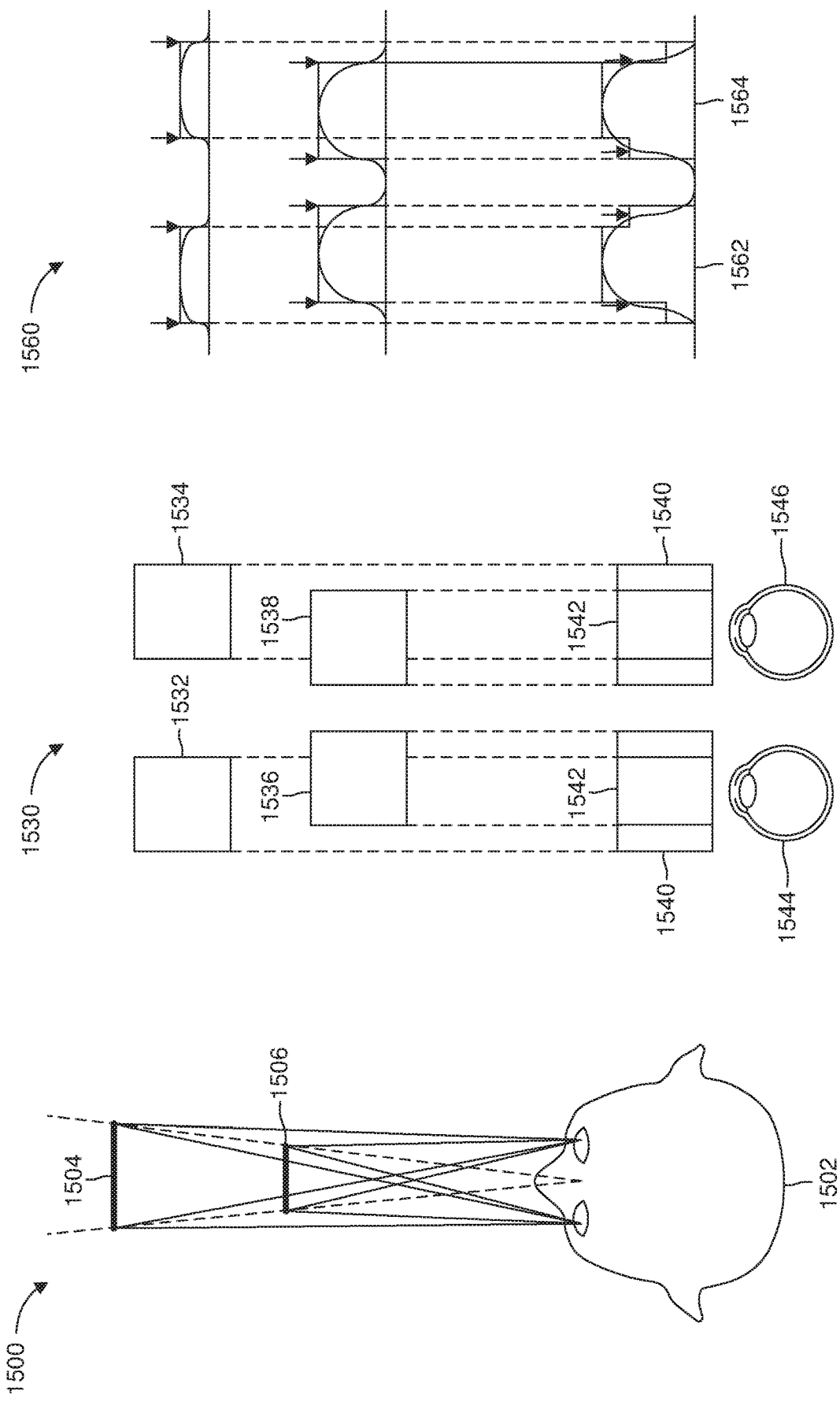

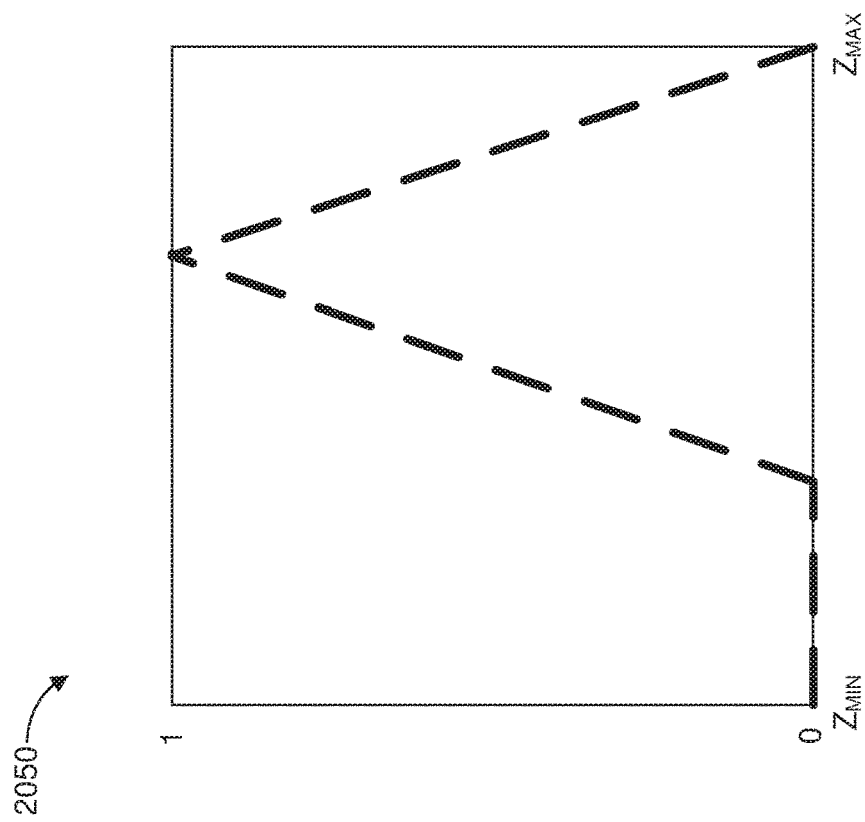
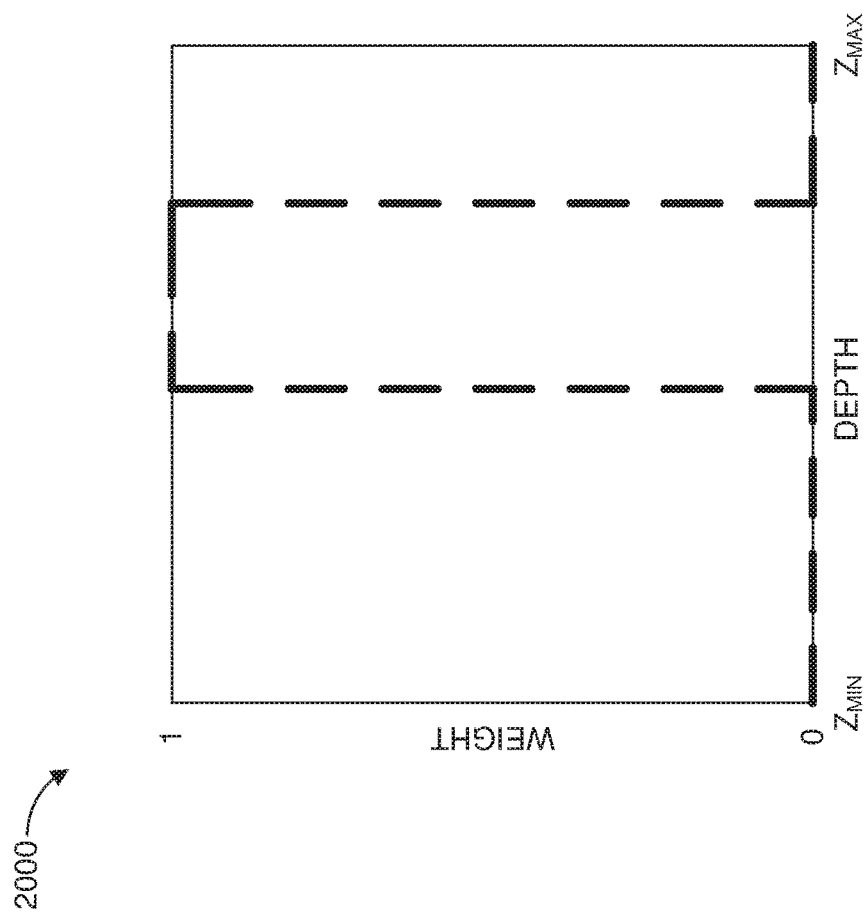
FIG. 20A
FIG. 20B

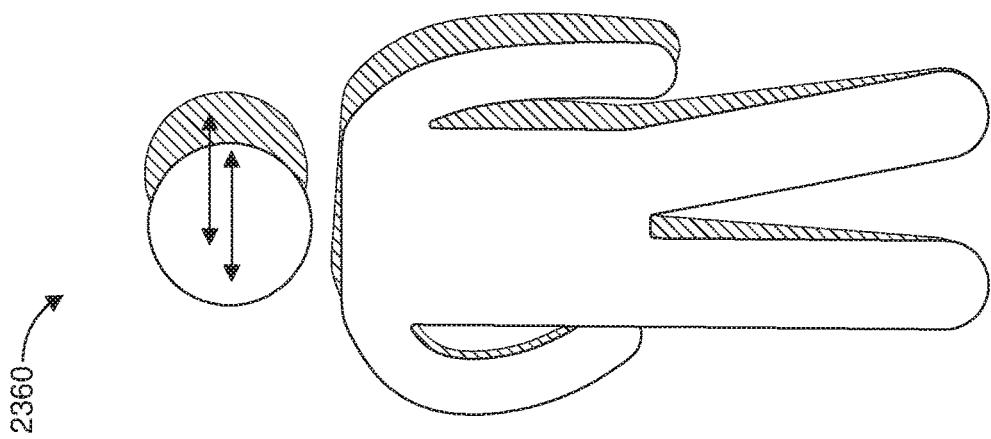
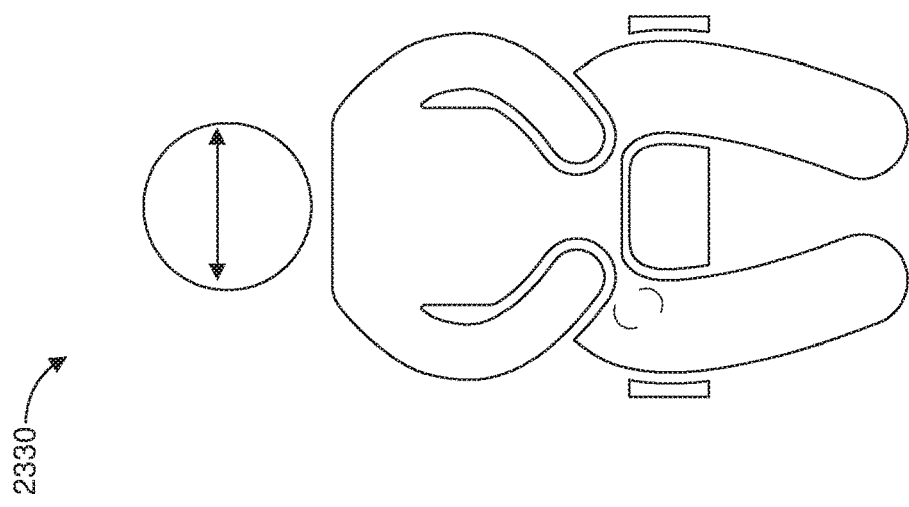
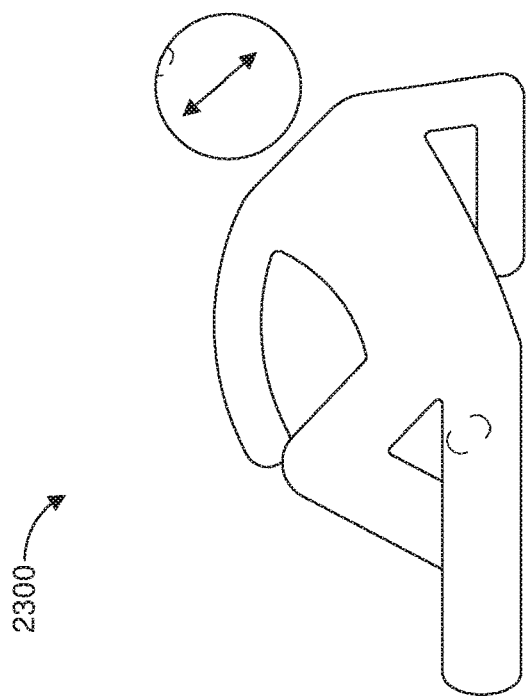
FIG. 23C
FIG. 23B
FIG. 23A

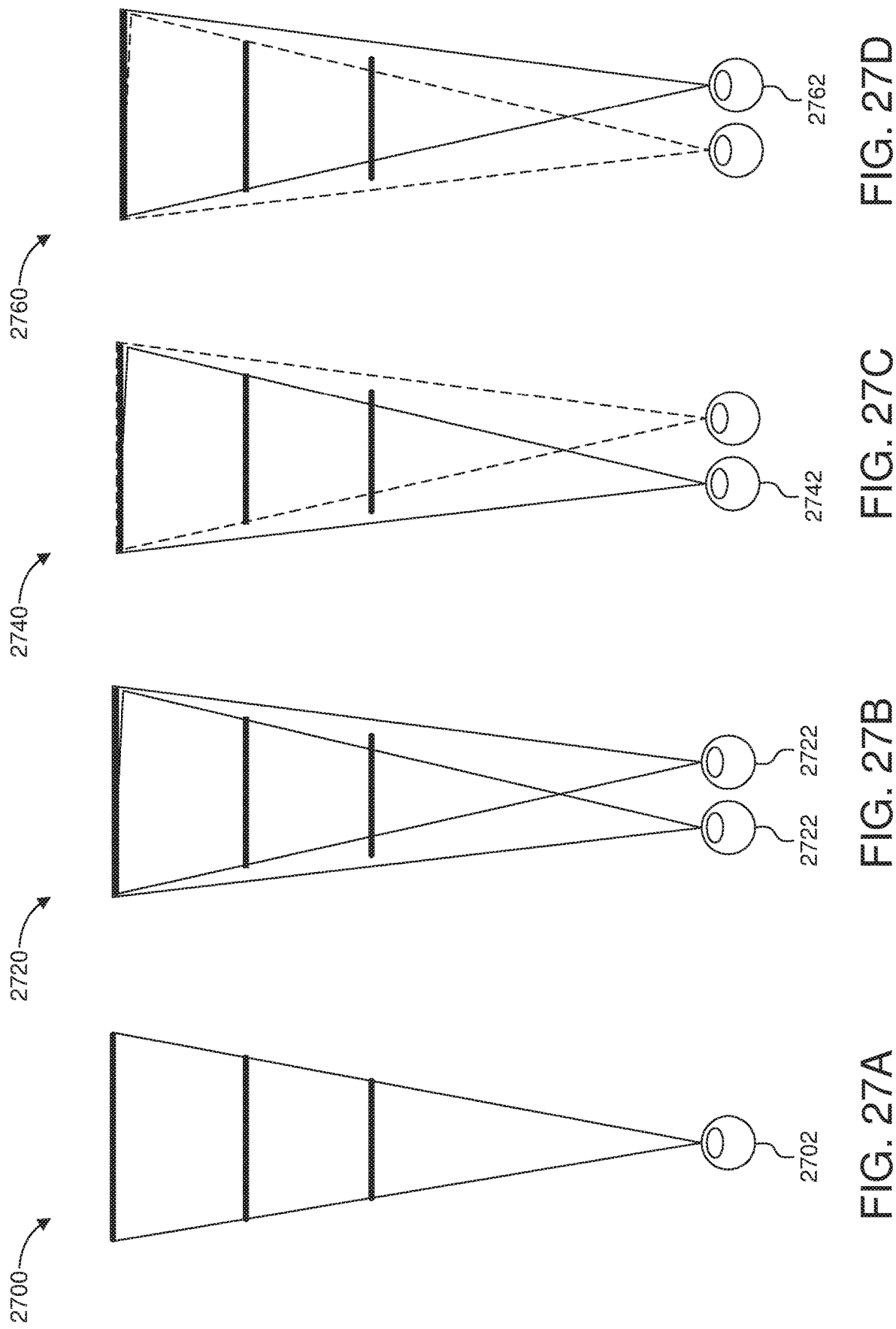

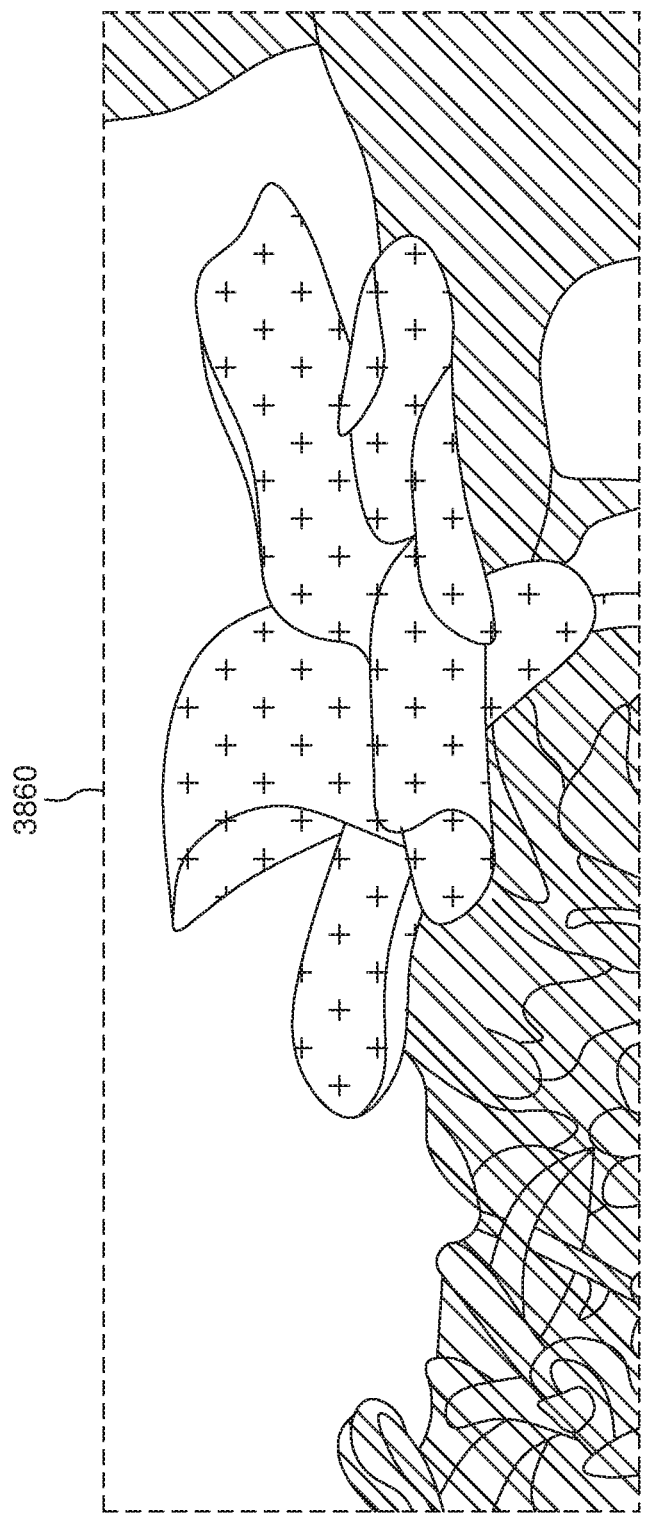

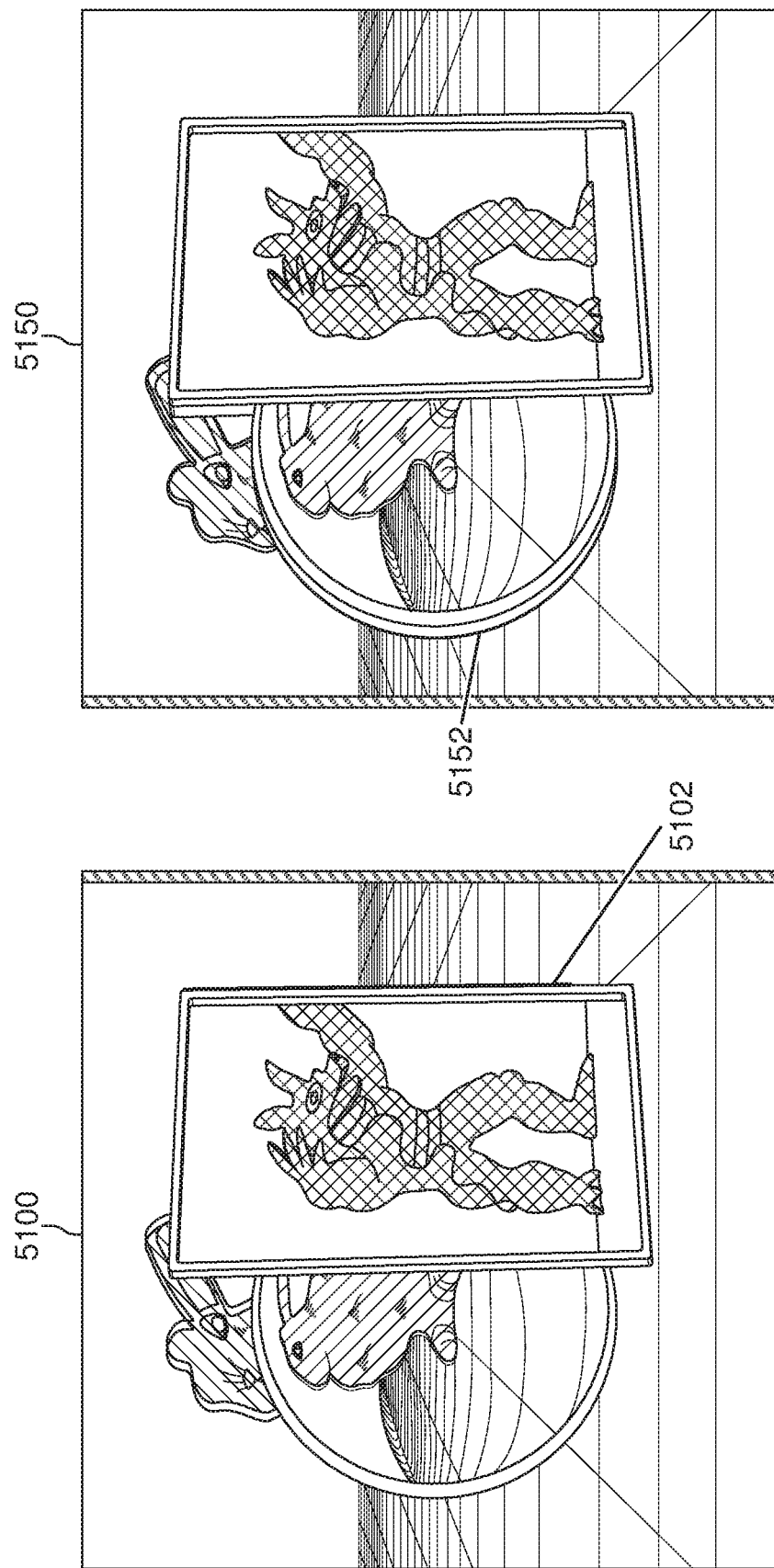

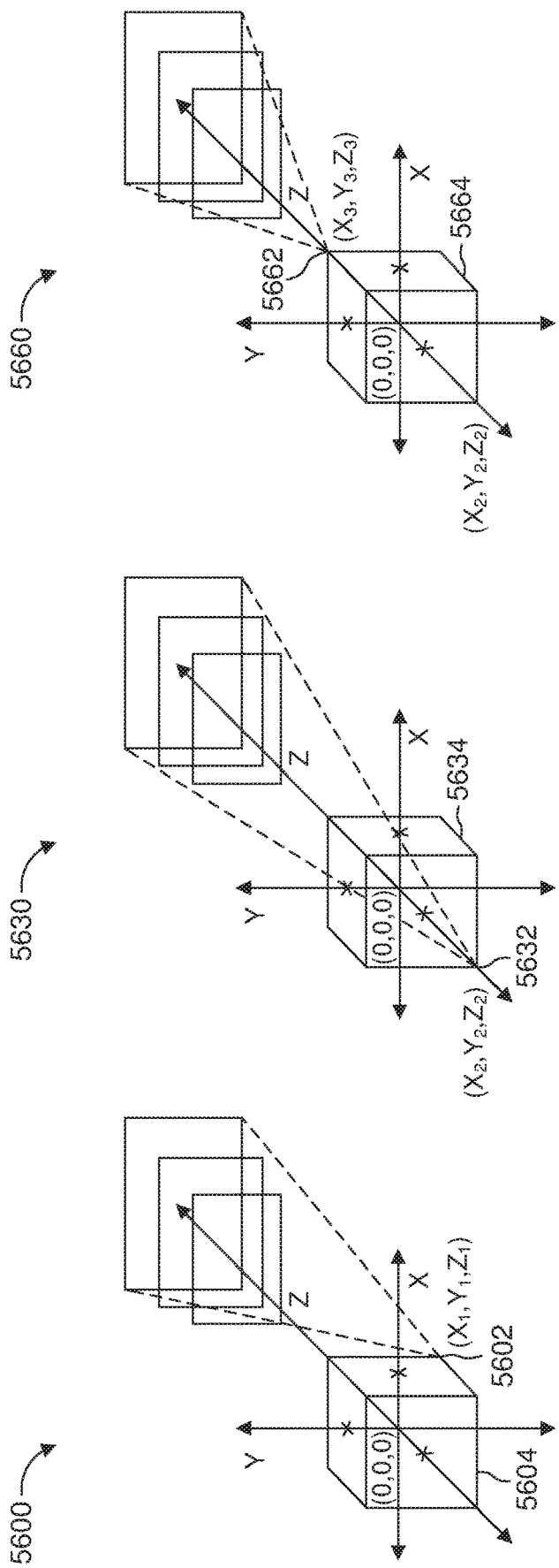

RECEIVING A DESCRIPTION OF THREE-DIMENSIONAL (3D) CONTENT
7002

RECEIVING, FROM A TRACKER, INFORMATION INDICATING MOTION OF A VIEWER RELATIVE TO A MULTI-FOCAL DISPLAY
7004

RESPONSIVE TO RECEIVING THE INFORMATION INDICATING MOTION OF THE VIEWER, SYNTHESIZING MOTION PARALLAX BY ALTERING MULTI-FOCAL PLANES FORMED USING THE 3D CONTENT
7006

RENDERING AN IMAGE TO THE MULTI-FOCAL PLANE DISPLAY USING THE ALTERED MULTI-FOCAL PLANE RENDERING
7008

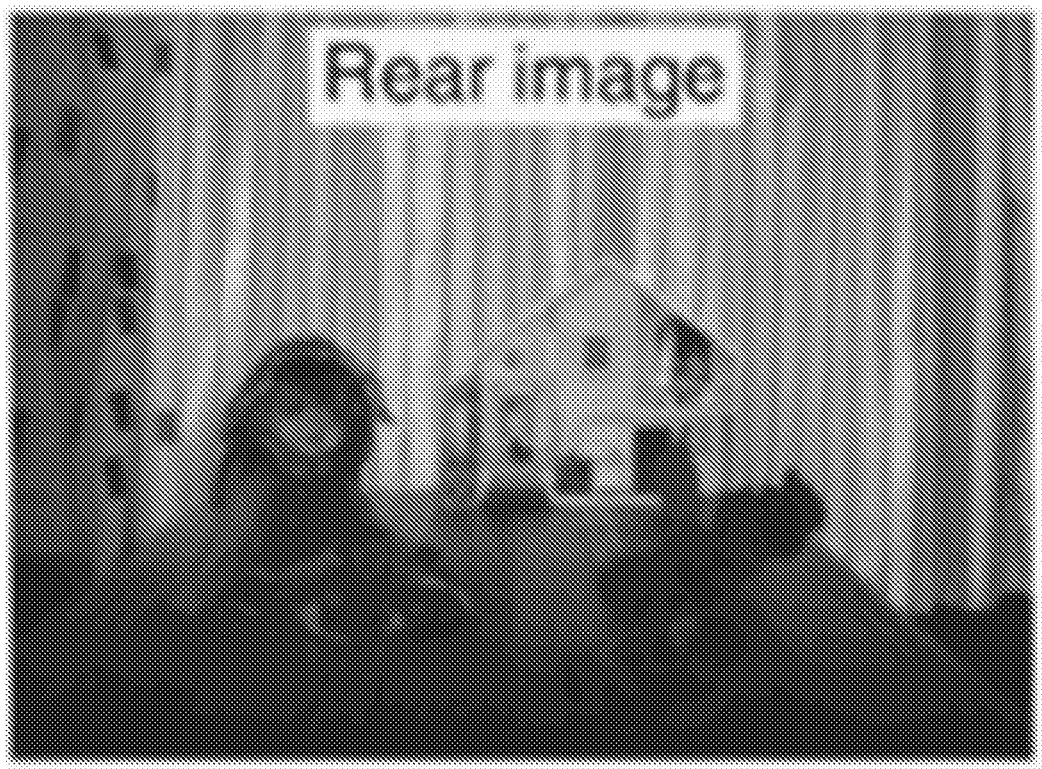
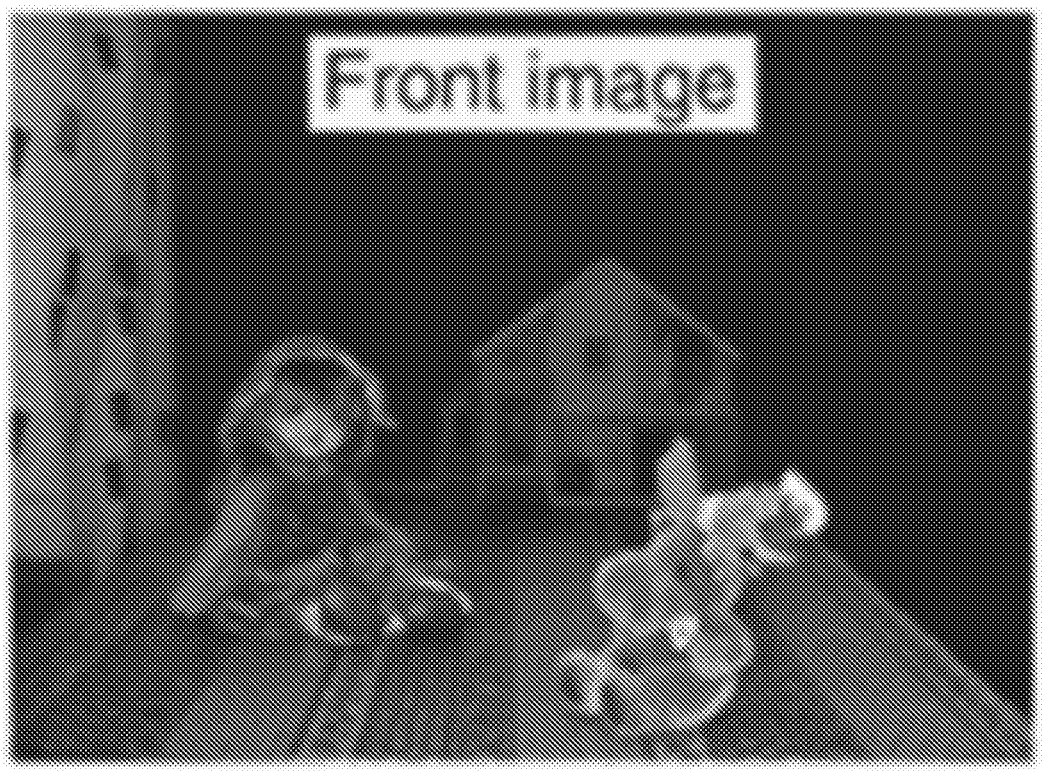
FIG. 72

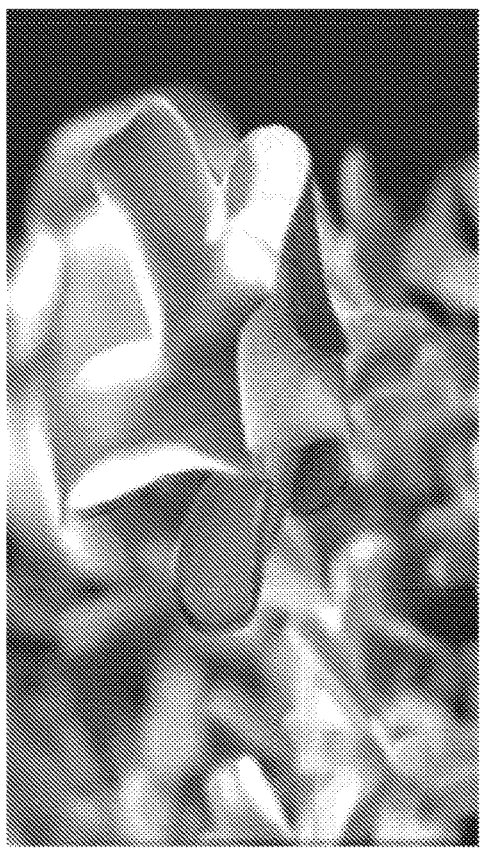
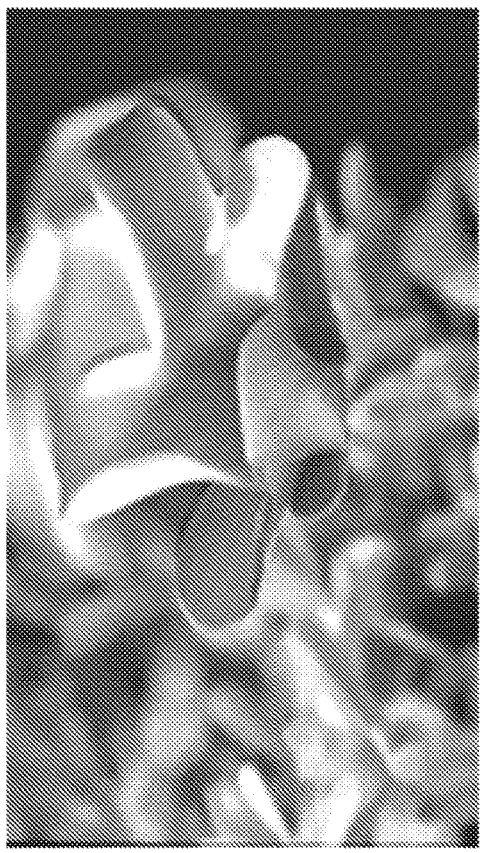
FIG. 77

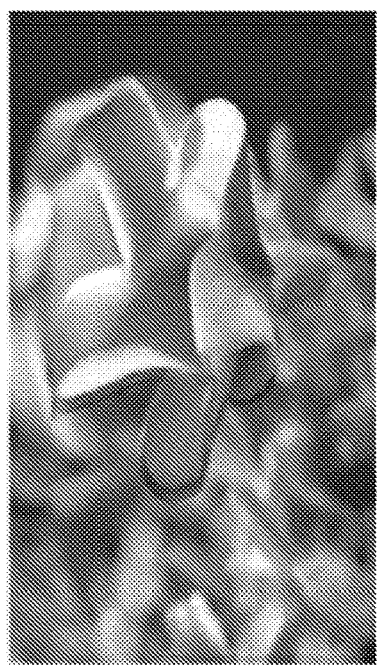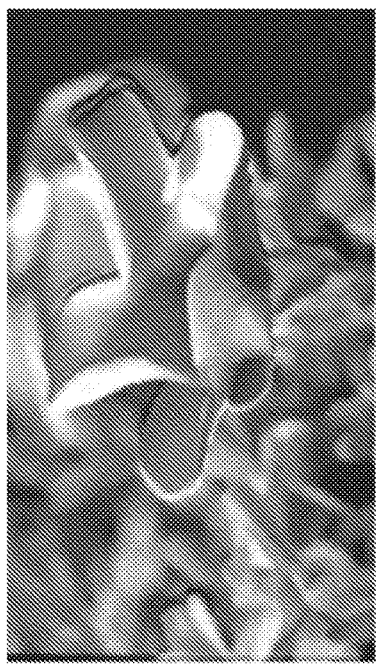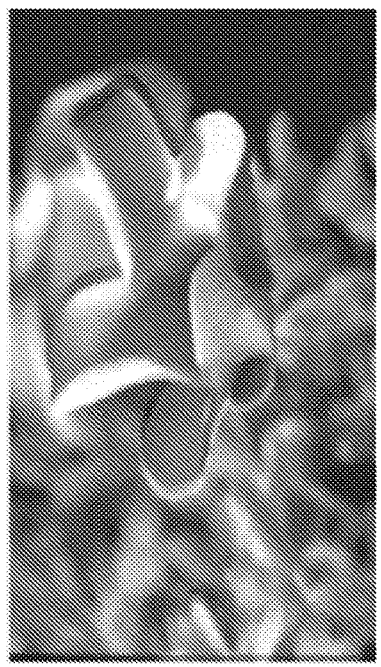
FIG. 78

12          8          4
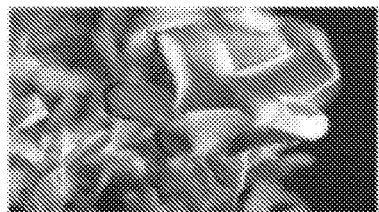 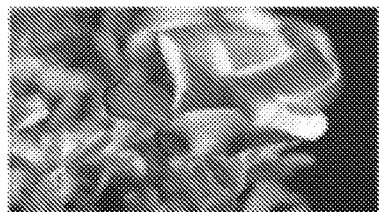 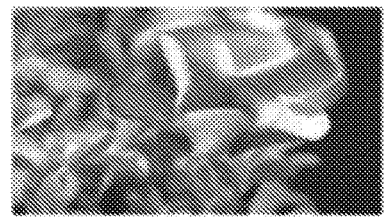
0
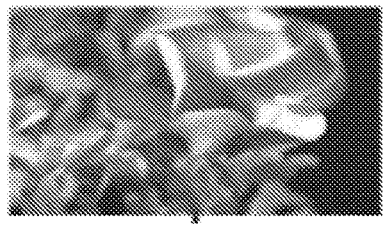
4          8          12
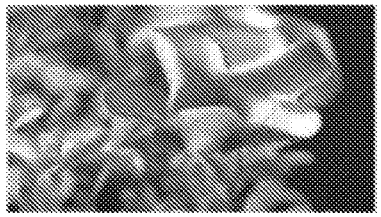 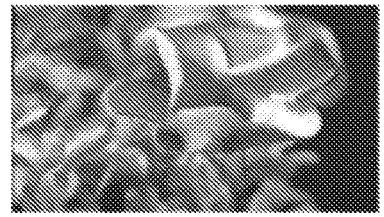 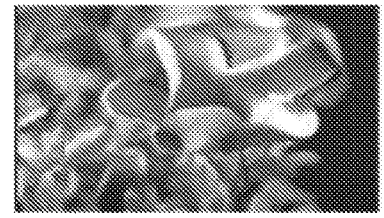
FIG. 79

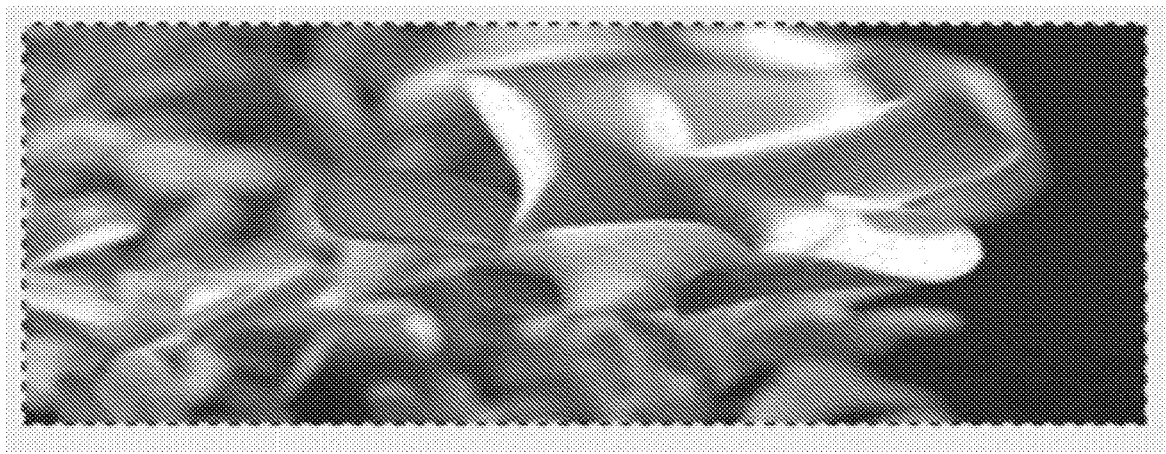
FIG. 82

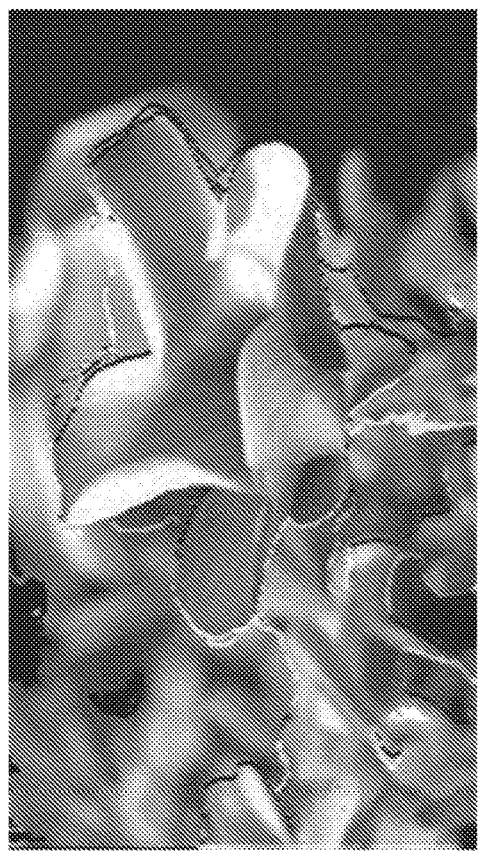
FIG. 87

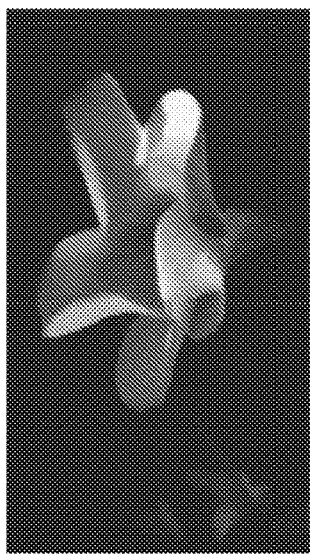
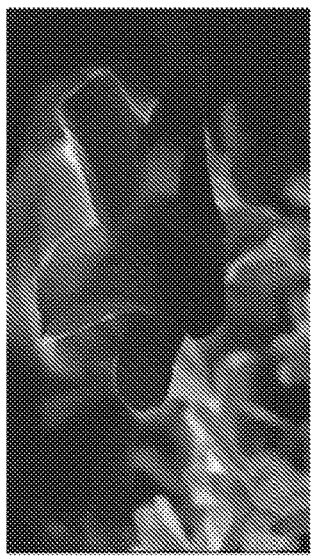
FIG. 88

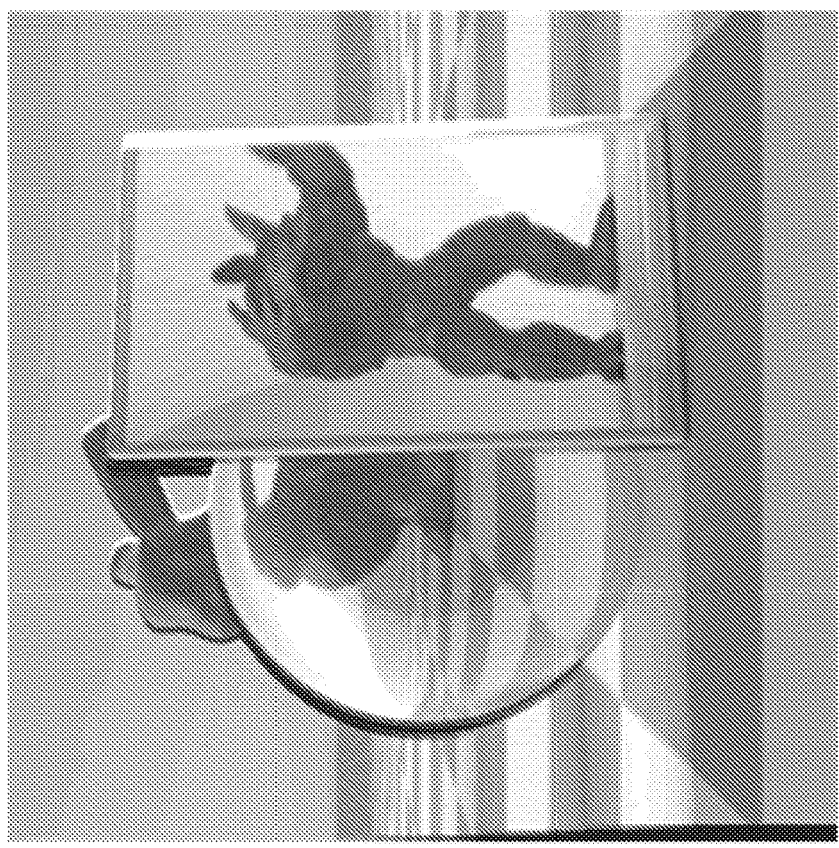
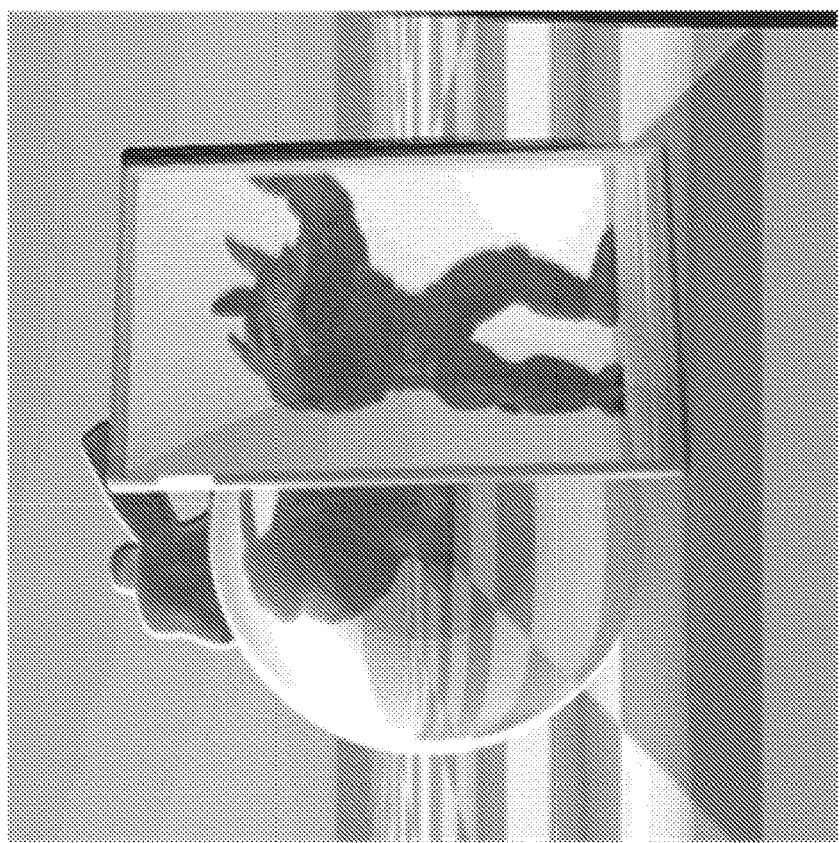
FIG. 89

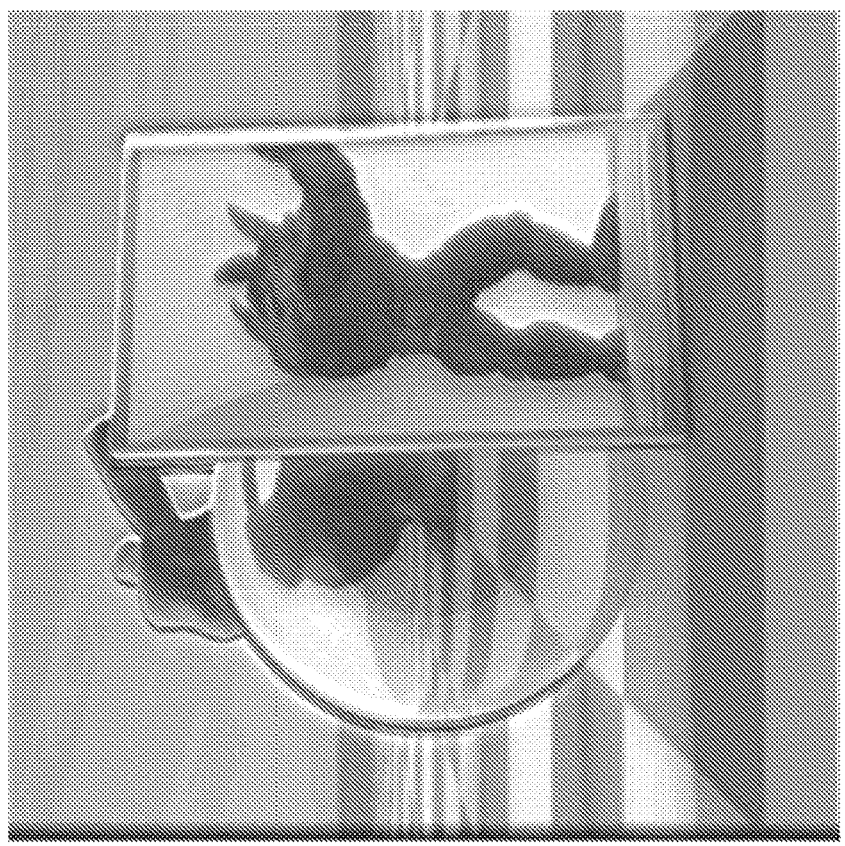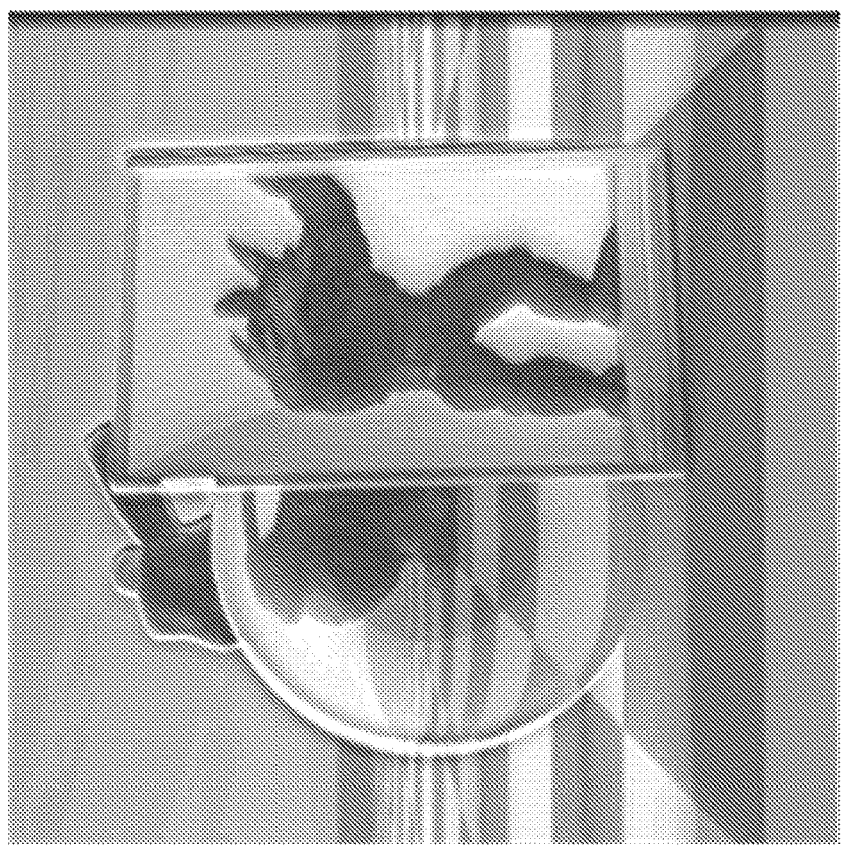
FIG. 90

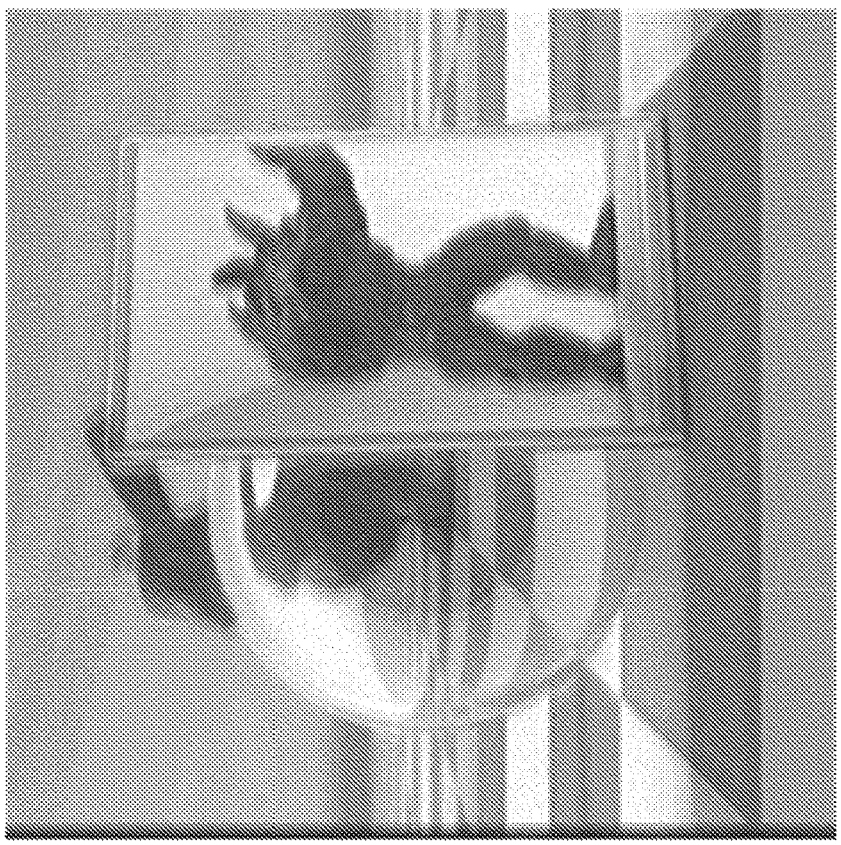
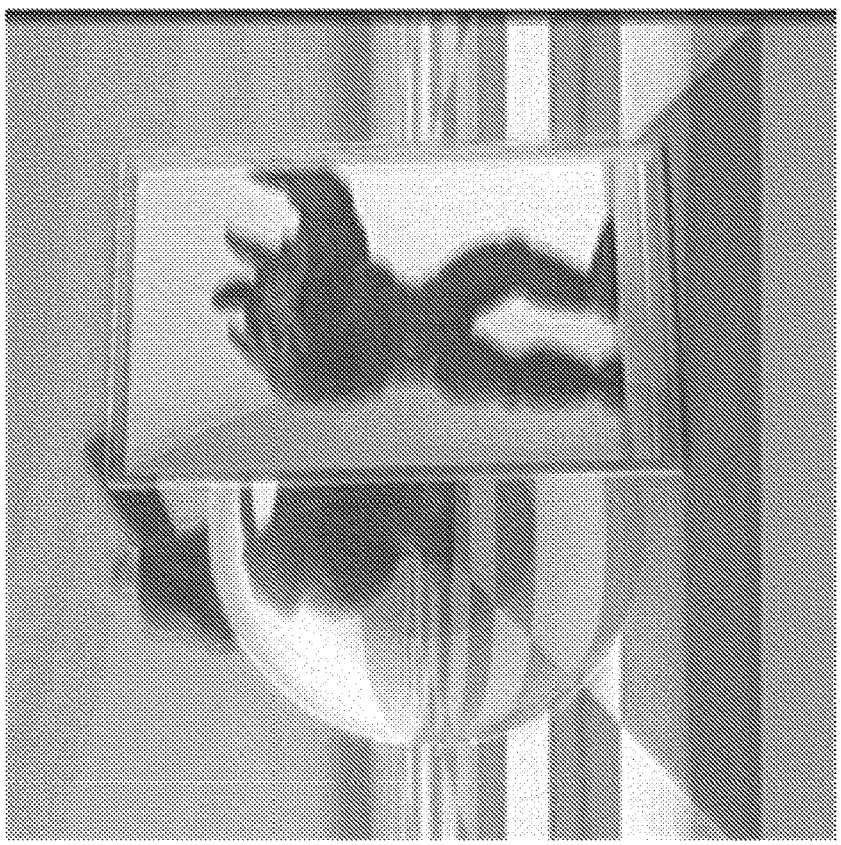
FIG. 91

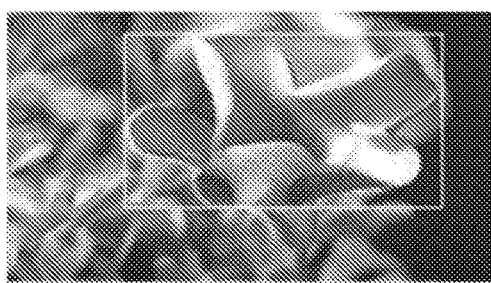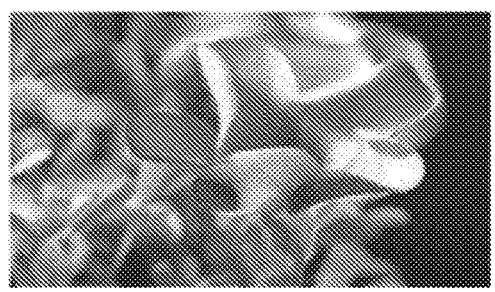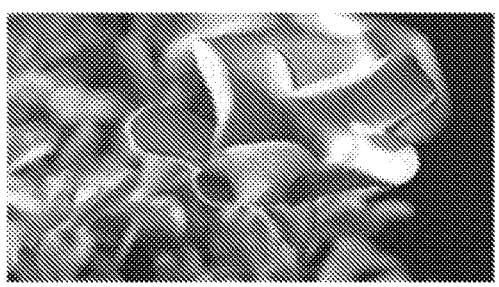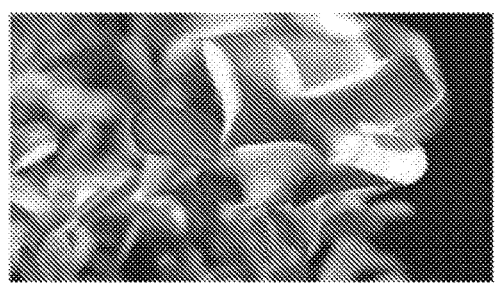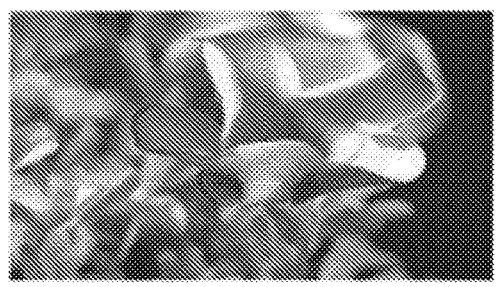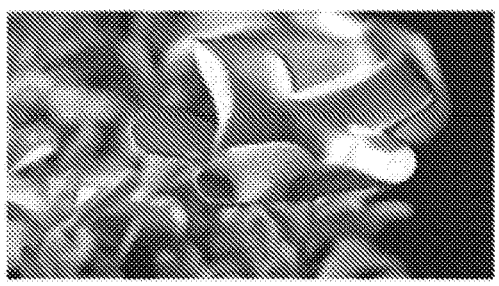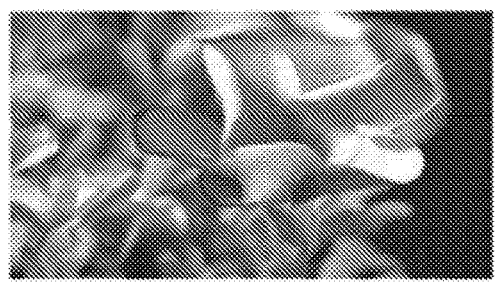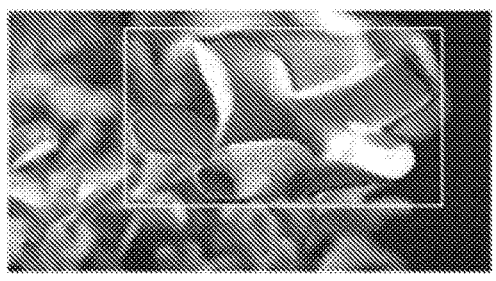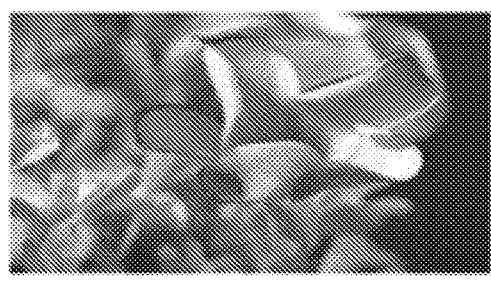
FIG. 92

MULTIFOCAL PLANE BASED METHOD TO PRODUCE STEREOSCOPIC VIEWPOINTS IN A DIBR SYSTEM (MFP-DIBR)

CROSS-REFERENCE TO RELATED APPLICATIONS

The present application is a national stage application under 35 U.S.C. § 371 of International Application No. PCT/US2019/023149, entitled "MULTIFOCAL PLANE BASED METHOD TO PRODUCE STEREOSCOPIC VIEWPOINTS IN A DIBR SYSTEM (MFP-DIBR)," filed on Mar. 20, 2019, which claims benefit under 35 U.S.C. § 119(e) from U.S. Provisional Patent Application Ser. No. 62/647,568, entitled "Multifocal Plane Based Method to Produce Stereoscopic Viewpoints in a DIBR System (MFP-DIBR)," filed Mar. 23, 2018, each of which is hereby incorporated by reference in its entirety.

BACKGROUND

Wearable glasses type of near-eye displays (NED) have become popular in virtual reality and gaming, and recently also in augmented reality. Glasses using a mobile phone as a display element is an example of a popular low-cost device for viewing virtual or camera captured videos. Generally, all of these displays present sequences of stereoscopic image pairs. Stereoscopic rendering may be used with external displays, including those for stereoscopic 3D (S3D) TV.

Many of the previous MFP- or 3D-based viewpoint generation systems, where the viewpoint may change slightly due to user motion, may have lower visual quality. Many near-eye displays supporting natural accommodation lack support for viewpoint changes, including even small viewpoint changes with respect to the display when turning one's eyes (slightly changing viewpoint inside the eye-box). Disocclusions depend naturally on the content but may be more prominent with large viewpoint changes or disparity. Forming virtual viewpoints for stereoscopy or motion parallax may be used for example in 3DoF+ extensions of 360° video and other 3DoF applications.

SUMMARY

An example method in accordance with some embodiments may include: receiving an input image with depth information; mapping the input image to a plurality of focal plane images using the depth information; orienting the plurality of focal plane images using head orientation information to provide stereo disparity between left and right eyes; and displaying the oriented plurality of focal plane images.

In some embodiments of the example method, at least receiving the input image and displaying the oriented plurality of focal plane images are performed by a multi-focal plane (MFP) display.

In some embodiments of the example method, orienting the plurality of focal plane images may include rotating one or more of the plurality of focal plane images.

In some embodiments of the example method, rotating one or more of the plurality of focal plane images may include rotating a disparity vector for one or more of the focal plane images in relation to a vector parallel to a horizon.

In some embodiments of the example method, orienting the plurality of focal plane images may include shifting one or more of the plurality of focal plane images.

In some embodiments of the example method, shifting one or more of the plurality of focal plane images may include scaling a disparity vector for the respective one or more focal plane images.

In some embodiments of the example method, shifting one or more of the plurality of focal plane images may include rotating one or more of the plurality of focal plane images relative to a fixed origin.

In some embodiments of the example method, shifting one or more of the plurality of focal plane images comprises moving one or more of the plurality of focal plane images by an offset relative to a fixed origin.

Some embodiments of the example method may further include processing the plurality of focal plane images to handle image disparities caused by shifting the focal plane images.

In some embodiments of the example method, processing the plurality of focal plane images may include filtering one or more of the focal plane images.

In some embodiments of the example method, processing the plurality of focal plane images comprises: determining depth blending weights for at least one of the plurality of focal plane images; and generating at least one of the plurality of focal plane images using the respective depth blending weights.

In some embodiments of the example method, generating at least one of the plurality of focal plane images comprises multiplying at least one of a plurality of textures by the respective depth blending weights.

In some embodiments of the example method, displaying the oriented plurality of focal plane images may include combining shifted focal plane images to generate a stereoscopic image pair.

Some embodiments of the example method may further include measuring motion tracking sensor readings of a position of a viewer relative to a real-world environment to generate the head orientation information.

Some embodiments of the example method may further include responsive to generating the head orientation information, synthesizing motion parallax by altering one or more of the plurality of focal plane images.

In some embodiments of the example method, the synthesized motion parallax may include scaling one or more of the plurality of focal plane images relative to each other using the head orientation information, and the head orientation information may indicate axial motion.

Some embodiments of the example method may further include: filtering the input image for low frequency content; and redistributing the low frequency content to the plurality of focal plane images.

Some embodiments of the example method may further include: filtering the input image for high frequency content; and decomposing the high frequency content to the plurality of focal plane images.

An example apparatus in accordance with some embodiments may include: a processor; and a non-transitory computer-readable medium storing instructions that are operative, when executed on the processor, to perform one of the example methods described above.

An example method in accordance with some embodiments may include: receiving a description of three-dimensional (3D) content; receiving, from a tracker, information indicating motion of a viewer relative to a real-world environment; responsive to receiving the information indicating motion of the viewer, synthesizing motion parallax by altering multi-focal planes of the 3D content; and rendering an image to the multi-focal plane display using the altered multi-focal plane rendering.

In some embodiments of the example method, the synthesized motion parallax may include scaling the multi-focal planes relative to each other using the information indicating motion of the viewer, and the motion of the viewer may be axial.

An example apparatus in accordance with some embodiments may include: a processor (e.g., one or more processors); and a non-transitory computer-readable medium storing instructions that are operative, when executed on the processor, to perform one of the example methods described above.

An example method in accordance with some embodiments may include: determining a plurality of focal plane images mapped to an input image; orienting the plurality of focal plane images using head orientation information to provide stereo disparity between left and right eyes; and displaying the oriented plurality of focal plane images.

In some embodiments of the example method, determining the plurality of focal plane images comprises receiving the plurality of focal plane images.

In some embodiments of the example method, determining the plurality of focal plane images comprises mapping the input image to the plurality of focal plane images to generate the plurality of focal plane images.

An example apparatus in accordance with some embodiments may include: a processor; and a non-transitory computer-readable medium storing instructions that are operative, when executed on the processor, to perform one of the example methods described above.

An example method in accordance with some embodiments may include: receiving three-dimensional (3D) video content; receiving a viewer orientation signal; determining image data for one or more focal planes of a display using the 3D video content and the viewer orientation signal; and rendering one or more focal plane images to the display using the image data.

An example apparatus in accordance with some embodiments may include: a processor; and a non-transitory computer-readable medium storing instructions that are operative, when executed on the processor, to perform the example method described above.

BRIEF DESCRIPTION OF THE DRAWINGS

A more detailed understanding may be had from the following description, presented by way of example in conjunction with the accompanying drawings. Furthermore, like reference numerals in the figures indicate like elements.

FIG. 2A is a schematic diagram illustrating an example set of focal planes displayed at different depths from a user.

FIG. 2B shows illustrations showing example focal plane images.

FIGS. 11A-11C are schematic perspective views illustrating an example vergence-accommodation conflict (VAC) in many stereoscopic viewing systems.

FIGS. 15A-15C are schematic diagrams illustrating example front and rear focal planes for an example image of a square.

FIGS. 20A and 20B are graphs illustrating examples of weight versus depth according to some embodiments.

FIGS. 23A-23C are schematic front views illustrating example scenarios for stereoscopic image disparities according to some embodiments.

FIGS. 27A-27D are schematic plan views illustrating example focal planes viewed under different viewer orientations according to some embodiments.

FIGS. 38A-38C are a set of computer windows illustrating an example set of interfaces for an image manipulation program showing a depth map image, a depth weighting graph, and a generated focal plane image, respectively according to some embodiments.

FIGS. 51A-51B are illustrations showing example right and left images for a crossed eye stereogram formed using selective Gaussian filtering in redistributing MFPs according to some embodiments.

FIGS. 56A-56C are schematic perspective views illustrating three examples of multi-focal planes shifted and scaled for different viewpoints according to some embodiments.

FIG. 70 is a flowchart illustrating an example process according to some embodiments.

FIGS. 71-92 are grayscale versions of native images corresponding to FIGS. 2B, 14, 16A-16B, 21B-21F, 22B-22F, 28A-28D, 29A-29B, 31A-31F, 35, 36, 38C, 39A-39C, 42B-42F, 43B-43F, 44, 45A-45H, 46A-46B, 48A-48F, 49A-49B, 50A-50B, 51A-51B, and 68A-68J, respectively.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

Example Networks for Implementation of the Embodiments

A wireless transmit/receive unit (WTRU) may be used, e.g., as a MFP display in some embodiments described herein.

Figure 1A:
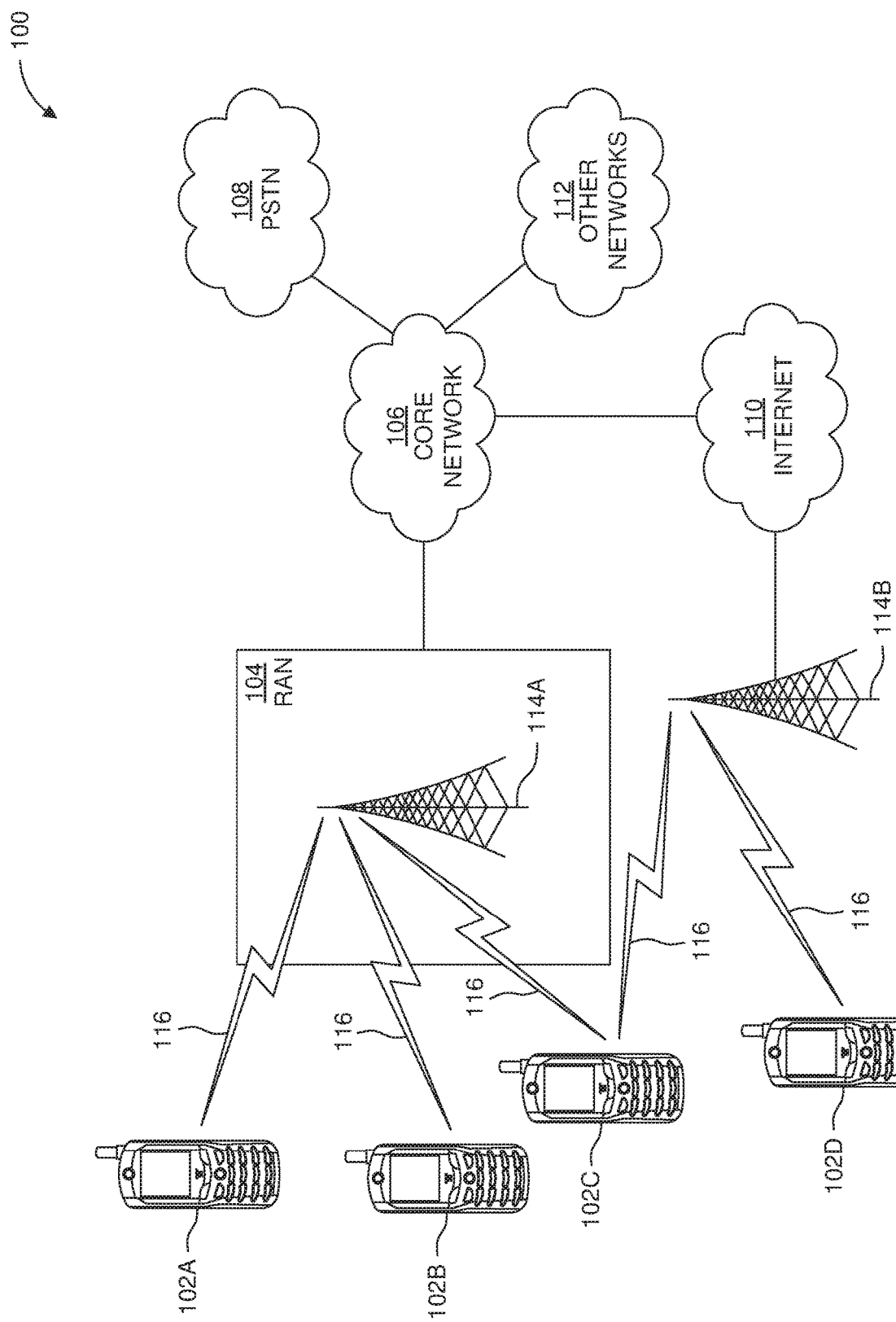
FIG. 1A is a system diagram of an example system illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
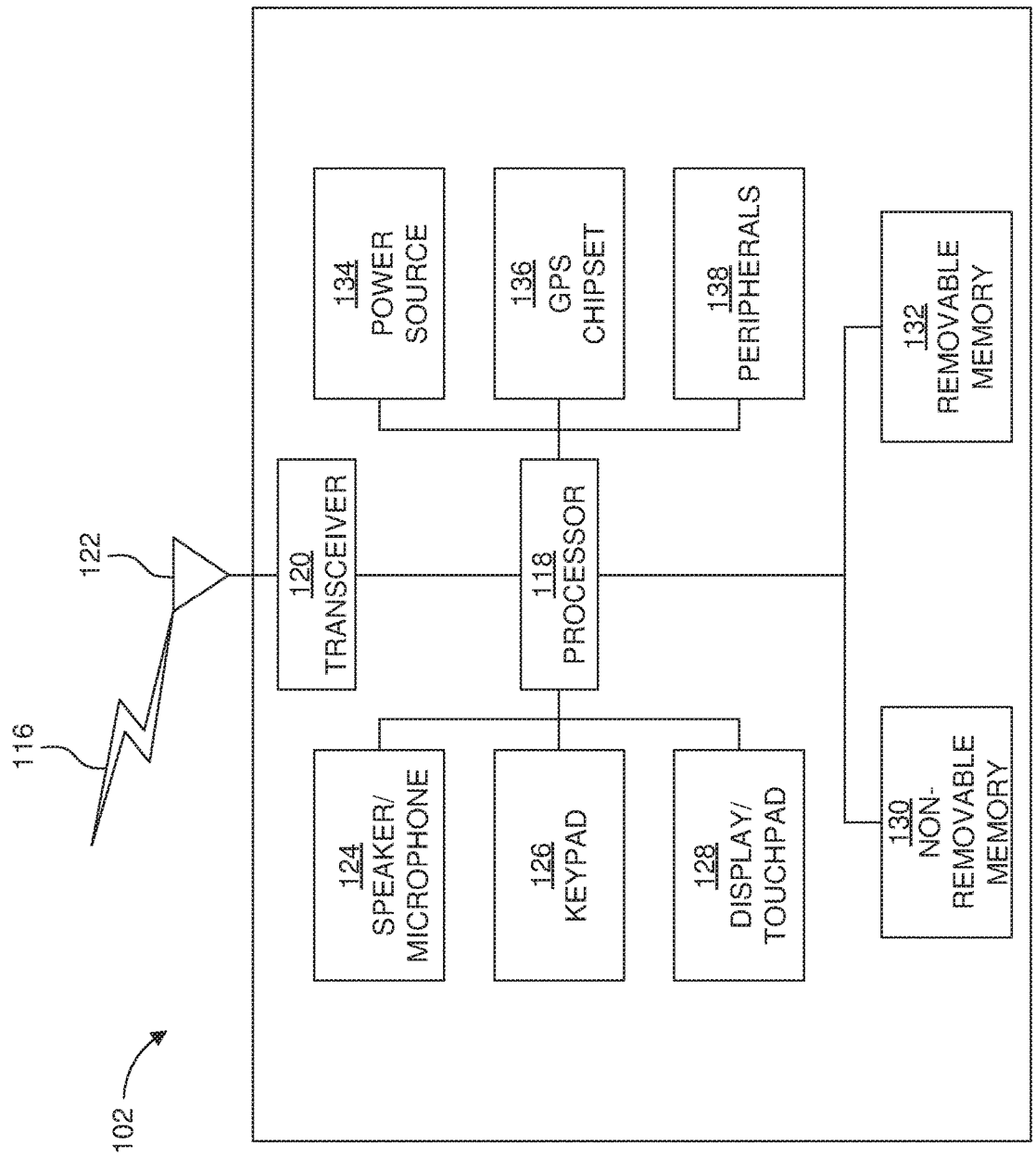
FIG. 1B is a system diagram of an example system illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

MFP-Based Method for Stereoscopic Viewpoints

Systems and methods disclosed herein in accordance with some embodiments describe various example MFP-based embodiments for cost efficient and flexible stereoscopic viewpoint generation in depth-image-based rendering (DIBR) systems. Example methods in accordance with some embodiments for generating virtual viewpoints enable a user to change his/her head tilt and viewing position more freely without degrading the viewing experience. In addition, in some embodiments, the user is provided with natural motion parallax, and personal adjustment for stereopsis, enabled by systems and methods disclosed herein in accordance with some embodiments, for creating stereoscopic disparity. Some embodiments enable producing high quality stereoscopic content and disparity-based interactions both for wearable and external displays. Some embodiments and ways of interactions may be used with emerging MFP displays.

In some embodiments, an MFP-based synthetic disparity is used for producing high quality stereoscopic content for DIBR. In some embodiments, the number of focal planes is not restricted. In addition, forming stereoscopic views at the receiver enables flexible functionalities. Using MFPs enables virtual viewpoint generation with adjustable disparity and orientation, in real-time operation. This methodology enables functionalities, which otherwise may use more complex and more bitrate consuming methods (e.g., real-time 3D and light field systems). A depth plus texture input format is applicable to one or more embodiments, which may use lower bitrates for transmission and storage.

In some embodiments, MFPs are used for producing high quality stereoscopic content with large disparity. Big disparity means large stereoscopic depth and/or keeping small viewing distance to the produced content. Desired accuracy may be achieved by using high number of MFPs, and by selecting and optimizing depth blending functions when forming the MFPs.

In some embodiments of the disclosed methods and systems, virtual stereoscopic projections may be formed in real-time at the receiving site, which enables making stereo content to be viewed with most head tilt orientations of the stereo baseline. Varying disparity and baseline orientation may be produced independently at multiple receiving nodes, and individually for several users per node. In addition, some embodiments support producing motion parallax at any viewing orientation, enabling further naturalness to viewing.

Systems and methods disclosed herein in accordance with some embodiments may be used in forming content for stereo displays, including wearable displays and external screens, and with accommodation-invariant (parfocal) NED, which is a variant of stereoscopic display, which supports natural accommodation (avoiding VAC) if viewing normal stereoscopic content. In some embodiments, virtual disparity adjustment and related interactions may also be implemented into emerging MFP displays with natural accommodation. In some embodiments for forming content with a large disparity, using polynomial blending functions (or other functions weighting pixels over the whole depth range) may bring better quality on object edges.

Systems and methods disclosed herein in accordance with some embodiments relate to forming stereoscopic image pairs (stereograms) in stereoscopic 3D (S3D) video transmission systems and in systems based on depth image-based rendering (DIBR). Some embodiments may use Multifocal Plane (MFP) content, MFP capability, and the number and location of planes. Some embodiments may use dynamic user behavior or content for adjusting disparities.

MFP may provide focus cues, but many systems use only two focal planes for enabling disparity (a compromise image between eyes is shown which creates appearance of stereo 3D). Many previous systems do not perceive continuous depth (both from accommodation and disparity) using larger MFP stacks (>2 planes). In many previous stereo-viewing systems, a separate MFP stack is provided per eye for stereo viewing.

FIG. 2A is a schematic diagram 200 illustrating an example set of focal planes displayed at different depths from a user. FIG. 2B shows illustrations showing example focal plane images. Addressing Vergence Accommodation Conflict (VAC), one system uses Multifocal Plane (MFP) displays to avoid VAC. FIGS. 2A and 2B are figures adapted from an article on optimal rendering for MFP display, Rahul Narain, et al., *Optimal Presentation of Imagery with Focus Cues on Multi-Plane Displays*, 34 (4) ACM TRANSACTIONS ON GRAPHICS 59:1-12 (August 2015) ("Narain"). In FIG. 2A, a user 202 is shown looking at four presentation planes (e.g., focal planes) 204, 206, 208, 210. Images 212, 214, 216, 218 for each of the four planes 204, 206, 208, 210 are shown in FIG. 2B. Such systems may not be responsive to a viewer. MFP provides focus cues but previously has been used with only two focal planes for enabling disparity (a compromise image is shown between the eyes which creates the appearance of stereo 3D). In many previous stereo viewing systems, a separate MFP stack is provided per eye for stereo viewing.

Figure 3:
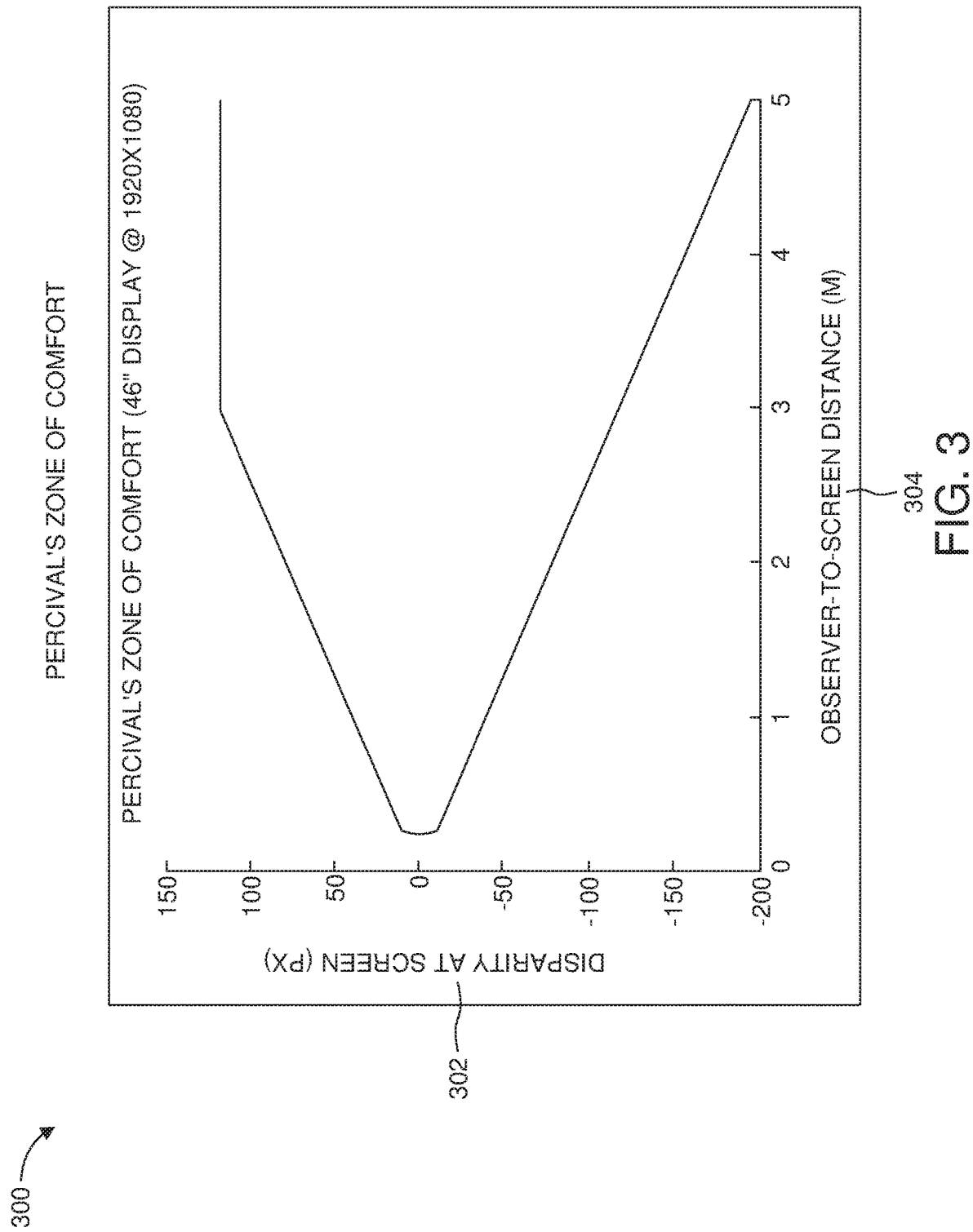
FIG. 3 is a graph illustrating an example image disparity between left and right images versus observer-to-screen distance for Percival's Zone of Comfort.

FIG. 3 is a graph illustrating an example image disparity between left and right images versus observer-to-screen distance for Percival's Zone of Comfort. FIG. 3 is a graph 300 of Percival's Zone of Comfort. The graph shows image disparity between left and right images 302 versus observer-to-screen distance 304 for viewer comfort based on Percival's Zone of Comfort theorem. FIG. 3 is shown in the article Pan, et al., *3D Video Disparity Scaling for Preference and Prevention of Discomfort*, 7863 PROCEEDINGS OF SPIE (2011) ("Pan").

Figure 4:
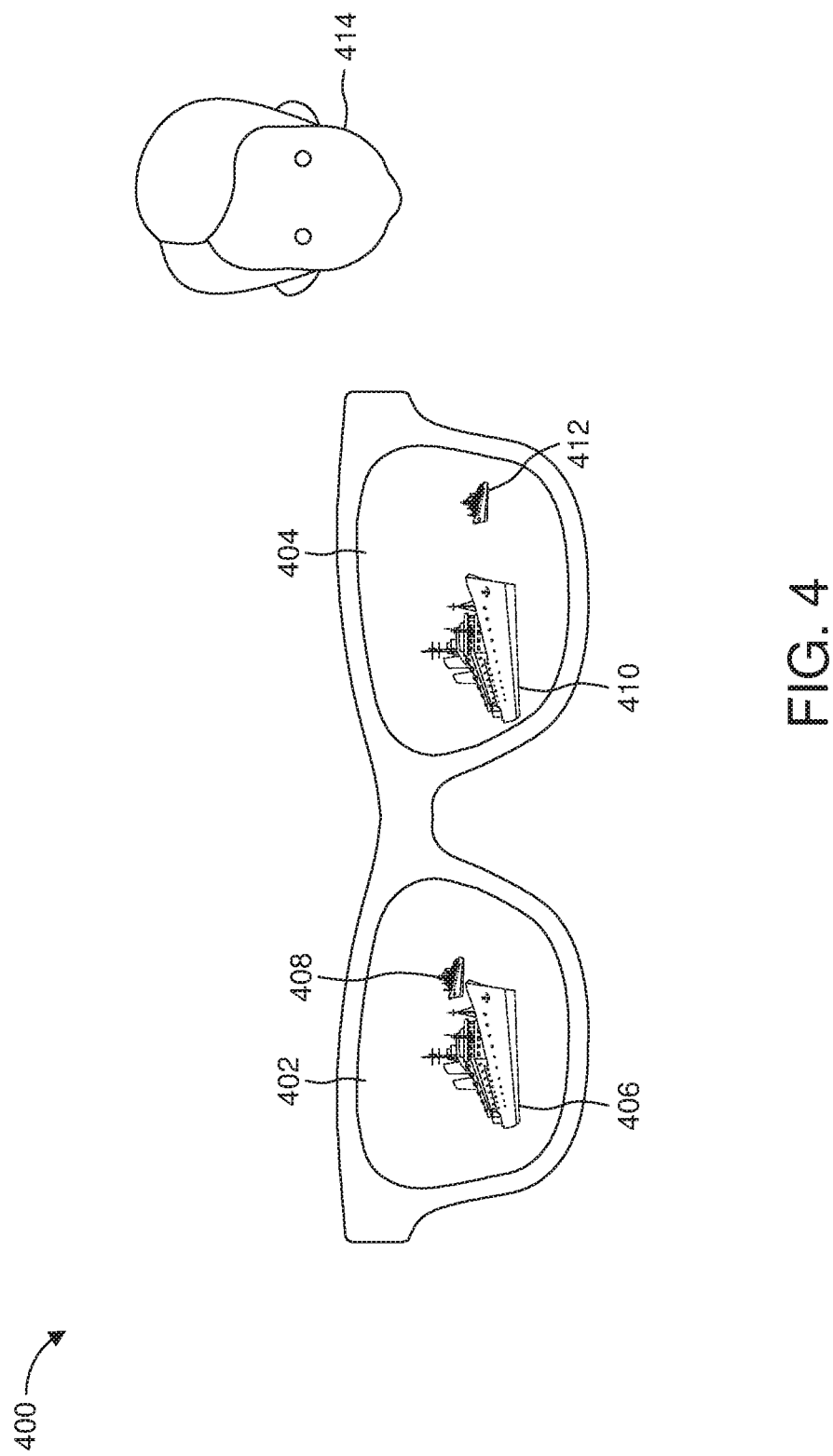
FIG. 4 is a schematic diagram illustrating example left and right eye images for a stereoscopic display for a viewer with an unrotated orientation.

FIG. 4 is a schematic diagram illustrating example left and right eye images for a stereoscopic display for a viewer with an unrotated orientation. FIG. 4 shows left and right images displayed for a near eye display viewer as seen by a user. FIG. 4 shows a parallax scenario 400 in viewing the small boat in the distance behind the large foreground boat. The right eye image 404 shows more of the small boat 412 to the right of the large boat 410 than the left eye image 406 which shows the top of the small boat 408 behind the large boat 406. The head icon 414 on the right side of FIG. 4 indicates the original orientation of the viewer.

Figure 5:
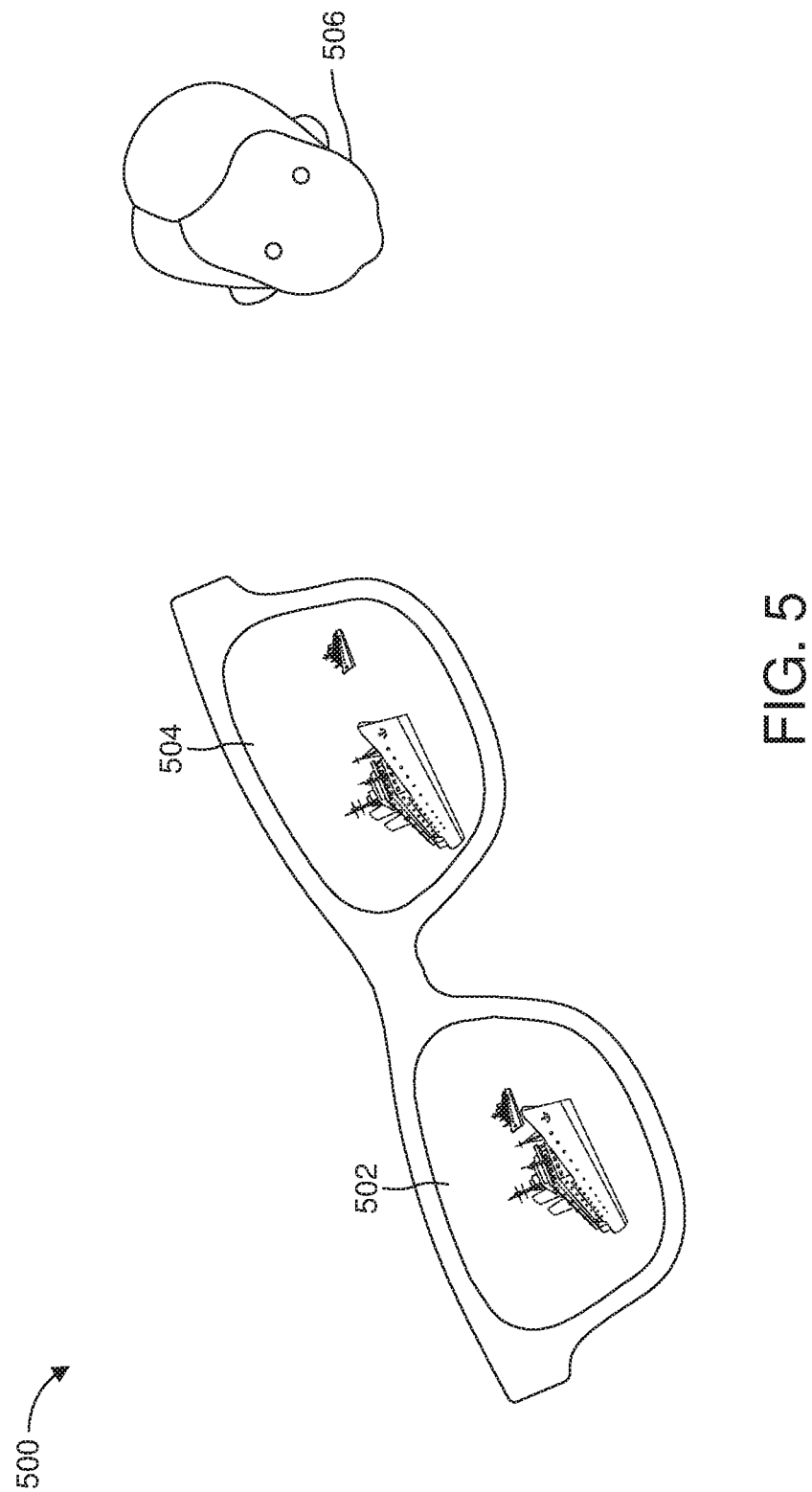
FIG. 5 is a schematic diagram illustrating example left and right eye images, bound in glasses coordinates, for a stereoscopic display for a viewer with a rotated orientation with the horizon tilting with the head.

FIG. 5 is a schematic diagram illustrating example left and right eye images, bound in glasses coordinates, for a stereoscopic display for a viewer with a rotated orientation with the horizon tilting with the head. FIG. 5 shows the left and right images displayed for a near eye display with a rotation of the viewer. For the scenario 500 of FIG. 5, the head icon 506 on the right side of FIG. 5 shows the rotated orientation of the viewer as seen by an outside observer standing in front of the viewer. The glasses and near eye display are shown from the perspective of the viewer as worn by the viewer. For FIG. 5, the same images 502, 504 shown in FIG. 4 are shown irrespective of the rotated orientation. This means that 3D perception stays correct, but the horizon rotates along the viewers orientation, violating viewing in the physical world.

Figure 6:
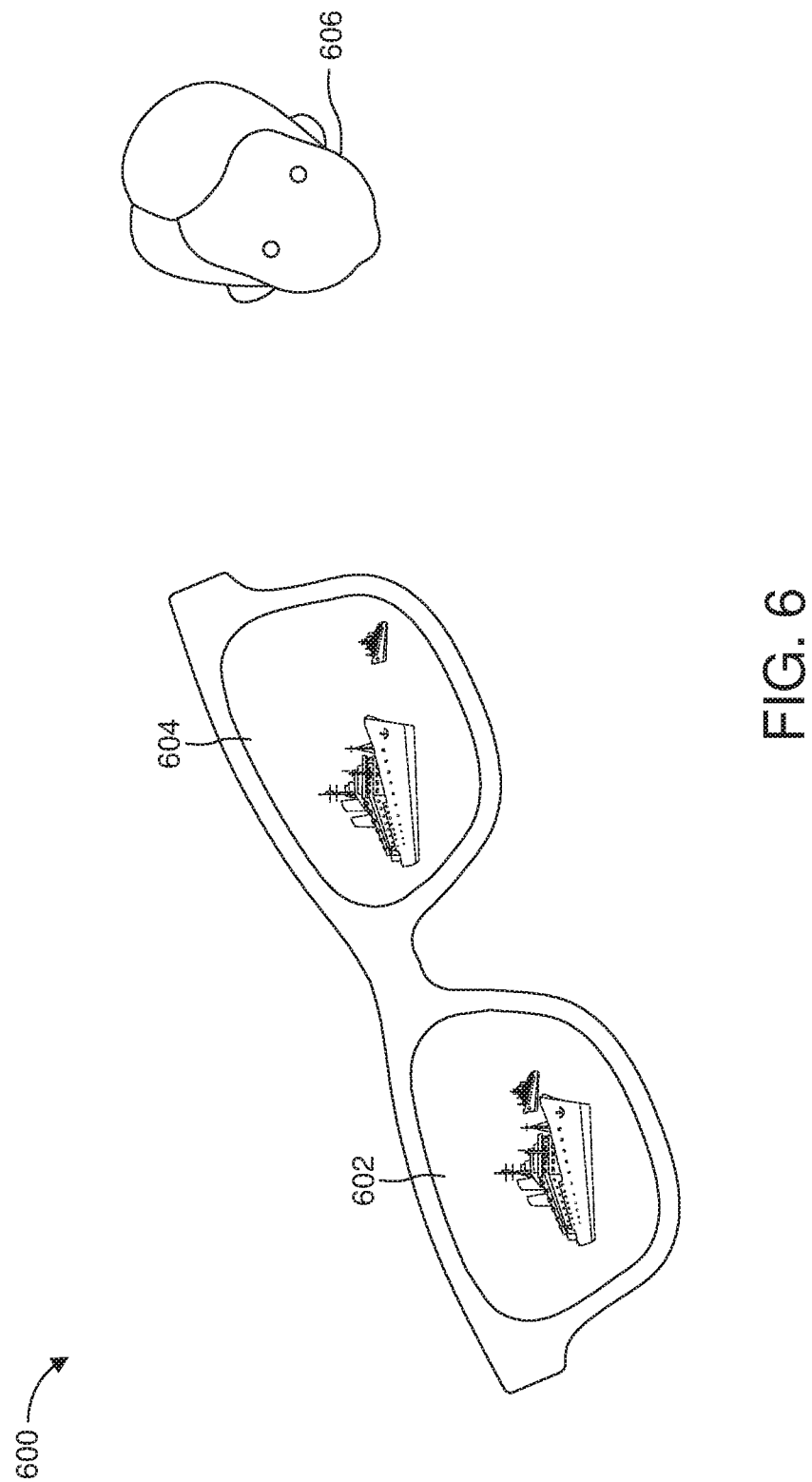
FIG. 6 is a schematic diagram illustrating example left and right eye images, adjusted to meet the orientation of the horizon, for a stereoscopic display for a viewer with a rotated orientation and unchanged disparity.

FIG. 6 is a schematic diagram illustrating example left and right eye images, adjusted to meet the orientation of the horizon, for a stereoscopic display for a viewer with a rotated orientation and unchanged disparity. FIG. 6 shows the left and right images displayed for a near eye display with the same rotation of the viewer as is shown in FIG. 5. For the scenario 600 of FIG. 6, the same images 602, 604 as the original orientation of FIG. 4 are rotated corresponding to the rotation shown for the head icon 606 to keep the images horizontal. The disparity between the left and right images 602, 604 is the same as FIGS. 4 and 5 (stays along the horizontal baseline). Although the horizon for the rendering is aligned with the real world, 3D perception is distorted because the disparity does not match the rotated orientation.

Figure 7:
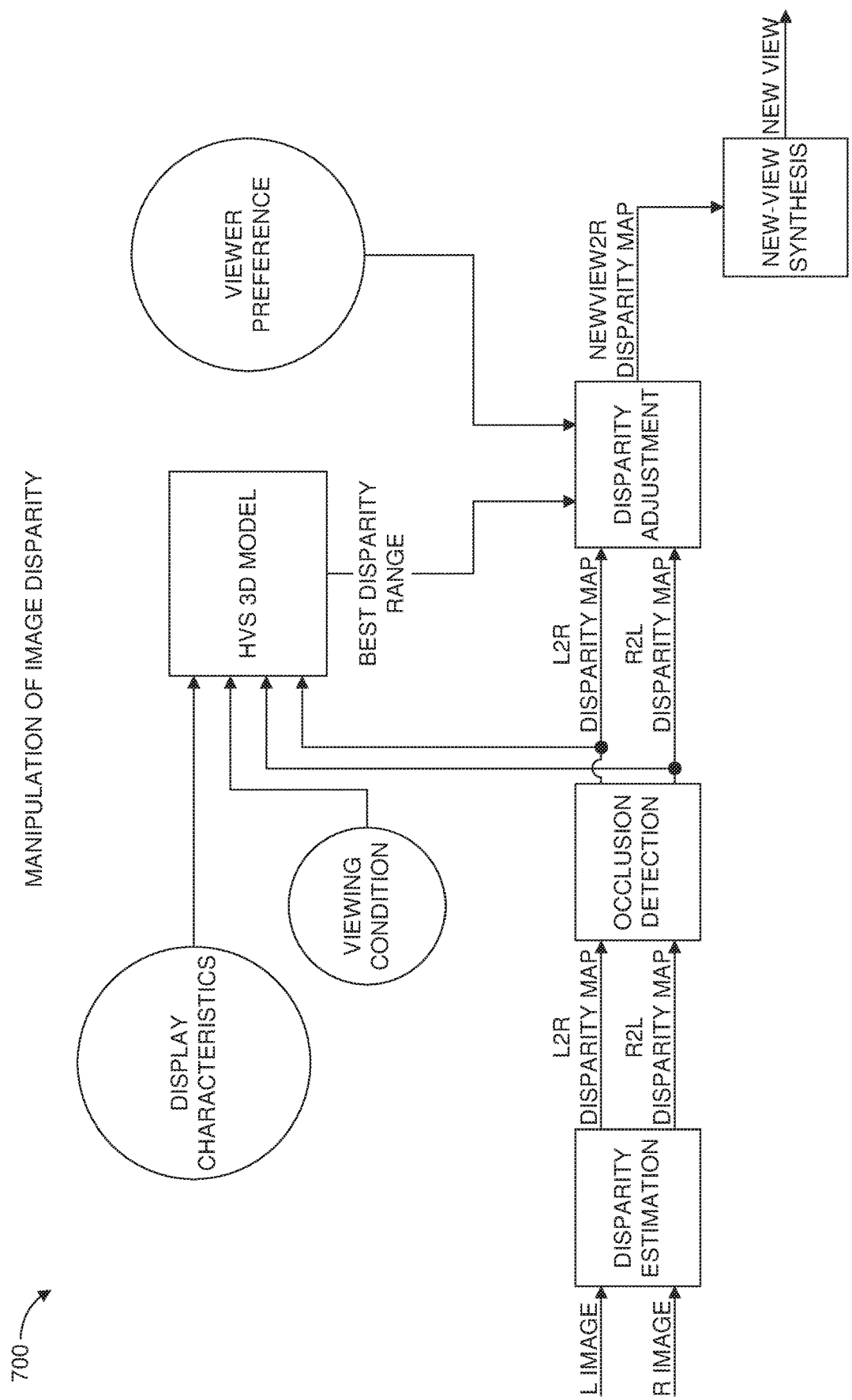
FIG. 7 is a system diagram illustrating an example set of interfaces for manipulation of image disparities.

FIG. 7 is a system diagram illustrating an example set of interfaces for manipulation of image disparities. FIG. 7 is a system interface diagram, which comes from Pan, for manipulation of image disparities. Many systems that produce stereo pairs at capture do not support individual user motion (such as occlusions, variable stereo baselines, and non-horizontal orientations). One system 700 with some user customization of disparity is described in Pan, which is understood to be limited to variation of rendering disparities. Such a system 700 adjusts disparities based on user preferences. Such a system is understood to provide only spacing adjustments.

Figure 8:
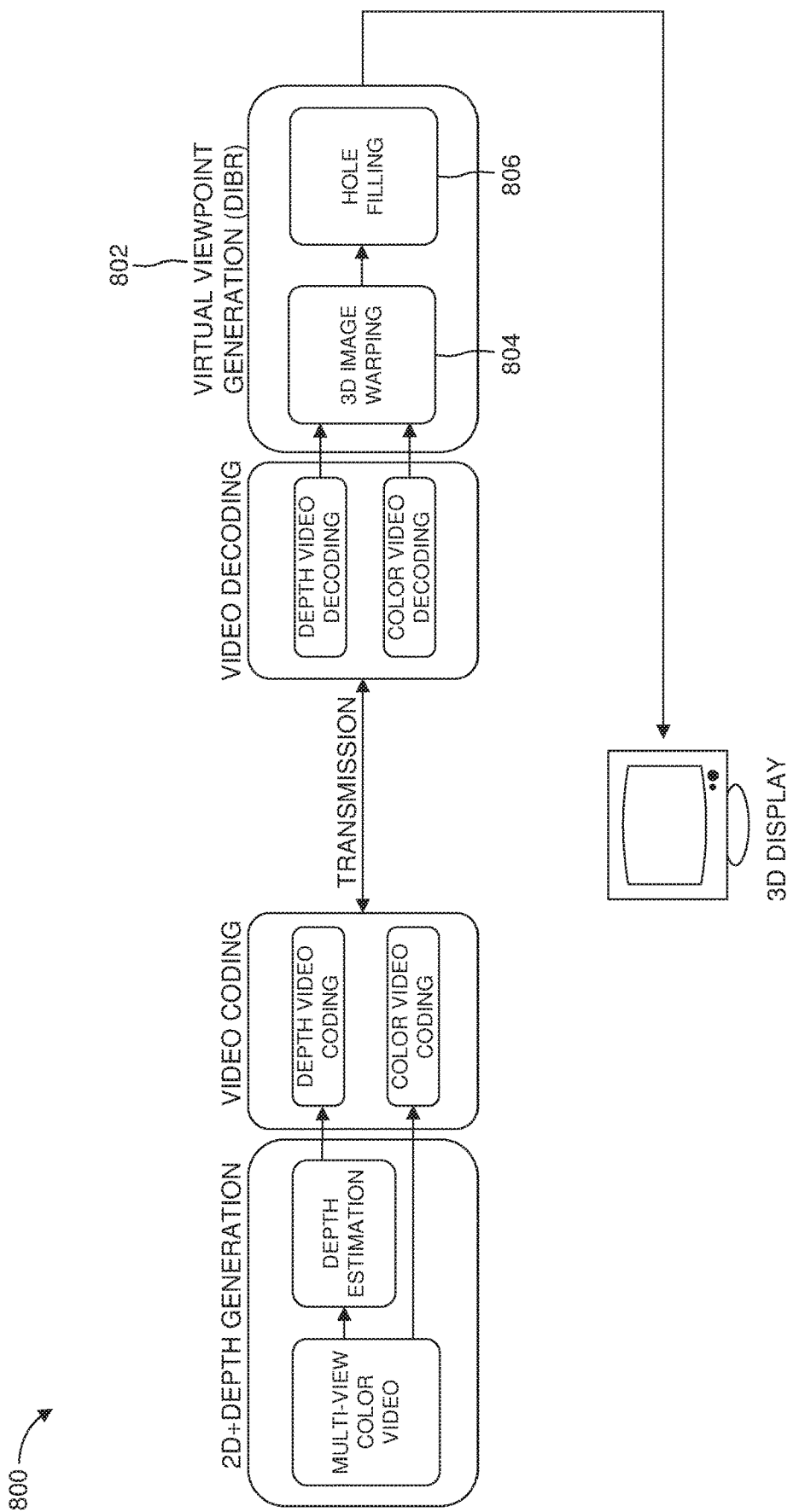
FIG. 8 is a system diagram illustrating an example set of interfaces for a DIBR-based 3D transmission system.

FIG. 8 is a system diagram illustrating an example set of interfaces for a DIBR-based 3D transmission system. FIG. 8 shows an interface diagram for one configuration of a DIBR-based 3D transmission system 800, which is adapted from journal article Linwei Zhu, et al., *View-Spatial-Temporal Post-Refinement for View Synthesis in 3D Video Systems*, 28 Signal Processing: Image Communication 1342-1357 (2013) ("Zhu").

Many DBIR-based systems enable stereoscopic image formation as a post-processing stage at the receiver, while many previous stereoscopic video systems are less flexible. The amount of stereoscopic disparity and depth budget may depend heavily on the captured content, and control of disparity and depth budget may be in some cases be more advantageous afterwards than, e.g., during shooting of scenes but may be difficult due to, e.g., parameters fixed in the production/front end.

In many DIBR systems, at the receiving side, virtual viewpoint generation 802 consists of 3D warping 804 and hole filling 806 stages (cf. virtual viewpoint generation block 802 in FIG. 8). 3D warping 804 is used to form two virtual views to the textured depth map, as seen from the two eye-points of a viewer.

Figure 9:
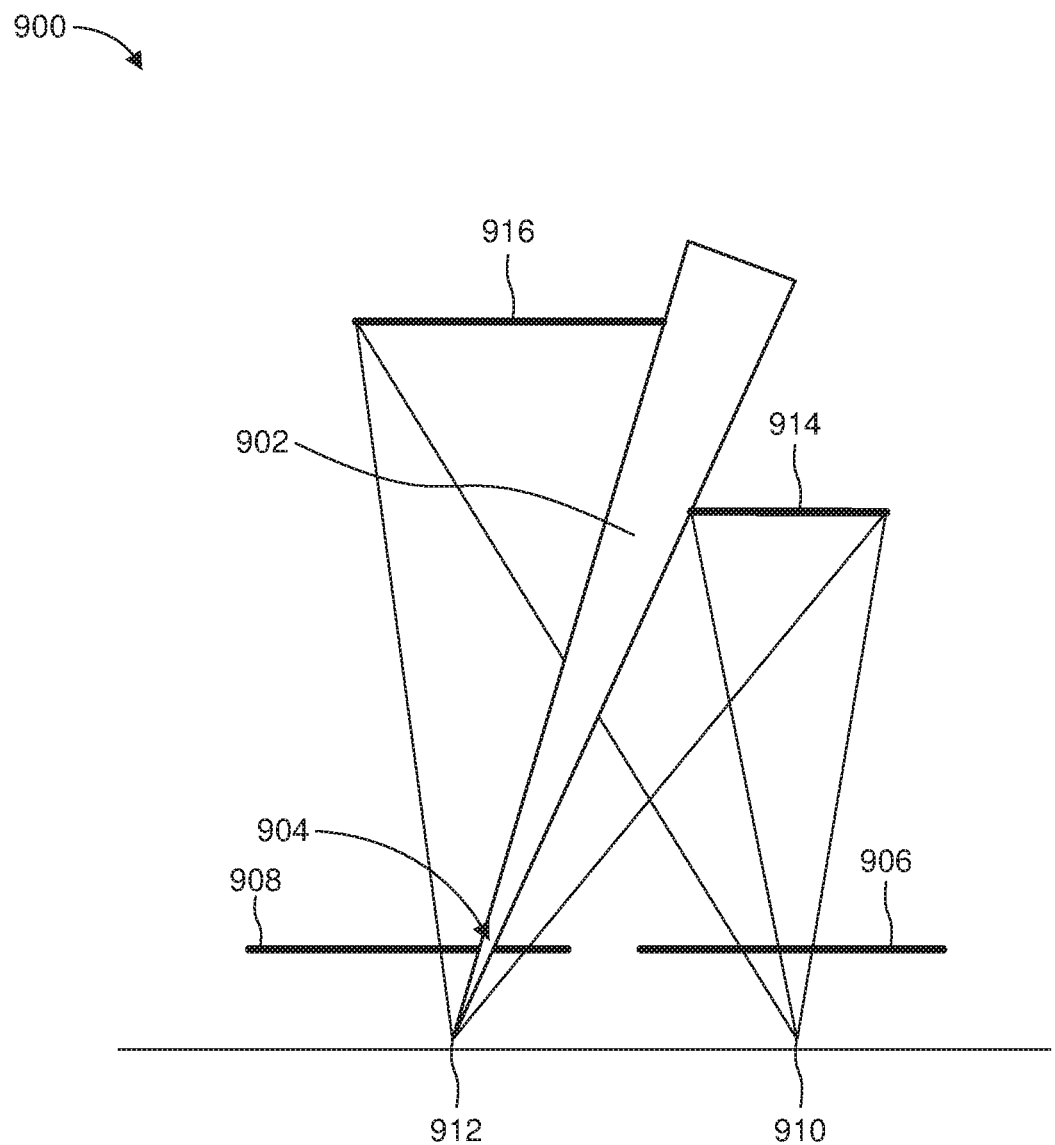
FIG. 9 is a schematic plan view illustrating an example scenario showing the appearance of disocclusions if changing between source and target cameras.

FIG. 9 is a schematic plan view illustrating an example scenario showing the appearance of disocclusions if changing between source and target cameras. Often, the corresponding perspective changes reveal parts of the view behind occluding objects. As illustrated by the schematic picture 900 in FIG. 9 and the example in FIGS. 10A and 10B, disocclusions (or disocclusion regions 902) may appear as gaps or holes 904 in each new perspective image because the captured texture or depth does not include information from those areas. In FIG. 9, disocclusions related to a close object 914 and a far object 916 may be produced if changing the viewpoint from source to target as shown by the viewpoint lines for source camera 910 and target camera 912 and the respective source image 906 and target image 908.

Figure 10B:
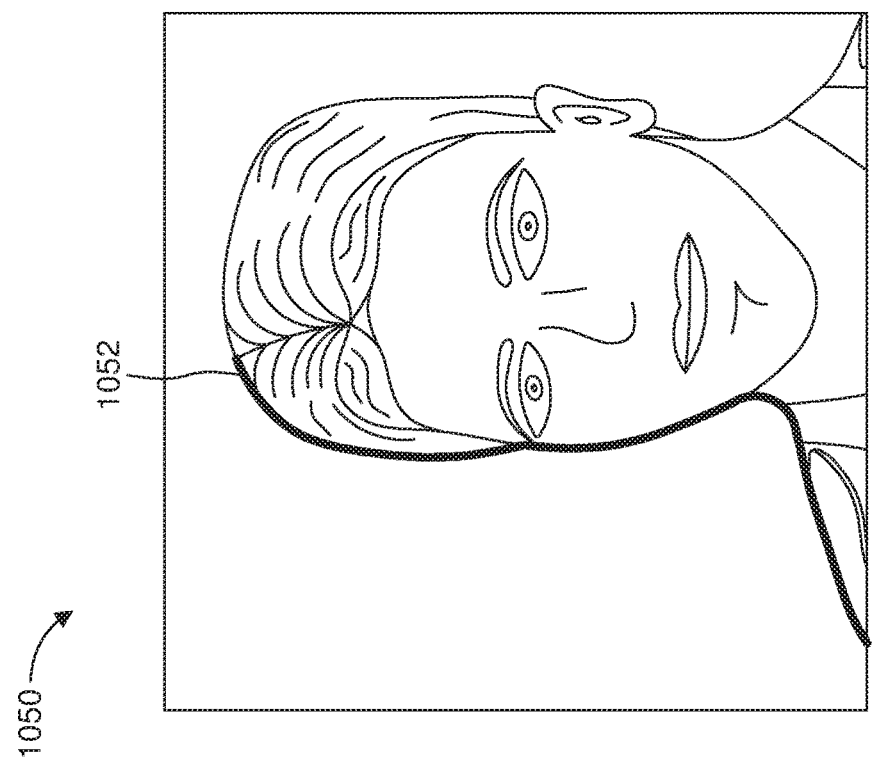
FIGS. 10A and 10B are illustrations showing an example 3D-warped image before and after hole filling.
Figure 10A:
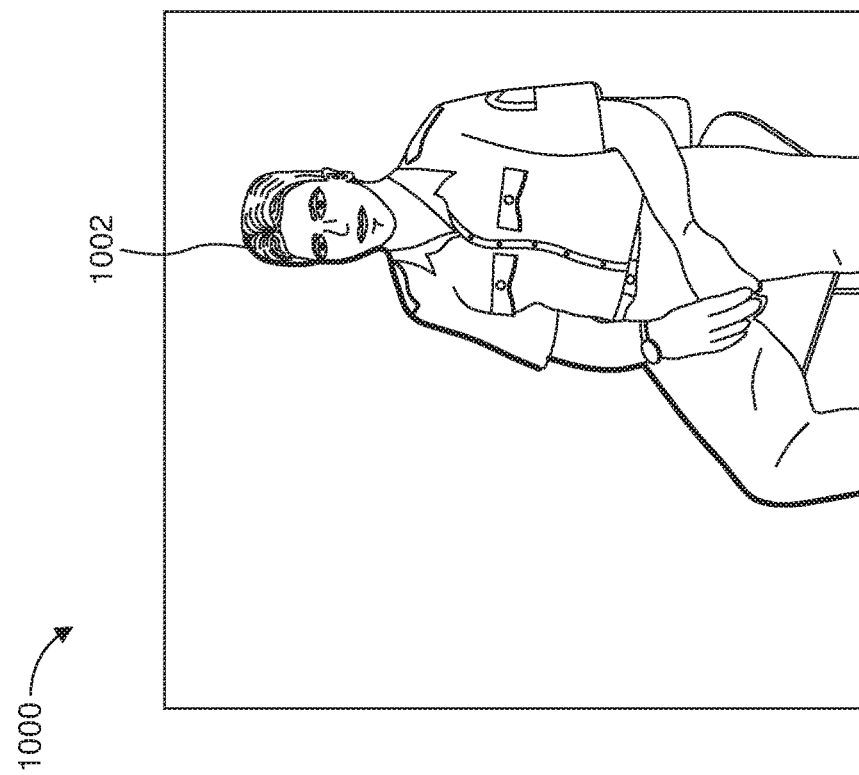

FIGS. 10A and 10B are illustrations showing an example 3D-warped image before and after hole filling. FIGS. 10A and 10B show an example of a 3D-warped image. The example shows the left eye image only. The right eye image is formed in the same way and has similar defects, but on the right side of objects. FIGS. 10A and 10B shows an example of disocclusions produced by 3D warping. The original monoscopic image 1000 is on the left, and a detail of the 3D-warped image 1050 is on the right (with linear interpolation-based hole-filling 1052 to fill the whitespace holes 1002 shown on the left side image 1000 as a black line due to the use of black and white line drawings with this application). For some embodiments, a method may include processing focal plane images to handle gaps caused by shifting the focal plane images. Some embodiments may filter one or more focal plane images to handle such gaps (e.g., to handle image disparities caused by shifting one or more focal plane images). FIGS. 10A and 10B are line drawing versions adapted from slide 14 of a presentation by Sergey Sukhanov, *3D Content Production*, ST. PETERSBURG ELECTROTECHNICAL UNIVERSITY (undated presentation; obtained from www.slideshare.net/mikhailvink/sergey-a-sukhanov-3d-content-production; website indicates published Mar. 12, 2011) (last accessed Feb. 26, 2019).

In hole filling, various image and depth map filtering and inpainting algorithms may be used to fill in the holes or other forms of disocclusions. The type and number of occlusions depends much on the content, and so are the distortions and their visibility. 3D warping may be performed by computer graphics algorithms. The complexity, speed, and outcome of these algorithms differ depending for example on the used perspective and camera models. An example of a mathematical formulation for a shift sensor setup is shown in Kristoph Fehn, A *3D-TV Approach Using Depth-Image-Based Rendering (DIBR)*, Proceedings of VIIP '03 (September 2003) (Benalmadena, Spain) ("Fehn").

Systems and methods disclosed herein in accordance with some embodiments are used for virtual viewpoint generation (DIBR), differing from previous methods for 3D warping and hole filling. Systems and methods disclosed herein in accordance with some embodiments may enable adjusting disparity and corresponding stereoscopic depth budget as post processing, e.g., easier than in some previous systems. Systems and methods disclosed herein in accordance with some embodiments may enable supporting stereoscopic viewing in, e.g., arbitrary viewing orientations (such as, e.g., head tilt), e.g., easier than in some previous devices (many previous devices support horizontal viewing only). Systems and methods disclosed herein in accordance with some embodiments, e.g., enable easier forming of virtual viewpoints for supporting (e.g., translational and/or axial) motion parallax. Systems and methods disclosed herein in accordance with some embodiments may have more distributed and therefore less visible distortions than some previous DIBR systems.

Stereoscopic 3D (S3D)

Use of a stereoscopic display is one way to show 3D information (which may be referred to as stereoscopic 3D or S3D). Stereoscopic viewing captures parallel views—a stereo pair—by two cameras, separated by a small distance (e.g., a stereo baseline). The capture setup mimics the binocular image perception by two human eyes.

Recently, stereoscopic systems have made a comeback in 3D cinema, 3DTV, and augmented and virtual reality applications (AR and VR). For many AR/VR systems, wearable near-eye displays (or glasses) are used.

In a real-world space, human eyes are able to scan freely and to pick information by focusing and accommodating to different distances or depths. When viewing, the (con)vergence of the eyes varies between seeing parallel directions (e.g., objects at an infinite distance away) and seeing crossed directions (e.g., objects close to the eyes). Generally, convergence and accommodation are often very strongly coupled, so that most of the time, by nature, the accommodation/focal points and the convergence point of the two eyes meet at the same 3D point.

In many previous stereoscopic viewing systems, the eyes are focused on the same image (or display) plane, while the human visual system (HVS) and the brain form the 3D perception by detecting the disparity of the images (e.g., the small distances of corresponding pixels in the two 2D projections).

FIGS. 11A-11C are schematic perspective views illustrating an example vergence-accommodation conflict (VAC) in many stereoscopic viewing systems. FIGS. 11A to 11C show the vergence-accommodation conflict (VAC) in many previous stereoscopic viewing systems. FIGS. 11A-11C are based on Shibata, Takashi, et al., *Visual Discomfort with Stereo Displays: Effects of Viewing Distance and Direction of Vergence-Accommodation Conflict*, PROCEEDINGS OF THE INT'L SOC. FOR OPTICS AND PHOTONICS (SPIE) 7863 (2011) (78630P1-78630P9) ("Shibata I"). FIG. 11A shows a stereoscopic viewing in which the vergence point 1102 is the same as the accommodation point 1102 (which may be typical when viewing with bare eyes). FIGS. 11B and 11C show viewing with a stereoscopic display. FIGS. 11B and 11C show viewing such that the vergence points 1132, 1162 and accommodation points 1134, 1164 are different, which causes a vergence-accommodation conflict (VAC). FIG. 11A shows natural viewing in a real world environment 1100 with the vergence distance 1106 equal to the focal distance 1108 relative to the viewer 1110. FIG. 11B shows crossed stereo viewing 1130 on S3D displays with the vergence distance 1136 shorter than the focal distance 1138 relative to the viewer 1140. FIG. 11C shows uncrossed stereo viewing 1160 on S3D displays with the vergence distance 1166 longer than the focal distance 1168 relative to the viewer 1170. Although VAC is known to cause visual strain and other types of discomfort, stereoscopy is still commonly-used for near eye displays due to its facility and cost-effectiveness.

3D Displays Using Multifocal Planes (MFP)

For multifocal plane (MFP) systems, a viewer is able to focus at different objects and depths, which avoids the VAC typical for stereoscopic displays. A stack of natural or virtual focal plane images are rendered at different depths. The focal plane being observed is seen in focus, and the other focal planes not being observed are blurred by the human visual system.

MFP displays show a stack of discrete focal planes, composing a 3D scene from layers along a viewers visual axis. The viewer is provided a 3D view by projecting those pixels of focal planes, which are visible to the viewer's eye-point at different depths and spatial angles.

Multifocal planes are primarily complementary (not additive) with respect to viewing directions from the eye-point. However, additive effects may smooth out the otherwise many times perceived quantization steps and contouring when seeing views compiled from discrete focal planes.

Multifocal planes may be displayed, for example, either by spatially multiplexing a stack of 2D displays, or by sequentially switching—in a time-multiplexed way—the focal distance of a single 2D display by a high-speed varifocal element (VFE), while spatially rendering the visible parts of corresponding multifocal image frames.

Figure 12:
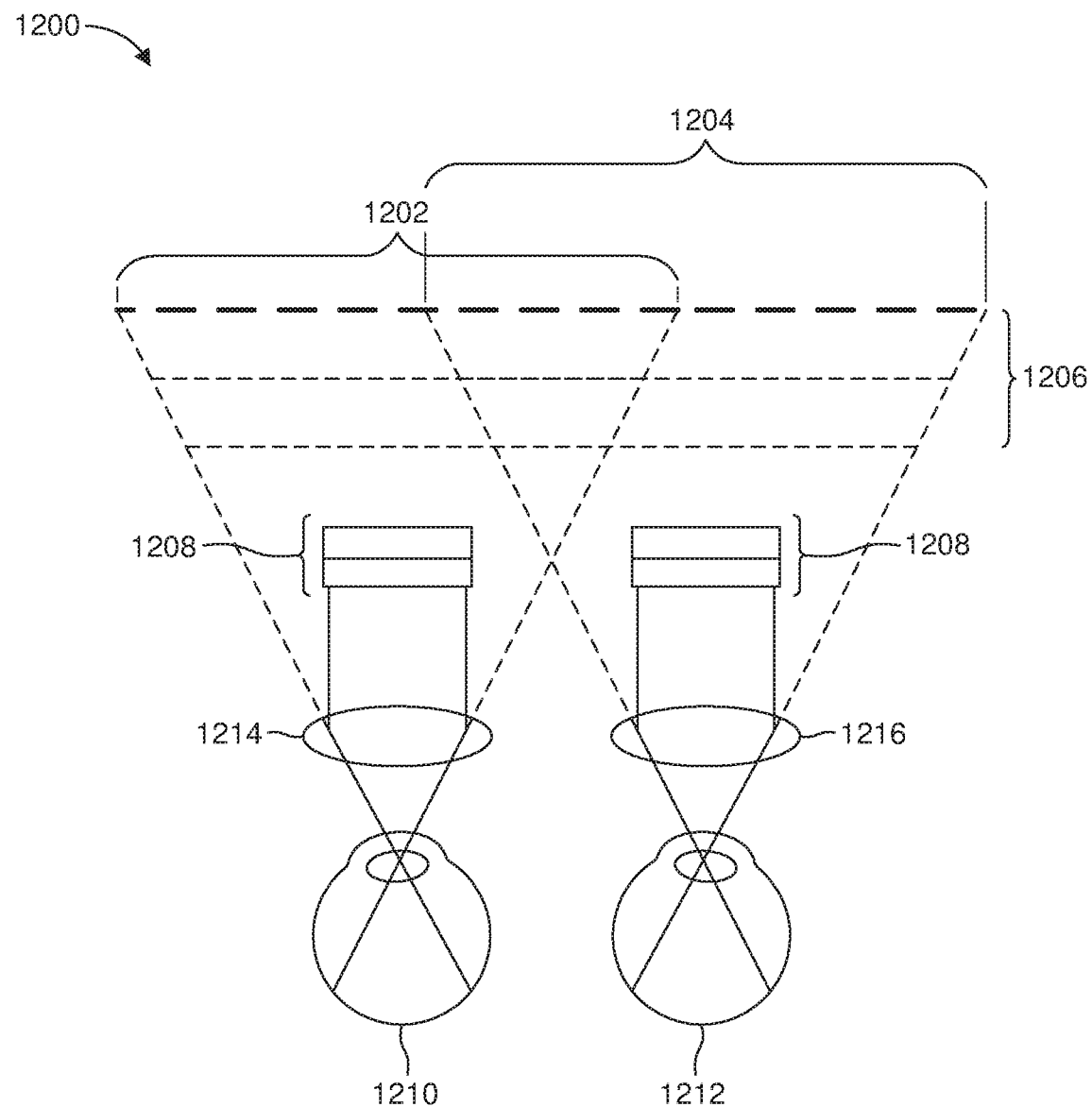
FIG. 12 is a schematic plan view illustrating an example multifocal plane (MFP) near-eye display according to some embodiments.

FIG. 12 is a schematic plan view illustrating an example multifocal plane (MFP) near-eye display according to some embodiments. FIG. 12 shows a schematic illustration 1200 of a multifocal plane (MFP) near-eye display. Each image 1202, 1204 in a display stack 1208 of virtual focal planes 1206 is rendered at a different depth, and a viewer's eyes 1210, 1212 blur those focal planes not being observed via eyepieces 1214, 1216. The article Shiro Suyama, et al., *Apparent 3-D Image Perceived from Luminance-Modulated Two 2-D Images Displayed at Different Depths*, 44 (8) Vision Research 785-793 (April 2004) ("Suyama") describes viewing content on an external display. Suyama describes the phenomenon of perceiving in 3D when viewing two specially-formed focal planes and the results observed by a physical prototype. The article describes a specific case of an MFP display.

A larger number of focal planes may have better accuracy for MFP displays but may have a more difficult implementation. For MFP displays, a feasible number of focal planes may be a small number (such as 4 to 6), which may limit achieved quality. Article Simon J. Watt, et al., *Real-World Stereoscopic Performance in Multiple-Focal-Plane Displays: How Far Apart Should the Image Planes Be?*, SPIE: Stereoscopic Displays and Applications XXIII (February 2012) gives information on the number of focal planes.

Figure 13:
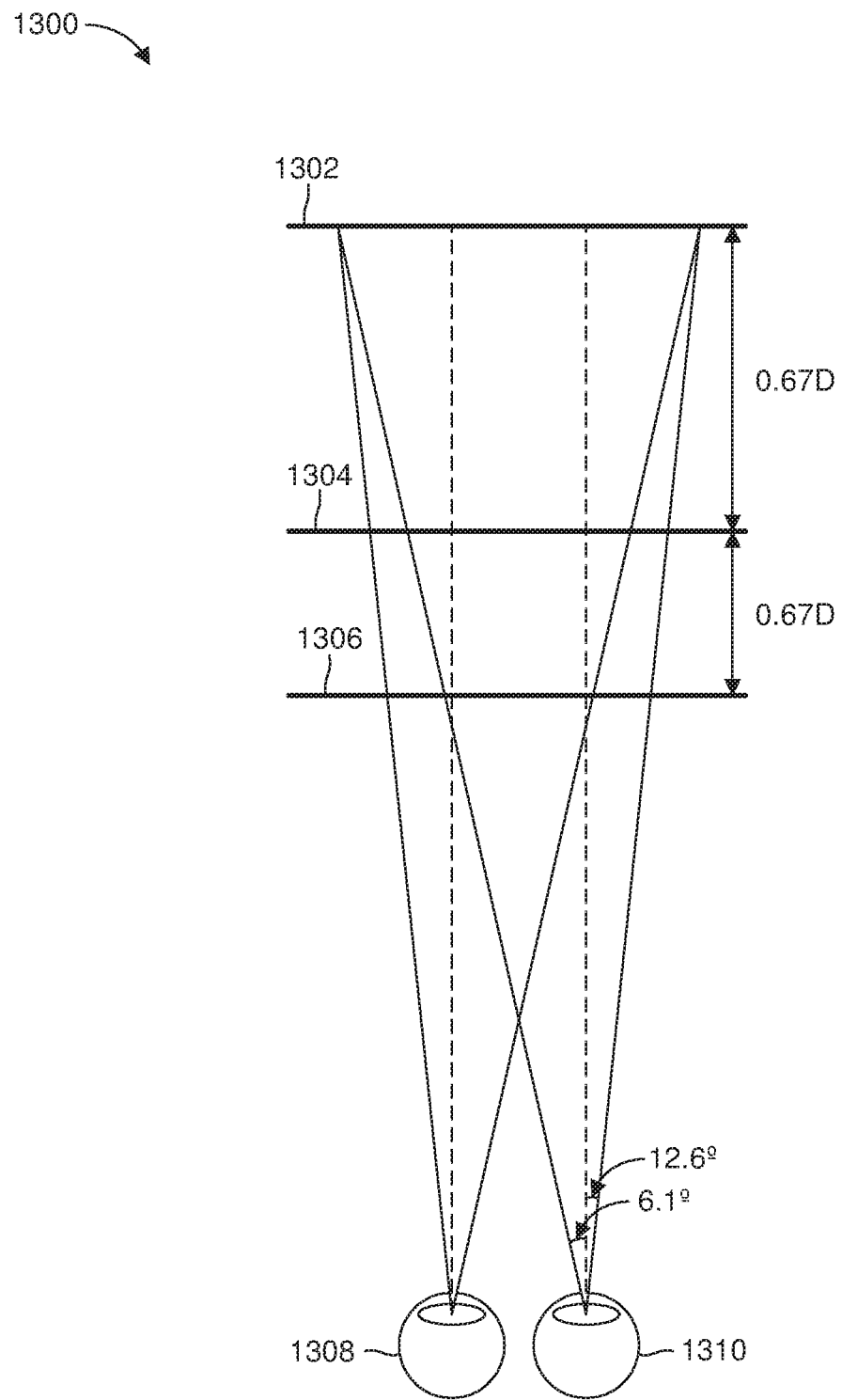
FIG. 13 is a schematic plan view illustrating an example viewing of near, mid, and far focal-image planes according to some embodiments.

FIG. 13 is a schematic plan view illustrating an example viewing of near, mid, and far focal-image planes according to some embodiments. FIG. 13 is a plan view schematic of view lines for left and right eyes for a prototype described in Simon J. Watt, et al., *Achieving Near-Correct Focus Cues in a 3-D Display Using Multiple Image Planes*, 5666 Proceedings of SPIE 393-401 (2005) ("Watt 2005"). FIG. 13 shows a plan view schematic 1300 (adapted from, and using example numerical values described in, Watt 2005) using multiple MFPs 1302, 1304, 1306 for capturing 3D perception. For FIG. 13, each eye 1308, 1310 sees the focal planes 1302, 1304, 1306 from slightly different viewpoints, creating disparity for 3D perception. The example of FIG. 13 shows a far image plane 1302 of an object at a distance of 53.6 cm (1.87 D) from the viewer's eyes 1308, 1310. A mid image plane 1304 of an object at a distance of 39.4 cm (2.54 D) from the viewers eyes 1308, 1310. A near image plane 1306 of an object at a distance of 31.1 cm (3.21 D) from the viewer's eyes 1308, 1310. The vertical field of view if +/−4.4° for the example of FIG. 13.

3D perception from the focal planes is correct for flat objects residing exactly on those planes. By using depth blending, disparity is created between focal planes, creating a continuous and close-to-real depth perception for objects between the planes. More details on depth blending and perception of disparity in MFP rendering are given below.

In previous MFP prototypes, focal planes were shown on external displays at different distances from the viewer. When showing MFPs on a near-eye display (such as FIG. 12), two MFP stacks are formed and seen separately by the left and right eyes.

Figure 14:
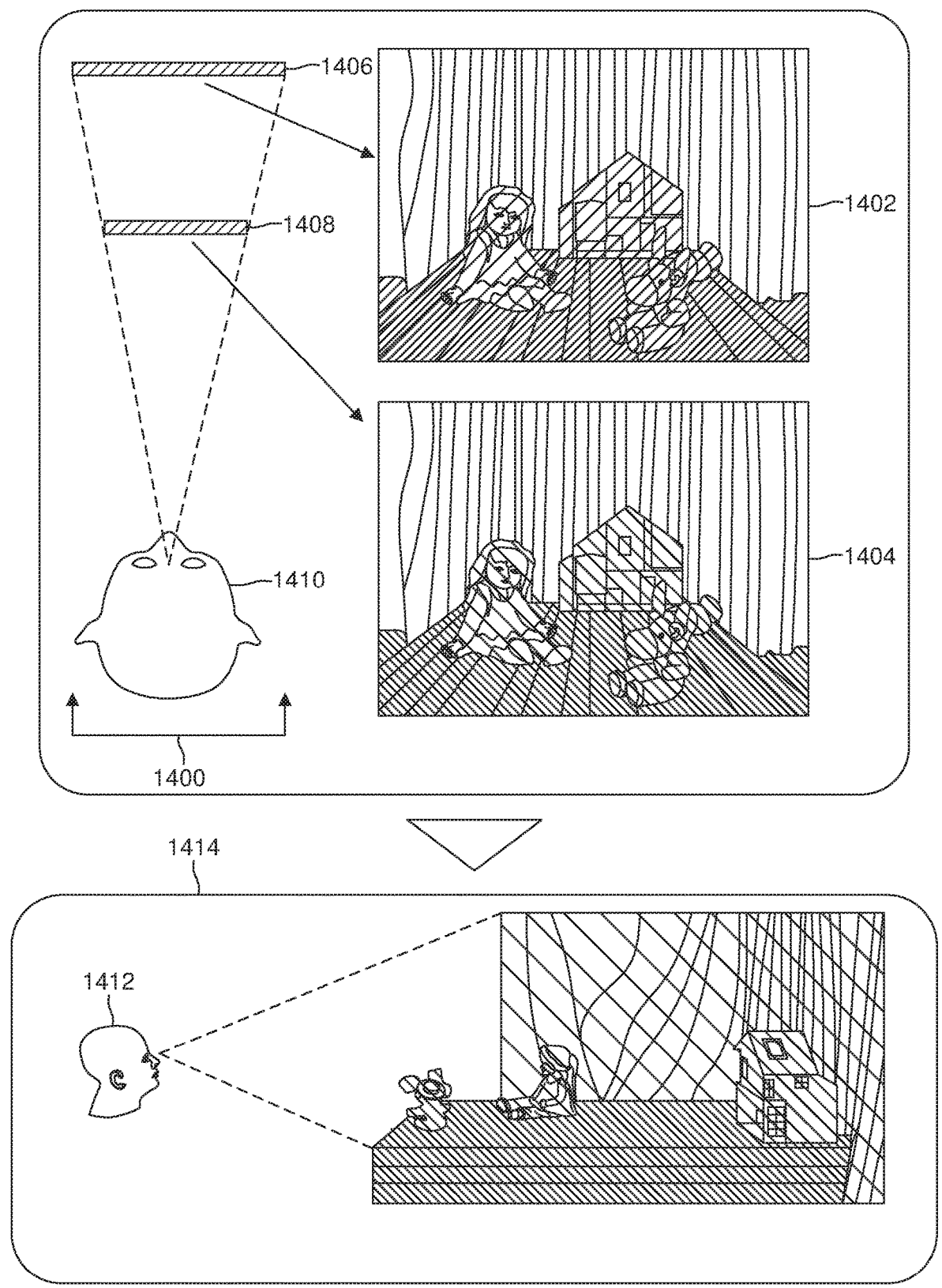
FIG. 14 is a schematic diagram illustrating example focal-image planes viewed by an observer.

FIG. 14 is a schematic diagram illustrating example focal-image planes viewed by an observer. FIG. 14, a version of which is included in Suyama, shows a top view 1400 and front views 1402, 1404 of two image planes 1406, 1408 viewed by an observer 1410 and a side view 1414 of how the planes are perceived as a 3D image by an observer 1412. In Suyama, two focal planes 1406, 1408 are formed, placed at different distances, and viewed from two eye points. This setup creates disparity and 3D perception produced by the sideways displacement of the two focal planes seen from the two eye-points. The displacement produces particular pixel value distributions at object edges, which the brain interprets as disparity and as depth variations, respectively. FIG. 14 shows perception of 3D images by viewing two overlapping focal planes formed from a scene. The two eyes see the focal planes from slightly different angles, which creates a synthetic stereo disparity between focal planes.

Figures 16A, 16B:
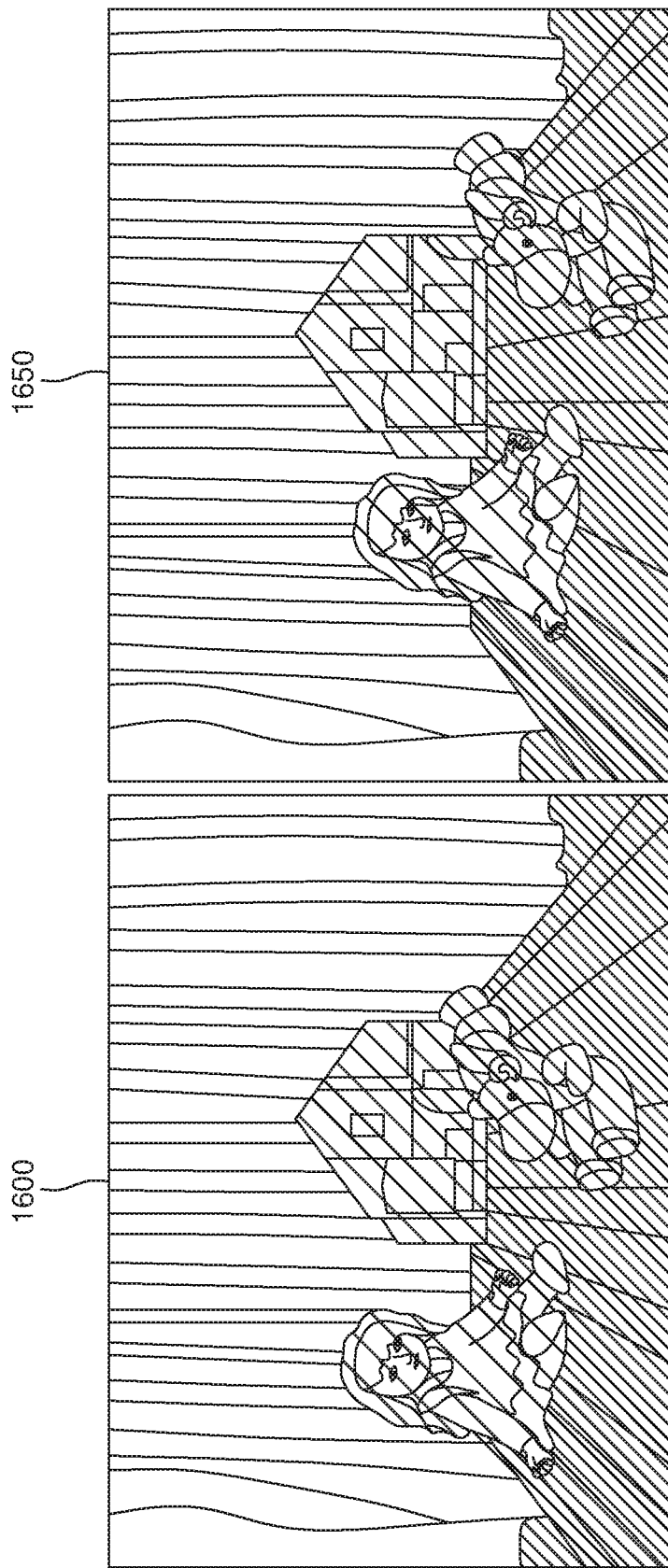
FIG. 16A-16B are schematic front views illustrating example focal planes displayed for right- and left-eye images.

FIGS. 15A-15C are schematic diagrams illustrating example front and rear focal planes for an example image of a square. FIGS. 15A-15C, versions of which are included in Suyama, show synthetic stereo disparity created at the edges of objects. In Suyama, synthetic stereo disparity is created at the edges of the squares 1504, 1506 as shown in FIGS. 15A-15C. In Suyama, the example view 1500 composed by the two focal planes (such as is shown in FIG. 14) is visualized by an observer 1502 by capturing a left stereoscopic image pair 1532, 1536 from the left eye-point 1544 and a right stereoscopic image pair 1534, 1538 from the right eye-point 1546 to the prototype display (which is shown in FIGS. 16A-16B). FIG. 15B is a perspective view 1530 of the scene. The retinal images 1540 have common regions 1542 that are seen in each retinal image. The plan view schematic 1560 of FIG. 15C shows image luminance distributions perceived from a left eye-point 1562 and a right eye-point 1564. The disparity (cf. sideways shift) of these luminance distributions gives a perception of depth.

FIGS. 16A-16B are schematic front views illustrating example focal planes displayed for right- and left-eye images. FIGS. 16A-16B (versions of which are from Suyama) show a crossed eye stereogram of the view in FIG. 14 composed by two focal planes. FIG. 16A shows a right eye image 1600, and FIG. 16B shows a left eye image 1650.

In Suyama, luminance distributions for the focal planes are achieved computationally, by weighting the pixels of an image (projection captured of the scene) by two linear weighting functions, which are proportional to the pixel's distance (depth coordinate) and its complement. Correspondingly, a feasible image capture format supporting the formation of focal planes is texture plus depth. Suyama describes the depth fusing or blending effect with two focal planes, seen from the two eye points.

Disparity may be used to show depth perception. For example, if two focal planes are flat objects, the closer object is slightly shifted related to the further one as seen from the two eye-points. Suyama states that objects in-between two focal planes are perceived in positions between the two extremes. This phenomenon is caused by the depth weighting (or depth blending) used to form the two focal plane contents. Depth blending shifts the apparent edge locations as illustrated in FIGS. 15A-15C and creates a synthetic but realistic disparity and depth perception between the two focal planes.

Figure 17:
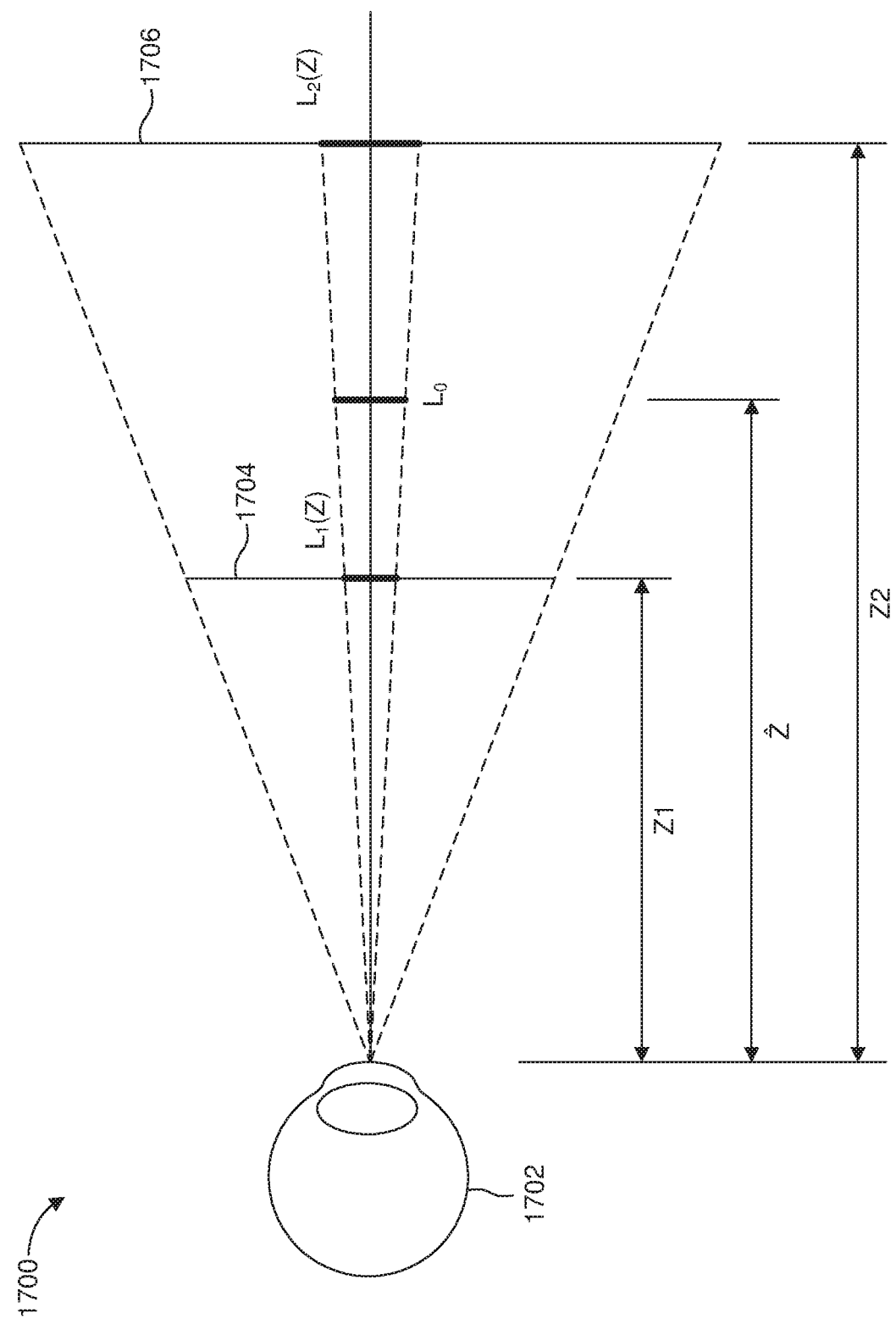
FIG. 17 is a schematic plan view illustrating an example viewing of two focal planes with depth-based luminosity weighting functions.

FIG. 17 is a schematic plan view illustrating an example viewing of two focal planes with depth-based luminosity weighting functions. FIG. 17 is a plan view schematic 1700 that shows the principle of depth fusing of two focal planes 1704, 1706 seen from one eye-point 1702. Kurt Akeley, et al., *A Stereo Display Prototype with Multiple Focal Distances*, 23(3) ACM TRANSACTIONS ON GRAPHICS (TOG) 804-813 (2004) ("Akeley") and X. Hu & H. Hua, *Design and Assessment of a Depth-Fused Multi-Focal-Plane Display Prototype*, 10(4) IEEE/OSA Journal of Display Technology 308-316 (2014) ("Hu & Hua") describe how a depth blending effect has been noticed to work with two or more focal planes viewed monocularly by only one eye. FIG. 17 is adapted from Hu & Hua. Hu & Hua describes perceived luminance of two overlapped pixels on two focal planes in Eqn. 1:

$$L_0 = L_1(z) + L_2(z) = w_1(z)L_0 + w_2(z)L_0 \quad \text{Eqn. 1}$$

where $w_1$ and $w_2$ are depth-weighted fusing functions. The perceived depth $\hat{z}$ of the fused pixel may be considered as the weighted sum of the depths $z_1$, $z_2$ of the two focal planes 1704, 1706 in Eqn. 2:

$$\hat{z} = w_1(z)z_1 + w_2(z)z_2 \quad \text{Eqn. 2}$$

If viewing two or more MFPs monocularly, the phenomenon is naturally not about shifting edges and changing disparity (and depth perception), as was described by Suyama, but about smoothing out the sudden step in perceived retinal blur when viewing around the transition between adjacent focal planes, as described by Akeley.

As described by Akeley, the monocular depth blending effect has been noticed to work also with MFP stacks with more than two focal planes. Exploiting the depth fused 3D (DFD) phenomenon in MFP displays leads to a variant of an MFP method (which is described in Hu & Hua, denoted as DFD-MFP), where the focal planes are not strictly separated in angular (and x-y) space, but also have some overlap and an additive property along the depth (z) dimension. This phenomenon may be referred to as depth-based filtering or depth blending.

Figure 18:
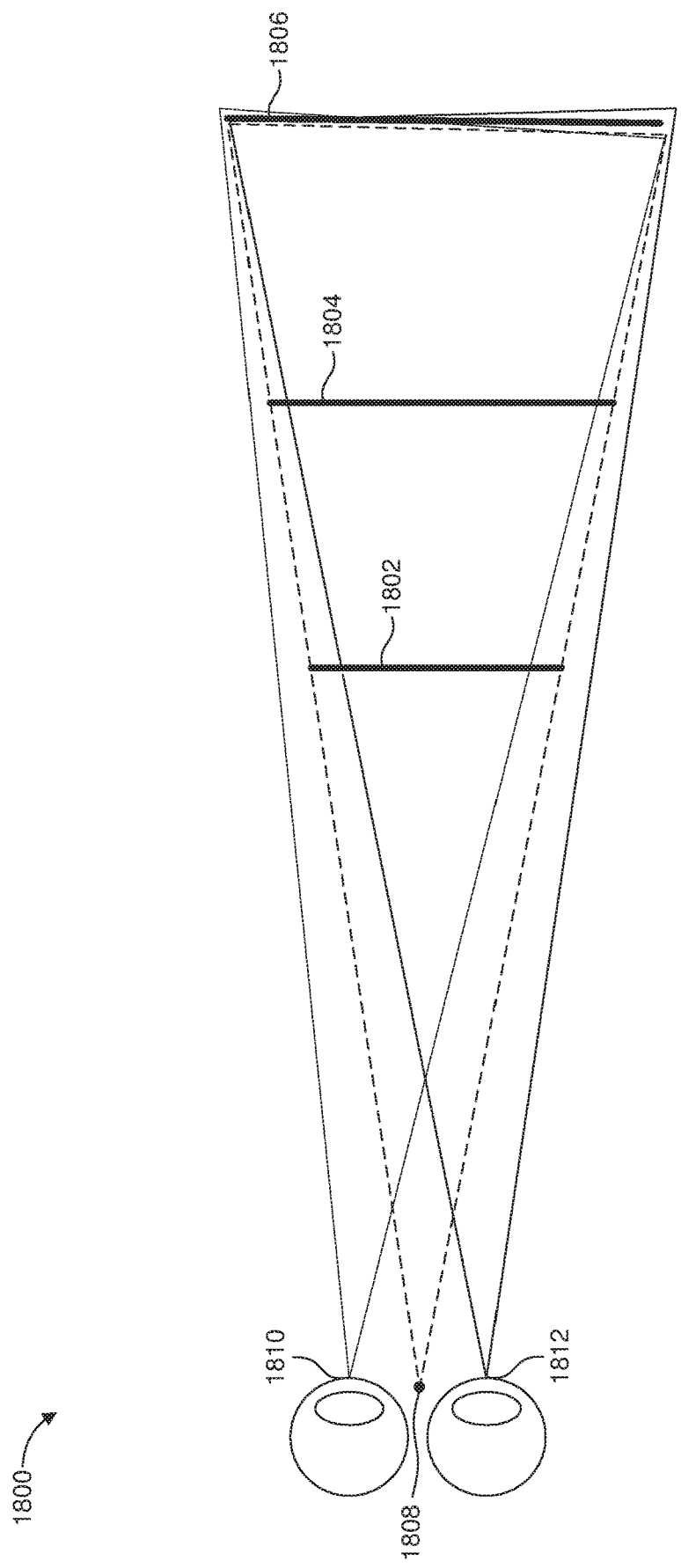
FIG. 18 is a schematic plan view illustrating an example viewing of three focal planes by left and right eyes according to some embodiments.

FIG. 18 is a schematic plan view illustrating an example viewing of three focal planes by left and right eyes according to some embodiments. Suyama describes a method that supports binocular viewing of one (monocular) MFP stack, albeit consisting of only two focal planes. This idea can be generalized to MFP displays with more than two focal planes. FIG. 18 extends Suyama's viewing setup to a stereoscopic viewing setup 1800 for a three focal plane display, where a monoscopic stack of three MFPs 1802, 1804, 1806 is formed from the average eye-point 1808, and the same focal planes 1802, 1804, 1806 are seen from slightly different viewpoints 1810, 1812 by the left and right eyes. After Suyama, research papers and MFP displays may not specify (or are not understood to specify) precisely whether a particular device in question displays one or two sets of MFPs to a viewer.

In examples described herein in accordance with some embodiments, the viewing situation of MFP displays is the one shown in FIG. 18, so that one monocular MFP stack is formed using monocular depth plus texture input, and two (stereoscopic) viewpoints are created to this MFP stack. In a near-eye display, however, providing correct viewing points to only one focal plane stack is difficult and may use optics and reflectors to enable correct sideway positions for the eyes. Further, this adjustment is naturally different for people with different eye-separation (different viewing angle to the MFP stack). In practice, as with stereoscopic near-eye displays showing side-by-side stereo images, the one MFP stack needs to be split in two stacks, one for each eye. Like in FIG. 12, the viewing conditions described by FIG. 18 and FIG. 27B need thus to be met with two parallel MFP stacks, from slightly different viewpoints. Both of these two MFP stacks differ from the original monoscopic stack, for which the viewing point is in between the eyes (cf. FIG. 18).

Depth Blending Functions for Forming MFP Stacks

A captured scene is decomposed into a number of focal planes (e.g., image layers at various depths or accommodation levels). Focal planes are formed using depth blending or weighting functions, which multiply each image pixel by a weight depending on its distance from the focal plane being formed (e.g., the distance being indicated by a depth image or a depth map). Two properties of blending functions are partition of unity and the depth blending property. For partition of unity, focal plane luminances add up to the luminances of the original scene. For the depth blending property, the same pixels may contribute to more than one focal plane. This property is a consequence of the continuity and overlap of the blending functions. The functions used or referred to herein in accordance with some embodiments are examples and non-restrictive.

Box filtering (e.g., slicing the image information based on pixel depths) is a good starting point for understanding depth blending. However, a box filter is not actually a blending function because, for the slicing result, each pixel contributes to only one of the focal planes. If using a box filter, approximations of focal plane images are formed by slicing the depth map corresponding to each image into narrow depth regions (slices) and projecting the corresponding pixels into a (flat) focal plane in the middle of each depth region.

If viewing a stack of focal planes, the composed view is formed by the information on different focal planes, visible from the viewer's eye-point. With box filtering, slicing to depth regions results with MFPs completing each other in spatial (x-y) direction, not adding up along depth dimension (z-dimension). Correspondingly, focal planes generated by a box filter do not create a disparity (perception of 3D) between focal planes but only for objects on the focal planes.

Figure 19:
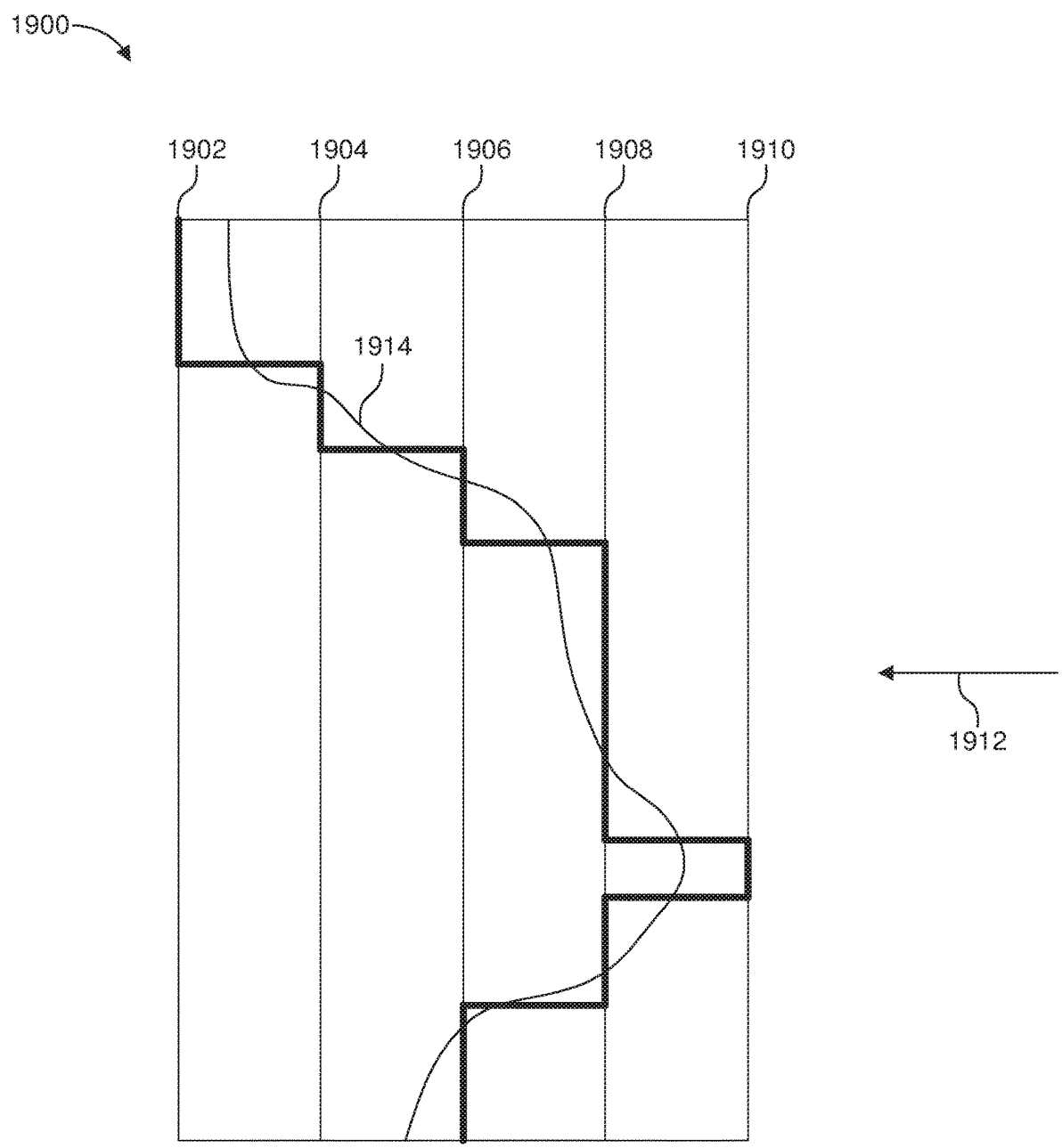
FIG. 19 is a schematic plan view illustrating an example quantization of depth for an MFP display without depth blending (weighting) according to some embodiments.

FIG. 19 is a schematic plan view illustrating an example quantization of depth for an MFP display without depth blending (weighting) according to some embodiments. Resulting from the use of a box filter, a smooth 3D surface is quantized in the depth dimension, as illustrated by FIG. 19. FIG. 19 shows a schematic example 1900 of the quantization of depth when describing a view by five focal planes 1902, 1904, 1906, 1908, 1910. An arrow 1912 shows the viewing direction.

A box filter separates image information in a strict way in spatial (x-y) and depth (z-) dimensions. As in practice, only a small number of focal planes are used, depth dimension is heavily quantized, which may result in low accuracy in presenting a 3D shape and depth.

In some embodiments, processing of focal plane images may include determining depth blending weights for one or more of the focal plane images. Processing of focal plane images also may include adjusting the focal plane images using the depth blending weights. For example, depth dimension values may be multiplied by depth blending weights.

Depth-based blending may be used to reduce quantization errors in the depth dimension, which otherwise may be visible to the human eye. Depth blending means using a depth-based function to weight pixels used to construct each focal plane. One depth blending function is a tent filter, which is a piecewise linear, saw-tooth shaped blending function 2050 (FIG. 20B). For a box filter, the corresponding function 2000 is shown FIG. 20A.

FIGS. 20A and 20B are graphs illustrating examples of weight versus depth according to some embodiments. FIGS. 20A and 20B show schematic illustrations of depth blending functions for four MFPs. FIG. 20A shows depth slicing without blending (a box filter), and FIG. 20B shows a linear (tent) filter. For some embodiments, the range for depth values is between 0 and 255 (cf. $z_{min}$ and $z_{max}$ in FIGS. 20A and 20B).

Figure 21A:
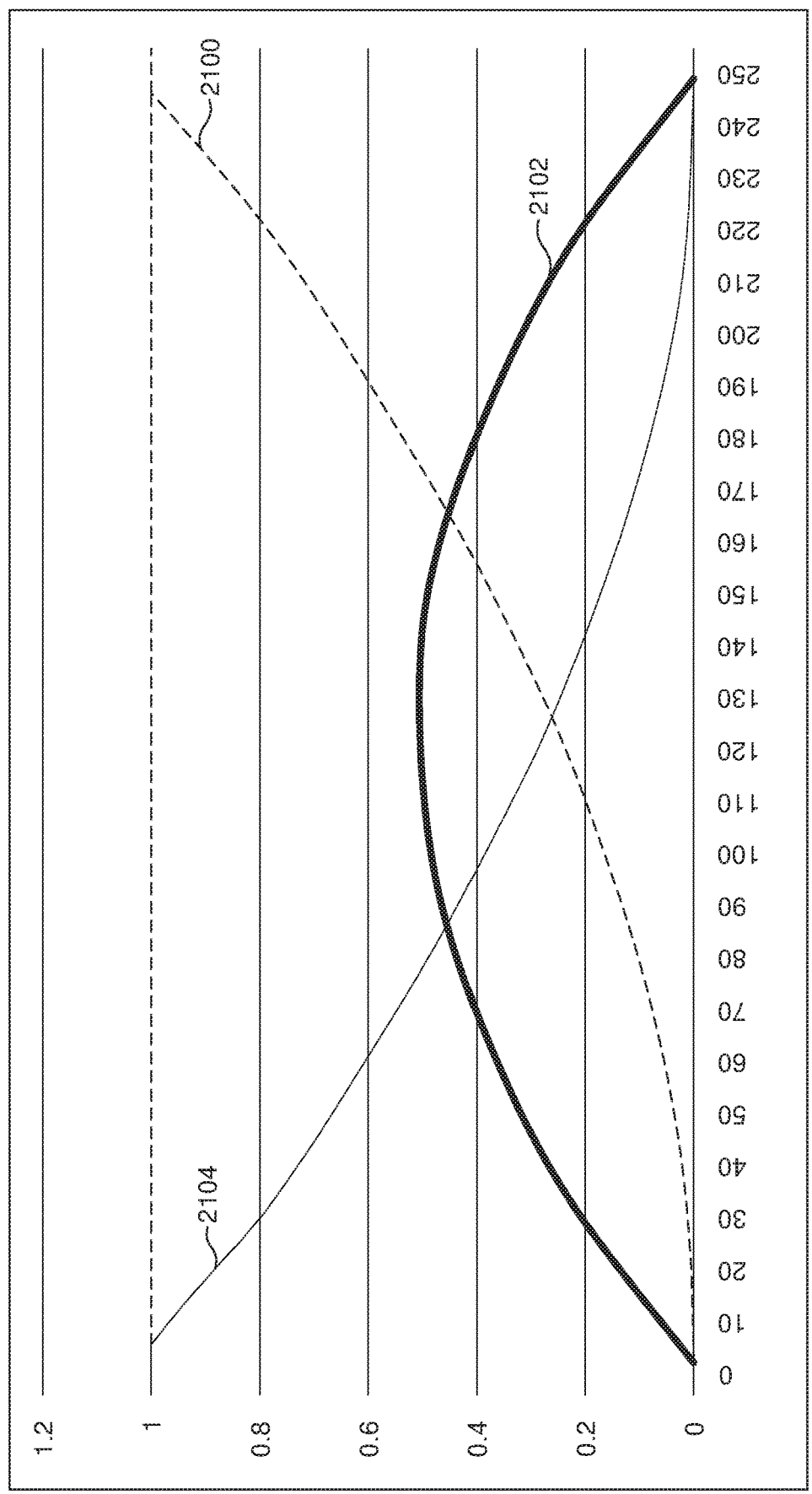
FIG. 21A is a graph illustrating example blending functions of weight versus depth according to some embodiments.
Figure 21B:
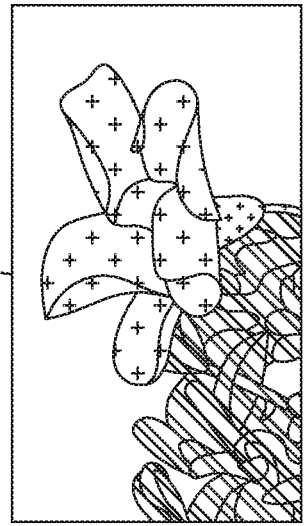
FIG. 21B is an illustration showing an example test image.
Figure 21C:
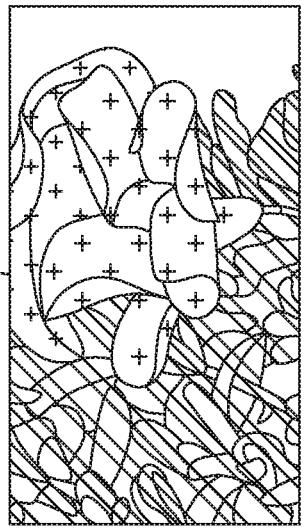
FIG. 21C is an example depth map illustrating pixel distances for FIG. 21B.
Figure 21D:
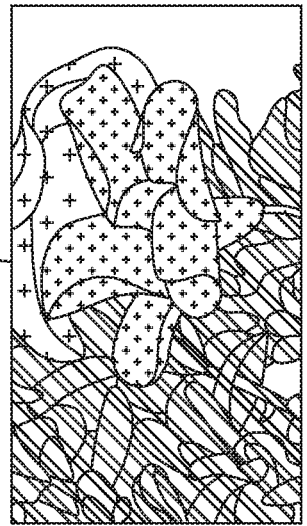
FIGS. 21D-21F are illustrations showing example focal plane images using the depth weights of FIG. 21A with the test image of FIG. 21B and its example depth map of FIG. 21C according to some embodiments.
Figure 21E:
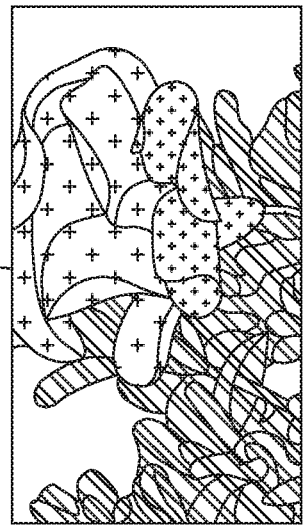
Figure 21F:
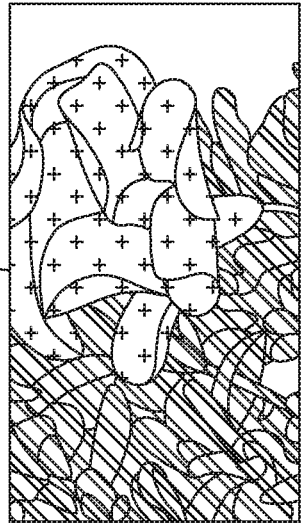

FIG. 21A is a graph illustrating example blending functions of weight versus depth according to some embodiments. FIG. 21B is an illustration showing an example test image. FIG. 21C is an example depth map illustrating pixel distances for FIG. 21B. FIGS. 21D-21F are illustrations showing example focal plane images using the depth weights of FIG. 21A with the test image of FIG. 21B and its example depth map of FIG. 21C according to some embodiments. FIGS. 21B and 22B originated from an image found on the webpage File:2D plus depth.png, WIKIPEDIA, //commons.wikimedia.org/w/index.php?curid=5489771 (last accessed Feb. 22, 2019), and FIGS. 21D to 21F are modified versions of that image. The example unprocessed test image and its depth map shown in FIG. 21B and FIG. 21C, correspondingly, is merely an example generic test image of a flower, used for explanatory purposes numerous times throughout this disclosure. In many cases modified versions of the example test image, e.g., from example processes conducted on the test image, in accordance with some embodiments, are presented. For some embodiments, polynomial blending functions extend over the whole depth range. FIG. 21A shows three polynomial blending functions 2100, 2102, 2104. FIGS. 21A and 21B-21F show an example of three polynomial blending functions 2100, 2102, 2104 (FIG. 21A) and corresponding focal planes (FIGS. 21D-21F) for a test image 2110 (FIG. 21B) and its corresponding depth map 2120 (FIG. 21C).

For some embodiments, a depth map (e.g., FIG. 21C) may be generated, which may be similar to what is shown in FIG. 19 by the smooth thin line 1914. The depth map is used to separate the input image into, for example, small, medium, and large focal plane distances from a viewer. A depth blending function (e.g., FIG. 21A) is used to generate a focal plane image for the particular focal plane distance. This process may be repeated for each focal plane image (e.g., FIGS. 21D to 21F). For some embodiments, a depth map (cf., FIG. 21C) may be generated by several methods, including depth from focus, depth from one or more RGB images, and depth from RGB-D sensors (using structured light or ToF). It will be understood that there are various known ways of acquiring a depth image.

Figure 22A:
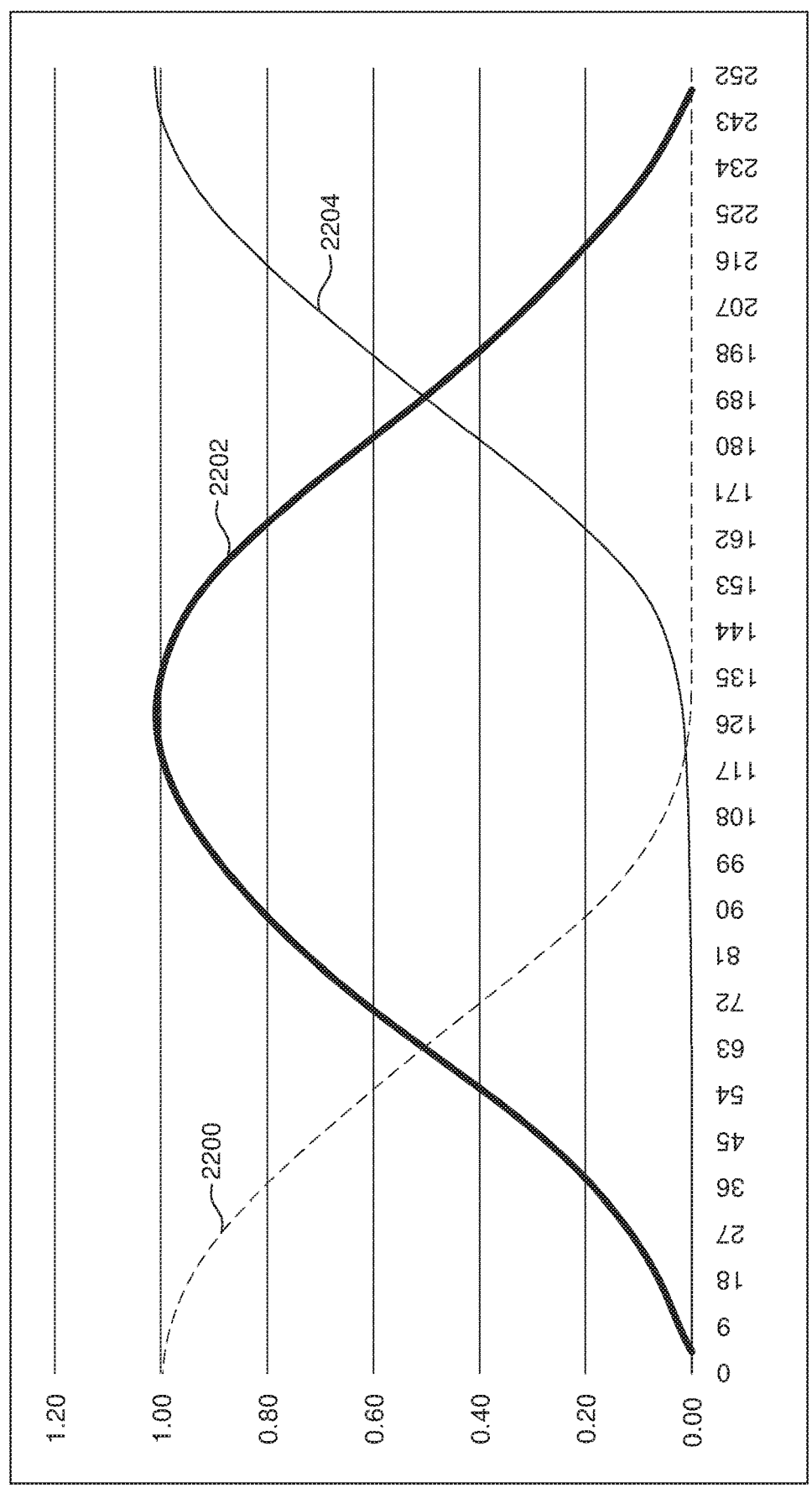
FIG. 22A is a graph illustrating example blending functions of weight versus depth according to some embodiments.
Figure 22B:
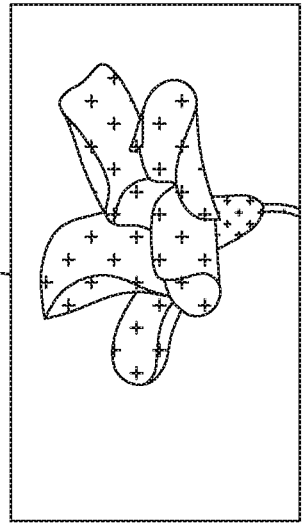
FIG. 22B is an illustration showing an example test image.
Figure 22C:
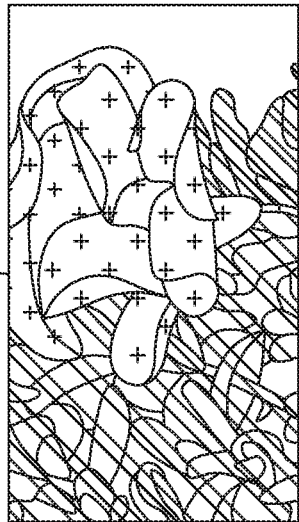
FIG. 22C is an example depth map illustrating pixel distances for FIG. 22B.
Figure 22D:
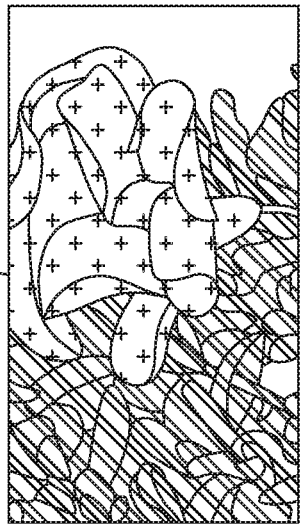
FIGS. 22D-22F are illustrations showing example focal plane images using the depth weights of FIG. 22A with the test image of FIG. 22B and its example depth map of FIG. 22C according to some embodiments.
Figure 22E:
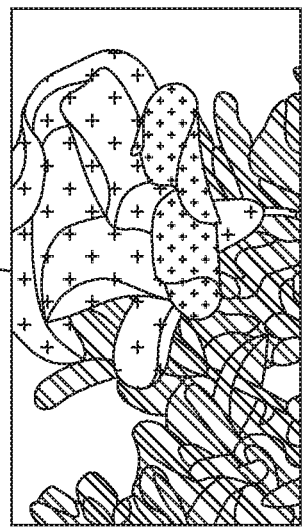
Figure 22F:
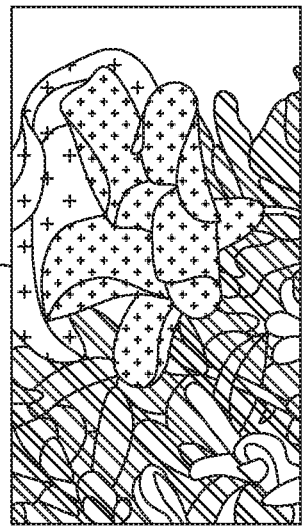

FIG. 22A is a graph illustrating example blending functions of weight versus depth according to some embodiments. FIG. 22B is an illustration showing an example test image. FIG. 22C is an example depth map illustrating pixel distances for FIG. 22B. FIGS. 22D-22F are illustrations showing example focal plane images using the depth weights of FIG. 22A with the test image of FIG. 22B and its example depth map of FIG. 22C according to some embodiments. FIG. 22B and its example depth map FIG. 22C originated from an image found on the webpage File:2D plus depth.png, WIKIPEDIA, //commons.wikimedia.org/w/index.php?curid=5489771 (last accessed Feb. 22, 2019), and FIGS. 22D to 22F are modified versions of that image. FIG. 22A shows the weights for three sinusoidal blending functions. FIG. 22A shows an example of three sinusoidal functions 2200, 2202, 2204 producing three MFPs 2230, 2240, 2250 (FIGS. 22D-22F) for the test pattern image 2210 (FIG. 22B) and its depth map 2220 (FIG. 22C). Other variations of blending filters have been suggested by Hu & Hua.

Depth blending or fusing, as explained by Suyama, is a way to increase the apparent number of focal planes, and thus depth accuracy. Akeley expanded the synthetic disparity finding to cases with more than two focal planes, increasing the effective number of depth planes from those few enabled by practical MFP display implementations. Akeley further reported the benefit of depth blending when viewing an MFP stack monocular with one eye. According to Akeley, depth blending filters the stepwise changes of focal distance perceived by one eye at the transitions between sparse focal planes.

Creation and perception of synthetic disparity (depth) between two focal planes is described in Suyama. Creation of depth perception between more than two focal planes is described in Akeley and Watt 2005. Filtering of stepwise accommodation changes between focal planes is described in Akeley. Describing variations on depth blending functions in Hu & Hua.

Wearable glasses type of near-eye displays (NED) have become popular in virtual reality and gaming, and recently also in augmented reality. Glasses using a mobile phone as a display element is an example of a popular low-cost device for viewing virtual or camera captured videos. Many near-eye displays (NED) present sequences of stereoscopic image pairs. Stereoscopic rendering may be used with external displays, including those for stereoscopic 3D (S3D) TV.

Capturing stereoscopic video (sequence of stereoscopic image pairs), may induce various restrictions. Capturing and transmitting stereoscopic content may prevent, for example, adjusting disparity and other important S3D parameters as post processing, both in content production and when rendering or viewing the content at the receiver.

Video plus depth (depth plus texture) format in capture and transmission is used in depth image-based rendering (DIBR). A lot of research has been made in the area, concentrating on optimizing rendering quality at the receiver, and more specifically, removing disocclusions induced in DIBR systems when generating stereoscopic views from two virtual viewpoints.

MFP displays are based on 3D perception of multiple focal planes, which may be formed using depth plus texture format. A lot of MFPs are able to avoid VAC, which may occur for stereoscopic displays. For technical reasons, the maximum number of focal planes is generally limited to only a few in MFP displays. If using a few focal planes, rendering quality may be improved by depth blending, but the number of focal planes may still present a limitation for MFP rendering quality.

Many previous systems for both DIBR and MFP lack support for user motion-based interactions, requiring adjustments of viewpoints, either for changing stereoscopic disparity or motion parallax. For many DIBR-based systems, one reason is the computational complexity of the methods used in virtual viewpoint generation (e.g., 3D warping and hole filling).

Some embodiments use depth plus texture content formats in image capture and transmission. Some embodiments of viewpoint generation differ from 3D warping and hole filling methods used in previous depth image-based rendering (DIBR) methods. In some embodiments, multifocal planes (MFPs) are formed in the receiver using depth and texture data. Stereoscopic content with a set of properties and supporting motion parallax is produced in real-time using the formed MFPs in any baseline orientation and individually for multiple receivers.

Example Process and Structure

An MFP-based method generates stereoscopic viewpoints for DIBR-based systems. An example method generates virtual viewpoints to enable a user to change his/her head tilt and viewing position. In addition, the user is provided with natural motion parallax, and personal adjustment for stereopsis, enabled by an example method for creating stereoscopic disparity. For producing a disparity complying with a users posture and motions, a users motion is tracked (e.g., by one or more head-mounted or external sensors).

Some embodiments enable producing stereoscopic content and disparity-based interactions both for wearable and external displays. The example implementations and ways of interactions described herein in accordance with some embodiments may also be used with MFP displays. Some embodiments use depth plus texture type of content format in the capture and transmission, and multifocal planes (MFPs) formed thereof in the receiver. In some embodiments, using the once received data, stereoscopic content with a set of properties may be formed in real-time, in any baseline orientation and individually for multiple local viewers. Forming of MFPs may be done in several ways, examples of which are disclosed herein in accordance with some embodiments.

FIGS. 23A-23C are schematic front views illustrating example scenarios for stereoscopic image disparities according to some embodiments. FIGS. 23A-23C show three (binocular) viewpoints for a user to see stereoscopic content. FIG. 23A is an example 2300 that shows a using seeing a depth effect while lying down. FIG. 23B is an example 2330 that shows a depth effect adjusted wider. FIG. 23C is an example 2360 in which the viewpoint follows the user's motions. Users see content from different orientations and varying amounts of stereoscopic disparity. The content may be seen using, e.g., either wearable or external displays. In some embodiments, 3D perception is based on approximated (e.g., virtual) disparity with users seeing a monocular stack of multiple focal planes from two eye viewpoints.

Many stereo 360° video systems respond to orientation changes only and not user parallax motions. Many previous systems use orientation (pure orientation changes) to control 360° video. A head rotation also gives a translation of eye positions. Avoiding VAC may provide, e.g., comfortable stereo viewing from a fixed position.

In some embodiments, virtual viewpoint generation for forming stereoscopic images is made by shifting and adding MFPs. Stereoscopic displays may be used for viewing the result, including near-eye and external S3D screens. If using time-multiplexed S3D displays, shutter glasses worn by a user may be equipped with sensors for tracking user motions, in order to support motion parallax effects. In order to avoid VAC associated with stereo displays, stereoscopic displays may be, e.g., replaced by displays supporting natural accommodation.

For some embodiments, a method may comprise: receiving three-dimensional video content; computing one or more multifocal plane (MFP) images for a number and position of multifocal planes using the three-dimensional video content; measuring motion tracking sensor readings of a motion tracking sensor; generating a viewer orientation signal from the motion tracking sensor readings; computing one or more disparity images (e.g., an MFP stack skewed by an amount indicated by a disparity vector, projected, and summed to a viewing point) for each view of a shutter glasses display using the one or more MFP images and the viewer orientation signal; and rendering the one or more disparity images to the shutter glasses display.

For some embodiments, a device may comprise: one or more motion tracking sensors; a processor; and a non-transitory computer-readable medium storing instructions that are operative, when executed on the processor, to perform the processes of: receiving three-dimensional video content; computing one or more multifocal plane (MFP) images for a number and position of multifocal planes using the three-dimensional video content; measuring motion tracking sensor readings of a motion tracking sensor (e.g., one or more motion tracking sensors); generating a viewer orientation signal from the motion tracking sensor readings; computing one or more disparity images for each view of shutter glasses display using the one or more MFP images and the viewer orientation signal; and rendering the one or more disparity images to the shutter glasses display. For example, in some embodiments, measuring motion tracking sensor readings of a position of a viewer relative to a real-world environment may include, e.g., measuring motion tracking sensor readings of a position of a viewer relative to a physical stationary point.

Varying Disparity According to User Motions

Figure 24C:
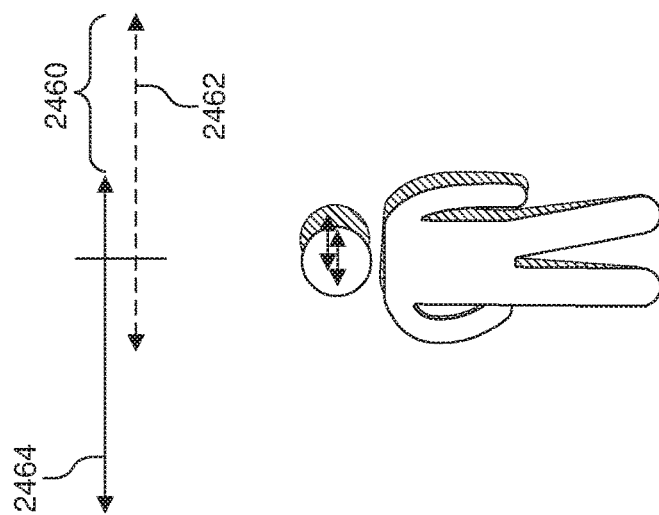
FIGS. 24A-24C are schematic front views illustrating example scenarios for image disparities with direction of viewer orientations according to some embodiments.
Figure 24B:
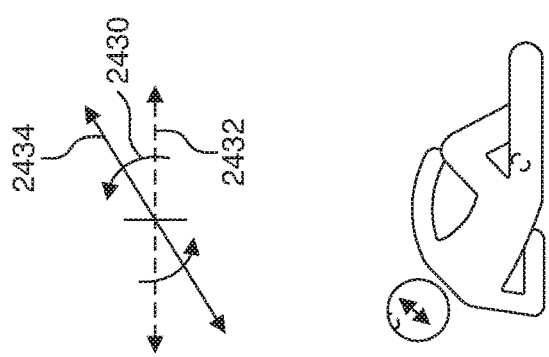
Figure 24A:
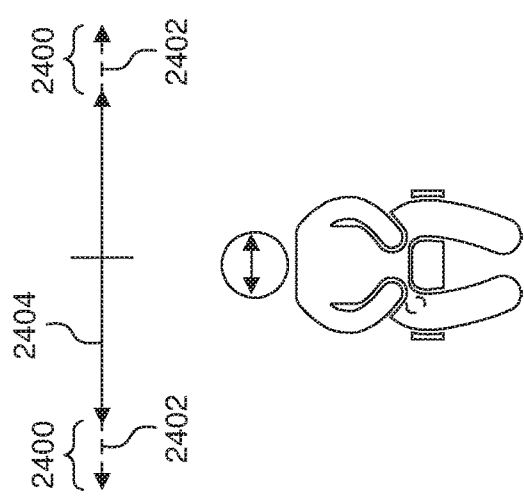

FIGS. 24A-24C are schematic front views illustrating example scenarios for image disparities with direction of viewer orientations according to some embodiments. Stereoscopic disparity adjustments may be made due to user motions and motion-related interactions. FIGS. 24A-24C show disparity-related viewpoint changes by user motions supported by some embodiments. As illustrated by FIGS. 24A-24C, the amount (e.g., length, height, or width) 2400 (FIG. 24A), orientation (e.g., direction) 2430 (FIG. 24B), and position (e.g., sideway translation) 2460 (motion parallax) (FIG. 24C) of the synthetic disparity may be adjusted, or, e.g., any combination of these user motions. Disparity (amount of head tilt and sideways translation) may be adjusted based on tracking data from a users eye-wear, or on his/her manual input (indicating e.g., personal preference for the amount of disparity). The three disparity related interactions illustrated in FIGS. 24A-24C, may, for example, occur in any order and may form a continuous sequence.

FIGS. 24A-24C illustrate disparity created by some embodiments, expressed via a bipolar vector 2402, 2404, 2432, 2434, 2462, 2464 whose amount (e.g., length, height, or width), orientation, and position with respect to origin (for supporting motion parallax effect) may be adjusted. Old disparity values are shown by dashed arrows 2402, 2432, 2462, and new disparity values by solid arrows 2404, 2434, 2464.

The disparity of a stereoscopic image pair (for the left and right eye) may be presented by a tuple of vectors (a "bipolar vector"), pointing at two opposite directions, along the baseline between the eyes. The amount of disparity is given by the magnitude of the difference of the two vectors (FIG. 24A). Head tilt is indicated by the angle between disparity vector(s) and the horizon (or a vector parallel to the horizon) (FIG. 24B). Motion parallax (e.g., a momentary shifted viewpoint) may be expressed by the asymmetry of the two vectors, the viewpoint being indicated by their average (FIG. 24C).

The amount of disparity is adjusted by scaling the disparity vectors (multiplying by a scalar), the direction is adjusted by rotating the vectors (or, e.g., by modifying a numeric expression for the amount of rotation), and translation is made by parallel shifts of the vectors. Instead of delivering captured user motion between system components (between glasses and system terminal) as motion vectors, component interfaces may be based on transmitting disparity vectors, after modifying them based on captured user motions.

For some embodiments, shifting of focal plane images may include scaling a disparity vector (or, e.g., by modifying a numeric expression for the amount of disparity adjustment by shifting) for the respective focal plane images. For example, the scaling may be performed as shown in FIG. 24A so as to widen (or shrink) a horizontal (or vertical) dimension. For some embodiments, shifting of focal plane images may include translating the respective focal plane images. For example, translating a focal plane image may include rotating a focal plane image or moving a focal plane image horizontally (or vertically) by an offset relative to a fixed origin.

Figure 25:
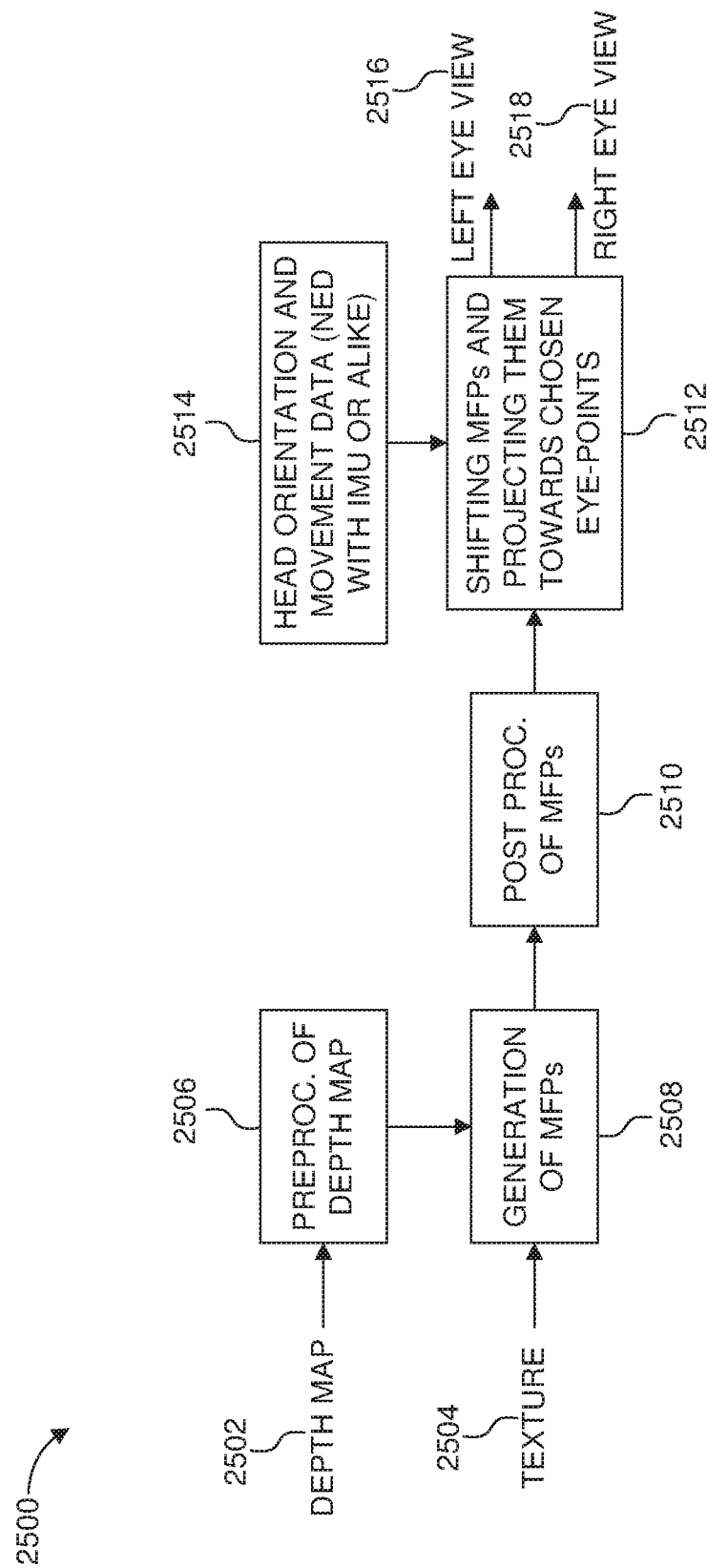
FIG. 25 is a system diagram illustrating an example set of processing blocks and interfaces for generating left and right eye shifted and projected MFPs according to some embodiments.

FIG. 25 is a system diagram illustrating an example set of processing blocks and interfaces for generating left and right eye shifted and projected MFPs according to some embodiments. The disclosed example method is a new example implementation of a virtual viewpoint generation stage in DIBR, in accordance with some embodiments. DIBR was discussed above with reference to a virtual viewpoint generation stage shown in FIG. 8 (adapted from Zhu). In FIG. 25, a block diagram 2500 for an example DIBR-based implementation according to some embodiments is shown. Preprocessing of depth map 2506 may contain filtering operations for the depth map 2502. One operation is smoothing the depth map 2502 in order to reduce holes or the maximum created disparity (for example, for viewing comfort) as described in Xuyuan Xu, et al., Depth Map Misalignment Correction and Dilation for DIBR View Synthesis, 28 Signal Processing: Image Communication 1023-1045 (2013).

Some embodiments for generation of MFPs 2508 may use blending functions to produce a weight map (remapped depth map) for each MFP and to form the MFPs by multiplying the captured (texture 2504) image with each of the formed weight maps. Some embodiments may post process MFPs 2510 prior to shifting and projecting MFPs 2512. For some embodiments, filtering may be used to reduce holes if MFPs are shifted for large viewpoint changes or disparities. For some embodiments, MFPs may be received as an input. With some embodiments, post processing of MFPs 2510 may include forming MFPs (e.g., via redistribution).

A DIBR-based method according to some embodiments may include hole-filling and other inpainting methods to reduce disocclusion artifacts in 3D warped images. In some disclosed embodiments, shifting of focal planes may produce similar distortions to the result, and comparable processing (e.g., inpainting in either depth or spatial dimensions) may be used for MFPs after they have been formed by depth blending. Shifting and projecting MFPs 2512 into stereoscopic images 2516, 2518 may be used to meet a desired stereoscopic disparity (or depth budget). Shifting of MFPs may be made along any chosen baseline orientation 2514 (e.g., not just horizontal) to support arbitrary head tilt (data from IMU (Inertial Measurement Unit) or alike in the NED). Further, motion parallax may be supported based on user's head motions.

Note that forming one set of MFPs serves both various baseline orientations, amounts of disparity, and synthetic motion parallax (e.g., based on showing series of stereograms with chancing viewpoints) for one or more local viewers. The once derived MFP stack may serve all mentioned cases. The direction and amount of shifts vary, as well as the display (or, e.g., person) to which the result is rendered.

Figure 26:
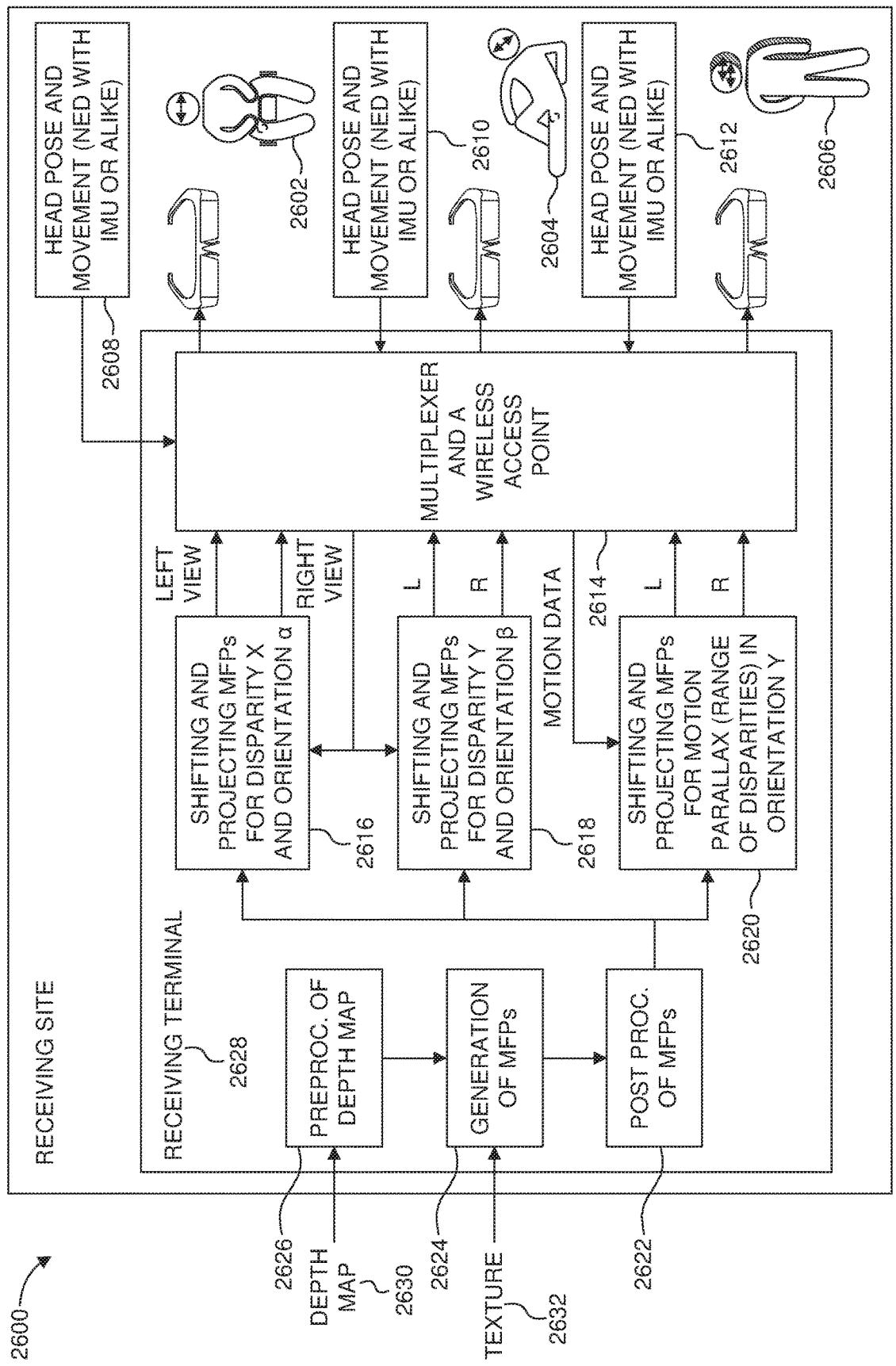
FIG. 26 is a system diagram illustrating an example set of processing blocks and interfaces for generating left and right eye shifted and projected MFPs for three scenarios of viewer orientations according to some embodiments.

FIG. 26 is a system diagram illustrating an example set of processing blocks and interfaces for generating left and right eye shifted and projected MFPs for three scenarios of viewer orientations according to some embodiments. FIG. 26 shows a process 2600 in which a generated MFP stack may be used for a number of local viewers 2602, 2604, 2606 with, e.g., different disparity, orientation, and motion parallax. For example, a receiving terminal 2628 may receive a depth map 2630 and preprocess the depth map 2626. A texture 2632 may be received by the receiving terminal 2628 to generate MFPs 2624 using the preprocessed depth map output. Some embodiments may post process MFPs 2622. MFPs may be shifted and projected 2616, 2618, 2620 for left and right views for each viewer 2602, 2604, 2606. Head pose and movement data (NED with IMU or alike) 2608, 2610, 2612 may be received by a multiplexer and wireless access point 2614. Motion data may be used in shifting and projecting of MFPs 2616, 2618, 2620.

Some embodiments serve multiple persons per site, individually, with several interaction functionalities. Note that, instead of sending motion data from the glasses to the receiving terminal (cf. 'head pose and movement' block in FIG. 26), in some embodiments the data may be disparity vectors derived from motion data or given as manual input (e.g., for setting a preferred disparity).

Some embodiments incorporate disparity adjustment by using an MFP display to create a visually natural disparity when a single MFP stack is viewed from an offset position. Some embodiments incorporate disparity adjustment through feedback from a viewer to a TV/HMD renderer to produce disparity-adjusted images. Orientation changes may be handled with glasses-based TV and with 360° video HMD clients.

For some embodiments, orienting one or more focal plane images may include shifting the respective focal plane images. Such shifting may be performed to handle motion parallax, such as is shown in FIG. 26, for example.

Forming Stereo Pairs from Focal Planes

FIGS. 27A-27D are schematic plan views illustrating example focal planes viewed under different viewer orientations according to some embodiments. In addition to forming a stack of MFPs, a stereoscopic image pair (stereogram) is formed from the focal planes. A monocular stack of MFPs (FIG. 27A) is placed at desired distances from the viewer's (average) eye-point 2702 and viewed by two eyes 2722 (FIG. 27B).

FIG. 27A shows a plan view illustration 2700 of a monocular MFP stack formed by depth blending. FIG. 27B shows a plan view illustration 2720 for viewing an MFP stack with two eyes 2722. FIG. 27C shows a plan view illustration 2740 for viewing the focal planes with the left eye 2742, for which the focal planes appear to have shifted to the right. FIG. 27D shows a plan view illustration 2760 for viewing the focal planes with the right eye 2762, for which the focal planes appear to have shifted to the left. Correspondingly, synthesizing two (stereoscopic) MFP stacks from a monocular MFP stack for stereoscopic (or stereoscopic MFP) viewing may be done by shifting MFPs in certain directions by certain amounts. Shifting of MFPs may be an approximation of more complex transformations for virtual viewpoint changes (cf. 3D warping in DIBR systems).

In FIGS. 27C and 27D, the left and right eye see the stack from slightly different viewpoints. The apparent sideway shift of focal planes in FIGS. 27C and 27D depends linearly on the distance of the focal planes. If the furthest plane is seen in the same position from both eyes (placed far from eyes), the middle plane is shifted 'one unit' sideways, and the closest plane 'two units' sideways.

For some embodiments, the sideways-shifted focal planes are collapsed by projecting them to each eye-point. For projecting, corresponding pixels on the focal planes may be summed up along the depth axis. This may generally result in a stereoscopic image pair of two images with different stereo disparity or parallax. If starting with a monoscopic MFP stack, the disparity may be interpreted being somewhat artificial or synthetic.

Examples of Stereograms Formed Using MFPs

Figure 28A:
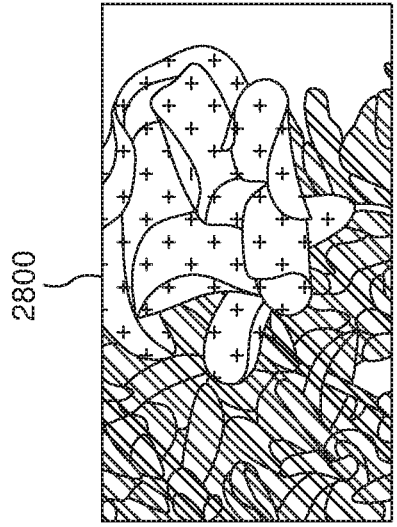
FIG. 28A is an illustration showing an example test image.
Figure 28D:
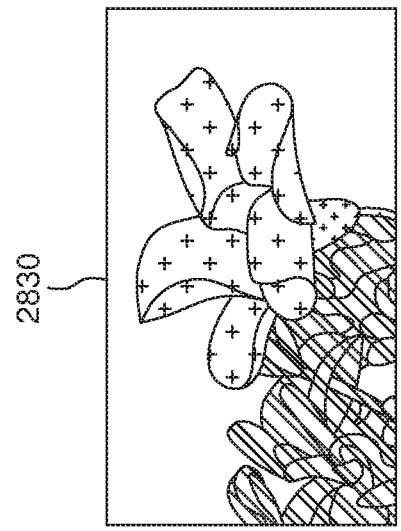
FIGS. 28B-28D are illustrations showing example weighted focal plane images using the test image of FIG. 28A according to some embodiments.
Figure 28C:
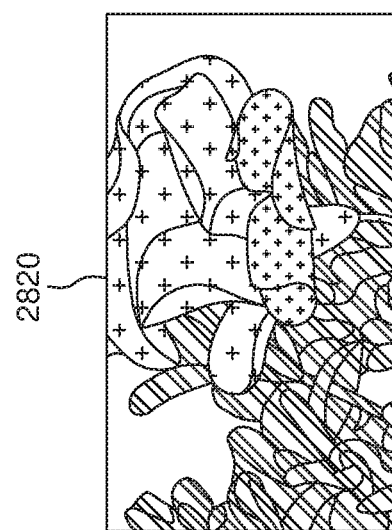
Figure 28B:
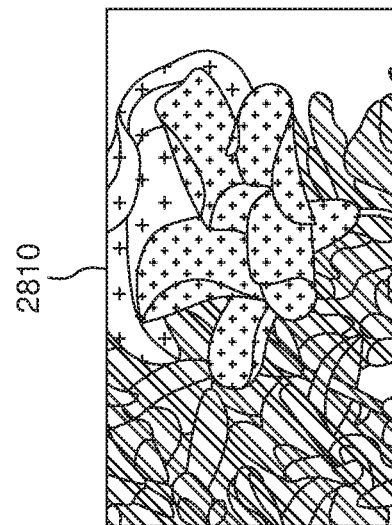
Figure 29A:
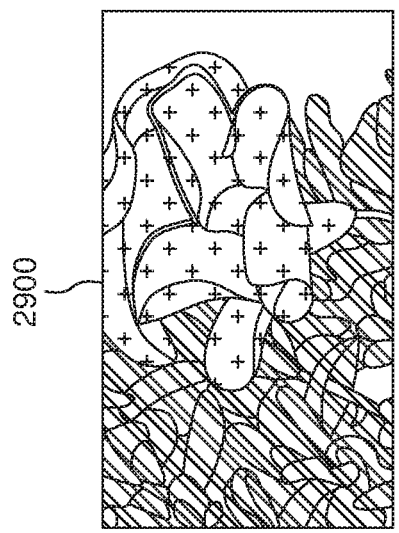
FIGS. 29A and 29B are illustrations showing example right and left eye images, correspondingly, formed using the focal plane images of FIGS. 28B-28D according to some embodiments.
Figure 29B:
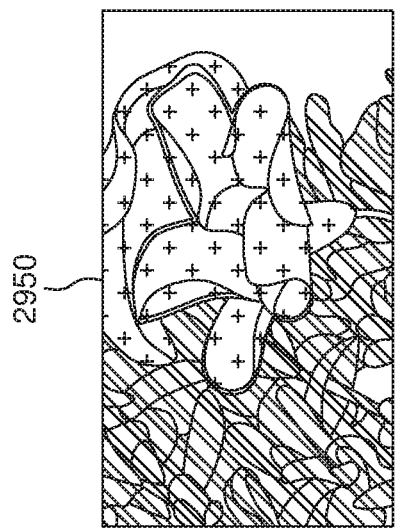

FIG. 28A is an illustration showing an example test image. FIGS. 28B-28D are illustrations showing example weighted focal plane images using the test image of FIG. 28A according to some embodiments. FIG. 28A originated from an image found on the webpage File:2D plus depth.png, WIKIPEDIA, //commons.wikimedia.org/w/index-.php?curid=5489771 (last accessed Feb. 22, 2019), and FIGS. 28B to 28D are modified versions of that image. Some embodiments may be illustrated using an example set of three focal planes, formed using polynomial blending functions (e.g., FIG. 21A). FIGS. 28B-28D show an example test image 2800 (FIG. 28A) decomposed to three MFPs 2810, 2820, 2830 using polynomial blending functions. Crossed eye stereograms are used to illustrate the quality of MFP stacks and stereo pairs. FIGS. 29A and 29B show a stereoscopic image pair 2900, 2950 (for the right and left eye, correspondingly) formed using the MFPs 2810, 2820, 2830 shown in FIGS. 28B-28D.

FIGS. 29A and 29B are illustrations showing example right and left eye images, correspondingly, formed using the focal plane images of FIGS. 28B-28D according to some embodiments. FIGS. 29A and 29B are an example of a crossed-eye stereogram formed using 3 MFPs. Total disparity corresponds to 2.76% of the image width (cf. MFPs shifted up to 6 pixels with the particular test image FIG. 28A). The amount of shift in pixels depends on the resolution of the test image used. Unlike with many MFP displays, where the rendering accuracy is limited by the number of focal planes, for some embodiments the accuracy and number of MFPs are not limited in the same way. Forming, shifting, and summing up MFPs for stereoscopic images may be performed with larger numbers of focal planes than just the example of three focal planes used to form FIGS. 29A and 29B.

Applying Focal Planes in Producing Stereoscopic Content

As in forming stereoscopic content, different accommodation distances may be chosen for a zero parallax setting (ZPS). In the real world, the ZPS plane is at infinity (far away from a viewers viewpoint). In such a setup, the produced disparity is in front of the furthest plane (commonly interpreted as negative disparity, although the sign convention may be reversed). In many cases, for various reasons, it may be more beneficial to use a closer distance for ZPS. Closer distances are used for the screen for many stereoscopic displays.

Figure 30C:
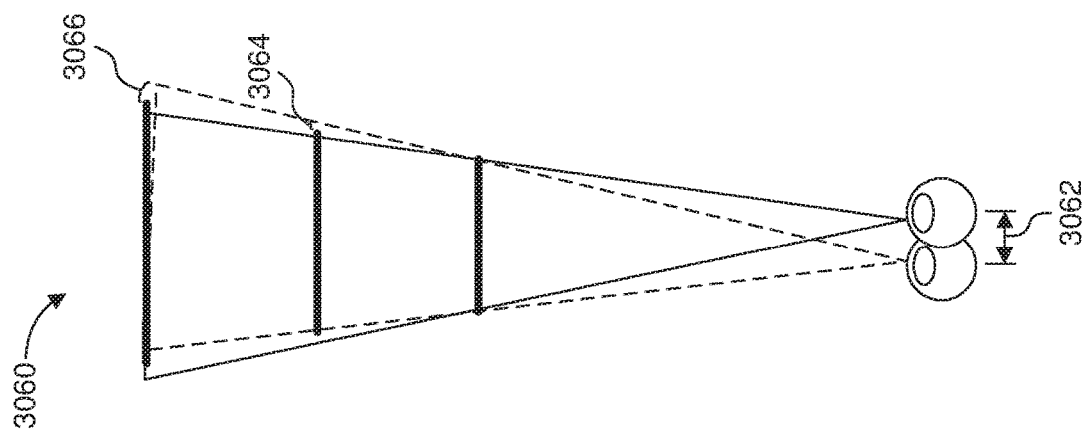
FIGS. 30A-30C are schematic plan views illustrating example focal planes viewed under different eye-separations according to some embodiments.
Figure 30B:
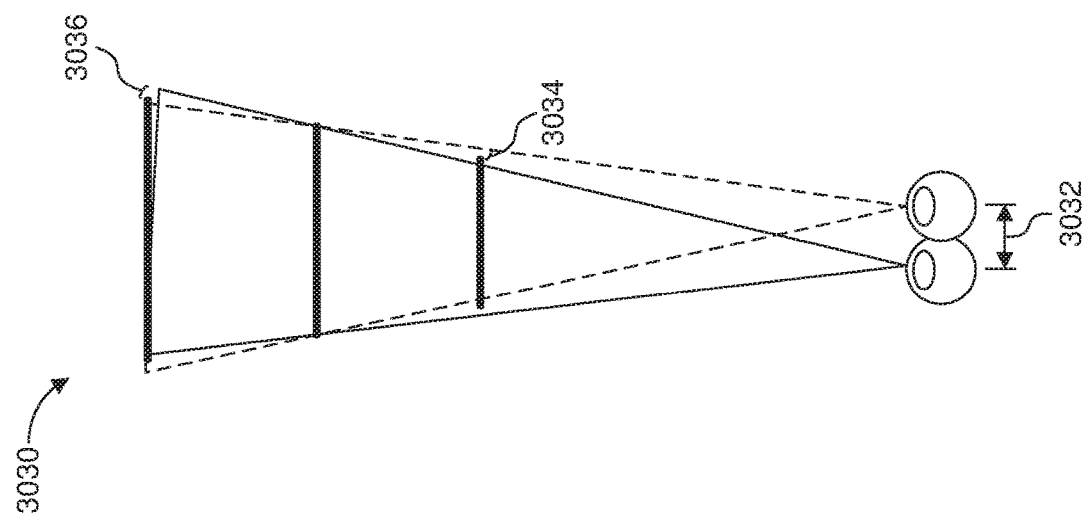
Figure 30A:
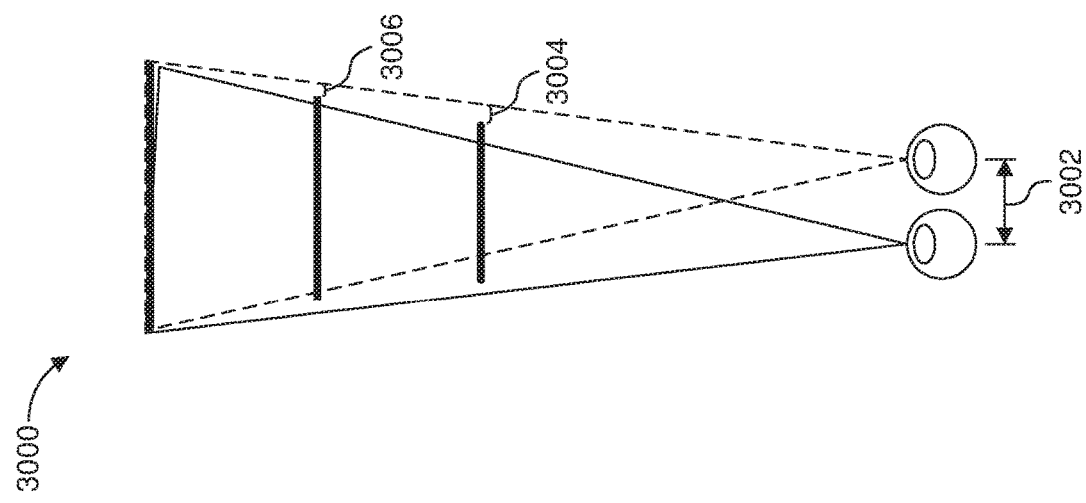

FIGS. 30A-30C are schematic plan views illustrating example focal planes viewed under different eye-separations according to some embodiments. FIGS. 30A-30C show three plan view schematics 3000, 3030, 3060 that illustrate adjusting the length of the stereo baseline (e.g., eye separation or Inter-Pupillary Distances (IPD)) 3002, 3032, 3062 may reduce edge effects of over/underlapping focal planes. In FIGS. 30A-30C, total disparities (e.g., amount of stereoscopic depth, and location of MFPs) and rendering distances remain the same. In FIGS. 30A-30C, this is true for three different viewers with correspondingly reduced inter-pupillary distances (IPD)/inter-ocular distances (IOD). In practice, referring to FIGS. 30A-30C, individual variations of IOD may affect to the perceived depth in the same way as selecting a ZPS-location to the back (e.g., FIG. 30A), middle (e.g., FIG. 30B), or front (e.g., FIG. 30C).

The inter-ocular adjustment illustrated in FIGS. 30A-30C corresponds to choosing the convergence point/focal plane (e.g., also called zero parallax setting, ZPS) for the content. Focal plane at ZPS divides the total disparity range (e.g., depth budget) between negative (near) and positive (far) disparities. In FIG. 30A, all content seems to be in front of the screen (due to all negative disparity 3004, 3006). In FIG. 30B, content seems to be on both sides of the screen (due to both negative disparity 3034 and positive disparity 3064). In FIG. 30C, the content seems to be behind the scene (due to having only positive disparity 3064, 3066). Note that the ZPS does not affect to the perceived depth range or disparity range itself.

For some embodiments for minimizing the effects caused by only partial overlay of MFPs on focal plane edges, the alignment of focal planes is beneficial to be made with respect to the middlemost plane (FIG. 30B). With depth blending, focal planes and their stereoscopic projections produce continuous depth perception for the image areas and for objects between the focal planes.

The number of MFPs is a parameter that may affect perceived quality. With synthetic stereoscopy, the number of focal planes is namely not limited by display properties (such as transparency and multiplexing speed). In some embodiments, the number of focal planes may be chosen, e.g., high enough to meet any desired depth accuracy. Computational complexity increases linearly with the number of focal planes but may not be an issue with a relatively high number of MFPs.

For the same reason, there may be less benefit for optimization of focal plane positions. As shifting focal planes for the left and right eyes is easier (e.g., may be performed without sub-pixel operations) with regular focal plane distances, equal displacement distances (e.g., intervals) may be used. Instead of optimizing positions by dioptric spacing, the number of MFPs with regular intervals may be increased. Due to the centermost plane being an alignment/pivot position, an odd number of focal planes may be used.

The depth map of a captured scene may be relative and normalized. The depth range may be relative or unlocked to real-world coordinates and may be a system variable. In some embodiments, the stereoscopic depth of a scene is determined by the amount of sideway shift used in the formation of (pseudo-) stereoscopic image pairs.

A higher number of MFPs may correlate to the ability to produce a larger synthetic disparity and stereoscopic depth. This process is also dependent on image content. With scenes having only a few objects with large depth separation, depth blending over a large depth range may be beneficial instead of blending over more compact ranges.

Forming Synthetic Stereo-Pairs

Stereoscopic image pairs are formed from the MFPs by summing up projections from the focal planes towards each eye. The process results in a stereo pair, which may be viewed with stereo glasses, thus inducing VAC, or an MFP version of stereo glasses, which are able to avoid VAC. Maximum disparity or parallax in stereogram formed this way is the same which is observed for stereoscopic content. This recommended maximum parallax from Fehn—also referred as depth range or (stereo) budget—depends on the content but is in the order of 3% of the image width. After this limit, stereo effect tends to break, meaning that the (subjective) quality of the stereo content degrades, as described in Fehn.

For example, in FIG. 13, the maximum parallax/disparity is about 2.5%, below the recommended maximum of 3% from Fehn. FIG. 13 shows that the corresponding maximum field-of-view for stereoscopic viewing is relatively small, about 20 degrees horizontal (compared to about 70 degrees for rotating eyes without head motion). In vertical dimension, the maximum field-of-view is up to 55 degrees without head rotation. In the vertical direction, stereoscopic (or any other) displays are smaller than what is enabled by the eyes.

Depending on the source, different recommendations are given for the allocation of the depth budget, the split between depth in front and behind the stereoscopic display screen (between negative and positive parallax). In addition to the content itself, this allocation may be affected by the screen size, and varies depending on source.

According to Shibata, et al., *The Zone of Comfort: Predicting Visual Discomfort with Stereo Displays*, 11(8):11 J. OF VISION 1-29 (2011) ("Shibata II"), crossed disparity (for objects nearer than the screen) should not exceed 2-3% of the screen width and uncrossed disparity (for objects further than the screen) should not exceed 1-2% of screen width.

In some embodiments, limits or, e.g., recommendations, such as those identified by, e.g., Fehn and Shibata II, may be applied and compensated for as design considerations.

Examples with Large Disparity

In the following, further examples are given with sinusoidal and polynomial blending functions. For ease of seeing distortions on print, a large total disparity of 4.6% is chosen for these examples—much more than the recommended maximum of 3% in Fehn. The effect is illustrated in FIGS. 31A-31F.

Figure 31B:
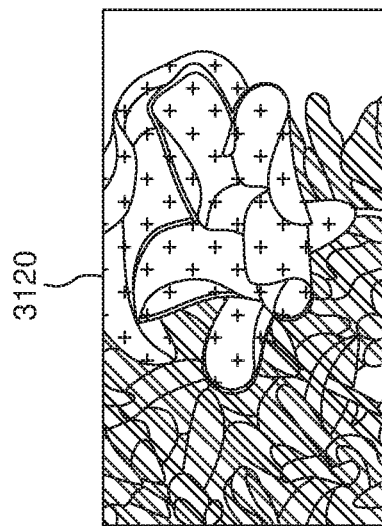
FIGS. 31B-31C are illustrations showing example stereoscopic images for the right and left eye, correspondingly, formed with sinusoidal depth weightings according to some embodiments.
Figure 31C:
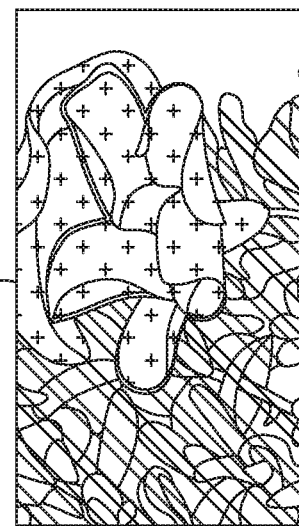
Figure 31E:
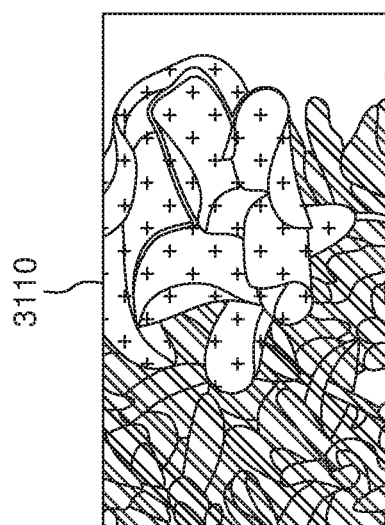
FIGS. 31E-31F are illustrations showing example right and left eye images, correspondingly, formed with polynomial depth weightings according to some embodiments.
Figure 31F:
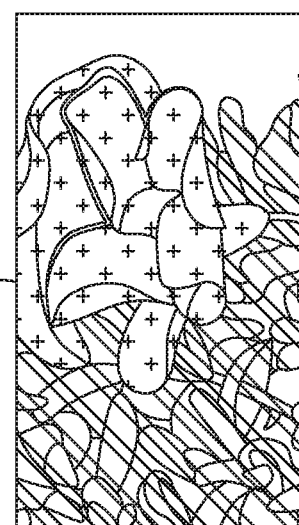
Figure 31A:
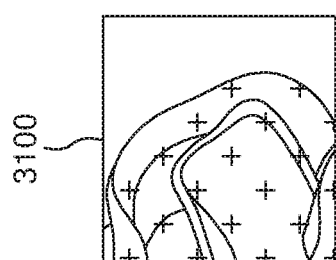
FIG. 31A is an illustration showing an enlarged excerpt of an example stereoscopic image for the right eye, formed with sinusoidal depth weightings according to some embodiments.
Figure 31D:
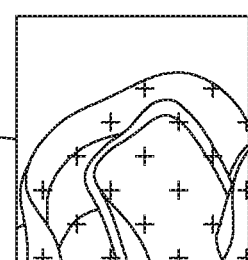
FIG. 31D is an illustration showing an enlarged excerpt of an example stereoscopic image for the right eye, formed with polynomial depth weightings according to some embodiments.

FIG. 31A is an illustration showing an enlarged excerpt of an example stereoscopic image for the right eye, formed with sinusoidal depth weightings according to some embodiments. FIGS. 31B-31C are illustrations showing example stereoscopic images for the right and left eye, correspondingly, formed with sinusoidal depth weightings according to some embodiments. FIG. 31D is an illustration showing an enlarged excerpt of an example stereoscopic image for the right eye, formed with polynomial depth weightings according to some embodiments. FIGS. 31E-31F are illustrations showing example right and left eye images, correspondingly, formed with polynomial depth weightings according to some embodiments. FIGS. 31B-31C and 31E-31F are modified versions of the unprocessed flower test image of, e.g., FIG. 21B, by processing the test image using its depth map FIG. 21C, in accordance with some embodiments. FIGS. 31B-31C and 31E-31F show a comparison of crossed eye stereograms with large synthetic disparity (±2.3%), produced by shifting and summing of three MFPs, formed using either sinusoidal and polynomial blending functions (cf. upper stereogram 3110, 3120 of FIG. 31B and FIG. 31C, and lower stereogram 3140, 3150 of FIG. 31E and FIG. 31F, correspondingly). Insets 3100 and 3130 on the left (FIGS. 31A and 31D) show details of the corresponding right-eye images 3110, 3140 with both methods. Insets show a benefit of polynomial functions on object edges, reducing disocclusions produced by the large disparity. A benefit may come from the stronger depth blending by polynomial over sinusoidal functions.

With polynomial functions, background image details are slightly more blurred. This is caused by a stronger spatial filtering effect, which filters the result when the shifted focal plane components are summed-up to form the two final viewpoints. With large disparities, polynomial blending functions have benefits on object edges. The benefit comes from the inpainting effect of stronger blending in depth direction, which reduces visible disocclusions produced by large disparities.

Supporting Free Baseline Stereo

Images, videos and virtual content may be viewed with stereoscopic VR glasses. These services may be able to provide stereoscopic disparity only in the horizontal dimension (if viewing with head upright). In order not to disturb a viewer's perception for his/her pose and balance, the horizon of the viewed content is commonly locked to the viewer's real horizon. This is made by sensing the users head tilt by a position sensor in the viewing device (e.g., a mobile phone in "cardboard" VR glasses).

In previous systems, in spite of leveling the content according to the user's head tilt, content disparity does not typically follow user's head tilt, but is horizontal despite the head orientation. With increasing head tilts, the horizontal disparity-based 3D perception is distorted, weakened or even lost. Systems and methods disclosed herein in accordance with some embodiments may be used to provide head orientation independent stereoscopic content. The stereoscopic (pseudo-)disparity may be formed in real-time at the receiving end, depending on a viewer's measured head-tilt. For some embodiments, if a viewer orientation signal indicates a tilt of the viewer, disparity images may be calculated that use a rotated disparity vector corresponding to the indicated tilt of the viewer.

Figure 32C:
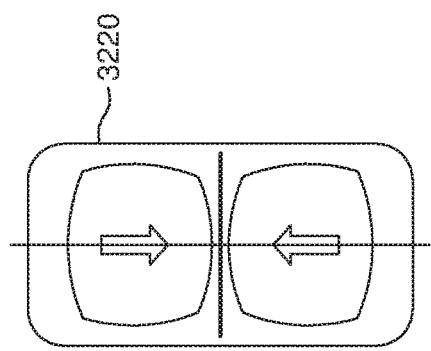
FIGS. 32A-32C are schematic front views illustrating example disparities for a first stereoscopic display with different user orientations according to some embodiments.
Figure 32F:
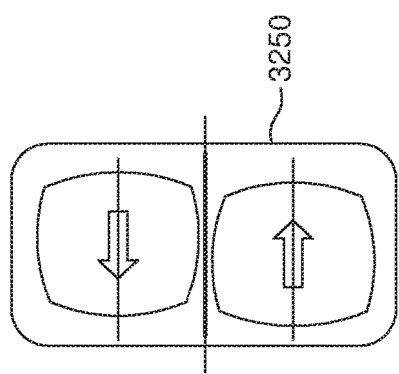
FIGS. 32D-32F are schematic front views illustrating example disparities for a second stereoscopic display with different user orientations according to some embodiments.
Figure 32B:
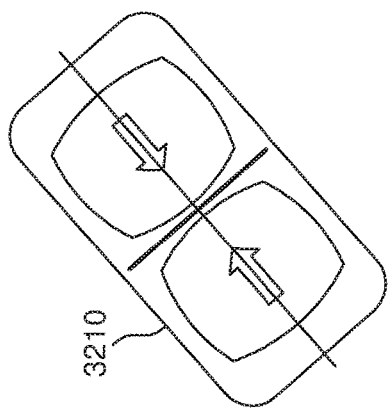
Figure 32E:
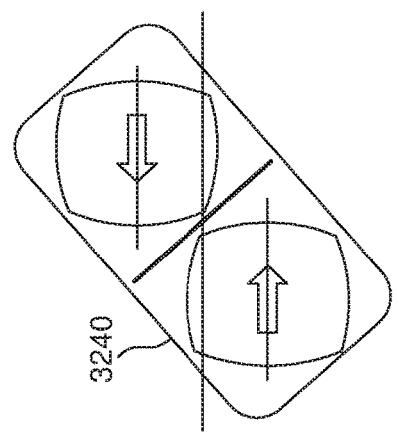
Figure 32A:
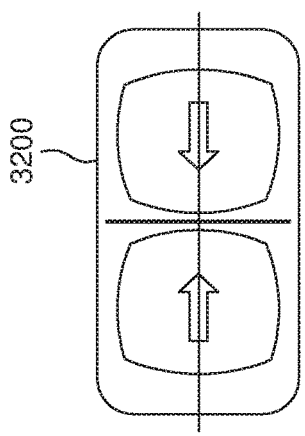
Figure 32D:
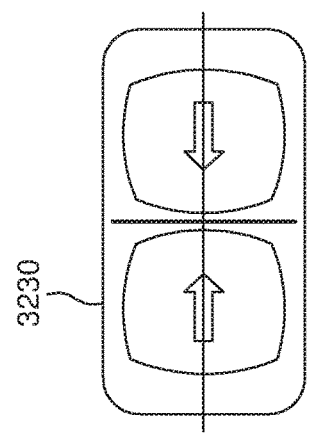

FIGS. 32A-32C are schematic front views illustrating example disparities for a first stereoscopic display with different user orientations according to some embodiments. FIGS. 32D-32F are schematic front views illustrating example disparities for a second stereoscopic display with different user orientations according to some embodiments. FIGS. 32A-32F illustrate some of the differences between previous systems and systems disclosed herein in accordance with some embodiments. In FIGS. 32A-32F, stereoscopic image pairs 3200, 3210, 3220, 3230, 3240, 3250 are depicted as they are shown with VR glasses using a mobile phone as display. Optimizing image geometry for viewing on a flat display near the eyes produces stereoscopic images with characteristic pincushion shape.

FIGS. 32A-32F show two methods for showing stereoscopic content on a near-eye display (e.g., a mobile phone). FIGS. 32A-32C show the content being tilted along a viewer's head pose, which results in a conflict between the real-world horizon line and what is shown. This conflict may cause simulator sickness and disorientation. FIGS. 32D-32F show, for some embodiments, methods for aligning the content's horizon with the real world horizon by tracking the users head pose. A drawback of this system is that the baseline of the stereo pair is misaligned and leads to erroneous or missing perception of depth.

Figure 33C:
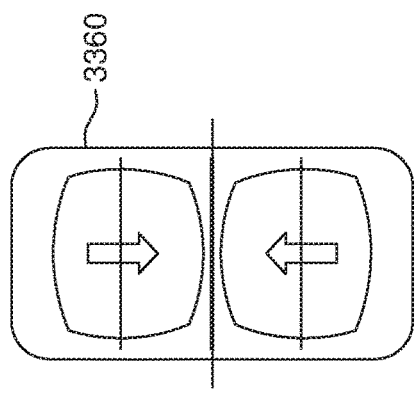
FIGS. 33A-33C are schematic front views illustrating example disparities for a stereoscopic display with different user orientations according to some embodiments.
Figure 33B:
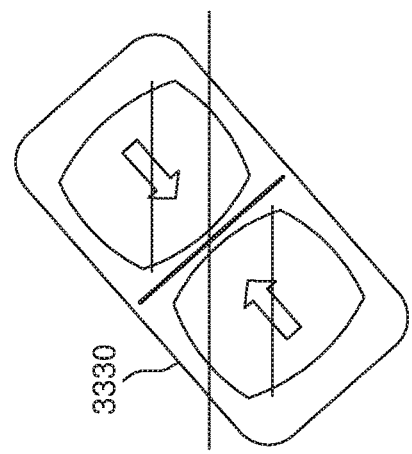
Figure 33A:
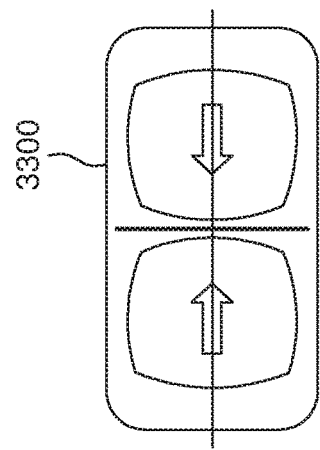

FIGS. 33A-33C are schematic front views illustrating example disparities for a stereoscopic display with different user orientations according to some embodiments. With some embodiments, such as illustrated by FIGS. 33A-33C, a stereo pair 3300, 3330, 3360 with a correct baseline and disparity may be formed in real-time, following the changes of a users head pose. Supported interactions may include also motion parallax. Notice that head tilt and motion are captured (see FIGS. 25 and 26) for varying the disparity accordingly in virtual viewpoint generation.

Figure 34:
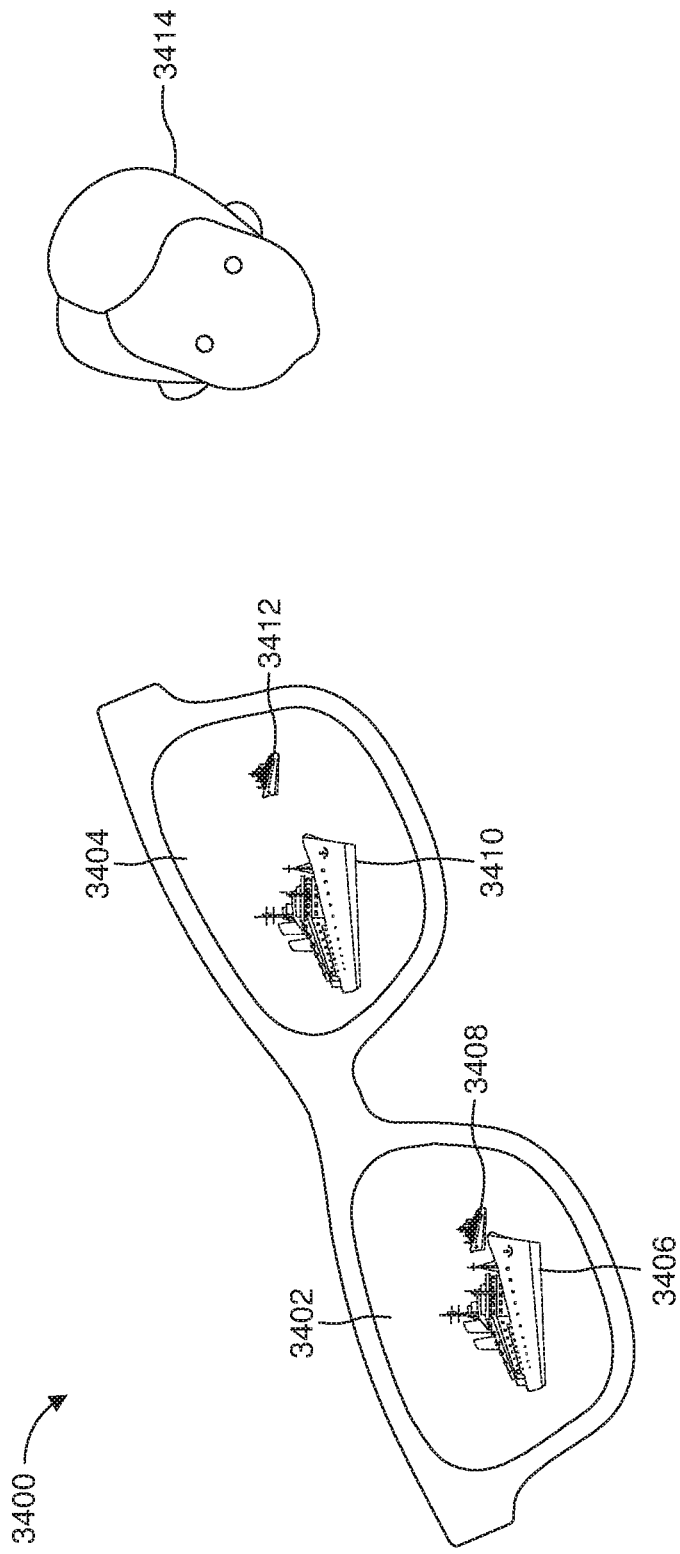
FIG. 34 is a schematic user's view illustrating example left and right eye images for a stereoscopic display for a viewer with a rotated orientation according to some embodiments.

FIG. 34 is a schematic user's view illustrating example left and right eye images for a stereoscopic display for a viewer with a rotated orientation according to some embodiments. FIG. 34 is a front view of left and right images displayed for a near eye display viewer. The head icon 3414 on the right side of FIG. 34 shows a rotation of the viewers orientation. The glasses on the left side of FIG. 34 are shown from the perspective of the viewer as worn by the viewer. The right eye image 3404 is seen from higher above, and the left eye image 3402 is seen from lower following a head rotation of the viewer. The same images shown in FIG. 5's original orientation are rotated for the scenario 3400 of FIG. 34 to keep the images horizontal. The disparity between the left and right images is altered to the rotated orientation (the location of the small boat shown in FIG. 5 is altered for FIG. 34 to show a change in both vertical and horizontal disparity such that the small boat 3408 is closer to the large boat 3406 for the left eye image 3402 in comparison with FIG. 5, and the small boat 3412 is further away from the large boat 3410 for the right eye image 3404 in comparison with FIG. 5).

For some embodiments, orienting one or more focal plane images may include rotating the respective focal plane images. For example, one or more focal plane images may be rotated to show images for left and right eye images 3402, 3404 as shown in FIG. 34. For some embodiments, rotating the focal plane images may include rotating a disparity vector for one or more of the focal plane images in relation to a vector parallel to a horizon.

Supporting Motion Parallax

Focal plane shifts based on synthetic disparity, at any baseline orientations (e.g., head tilts), may be used also to support small amounts of motion parallax for the left and right eyes. This embodiment uses a high number of focal planes, and the span of disparities may be extended so large that various head positions (motion parallax) may be supported within that range.

Figure 35:
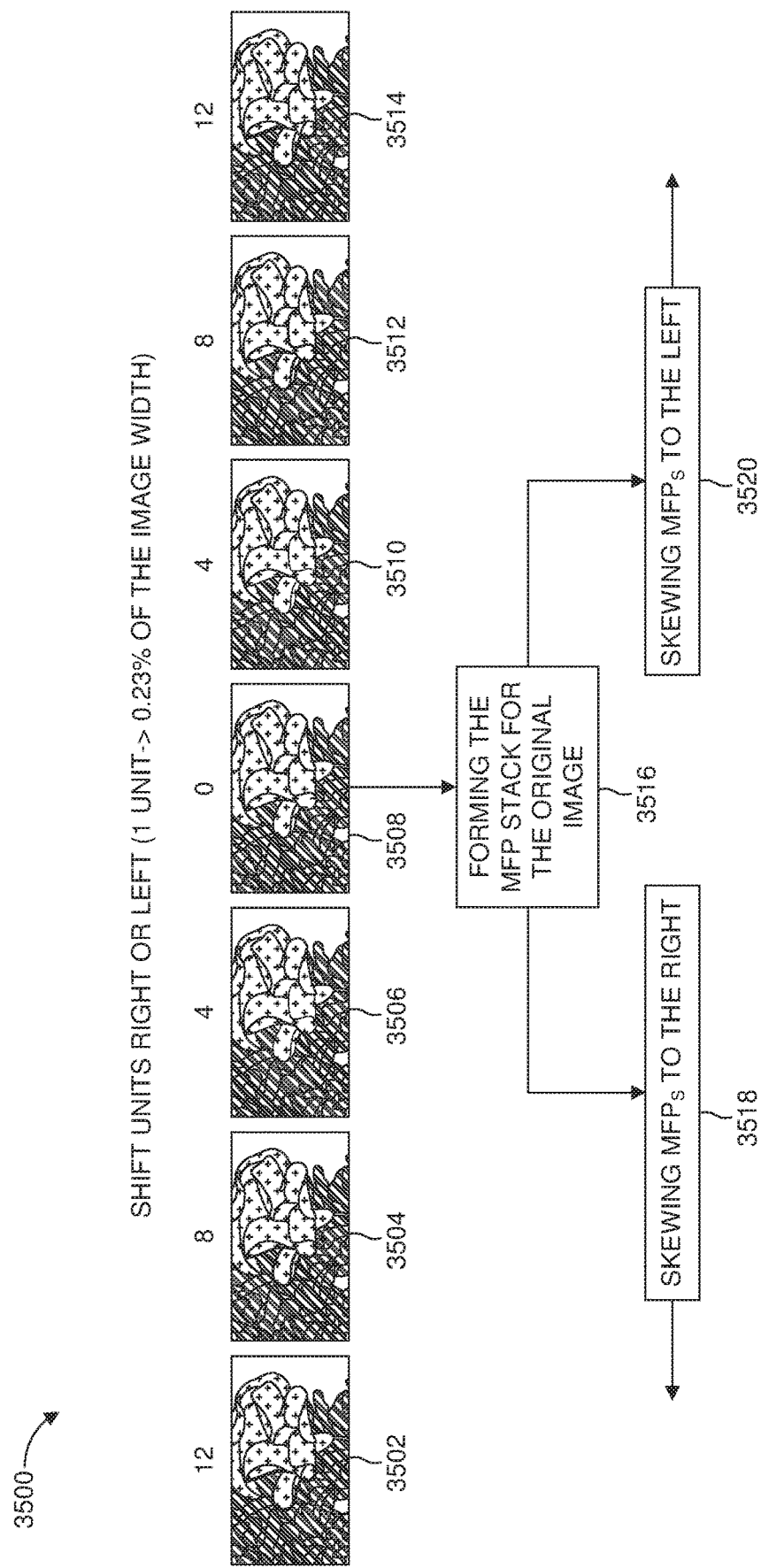
FIG. 35 is a schematic processing diagram illustrating an example process for producing multiple viewpoints to a view by skewing left and right a set of focal plane images according to some embodiments.

FIG. 35 is a schematic processing diagram illustrating an example process for producing multiple viewpoints to a view by skewing left and right a set of focal plane images according to some embodiments. FIG. 35 shows various modified versions of the unprocessed flower test image of, e.g., FIG. 21B, using its depth map of, e.g., FIG. 21C, in accordance with some embodiments. In the example in FIG. 35, five (e.g., sinusoidal) MFPs and a maximum parallax/sideway shift of 12 units (for either eye) have been used. A multiview image of seven frames 3502, 3504, 3506, 3508, 3510, 3512, 3514 has been formed 3516 over the chosen disparity/parallax range. Each of the frames 3502-3514 is formed by first skewing an MFP stack to a varying degree, then by projecting and summing MFPs towards a viewer. Also, the original zero disparity image is taken into the series. The multiview image contains a series of crossed eye stereograms, with the viewpoints for the right eye on the left side, and vice versa. Within the multiview series of FIG. 35, by picking every other frame, five stereogram pairs 3502/3506, 3504/3508, 3506/3510, 3508/3512, 3510/3514 may be formed, which differ by 8 units of parallax/sideway shift. Correspondingly, linearly varying stereoscopic parallax (with stereoscopic disparity of 8 units) may be supported in five positions. FIG. 35 shows an example 3500 for forming a multiview image using synthetic disparity. Maximum disparity range (e.g., maximum sideway shift range of the 5 MFP stack) for each eye is 12 units (±2.75% of the test image width). For example, an MFP stack may be skewed (or, e.g., MFPs shifted) to the right 3518 and an MFP stack may be skewed (or, e.g., MFPs shifted) to the left 3520. A stack of MPFs is skewed (or, e.g., MFPs shifted) by varying amounts. The result is a stack of MFPs tilted left or right, depending on the shifting direction.

Splitting the multiview image into stereo pairs may be more convenient for perceiving the parallax effect from print. A compromise between motion parallax effect and the perceived stereo disparity (depth) may be made by using either: 1) two adjacent images in 6 positions (total disparity 0.46%; positive and negative disparities both 0.23%), 2) every other image in 5 positions (total disparity 0.92%), 3) every third image in 4 positions (total disparity 1.38%), 4) every fourth image in 3 positions (total disparity 1.84%), or every fifth image in two positions (total disparity 2.3%). A stereo pair with two end images provides total maximum disparity of 2.76% without motion parallax.

Figure 36:
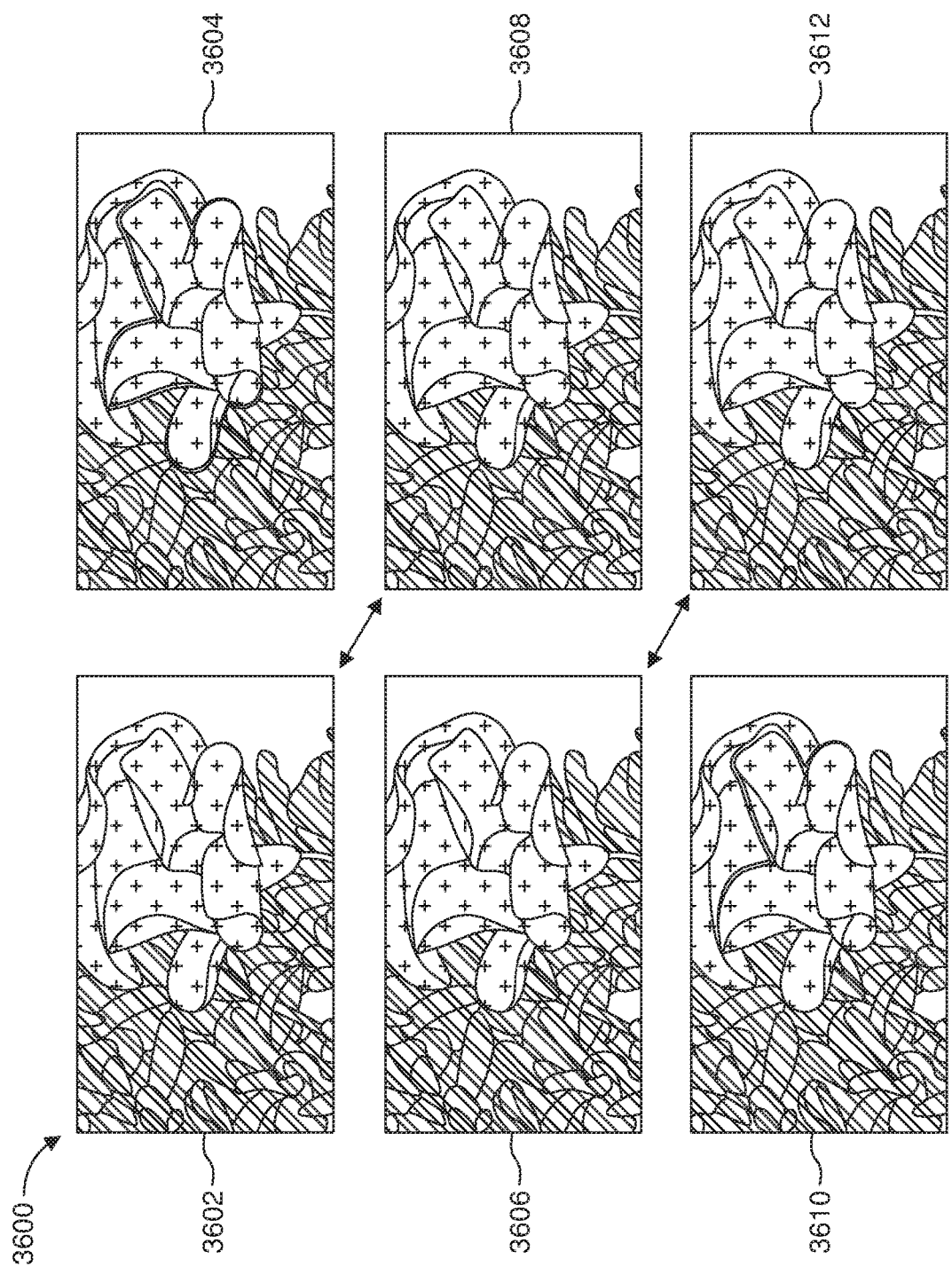
FIG. 36 are illustrations showing an example series of three stereoscopic images for a stereoscopic display using the skewed images of FIG. 35 according to some embodiments.

FIG. 36 are illustrations showing an example series of three stereoscopic images for a stereoscopic display using the skewed images (each of them is an MFP stack first skewed by a varying degree, then projected and summed towards a viewer) of FIG. 35 according to some embodiments. FIG. 36 shows three samples 3602/3604, 3606/3608, 3610/3612 (crossed eye stereo pairs with disparities 0.92%) from the above series, formed by picking every other image. Perceiving the motion parallax effect (total of 3.7%) from a print may be a bit challenging, but it is clear when an animation is formed using the multiview images in FIG. 35. FIG. 36 illustrates an example 3600 of three stereoscopic views 3602/3604, 3606/3608, 3610/3612 with motion parallax (the viewpoint moving from left to right), formed using the multiview image shown in FIG. 35. FIG. 36 shows three (crossed eye) stereograms 3602/3604, 3606/3608, 3610/3612 with the viewpoint change from left to right (cf. FIG. 35). Images connected by arrays are the same.

The amount of motion parallax in the example of FIG. 36 may be estimated. The two viewpoints to the stereoscopic content are separated by the eye separation, typically around 60 mm. Correspondingly, the virtual views illustrated in FIG. 36 allow the user to move his/her head 12 cm between the two extremes. However, seeing the results as small crossed eye stereograms likely distorts the effect, compared to observing the effect in more realistic conditions. The described head tilt and motion parallax support may be provided individually to multiple local viewers, as forming and processing of MFPs may be made in the receiver multiple times, for one-time transmitted (broadcast) content.

For synthetic motion parallax, stereo pairs are not formed with symmetrically left- and right-shifted versions but, for example, by two left shifted versions, with different amount of shifts. However, this does not seem to cause any noticeable degradation in perceiving the motion parallax effect. Another related detail is that the original unshifted texture image (without any effects on either side of object edges) also may be used as part of the multiview image series.

Although choosing the focal point or ZPS (cf. FIGS. 30A-30C and its explanation) does not affect to the depth range (cf. total disparity) perceived from the stereo image, there is a small consequence from the choice when creating synthetic motion parallax. When the focal point is in the middle (e.g., as chosen generally for the examples in this disclosure), a viewer moving sideways namely perceives the rendered volume rotating around a pivot point (at the distance of ZPS). However, more natural for motion parallax is that a volume rotates around its furthest point. For some embodiments, if forming the motion parallax effect, the far plane (and all disparity in front of the far plane) may be used in the virtual viewpoint generation.

Applicable Source Formats for Forming MFPs

Video plus depth map is an applicable format for the disclosed methods according to some embodiments, which gives the distance of each pixel in the image. Parsing stereoscopic views from such a format, using 3D warping or an MFP-based design, may cause some errors at object edges, when occluded areas of the view are revealed due to the changing the viewpoint. One example embodiment is stereoscopic video with a depth map. Both of the above-mentioned formats are supported by video compression methods, e.g., H.264 MVC.

Multiple processes exist for generating depth images. One method in accordance with some embodiments is to derive the disparity of two camera views (a stereo pair) and map the disparity to depth. Finding correspondences between image pixels is made in parallel to the line connecting two camera points (baseline). Finding true correspondences is an error prone process, with potential false positive correspondences and disparities. Various types of filtering and segmentation operations may be used to smooth out errors.

Some embodiments use a source format of depth plus texture captured by a depth sensor (such as RGB-D or ToF (time-of-flight)). Depth information may be compressed before transmission. This uses a smaller bitrate than realtime transmission of virtual (3D modeled) scenes for stereoscopic viewpoints or corresponding depth maps.

Example Embodiments Using External Displays

Figure 37:
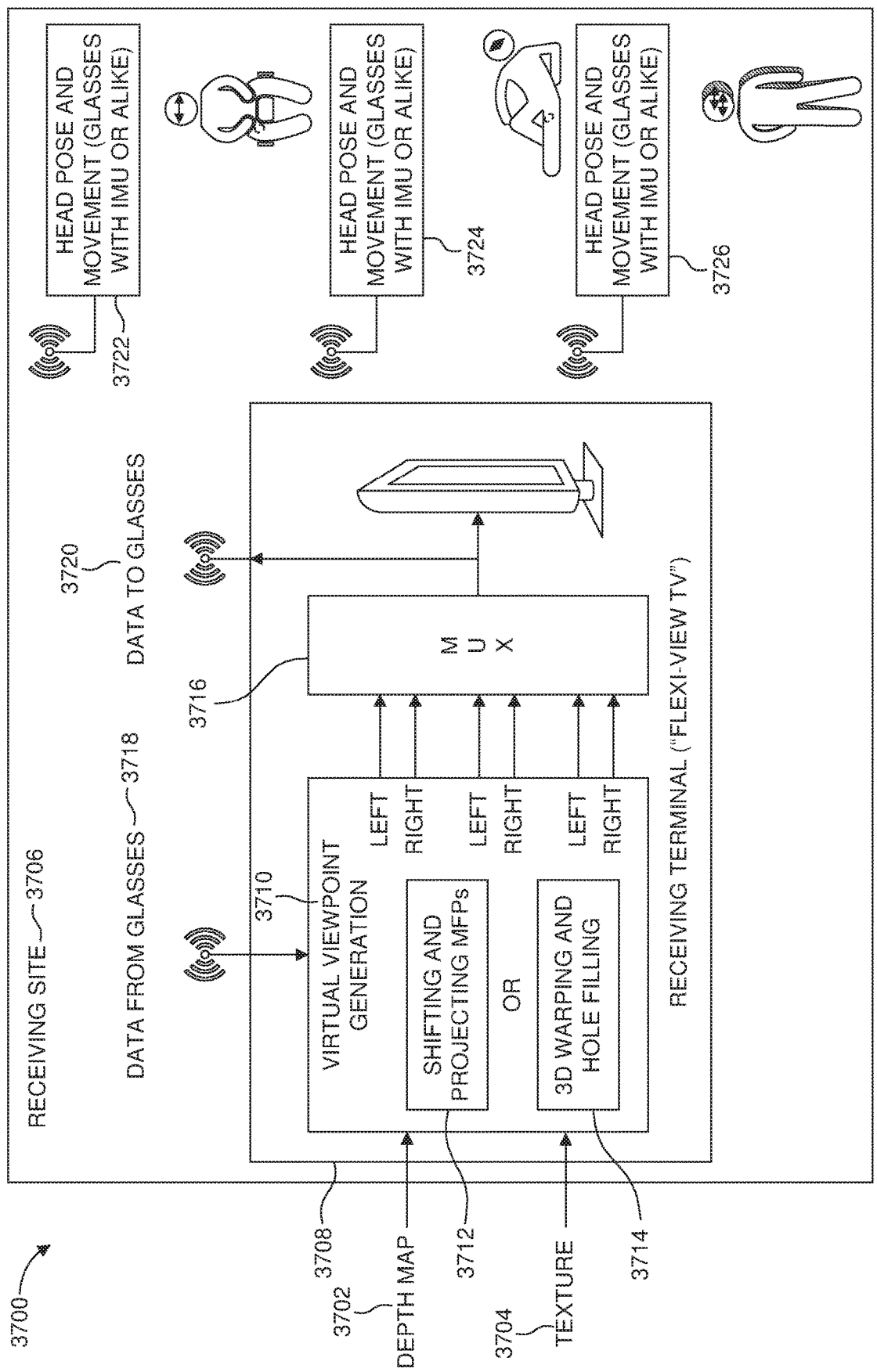
FIG. 37 is a system diagram illustrating an example set of processing blocks and interfaces for generating shifted and projected MFP images for a flexible-baseline stereoscopic display for three viewer orientations according to some embodiments.

FIG. 37 is a system diagram illustrating an example set of processing blocks and interfaces for generating shifted and projected MFP images for a flexible-baseline stereoscopic display for three viewer orientations according to some embodiments. For some embodiments, the flexible-baseline stereoscopic display may by a Flexi-view TV, for example. Although the context for describing some embodiments has mainly been a near-eye display, the same interactions also may be implemented using, e.g., external displays in accordance with some embodiments. If used for example for time multiplexed S3D displays, shutter glasses worn by a user may be equipped with sensors for tracking user motions and for receiving data from glasses 3718 and for sending data to glasses 3720. External tracking may be used for some embodiments. By tracking user posture and motions for an example of three users 3722, 3724, 3726, systems and methods disclosed herein in accordance with some embodiments (including virtual disparity-related functionalities) may use external displays. Multi-user views (which may be implemented with time-multiplexing 3716) may be used to provide service for multiple co-located viewers. FIG. 37 illustrates some embodiments using external displays and two example methods 3712, 3714 for virtual viewpoint generation 3710 in the receiver 3708 at a receiving site 3706 for inputs of a depth map 3702 and a texture 3704. While the techniques are shown as being alternatives in FIG. 37 ("OR"), in some embodiments, any combination of these techniques may be used.

Example Embodiments Using DIBR-Based Ways for Viewpoint Generation

Some embodiments for virtual viewpoint generation by MFPs may be used with DIBR systems based on 3D warping and hole filling. Some embodiments may use DIBR-based methods for producing free baseline stereo and motion parallax for freely postured or moving users. This embodiment may compute 3D geometric transformations for multiple users and changing of viewpoints. This embodiment is illustrated in FIG. 37 (cf. the two boxes inside 'virtual viewpoint generation', corresponding methods 3712 and 3714).

Example Embodiments for Free Baseline Stereo and Motion Parallax in MFP NEDs

Systems and methods disclosed herein in accordance with some embodiments form MFPs and use them to produce chosen (varying) stereoscopic disparity in desired orientation (head tilt). Some embodiments shift MFPs to comply with a baseline orientation. Some embodiments create free baseline stereo and motion parallax effects for actual MFP displays. If shown on actual MFP displays, natural accommodation is supported. An MFP stack may be viewed with a head tilt, such as illustrated in FIG. 34 for a stereoscopic display, such that accommodation supported stereoscopic perception is actually invariant for the viewer's head tilt (rotation "around nose").

Example Embodiments for Asymmetric Viewpoint Generation

An alternate embodiment is to form and show one eye information with shifted MFPs and to show the other eye MFPs without shifts (using the focal planes for the received texture image directly for one eye). According to Paul V. Johnson, et al., *Dynamic Lens and Monovision 3D Displays to Improve Viewer Comfort*, 24(11) Opt. Exp. 11808-11827 (2016), simultaneously showing one high quality image and one lower-quality image (here with disoccluded areas) may bring similar quality benefits as monovision methods. However, this variant may allow smaller disparities due to asymmetrical viewpoint generation and distortions.

Producing MFPs and Virtual Viewpoints

Some embodiments for forming MFPs and virtual viewpoints calculate depth blending weights for each focal plane, form MFP weight maps by remapping an image depth map by the depth blending weights calculated for each focal plane, multiply a captured or input image by each MFP weight map to form each focal plane image, and perform spatial shifts of each focal plane image, and add the formed MFPs to generate stereoscopic image pairs for a disparity. For some embodiments, depth blending weights may be calculated, and image processing may be used to form MFP weight maps (as illustrated in FIG. 38B), to form each focal plane image (as illustrated in FIGS. 39A-39C for one focal plane image) and to perform spatial shifts and additions (e.g., for a stereo image chosen disparity).

Figure 38A:
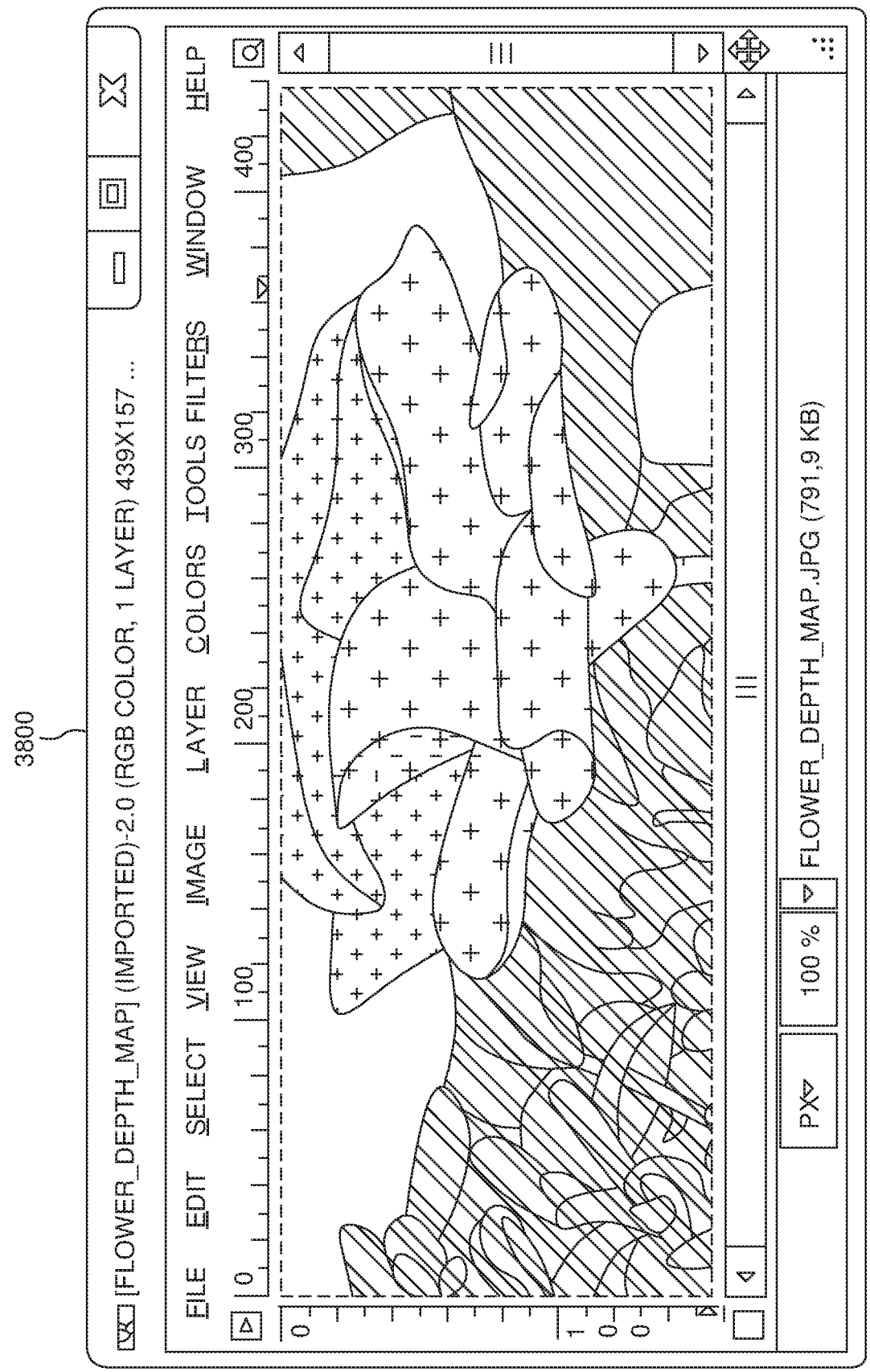
Figure 38B:
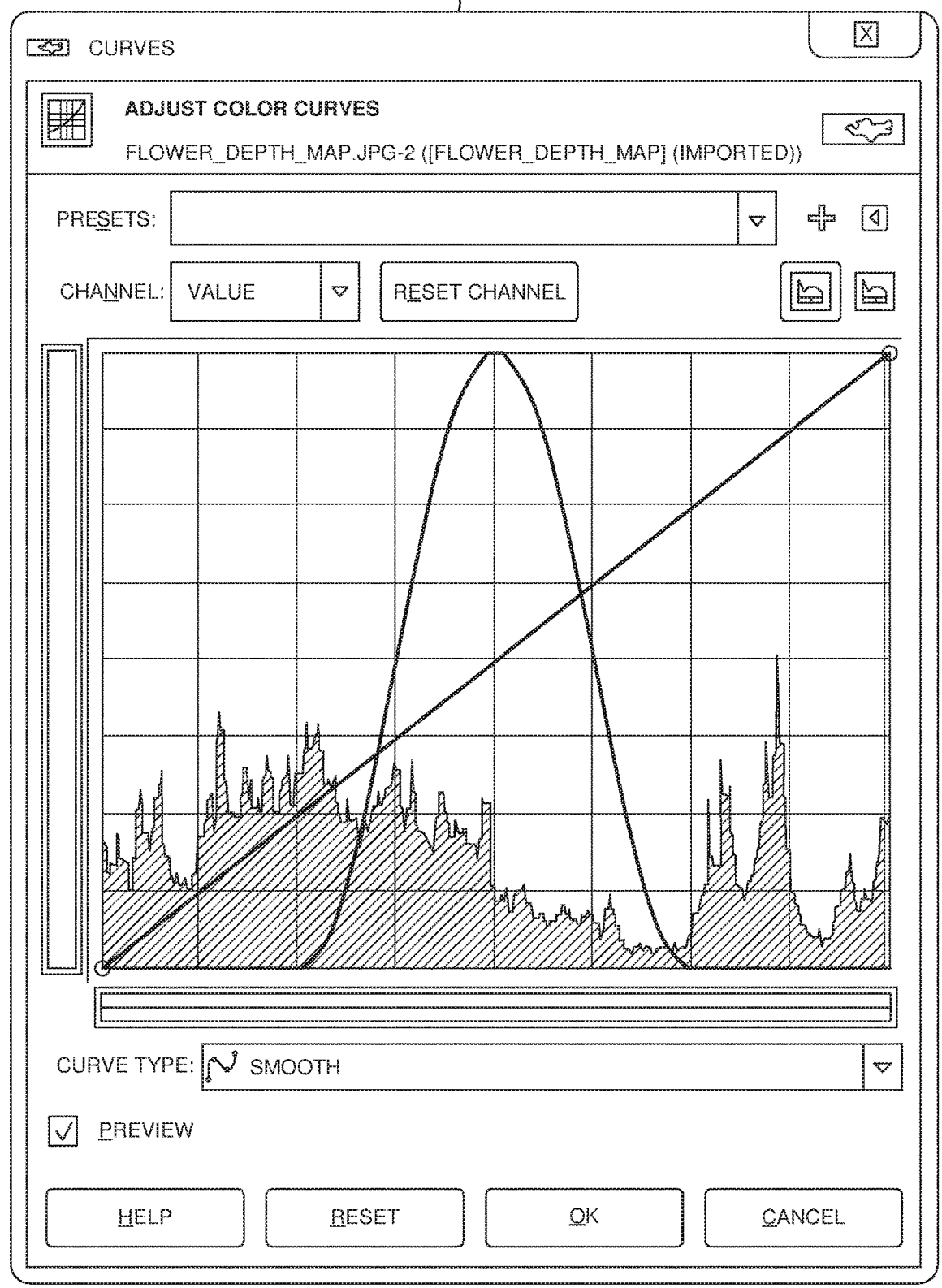

FIGS. 38A-38C are a set of computer windows illustrating an example set of interfaces for an image manipulation program showing a depth map image, a depth weighting graph, and a generated focal plane image, respectively according to some embodiments. FIGS. 38A-38C show an example of a depth map 3800 (FIG. 38A) being remapped by a sinusoidal weight function 3830 (FIG. 38B) to create a weight map for one focal plane 3860 (FIG. 38C). Other weight maps (5 in total in the example) may be formed in a similar way.

Figure 39C:
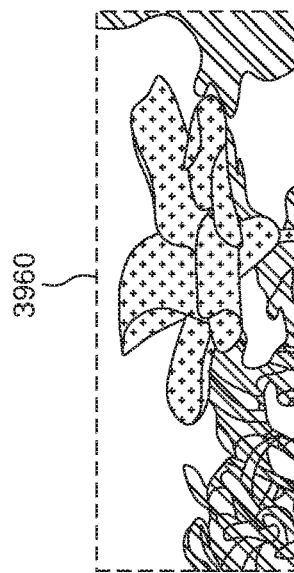
FIGS. 39A-39C are illustrations showing an example set of generated focal plane images in a simulation environment.
Figure 39B:
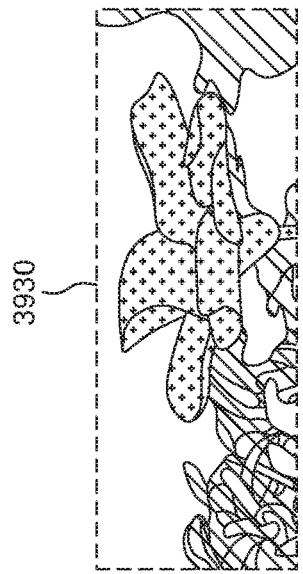
Figure 39A:
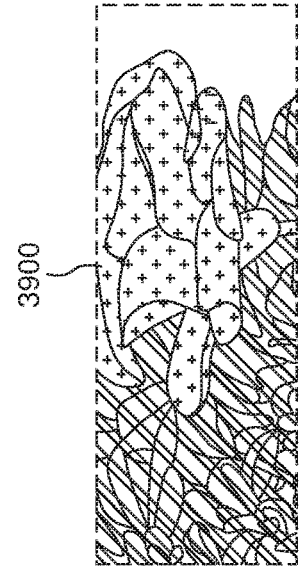

FIGS. 39A-39C are illustrations showing an example set of generated focal plane images in a simulation environment. FIGS. 39A-39C show a test image 3900 (FIG. 39A) multiplied by a weight map 3930 (middle graph of FIG. 38) to form the corresponding focal plane 3960 (FIG. 39C). Other focal planes (5 in total in the example) are generated in the same way.

About Computational Complexity in Virtual Viewpoint Generation 3D warping for viewpoint changes may be made by computer graphics algorithms. The complexity, speed, and outcome of these algorithms differ depending for example on the used perspective and camera models. An example of a mathematical formulation for a shift sensor setup is found in Fehn. Computational complexity for 3D warping may be high, such as with high quality near-eye displays with large FoV (field of view or field of vision) and bigger resolutions than in many external displays. In addition, if using 3D warping to form viewpoints to an MFP display, focal planes are formed after 3D warping, which may further increase complexity for many previous systems.

Forming a stack of MFPs, on the other hand, is a procedure using pixel-based operations for weighting each pixel value by its distances to each focal plane (e.g., obtained from the depth map). After the decomposition has been made, any changes in viewpoint or stereo baseline orientation is just lateral (e.g., bulk) shifts of the once derived focal planes with respect to each other, and their per pixel additions to form the projections to new viewpoints. For some embodiments, there are no sub-pixel shifts and operations either, as shifting of the focal planes may be made in multiples of pixel displacements, without resolution changes by interpolation or alike.

Instead, with traditional 3D warping procedures, changing the viewpoint requires typically multiple 3D geometry based arithmetic operations (e.g., matrix calculations) in sub-pixel accuracy. Further, inpainting and hole-filling operations for removing disocclusions may use operations with several pixels wide kernels or windows, instead of simple pixel-based operations.

Figure 40:
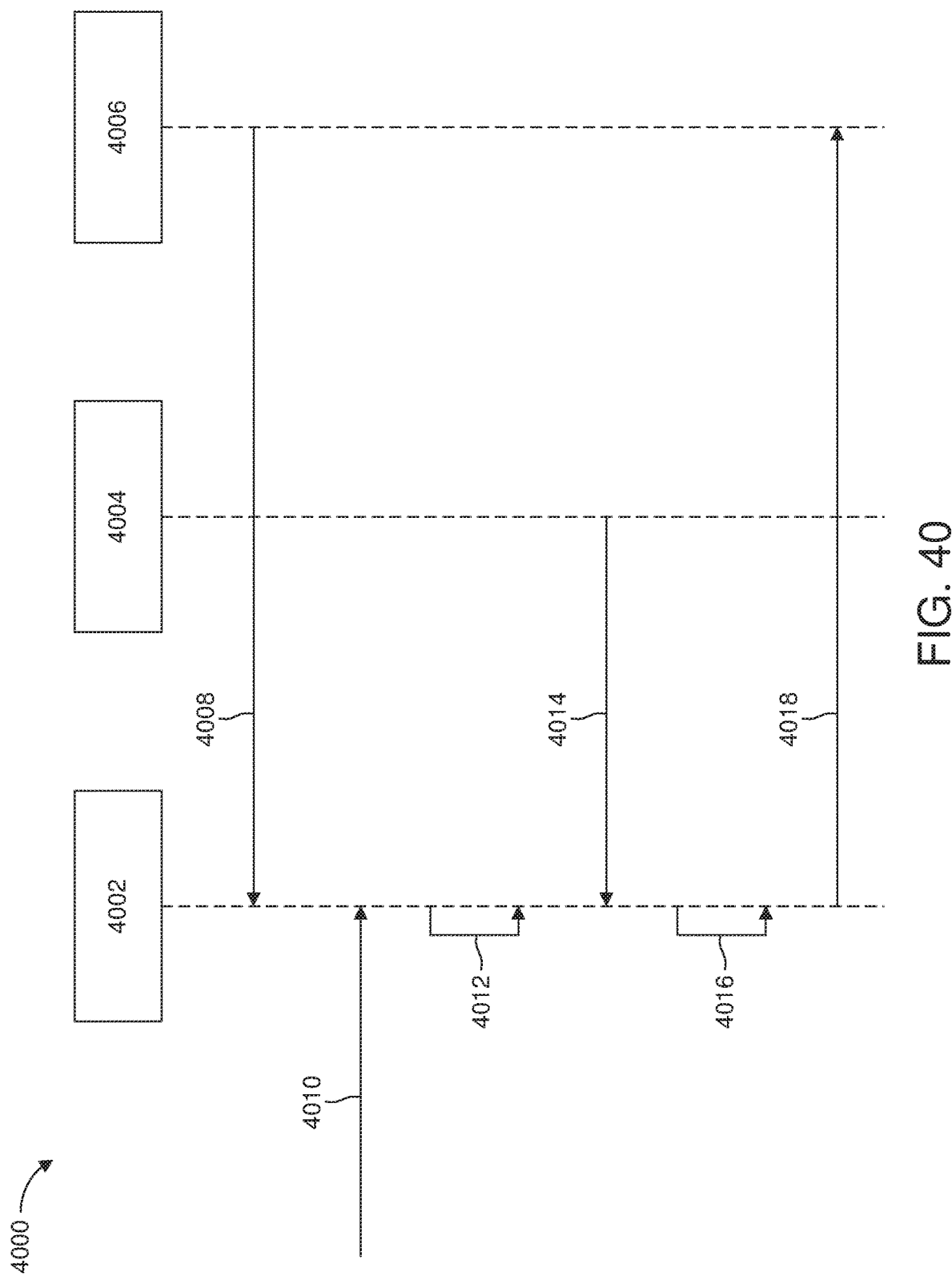
FIG. 40 is a message sequencing diagram illustrating an example process for generating multifocal plane (MFP) display images according to some embodiments.

FIG. 40 is a message sequencing diagram illustrating an example process for generating multifocal plane (MFP) display images according to some embodiments. FIG. 40 is a message sequencing diagram 4000 for some embodiments of generating a stereoscopic MFP stack (e.g., two monocular stacks of MFPs for the left and right eye, correspondingly) by shifting and projecting focal plane images. An MFP display 4006 sends 4008 MFP plane positions to a renderer control module 4002. Texture images and a depth map are received 4010 by a renderer control module 4002. The renderer control module 4002 generates 4012 images for each MFP plane. A tracking module 4004 (or sensor(s)) sends 4014 viewer position/orientation to a renderer control module 4002. MFP images are shifted and projected 4016 by a renderer control module 4002. A stereoscopic MFP stack (left/right pair) is sent 4018 from a renderer control module 4002 to an MFP display 4006 and displayed to a user by the MFP display.

Figure 41:
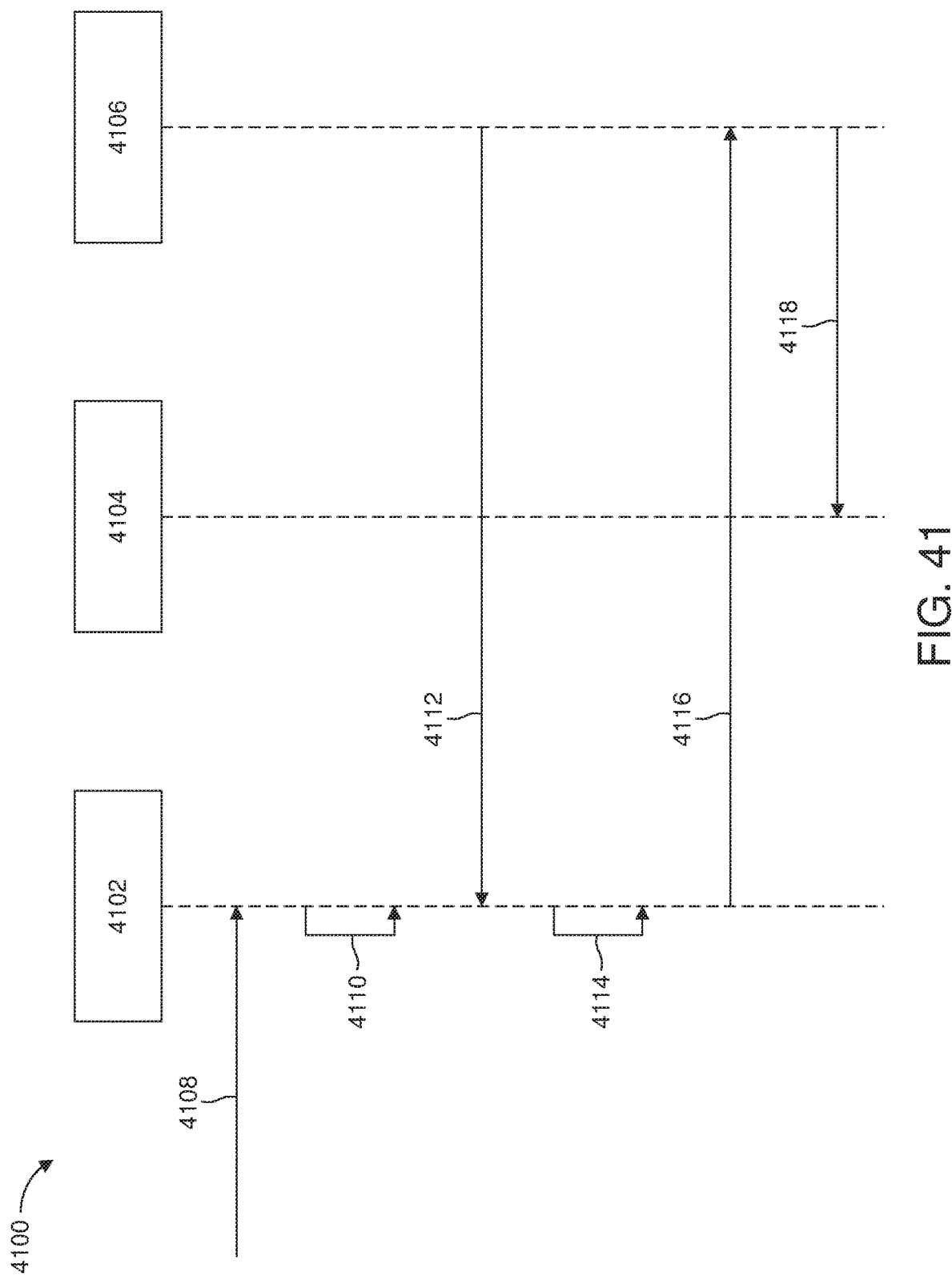
FIG. 41 is a message sequencing diagram illustrating an example process for generating stereo 3D display images according to some embodiments.

FIG. 41 is a message sequencing diagram illustrating an example process for generating stereo 3D display images according to some embodiments. FIG. 41 is a message sequencing diagram 4100 for some embodiments of generating disparity views of focal plane images for a stereo 3D display (e.g., external flat screen). Texture images and a depth map are received 4108 by a renderer control module 4102. A renderer control module 4102 generates 4110 images for each MFP plane. For some embodiments, a renderer control 4102 may be used to compute 4114 a disparity view. Glasses/HMD sensors 4104 send 4112 viewer position/orientation to a renderer control module 4102. Disparity views are computed by a renderer control module 4102. A stereo image left/right pair is sent 4116 from a render control module 4102 to a stereo 3D display 4106. The stereo 3D display 4106 sends 4118 an active glasses signal from a stereo display 4106 to the glasses/HMD 4104, and the images are displayed to a user.

For some embodiments, a method may comprise receiving three-dimensional video content; computing one or more multifocal plane (MFP) images for a number and position of multifocal planes using the three-dimensional video content; receiving a viewer orientation signal; computing one or more disparity images for a common view of a stereoscopic display using the one or more MFP images and the viewer orientation signal; and rendering the one or more disparity images to the stereoscopic display, wherein the common view of the stereoscopic display is rendered to each eye view of the stereoscopic display. For some embodiments, the common view may be left and right eye viewpoints to an average eye viewpoint of a monoscopic MFP stack. For MFP NEDs, the optical arrangement may use periscopic-type eyepieces that enable the monoscopic MFP stack to be viewed in-between the eyes with uncrossed eyes.

For some embodiments, a method of computing one or more disparity images for a common view may compute an average eye-point that is an average of each eye view (or an average of a left/right pair of images) of the stereoscopic display.

Systems and methods disclosed herein in accordance with some embodiments form MFPs and use them to produce chosen (varying) stereoscopic disparity in desired orientation (head tilt). MFPs may be shifted in directions to comply a baseline orientation. The resulting stereoscopic image may be displayed on wearable displays as well as, e.g., external screens. Some embodiments may be used to produce stereoscopic content for services using stereoscopic displays. Some embodiments enable development of stereoscopic displays, enabling easy and cost-effective ways of producing head-tilt independent (free baseline) stereoscopic rendering, with undistorted parallax, as well as with a sensor-supported motion parallax effect. Such systems may support stereopsis and motion parallax for users moving their head and bodies.

Some embodiments produce stereoscopic images, which may cause VAC if viewed on previous stereoscopic displays. VAC may be reduced by showing the contents with accommodation-invariant-type of stereoscopic glasses. In alternate embodiments, disparity-based interaction functionalities with MFP displays are supported.

For some embodiments, a method may comprise computing image data for one or more focal planes of an MFP display using three-dimensional video content and a viewer orientation signal; and rendering one or more MFP images to the MFP display using the computed image data.

For some embodiments, a device may comprise a processor; and a non-transitory computer-readable medium storing instructions that are operative, when executed on the processor, to perform the processes of computing image data for one or more focal planes of an MFP display using three-dimensional video content and a viewer orientation signal; and rendering one or more MFP images to the MFP display using the computed image data.

Virtual Viewpoint Generation from Depth Plus Texture

Systems and methods disclosed herein in accordance with some embodiments relate to forming stereoscopic image pairs (stereograms) in stereoscopic 3D (S3D) display systems. One method for forming stereograms is depth image-based rendering (DIBR). Systems and methods disclosed herein in accordance with some embodiments generate synthetic stereoscopic views from multiple focal planes (MFP). One example method in accordance with some embodiments uses virtual viewpoint generation by 3D warping used in DIBR systems. For both DIBR and MFP stereo methods, depth plus texture input format may be used in capturing views. Some embodiments use post-process of multiple focal planes (MFPs) for virtual viewpoint generation and for MFP rendering.

Depth blending used for improving depth perception in MFP based methods is described in Akeley and Hu & Hua, and a depth blending method based on redistribution of focal (representation) plane information in the frequency domain is described in Narain. Natural blur and occlusions are important factors for the quality in stereoscopic and 3D image rendering. For information on their perception by human visual system (HVS), see, for example, Zannoli, et al., *Blur and the Perception of Depth at Occlusion*, 16(6):17 Journal of Vision 1-25 (2016).

Many stereoscopic 3D systems use depth image-based rendering (DIBR). A schematic picture of a DIBR based 3D transmission system is shown in FIG. 8, which is adapted from Zhu. In many DIBR systems, at the receiving side, virtual viewpoint generation consists of 3D warping and hole filling stages (cf. virtual viewpoint generation block in FIG. 8). 3D warping may be used to form two virtual views to the 3D view (textured depth map), as seen from the two eye-points of a viewer. 3D warping is made by computer graphics algorithms.

Stereoscopic 3D Synthesized from a Stack of MFPs

Multifocal plane (MFP) rendering is used to support natural eye accommodation in near-eye displays. As described above, stereoscopic views may be synthesized from multiple focal planes (cf. 3D warping in DIBR). MFP displays create a stack of discrete focal planes, composing a 3D scene from layers along a viewers visual axis. A view to the 3D scene is formed by projecting all those volume pixels (e.g., more precisely: voxels), which are visible to the user at different depths and spatial angles. Multifocal planes may be rendered, e.g., either by spatially multiplexing a stack of 2D displays, or by sequentially switching—in a time-multiplexed way—the focal distance of a single 2D display by a high-speed varifocal element (VFE), while rendering the visible parts of corresponding multifocal planes.

FIG. 12 shows a schematic illustration for a multifocal near-eye display. MFP displays create an approximation for the light-field of the displayed scene. For many near-eye-displays, only one user viewpoint is supported. Correspondingly, the approximation is easier and may not use a complete light-field capture as input. If rendering a high number of MFPs at different distances (into 3D space), close to natural accommodation by the viewer is supported (VAC is avoided). Rendering quality may further be improved and/or the number of MFPs reduced by using the depth blending when forming the MFPs.

Depth blending means weighting of pixels according to their distance from typically two nearest focal planes. The distances may be obtained, e.g., from a depth map. Depth blending may improve depth perception between focal planes. Focal planes sum up to (or nearly to) the original captured scene to comply with partition of unity. There are many ways to decompose a scene into additive planes so that they fulfill this requirement. Correspondingly, systems and methods disclosed herein are presented as illustrative examples in accordance with some embodiments.

Many MFP rendering systems form and show a different MFP stack for each eye, supporting stereoscopic perception. Suyama describes a depth-fused 3D (DFD) phenomenon between two specially formed focal planes. Akeley expanded the phenomenon (described as depth blending) to setups with multiple (more than two) focal planes. However, Akeley is understood to describe viewing a separate MFP stack by each eye, formed from stereoscopic captures for depth and texture (not by shifting MFPs for synthesizing disparity.

For some example systems and methods disclosed herein in accordance with some embodiments, both eyes are viewing the same monocular stack of focal planes from slightly different viewpoints, creating a somewhat synthesized disparity for 3D perception. Thus, for some embodiments, instead of two sets of MFPs captured and formed separately for each eye, only one stack of MFPs is formed and aligned towards the point between the eyes, as shown in FIG. 18. FIG. 18 shows a stack of MFPs formed from the average eye-point, and the same focal planes are seen from slightly different viewpoints by the left and right eyes. For some embodiments, the one stack of MFPs formed and aligned towards the point between the eyes is rendered to each eye view of a stereoscopic MFP display by forming two versions of the one monoscopic MFP stack from slightly different viewpoints, as shown in FIG. 18. In some embodiments, projections of the two versions of the MFP stack are summed up, and displayed to each eye using a conventional stereoscopic display (S3D).

3D perception from the focal planes is correct for flat objects residing exactly on those planes. Using depth blending, however, the perception is close to correct also between the planes. As MFP stacks may be formed for each eye separately, depth blending has been developed by studying accommodation to stereoscopic (two sets of) MFPs. However, depth blending may provide more continuous depth perception through (synthesized) stereoscopic disparity (if viewing one monocular depth blended MFP stack with two eyes (cf. FIG. 18)). This phenomenon may be seen by comparing the crossed-eye stereograms with and without depth blending corresponding to FIGS. 29A, 29B, 46A, and 46B.

Synthesizing stereoscopic images from MFPs is described below. In addition to forming a stack of MFPs, a stereoscopic image pair (stereogram) is formed from the focal planes. For example, a monocular stack of MFPs (cf. FIG. 27A) is formed and placed at set (or desired or regular) distances from the viewers (average) eye-point and viewed by two eyes (cf. FIG. 27B).

FIG. 27A shows a monocular MFP stack formed by depth blending. FIG. 27B shows viewing the stack with two eyes. FIG. 27C shows the focal planes for the left eye, for which the focal planes appear to have shifted to the right. FIG. 27D shows focal planes for the right eye, for which the focal planes appear to have shifted to the left. The left and right eye see the stack from slightly different viewpoints. Correspondingly, synthesizing two (stereoscopic) MFP stacks from a monocular MFP stack for stereoscopic (or stereoscopic MFP) viewing may be done by shifting MFPs in certain directions by certain amounts. Shifting of MFPs is actually an approximation of more complex transformations for virtual viewpoint changes (cf. 3D warping in conventional DIBR systems). The sideway position of each focal plane perceived by the eyes depends linearly on the distance of the focal plane (cf. FIG. 27B). When using fixed focal plane intervals as in FIG. 27B, if the furthest plane is seen in the same position from both eyes (e.g., placed far from the eyes), the middle plane appears to be shifted 'one unit' sideways, and the closest plane 'two units' sideways. If the separation of the focal planes is regular in dioptric scale, their actual metric distances are used to derive the varying amounts of shifts sideways.

If forming a stereoscopic image pair corresponding to the eye positions, the sideways shifted focal planes are collapsed by projecting them to each eye-point. Projecting for a stereoscopic image pair means in practice that corresponding pixels on the focal planes are summed up along the depth axis. This results in a stereoscopic image pair of two images with different stereo disparity/parallax. Some embodiments may start with a monoscopic MFP stack (such as, e.g., FIGS. 28B to 28D) and may use a synthetic disparity to generate a stereoscopic MFP stack.

FIGS. 29A and 29B give an example of a stereoscopic image pair formed by the described procedure. In forming the three focal planes used in the example of FIGS. 29A and 29B, depth blending with linear (tent) filter was used. FIGS.

29A and 29B show examples of a crossed-eye stereogram formed by shifting and summing up three linearly blended MFPs. Total disparity corresponds to 2.76% of the image width (cf. MFPs shifted up to 6 pixels with the particular test image). If the separation of the focal planes is regular in dioptric scale, their actual metric distances are used to derive the varying amount of sideways shift.

Depth Blending Improves Depth Perception in MFP Rendering

In some embodiments, 3D video content may be filtered into high and low frequency content. The high frequency content may be decomposed into one or more high frequency focal planes. The low frequency content may be redistributed to one or more high frequency focal planes to generate one or more redistributed focal planes. The one or more redistributed focal planes may be used to render one or more multifocal plane images.

According to J. P. Rolland, et al., *Multifocal Planes Head-Mounted Displays*, 39 Appl. Opt. 3209-3215 (2000) ("Rolland"), for any human, a maximum 28 focal panes are enough to cover the depth range from infinity to 4 diopters (25 cm), corresponding to $\frac{1}{7}$ diopter spacing for focal planes. For persons with average vision, Rolland states 14 focal planes cover the range. Hence, a high number of focal planes may be used for high quality depth perception.

Rendering a large number of focal planes is limited by various technical reasons. The number may be reduced by using depth blending. If using only a few focal planes, optimal placement may be beneficial for human eye properties. Due to accuracy of depth perception decreasing inversely proportional to distance from the viewer, more accuracy may be obtained by placing the depth planes as a function of dioptric depth.

Mapping between linear and dioptric scales may be determined. Many examples are obtained by using regular spacing between focal planes on a linear scale. Depth-based blending may be used to reduce quantization errors in the depth dimension, which otherwise may be visible to the human eye. Depth blending means using a depth-based function to weight pixels used to construct each focal plane.

Figure 42A:
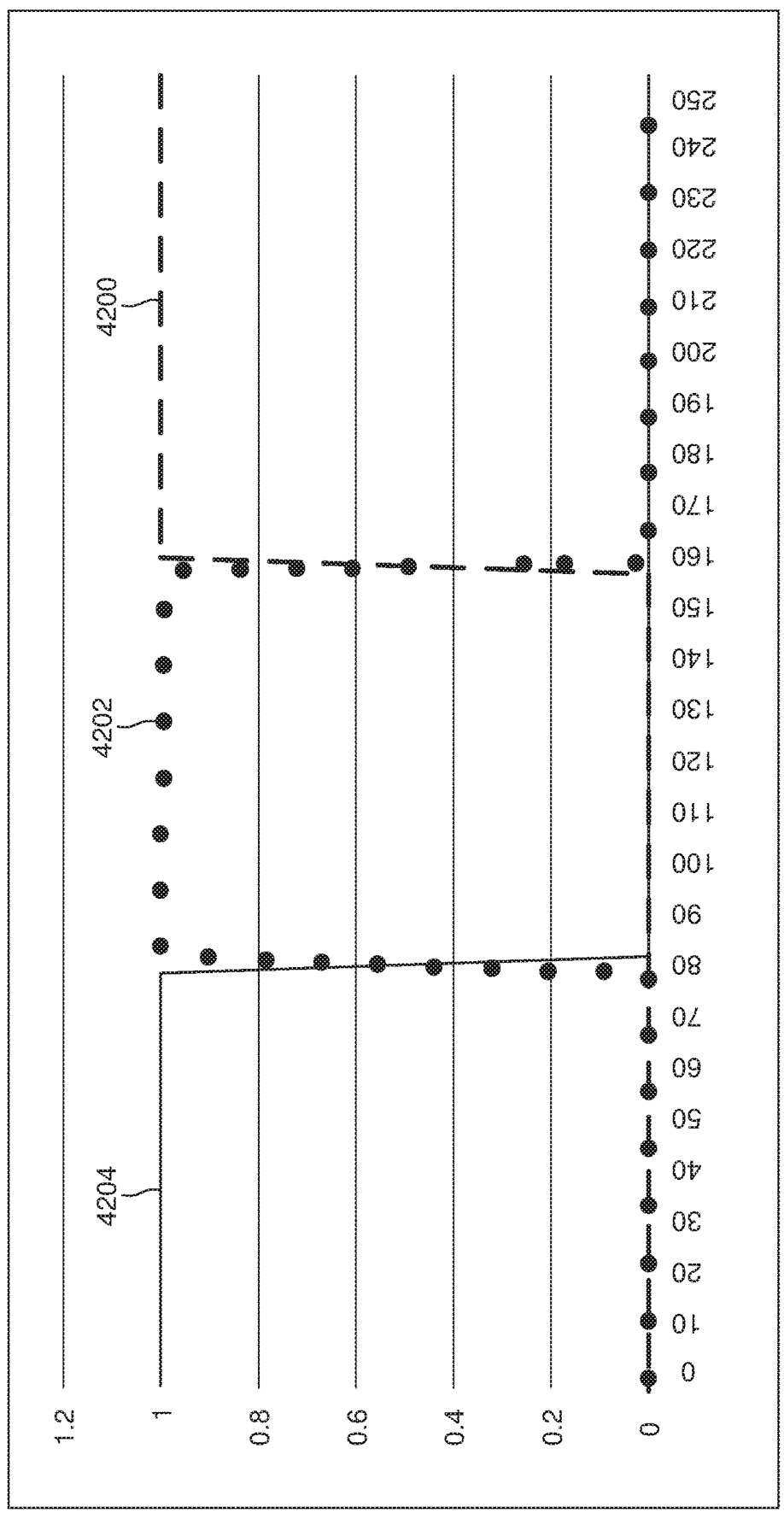
FIG. 42A is a graph illustrating example blending functions of weight versus depth according to some embodiments.
Figure 42B:
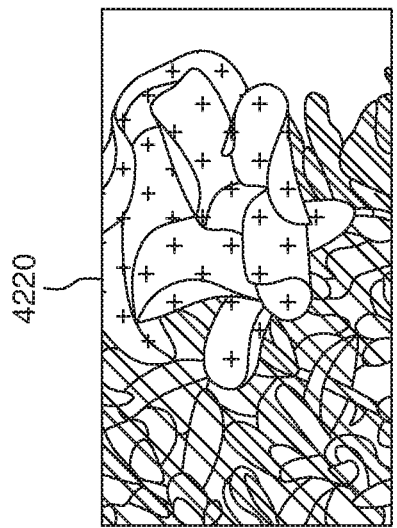
FIG. 42B is an illustration showing an example test image.
Figure 42C:
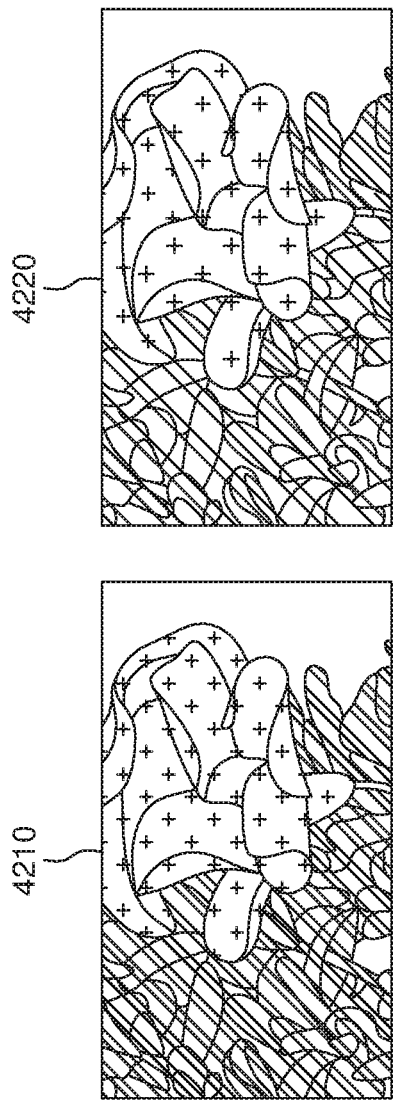
FIG. 42C is an example depth map illustrating pixel distances for FIG. 42B.
Figure 42F:
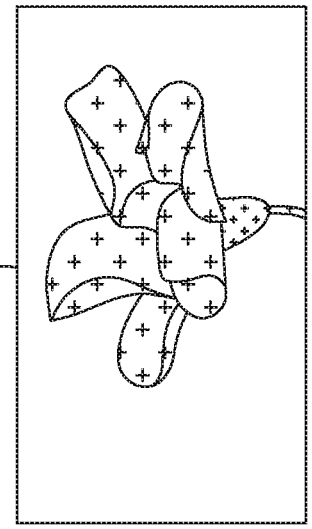
FIGS. 42D-42F are illustrations showing example focal plane images using the depth weights of FIG. 42A with the test image of FIG. 42B and its example depth map of FIG. 42C according to some embodiments.
Figure 42E:
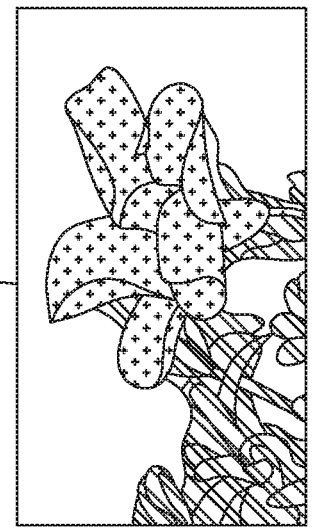
Figure 42D:
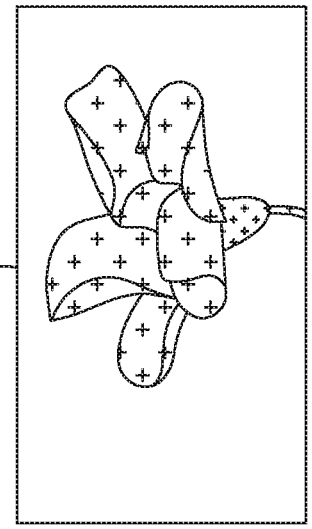
Figure 43A:
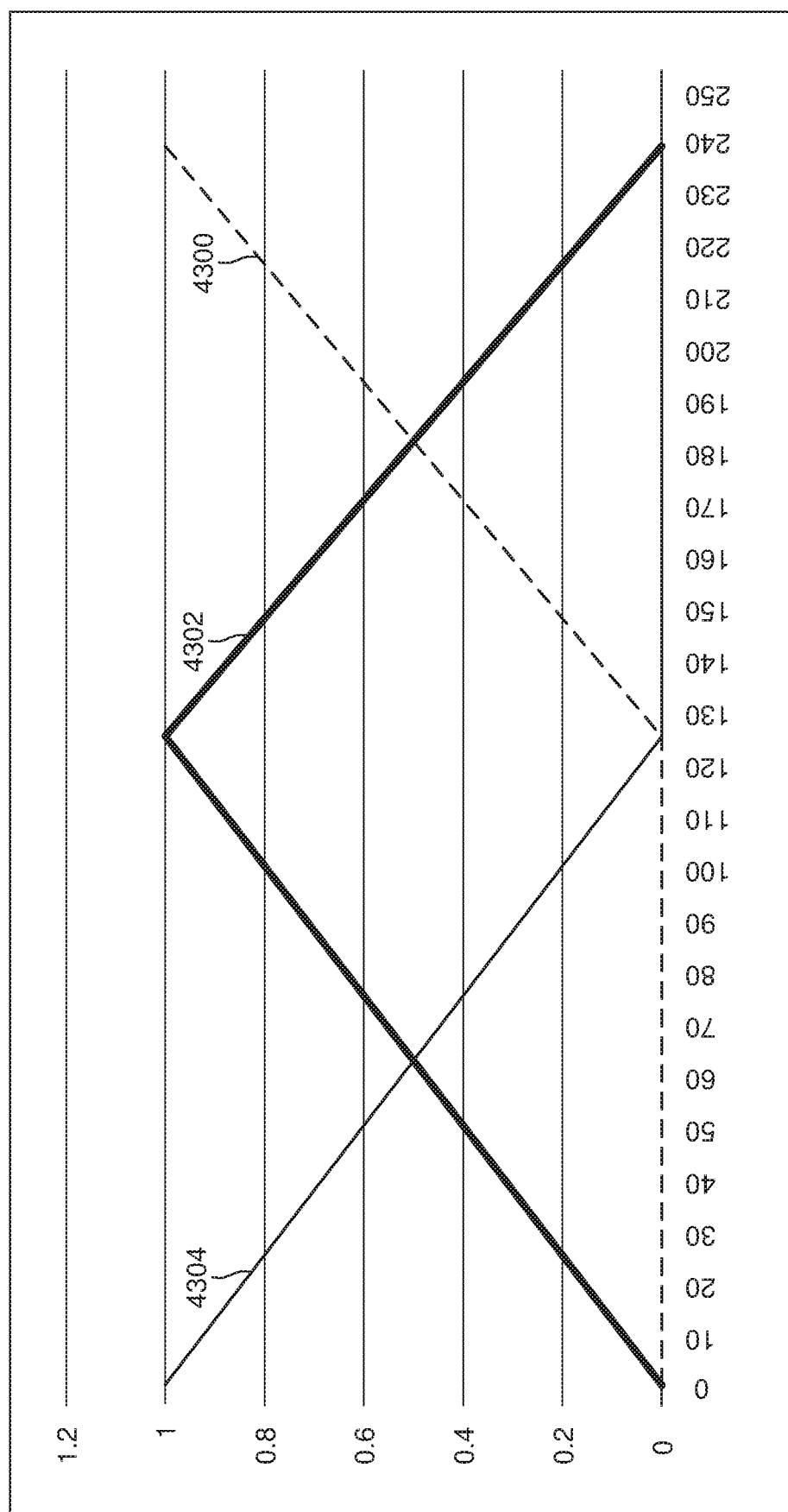
FIG. 43A is a graph illustrating example blending functions of weight versus depth according to some embodiments.

FIG. 42A is a graph illustrating example blending functions 4200, 4202, 4204 of weight versus depth according to some embodiments. One depth blending function is a box filter (which slices without blending) which is shown in FIG. 42A. For comparison, a tent filter, which is a piecewise linear, saw-tooth shaped blending function is shown in FIG. 43A. For some embodiments, the range of depth values is between 0 and 255, which is used herein in some of the examples, such as FIGS. 42A and 42C. FIG. 42B is an illustration 4210 showing an example test image. FIG. 42C is an example depth map 4220 illustrating pixel distances for FIG. 42B. FIGS. 42D-42F are illustrations 4230, 4240, 4250 showing example focal plane images using the depth weights of FIG. 42A with the test image 4210 of FIG. 42B and its example depth map of FIG. 42C according to some embodiments. FIGS. 42B and 42C originated from an image found on the webpage File:2D plus depth.png, WIKIPEDIA, //commons.wikimedia.org/w/index.php?curid=5489771 (last accessed Feb. 22, 2019), and FIGS. 42D to 42F are modified versions of that image.

Figure 43C:
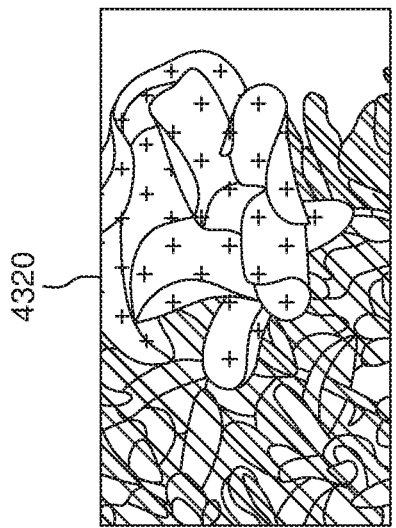
FIG. 43C is an example depth map illustrating pixel distances for FIG. 43B.
Figure 43B:
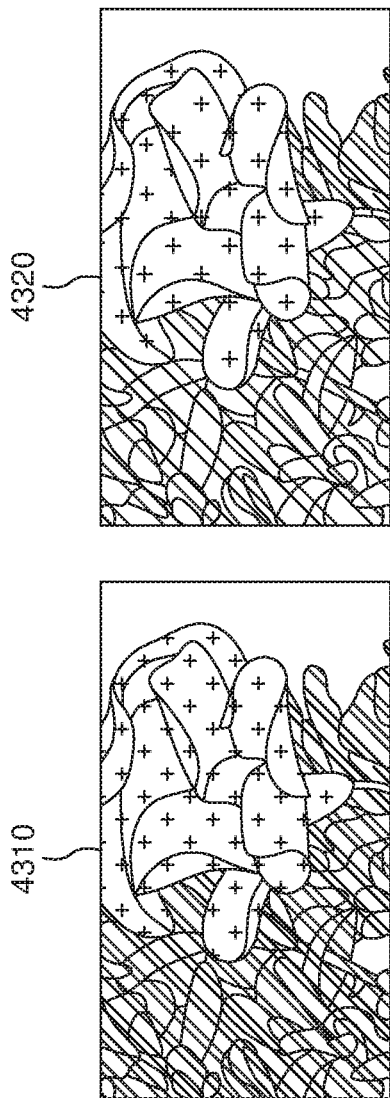
FIG. 43B is an illustration showing an example test image.
Figure 43F:
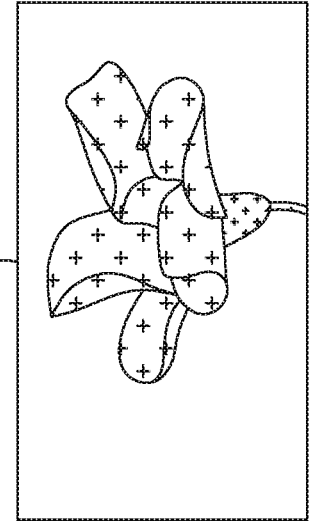
FIGS. 43D-43F are illustrations showing example focal plane images using the depth weights of FIG. 43A with the test image of FIG. 43B and its example depth map of FIG. 43C according to some embodiments.
Figure 43E:
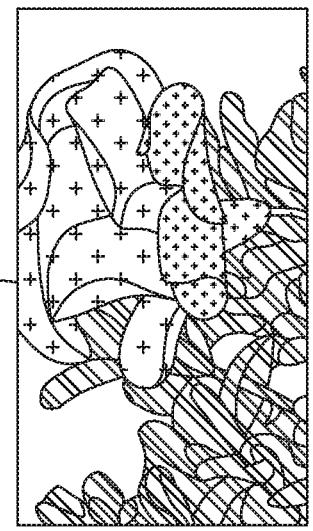
Figure 43D:
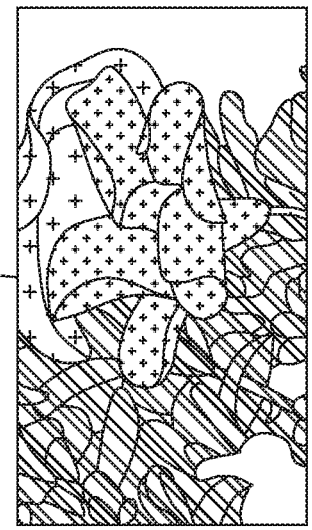

FIG. 43A is a graph illustrating example blending functions 4300, 4302, 4304 of weight versus depth according to some embodiments. FIG. 43B is an illustration 4310 showing an example test image. FIG. 43C is an example depth map 4320 illustrating pixel distances for FIG. 43B. FIGS. 43D-43F are illustrations 4330, 4340, 4350 showing example focal plane images using the depth weights of FIG. 43A with the test image 4310 of FIG. 43B and its example depth map of FIG. 43C according to some embodiments. FIGS. 43B and 43C originated from an image found on the webpage File:2D plus depth.png, WIKIPEDIA, //commons.wikimedia.org/w/index.php?curid=5489771 (last accessed Feb. 22, 2019), and FIGS. 43D to 43F are modified versions of that image.

For some embodiments, polynomial blending functions extend over the whole depth range. FIGS. 21A-21F show an example of forming focal planes using three polynomial blending functions (FIG. 21A). Corresponding focal planes are shown in FIGS. 21D-21F for a test image (FIG. 21B) and its depth map in FIG. 21C.

FIGS. 22A-22F show an example of forming focal planes using three sinusoidal blending weight functions (FIG. 22A). Corresponding focal planes are shown in FIGS. 22D-22F for a test image (FIG. 22B) and its depth map in FIG. 22C.

In addition to the above blending filters, other variations have been suggested by Hu & Hua. In Narain, a method is described for forming dioptrically-placed MFPs. Instead of successively capturing depth and texture from the scene, the method captures a series of focus stacks—successive sets of multiple images with varying focus distances.

Using focus stacks, MFPs may be optimized more accurately according to human visual system (HVS). In particular, according to Narain, this method applies to the effects of occlusions, reflections, and other non-Lambertian phenomena in the captured views. In addition to a camera with different focus distances, a set of input images may be derived from a light field captured from the scene. In Narain, the first generation Lytro Ilium camera was experimented for this purpose.

Figure 44:
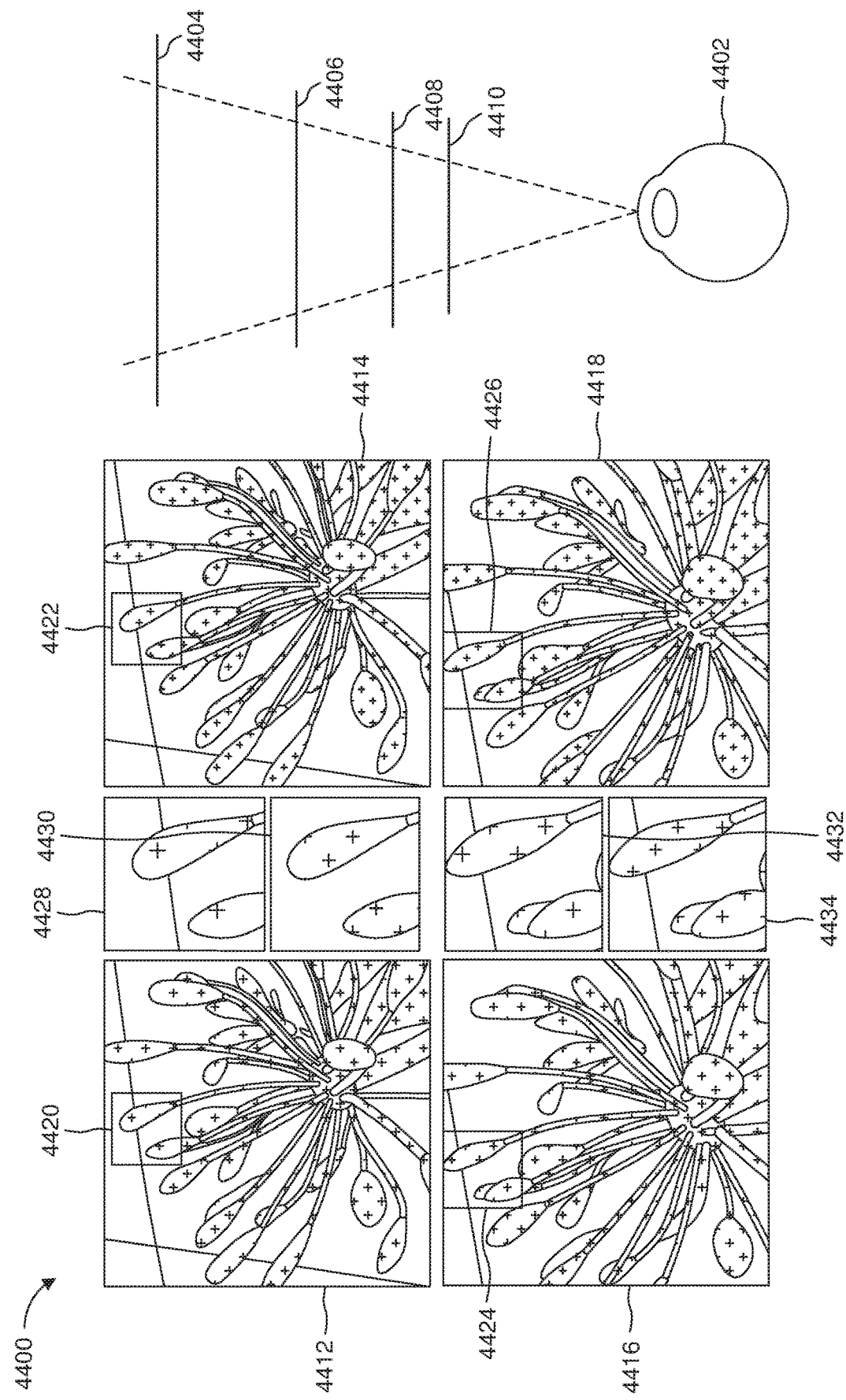
FIG. 44 is a schematic diagram illustrating example focus stack images captured at different depths from a user.
Figure 45A:
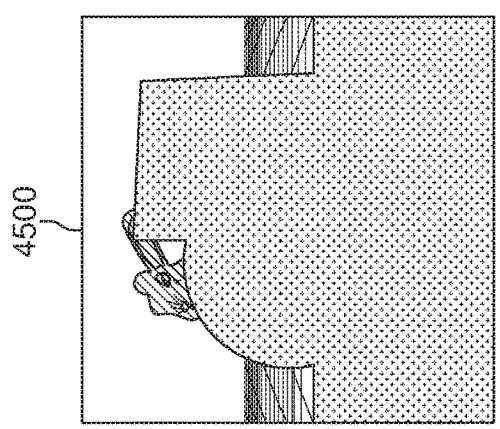
FIGS. 45A-45D are illustrations showing example linearly blended focal planes.
Figure 45B:
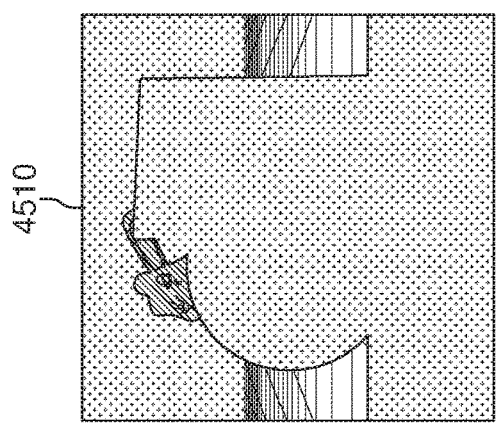
Figure 45C:
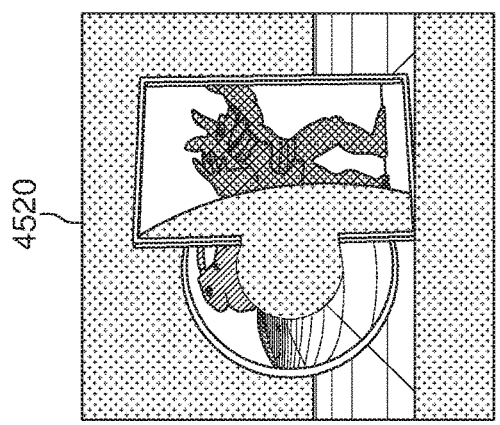
Figure 45D:
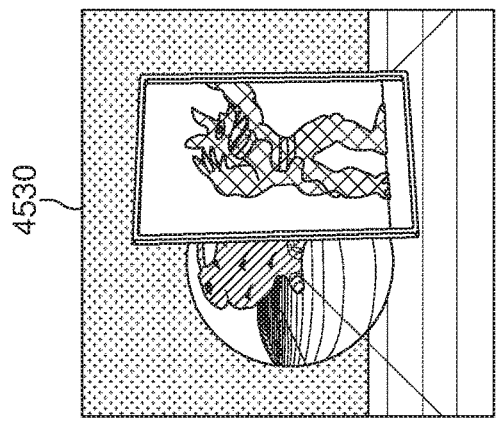
Figure 45E:
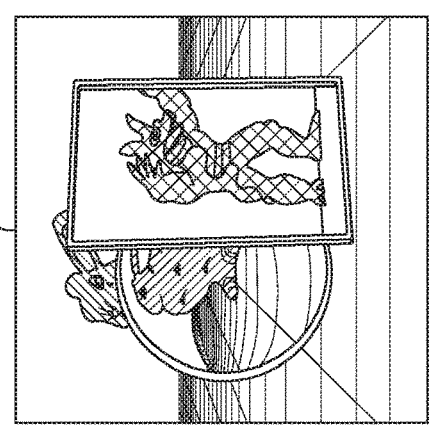
FIGS. 45E-45H are illustrations showing example redistributed focal planes.
Figure 45F:
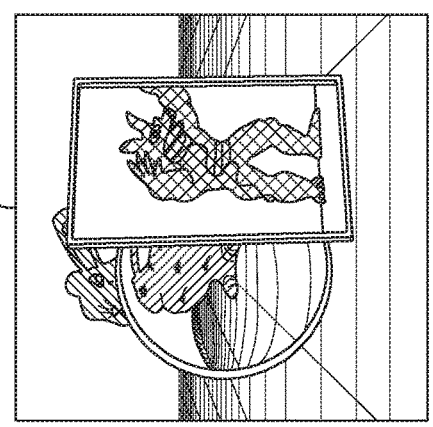
Figure 45G:
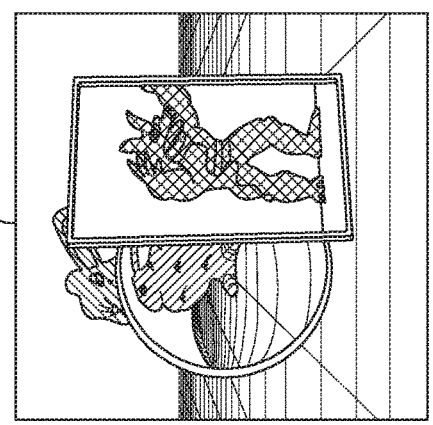
Figure 45H:
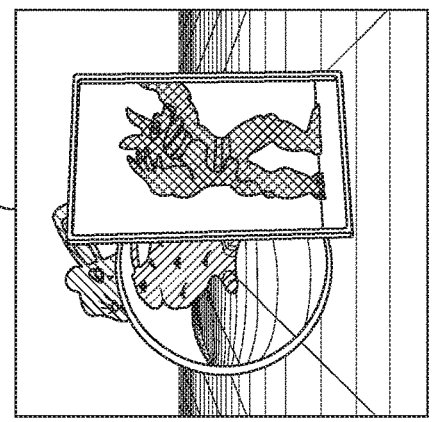

FIG. 44 is a schematic diagram illustrating example focus stack images captured at different depths from a user. FIG. 44 shows an example 4400 of a focal stack (four images 4412, 4414, 4416, 4418 with different focal distances), captured from a real-world view and processed to form focal (presentation) planes 4404, 4406, 4408, 4410 for a user's eye 4402 (adapted from Narain). The insets 4420, 4422, 4424, 4426, 4428, 4430, 4432, 4434 show details of the focal stack images 4400 with varying focal blur (adapted from Narain).

FIGS. 45A-45D are illustrations showing example linearly blended focal planes. FIGS. 45E-45H are illustrations showing example focal (presentation) planes processed from a focus stack. FIGS. 45A-45D show a comparison of MFPs formed by linear depth blending, and FIGS. 45E-45H show a comparison of MFPs formed by the optimized procedure in Narain. FIGS. 45A-45H compare focal planes 4500, 4510, 4520, 4530 formed with conventional linear blending (FIGS. 45A-45D) and focal (e.g., presentation) planes 4540, 4550, 4560, 4570 formed from a focus stack with optimized blending (FIGS. 45E-45H). Note that brightness of the images in FIGS. 45E-45H has been increased for better visibility when printed. FIGS. 45A to 45H are line drawing versions of images appearing in Narain.

The approach in Narain does not use depth plus texture format for scene capture. Instead, a system captures a set of images with different focus distances, processes them in the frequency domain, and allocates the information to different focal planes (or representation planes, as denoted in Narain) according to models for the human visual system (such as retinal blur).

As described in Narain, likely for better visibility when printed, luminance of the optimized focal planes (FIGS. 45E-45H) seem to have been scaled up by (about) a factor of two. Later in this disclosure, when using these focal planes as test images, reverse scaling by 0.5 is made for them to prevent saturation of the results (a violation of the partition of unity).

Notably, there are also some horizontal luminance artefact(s) in linearly blended focal planes shown in FIGS. 45A-45D). These artefacts may be noticed when summing the focal planes to reproduce the original test image (demonstrating partition of unity). Narain is not understood to give the depth map for the test image in their paper or its supplementary material, so we are not able to regenerate the MFPs. Despite the observed artefacts, these focal planes are used to visualize the effects of some embodiments in order to enable comparison of their performance with the approach in Narain.

According to Narain, high frequency (edge and texture generated) components benefit from being allocated to their closest focus distance. Low frequency components may be allocated also to more far away focal planes. Quoting Narain, "high-frequency image content must be assigned to its closest plane, while low frequencies are underconstrained and may be redistributed between planes. It is these underconstrained degrees of freedom that the algorithm exploits to satisfy the constraints on display intensities." High frequency components dominate in perceiving depth from focal properties. Low frequency components, for example slowly varying luminance or color, generate only a few cues for depth perception. In some embodiments, focal planes produced by known methods (e.g., FIGS. 45A-45D produced using linear depth blending) are processed by redistributing their low frequency content between original focal plane positions, and the redistributed focal planes are shown to have benefits over the original unprocessed focal planes, when using them to create stereoscopic or changing viewpoints (the latter for motion parallax).

The apparent distance detected by a depth sensor is not necessarily true for image content that is reflected or refracted (non-Lambertian). If capturing image information as a function of focus distance, as in Narain's system, focal properties and distances match also for such content, if the images are captured with small enough separation in depth dimension (small enough difference in focal distances).

For many 3D display systems, new viewpoints benefit from being derived to support stereoscopic or multi-view rendering. For example, if using a depth plus texture capture format, stereoscopic views may be derived by forming virtual viewpoints symmetrically around the capture point, so that both of the two views are synthesized.

Using depth plus texture as capture format has benefits in stereoscopic 3D. While the stereoscopic baseline is not fixed at the front end, the amount and direction of the disparity may be synthesized in the receiver, also for stored content.

Often, the corresponding perspective changes reveal parts of the view behind occluding objects, which is described in Zhu. As illustrated by the schematic picture in FIG. 9 and the example in FIGS. 10A and 10B, these disocclusions show up as gaps or holes in each new perspective image, as the captured texture or depth does not include information from those areas.

FIG. 9 shows that disocclusions may be produced when changing the viewpoint, as illustrated when changing a camera viewpoint from a source position/image to a target position/image.

The mechanism of producing disocclusions may be similar for DIBR and MFP-based virtual viewpoint generation. These disocclusions may be created in the viewpoint generation or if an MFP viewer deviates enough from a viewing point. Larger disparity or viewpoint change may be achieved by using means to reduce the visibility of disocclusions. For many previous systems, disocclusions still limit the maximum disparity.

FIGS. 10A and 10B give an example of a 3D warped image. The example shows the left eye image only. The right eye image is formed in the same way and has similar defects, but on the right side of objects. FIGS. 10A and 10B show an example of disocclusions produced by 3D warping. The original monoscopic image after 3D warping is on the left, and a detail of the 3D warped image is on the right (if using linear interpolation-based hole-filling).

In hole filling, various image and depth map filtering and inpainting algorithms are used to fill in the holes or other forms of disocclusions. The type and amount of occlusions depends much on the content, and so are the distortions and their visibility. Disocclusions may degrade the perceived stereoscopic quality around object edges. They may limit the amount of synthetic disparity and perception of depth. A procedure for virtual viewpoint generation based on shifting MFPs may produce disocclusions beside vertical edges, or more generally, perpendicular to a chosen stereo baseline.

Figure 46A:
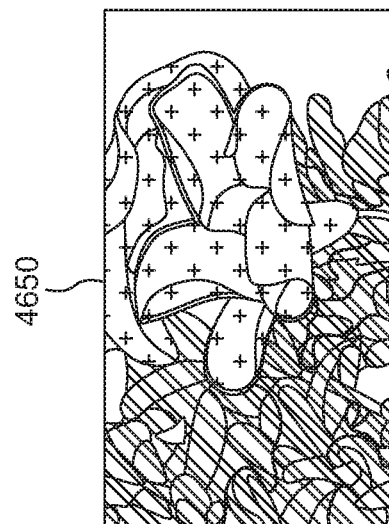
FIGS. 46A and 46B are illustrations showing example stereoscopic images for the right and left eye, correspondingly, formed using non-blended focal plane images according to some embodiments.
Figure 46B:
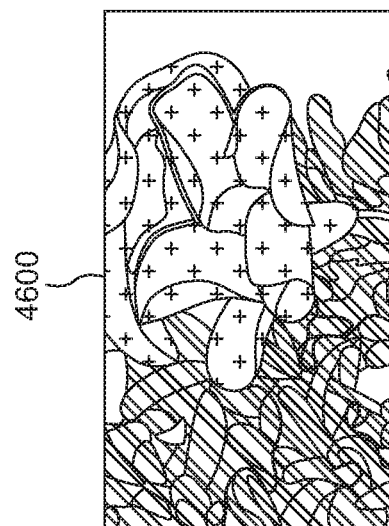

FIGS. 46A and 46B are illustrations showing example stereoscopic images for the right and left eye, correspondingly, formed using non-blended focal plane images according to some embodiments. For some embodiments, box filtering is used to form non-blended focal plane images (e.g., box filter using tooth-shaped depth weight functions, such as the depth weight function in FIG. 20A). FIGS. 46A and 46B give an example of disocclusions in a stereo image, formed by deriving two viewpoints 4600, 4650 to a stack of MFPs. For some embodiments, non-blended focal plane images may be generated by box-filtering the input image. In the example, the MFPs were not depth blended because a box filter was used to form them. FIGS. 46A and 46B show an example of disocclusions in a crossed-eye stereogram formed by shifting and summing up three non-blended (box filtered) MFPs. Total disparity corresponds to 2.76% of the image width (cf. MFPs shifted up to 6 pixels for both images). Disocclusions are less visible when depth blending is used. Depth blending creates also depth values between MFPs. Both of these improvements may be seen by comparing FIGS. 46A and 46B to FIGS. 29A and 29B, where depth blending was used.

In addition to reducing quantization effects in depth dimension, depth blending may reduce disocclusions if synthesizing viewpoints from MFPs. To reduce disocclusions, content from adjacent depth planes is used for depth blending. If there is not any content at depth(s) corresponding to a focal plane, shifting close (occluding) focal planes sideways reveals empty areas, which do not have any texture or color information (and appear as transparent). These empty areas may appear as black stripes beside object edges (due to transparency through all focal planes). If there is no content at adjacent focal planes, there will not be depth blending to reduce disocclusions. Hence, reduction of disocclusions by depth blending is dependent on the content.

For forming of synthetic stereo from MFPs, one challenge for previous depth blending methods is that they produce MFPs, which may have disocclusions, due to concentrating most of the low-frequency contents (image areas with slowly varying luminance and color) to one focal plane (of the many focal planes). Correspondingly, large areas in MFPs are left without any information.

Some embodiments post-process multiple focal planes (MFPs) so that they have better properties for virtual viewpoint generation or MFP rendering. Some embodiments are based on removing typical holes or un-textured (e.g., white background) areas of MFPs by redistributing their low frequency contents. In particular, redistribution reduces disocclusions when using MFPs for generating virtual (e.g., stereoscopic) viewpoints, even with large disparity.

Redistribution allocates low-frequency content more evenly on all focal planes, instead of concentrating the content inside MFPs. This method may produce more evenly distributed luminance and color values than other MFP systems. Low frequency content may be reallocated without degrading 3D perception. The procedure preserves partition of unity for the MFPs, meaning that they add up (e.g., close enough) to the original image.

Mono-scopic MFP stacks, viewed from two virtual viewpoints, are attractive in their ability to support disparity and motion parallax in any baseline orientation. The benefits are comparable to those of more conventional depth image-based rendering (DIBR) in stereoscopic 3D.

If the stereoscopic viewpoints, disparity, and baseline are chosen prior to capturing a scene, a receiving terminal may not enable changing these parameters after capturing a scene. A problem may occur if a viewer wants to set these parameters or if a system attempts to combine renderings of stereoscopic content produced with different parameters.

A DBIR system may be used instead of conventional stereoscopic video because stereoscopic image formation using DIBR may enable additional options in a post-processing stage at the receiver. The amount of stereoscopic disparity (using of the depth budget) may depend on the captured content, which may be, e.g., more beneficial to control afterwards than during shooting the scenes. Similarly, using depth plus texture format for producing multiple focal planes may be easier to control afterwards than while shooting. Post-processing in the receiving terminal of a monocular stack of MFPs enables a stereoscopic MFP rendering in a baseline orientation with variable disparity.

Many 3D display systems or near-eye displays with accommodation support do not support or tolerate even minor changes in viewpoint. Some embodiments for producing (redistributed) MFPs support relatively large viewpoint changes, disparity, and motion parallax, and improve visual quality for example in 3DoF+ applications. Relatively large disocclusions may be reduced by distributing MFP luminance and color values more evenly than in previous MFP systems. This even distribution is based on allocating low-frequency content on several or all focal planes, instead of concentrating low-frequency content to one of the MFPs.

Some embodiments perform post-processes to improve the properties of MFPs formed using some existing method. These methods may use depth and texture inputs and a stack of focal planes as inputs and may work with multiple capture and transmission formats.

In previous MFP displays, stereoscopic disparity-related disocclusions may not be a problem due to rendering a separate MFP stack for each eye, obtained using stereoscopic capture for texture and depth. However, due to using focal planes with high luminance and contrast differences, even small viewpoint changes caused by eye-rotations may show up as small but visible disocclusions. These artifacts may be removed under certain scenarios. Systems and methods disclosed herein in accordance with some embodiments enable generation of virtual viewpoints with large disparities.

Redistributing MFPs for Supporting Viewpoint Change

Described below are example procedures for producing optimized MFPs for viewpoint generation with variations in viewpoint. Some embodiments for producing redistributed MFPs include receiving an MFP input, which may be generated by a depth blending method. Low-frequency image areas are detected, which may occur by low-pass filtering an input image and by low-pass filtering each MFP. Low-pass components of each MFP may be replaced by an equal share of the low-pass image filter output, which may occur by removing the corresponding low-pass component from each MFP and by adding a fraction of the low-pass filtered input image, where the fraction is inverse of the number of MFPs used. MFPs may be redistributed to produce MFPs for synthesizing stereoscopic views with a reduced amount of disocclusions and/or to render MFPs with a depth dimension to support natural accommodation (to remove VAC). High-frequency image content may not be derived as such but may be a complement for the low-frequency component.

Figure 47:
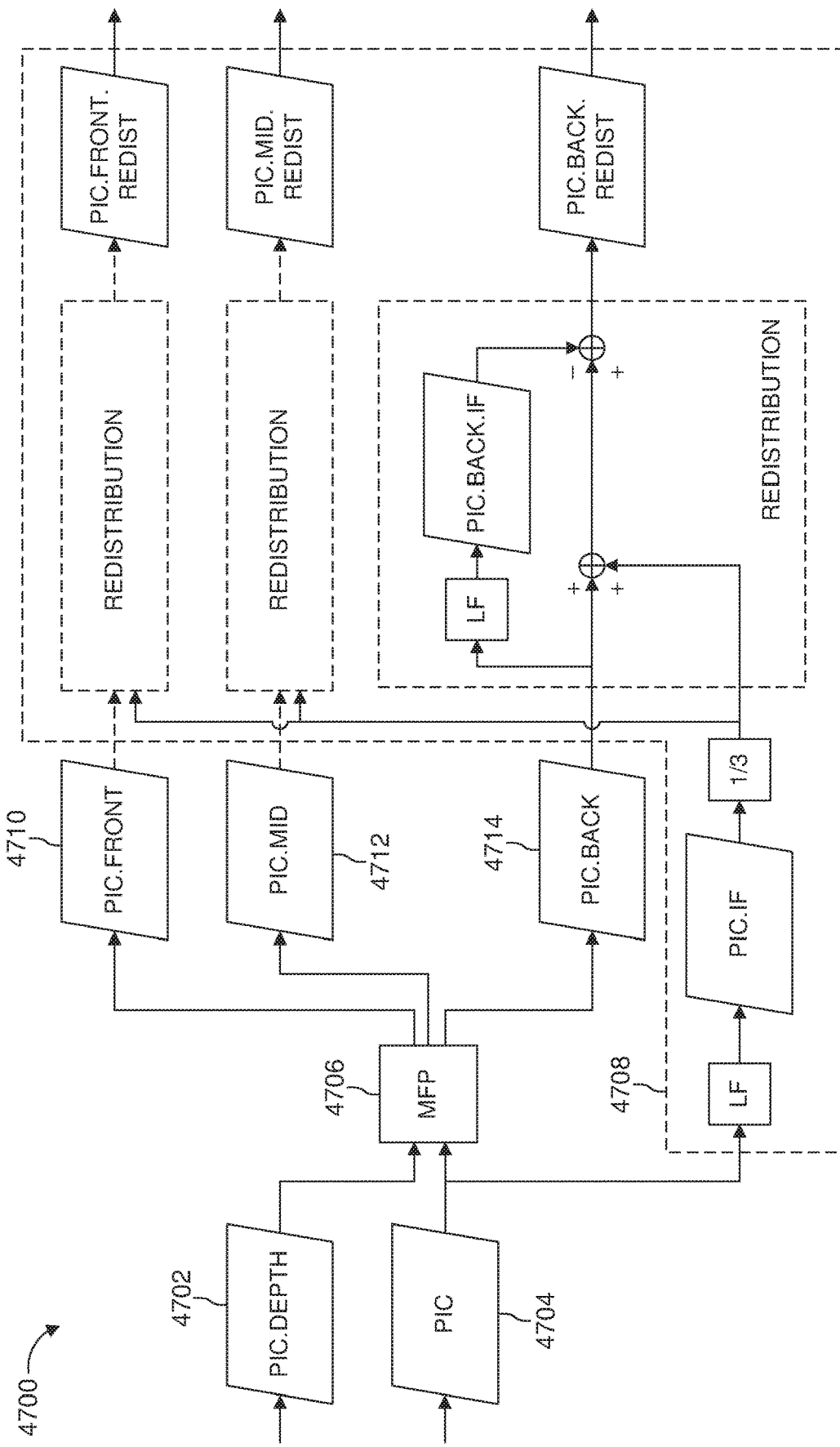
FIG. 47 is a flowchart illustrating an example process for generating redistributed focal plane images of front, mid, and back depth ranges according to some embodiments.

FIG. 47 is a flowchart illustrating an example process for generating redistributed focal plane images of front, mid, and back depth ranges according to some embodiments. FIG. 47 is a block diagram 4700 of a redistribution process for three MFPs. For some embodiments, redistribution 4708 is a post process for conventionally formed MFPs. For some embodiments, a set of (e.g., conventional) focal planes (MFPs) are used as input. The received image (picture) 4704 may be summed up from those focal planes using a picture depth data 4702 or may be received by the MFP block 4706. The MFP block 4706 may output front-, mid-, and back-depth 4710, 4712, 4714 planes. Low-pass components of each focal plane (one of N) are replaced by the low-pass component of the input image by a scaling factor 1/N, where the N is the number of focal planes. For example, N is 3. The process may preserve the partition of unity property of MFPs.

Figure 48C:
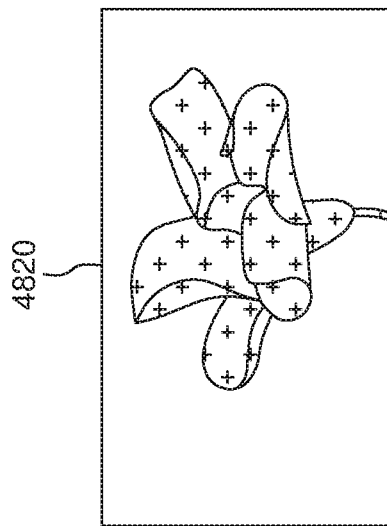
FIGS. 48A-48C are illustrations showing example focal plane images without redistribution according to some embodiments.
Figure 48F:
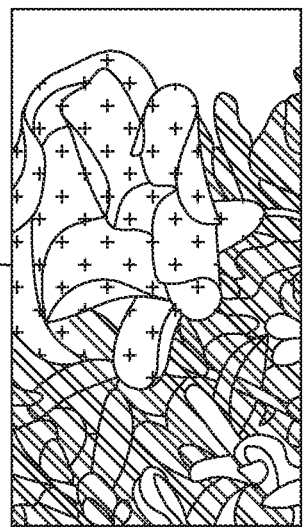
FIGS. 48D-48F are illustrations showing example focal plane images with redistribution according to some embodiments.
Figure 48B:
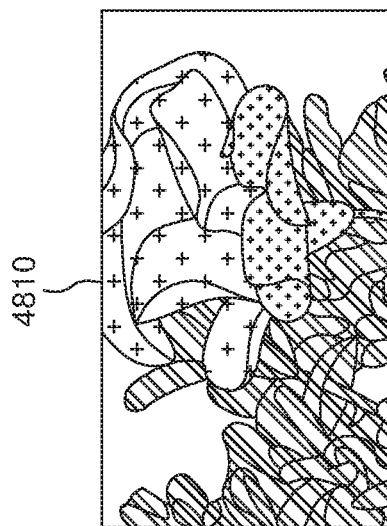
Figure 48E:
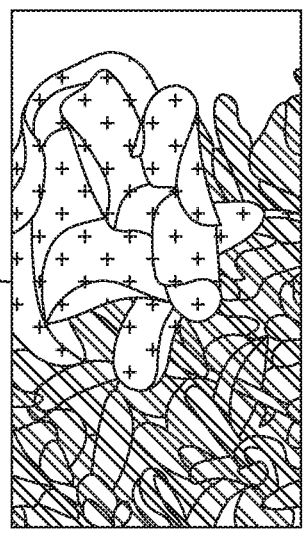
Figure 48A:
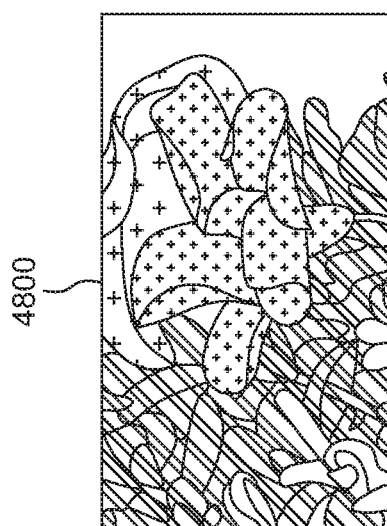
Figure 48D:
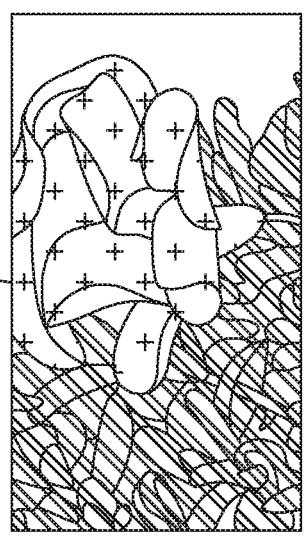

FIGS. 48A-48C are illustrations showing example focal plane images without redistribution according to some embodiments. FIGS. 48D-48F are illustrations showing example focal plane images with redistribution according to some embodiments. FIGS. 48A-48F are modified versions of the unprocessed flower test image and its respective depth map of, e.g., FIG. 21B and 210, correspondingly, in accordance with some embodiments. FIGS. 48A-48F show an example of MFPs before and after redistribution. FIGS. 48A-48C show linearly blended MFPs 4800, 4810, 4820 before redistribution. FIGS. 48D-48F show redistributed versions of the same MFPs 4830, 4840, 4850. A Gaussian filter with a radius of 20 pixels (both horizontally and vertically) was used for low-pass filtering. FIGS. 48A-48F reveal that redistribution preserves high frequency components (details) of each focal plane, while bringing low-frequency components to areas originally with no information (such as the white background of FIGS. 48D to 48F).

Both MFP examples in FIGS. 48A-48C and FIGS. 48D-48F split the captured information into different accommodation levels (focus distances). However, they have differences in their ability to inpaint disocclusions. Whereas the MFP stack produced by linear blending in FIGS. 48A-48C have untextured/uncolored (e.g., white background) areas that may cause disocclusions, the redistributed versions of the same MFPs in FIGS. 48D-48F show improvement and have a more uniform nature. When shifting the second set of MFPs for new viewpoints or for small viewer motions, less disocclusions are visible.

The MFPs in FIGS. 48D-48F are selectively low-pass filtered so that high contrast transitions between textured and un-textured (e.g., white background) areas are not filtered. Because low-frequency image components are not sensitive to being allocated at various depths, in some example embodiments low-frequency image components are allocated evenly to all focal planes. Low frequencies may be allocated to only one focal plane, or to an extra focal plane between or outside (not belonging to) any of the original MFP distances.

There may be different reasons to favor a particular allocation. For example, ratios for the allocation may vary depending on content properties. Also, a viewer may expect the outcome MFPs to comply with (or be close to) partition of unity.

Figure 49B:
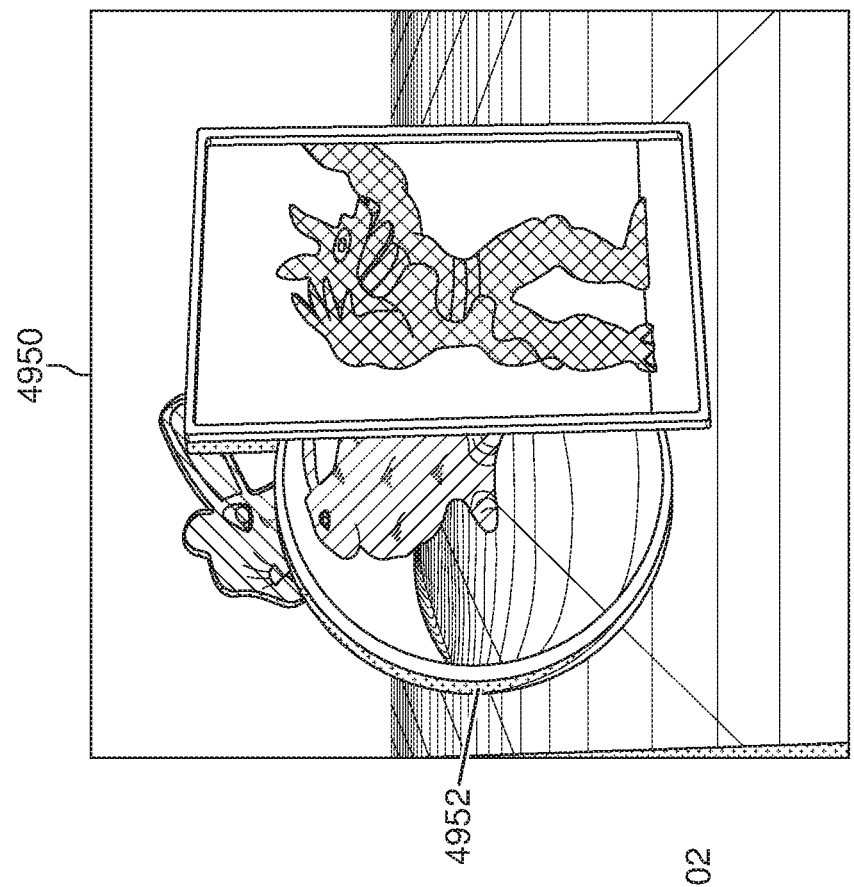
FIGS. 49A-49B are illustrations showing example right and left images for a crossed eye stereogram formed using linearly blended focal planes according to some embodiments.
Figure 49A:
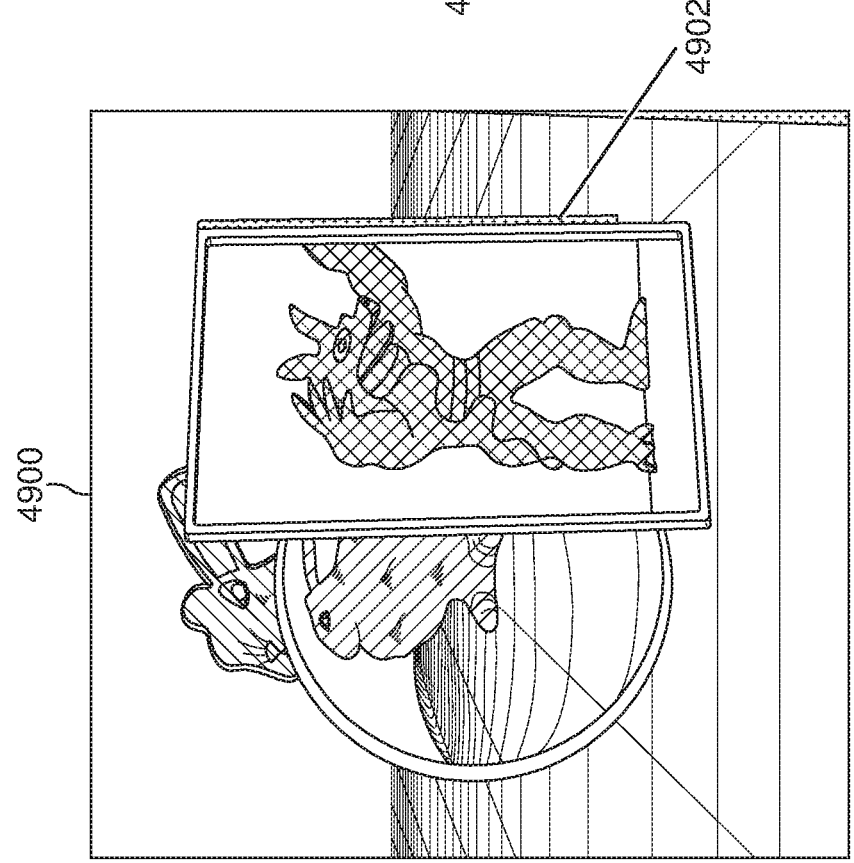

FIGS. 49A-49B are illustrations showing example right and left images for a crossed eye stereogram formed using linearly blended focal planes according to some embodiments. FIGS. 49A and 49B show an example of a crossed eye stereogram formed using the linearly blended focal planes shown in FIGS. 45A-45D. FIGS. 49A and 49B show a crossed eye stereogram 4900, 4950 formed by shifting linearly blended focal planes (FIGS. 45A-45D, which are line drawing versions of images appearing in Narain) according to some embodiments. Total disparity is 4% (2×12 pixels in a 600×600 pixel image). FIGS. 49A and 49B show example disocclusion errors 4902, 4952 beside object edges.

Figure 50B:
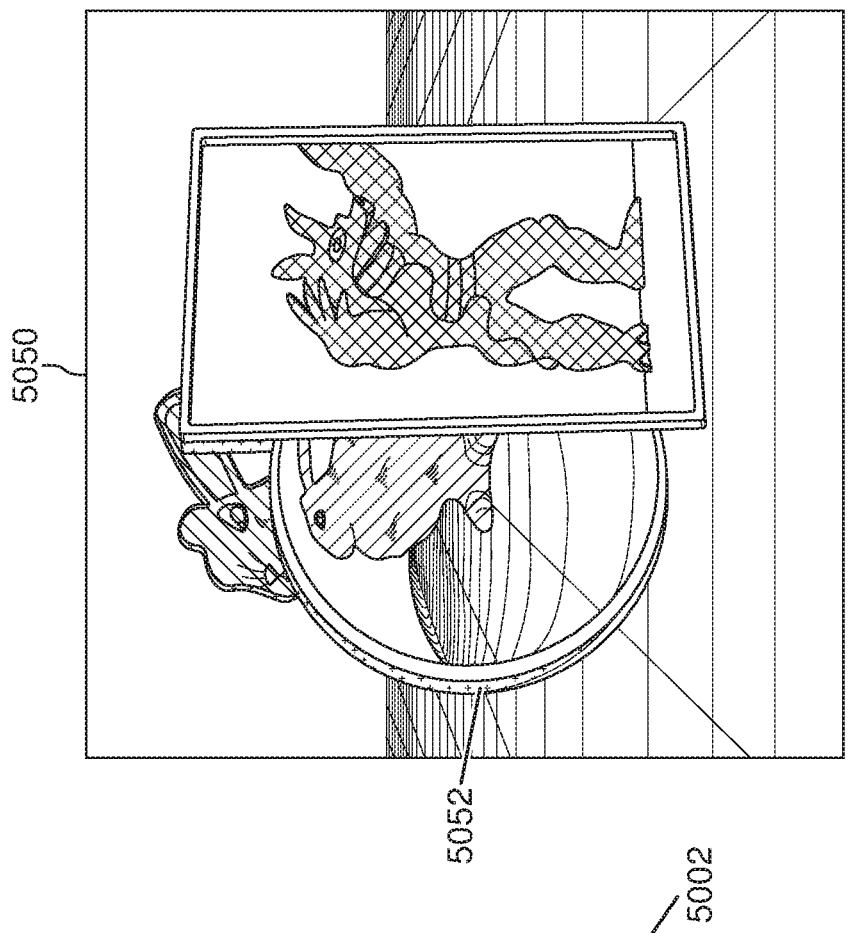
FIGS. 50A-50B are illustrations showing example right and left images for a crossed eye stereogram formed using redistributed focal planes according to some embodiments.
Figure 50A:
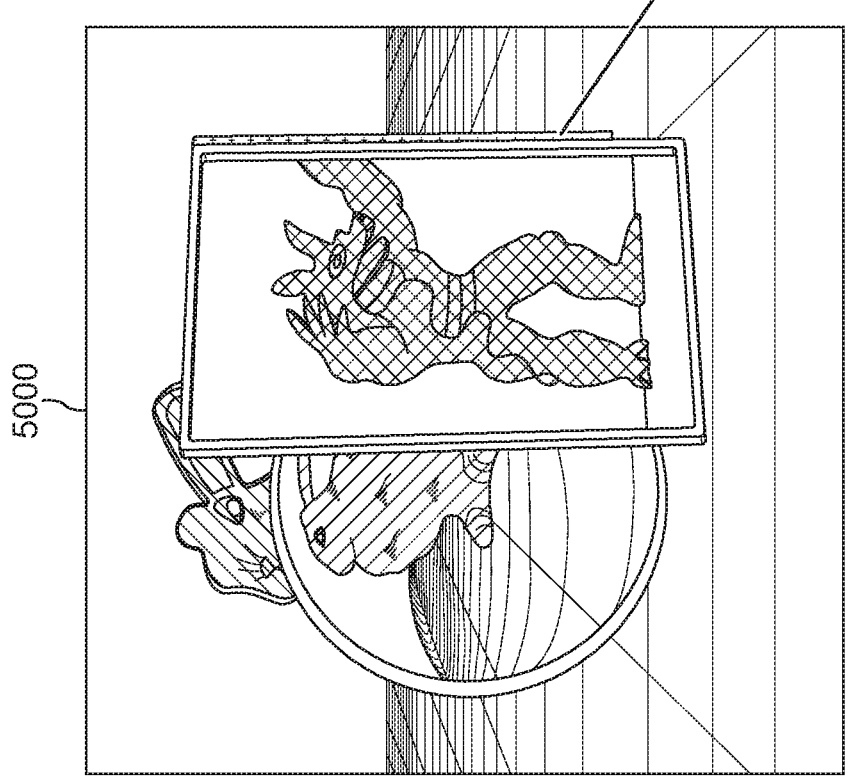

FIGS. 50A-50B are illustrations showing example right and left images for a crossed eye stereogram formed using redistributed focal planes according to some embodiments. FIGS. 50A and 50B show one embodiment of the same focal planes of FIGS. 49A and 49B but redistributed. In FIGS. 50A and 50B, the example disocclusions 5002, 5052 are much smaller. FIGS. 50A and 50B show a crossed eye stereogram formed using focal planes redistributed with the described simplified procedure. Total disparity is 4%. Disocclusion errors are reduced with respect to those in FIGS. 49A and 49B. FIGS. 50A and 50B are processed versions of unprocessed image(s) from Narain (FIGS. 45A-45D).

In FIGS. 49A, 49B, 50A, and 50B, four MFPs were used with the amount of synthetic disparity corresponding to 4.0% of the image width (600×600 pixel MFPs are shifted by up to 12 pixels for both viewpoints). For the examples in FIGS. 50A and 50B, the MFPs are selectively low-pass filtered, so that the high contrast transitions between textured and un-textured (e.g., the white background) areas are not filtered.

Redistributing Low Frequency Components of MFPs

As shown by Narain, accommodation may be more natural to redistributed MFPs. In particular, this holds for non-Lambertian effects in the scene. Narain is not understood to redistribute MFPs as a post process and is not understood to be used to enable large synthetic disparity in stereoscopic views, even in arbitrary baseline orientations.

According to some embodiments, redistribution of low frequency components is used for multifocal planes (MFPs) for virtual viewpoint generation with large disparity. By (re)distributing low frequency components, big variations of pixel values in and between conventional focal planes may be avoided. This in turn reduces high contrast effects and visible disocclusions when shifting focal planes (cf. 3D warping) for new viewpoints.

About Performing Filtering Operations

Redistribution may produce modified MFPs so that each focal plane is a sum of a specified fraction of the low-frequency contents of the whole scene, and those high frequency components specific for the said focal plane (at the corresponding accommodation distance). The process replaces the MFP specific low-frequency components with a specific part of the overall low frequency component.

High frequency and low frequency components are complementary so that in deriving either one of them the other component may be determined by subtraction. In an example process shown in FIG. 47, low frequency components are derived, and high frequency components are obtained as their complement (by subtraction) from the unfiltered image. The process may be the other way around, or both components may be obtained directly with two filters, having complementary transfer functions in the frequency domain. Because a user's accommodation distance is not determined or stored when rendering, many systems may use the same filter functions for all focal planes.

Note that the original MFPs are selectively filtered so that the high contrast changes between textured and un-textured (e.g., white background) areas are not filtered (see, for example, FIGS. 45A-45D). Without selective filtering, the high contrast areas may produce high frequency components, which are not part of the original image content, and induce ringing around object edges, degrading the quality of redistributed MFPs and renderings using them.

In the disclosed examples in accordance with some embodiments, a Gaussian low pass filter was used with an adjustable radius (filter window). In some embodiments, it is beneficial for the end result that the filtering operation is applied only to those pixels which do not belong to the steep transitions between non-zero-valued (colored) areas and zero-valued (transparent or void) areas. A Selective Gaussian filter does not filter image areas having bigger color differences than a set threshold. Due to the typically high contrast between colored and black areas, their borders may be detected reliably, and the detection is not sensitive to the threshold value.

FIGS. 51A-51B are illustrations showing example right and left images for a crossed eye stereogram formed using selective Gaussian filtering in redistributing MFPs according to some embodiments. FIGS. 51A and 51B show crossed eye stereogram using selective Gaussian filtering in redistributing MFPs. Parameters are otherwise the same as in FIGS. 50A-50B, except that filtering is not applied if the filtering changes a pixel value by more than a threshold (e.g., here 60). The example disocclusion errors 5102, 5152 are reduced further from those in FIGS. 50A-50B. The result shows some contouring in the smooth parts of the scene, which may be induced by certain inaccuracies used in the implementation. FIGS. 51A and 51B are processed versions of unprocessed image(s) from Narain (FIGS. 45A-45D).

About Supporting Non-Lambertian Content

Narain reports a method in which non-Lambertian effects for reflections or refractions are correctly presented. Many previous methods do not support this type of content, but this lack of support may be a drawback only with specific types of content.

As the disclosed method may use multiple capture and transmission formats, non-Lambertian content may be used as well, e.g., by selecting a certain input format. Many previous systems do not support depth map generation with depth sensors but may support focus stacks (cf. Narain) or by some other camera-based (depth from disparity) methods, which may be able to capture correct pixel distances also for non-Lambertian content. Hence, MFPs received as input may be produced or corrected to show reflected or refracted image content at correct distances.

For some embodiments, focus stack-originated MFPs (presentation planes) may be received as inputs in the front-end and used without an MFP formation stage, e.g., for synthesizing stereo or motion parallax. For some embodiments, a method may include: receiving a plurality of focal plane images; orienting the plurality of focal plane images using head information to provide stereo disparity between left and right eye; and displaying the oriented plurality of focal plane images.

Example Embodiments for Forming Redistributed Focal Planes

A procedure for redistributing low-frequency components is described above. The procedure may be based on decomposing a texture image into discrete MFPs, and using a depth blending method (e.g., linear filtering) to interpolate between discrete planes. Filtering operations for redistributing low frequencies between MFPs may occur as a post process.

Figure 52A:
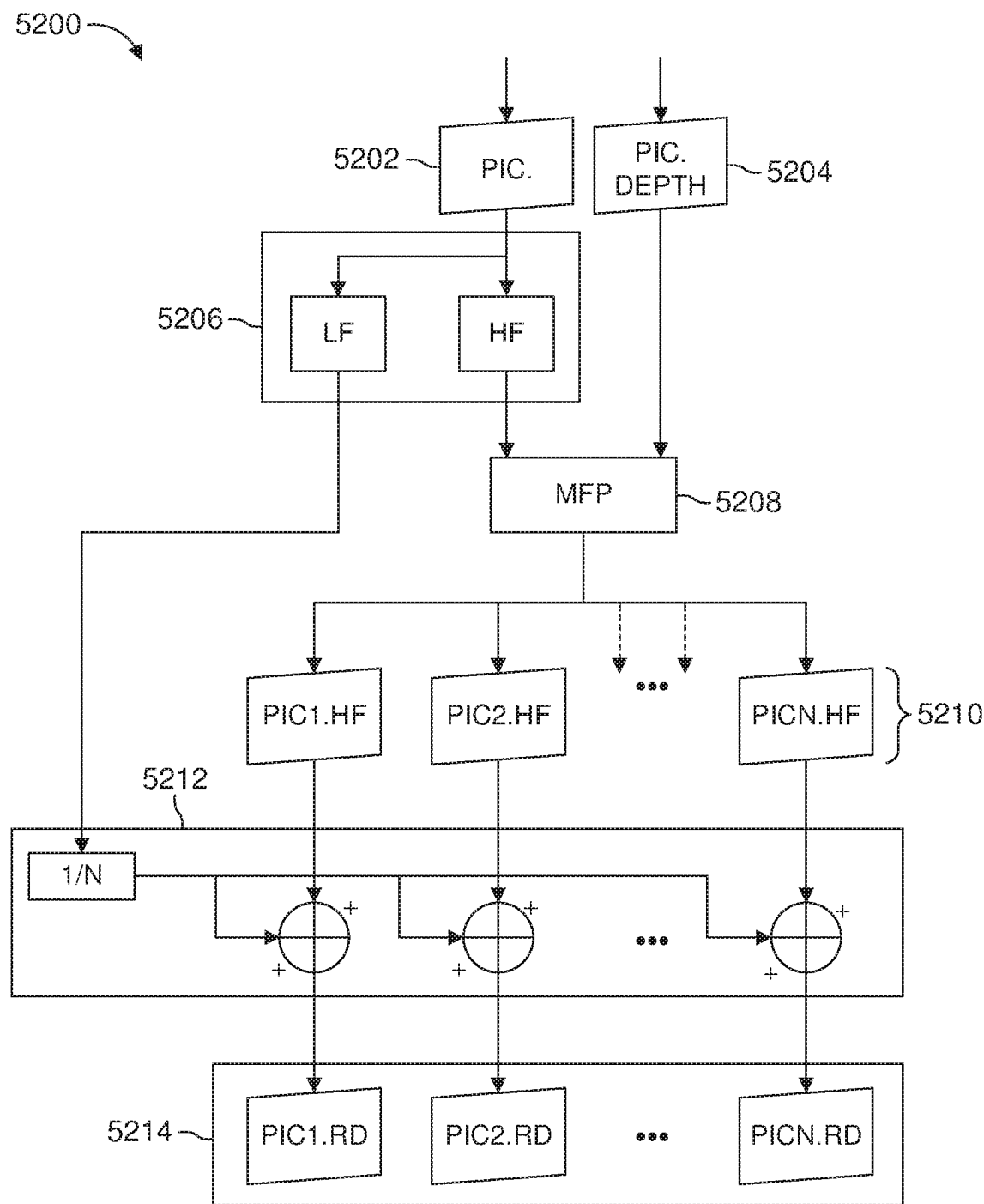
FIG. 52A is a flowchart illustrating an example process for generating redistributed focal plane images using low and high frequency filtering according to some embodiments.
Figure 52B:
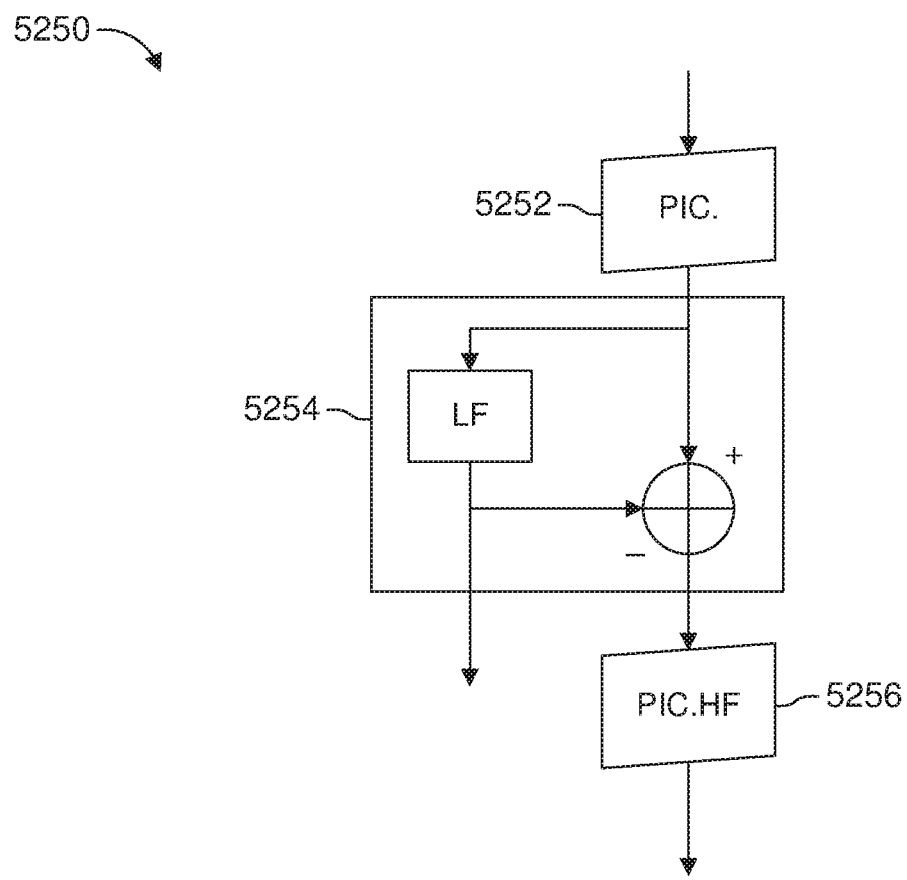
FIG. 52B is a flowchart illustrating an example process for generating high frequency focal plane images using low-pass filtering according to some embodiments.

FIG. 52A is a flowchart illustrating an example process for generating redistributed focal plane images using low and high frequency filtering according to some embodiments. FIG. 52B is a flowchart illustrating an example process for generating high frequency focal plane images using low-pass filtering according to some embodiments. The example process 5200 (cf. FIG. 52A) uses filters 5206 to separate high and low frequency contents of the picture 5202 before decomposing 5208 the contents into focal planes 5210 using picture depth data 5204. Redistribution 5212 of low frequencies and rendering 5214 MFPs also occur. Changing the filtering stage generates alternative MFPs. FIG. 52A is a block diagram of another redistribution process for MFPs in accordance with some embodiments. FIG. 52B shows an example process 5250 for implementation of complementary low-pass filters 5254 and high-pass filters 5256 of a picture data 5252. The example process 5200 may avoid using, e.g., a selective Gaussian filter and optimizing its threshold parameter, as low-pass filtering is not made to focal planes, which often contain high-contrast transitions. Correspondingly, some embodiments using the example process 5200 may improve quality.

Filtering as a post process may be used by MFP processes and outputs. However, some example methods and systems disclosed herein in accordance with some embodiments may improve quality. Some embodiments avoid the use of selective or guided filtering to exclude void areas (pixels not belonging to the actual focal plane content) from the filtering. Void areas may appear as white or black regions in MFPs and may not be detected correctly if filtering. Depending on the image content, this may appear as defects in the filtering results and reduce the quality of redistributed focal planes. Some embodiments avoid optimization of a threshold for selective filtering because the parameter is not used.

For some embodiments, a process for forming of redistributed focal planes may include filtering the input image for low frequency content; and redistributing the low frequency content to the plurality of focal plane images. For some embodiments, a process for forming of redistributed focal planes may include filtering the input image for high frequency content; and decomposing the high frequency content to the plurality of focal plane images. For some embodiments, if decomposing, high frequency components are not moved from their original depth, unlike if, e.g., redistributing low frequency content. An example process for forming of redistributed focal planes may be as shown in FIG. 52A. For some embodiments, high frequency content HF shown in FIG. 52A may be derived from low frequency content LF shown in FIG. 52A, or vice versa.

Avoiding Use of Signed Arithmetic

Figure 53:
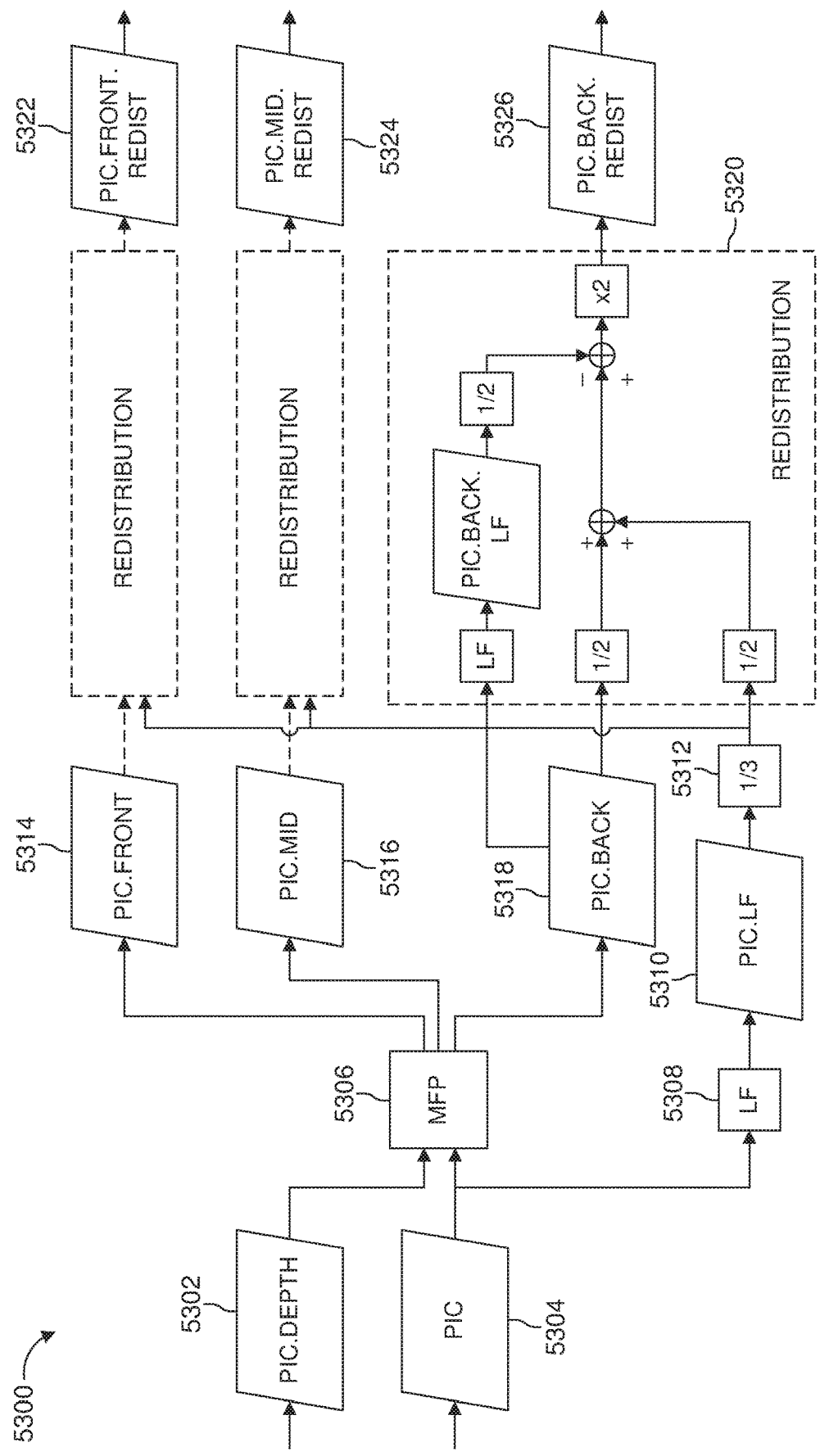
FIG. 53 is a flowchart illustrating an example process for generating redistributed focal plane images for front, mid, and back depth ranges according to some embodiments.

FIG. 53 is a flowchart illustrating an example process for generating redistributed focal plane images for front, mid, and back depth ranges according to some embodiments. If making the redistribution for the given examples, a slightly modified process flow shown in FIG. 53 is used. FIG. 53 shows a block diagram of a redistribution process 5300. Redistribution 5320 of three MFPs is shown as an example. Scaling operations with constants (0.5 and 2) are used to prevent saturations in the image processing software. Some embodiments use a set of focal planes (MFPs) as an input. The received image (picture) 5304 may be summed up from those focal planes 5306 or received by the MFP block 5306. The MFP block 5306 may receive picture depth data 5302 in addition to the picture 5304. The MFP may be broken into high, mid, and back range planes 5314, 5316, 5318. The redistribution process 5300 may output front, mid, and back redistributed pictures. In some embodiments, arithmetic operations and components performing arithmetic operations (e.g., ALUs) may use signed arithmetic with enough bits to handle signed computations.

In FIG. 53, low-pass (low frequency) components of each focal plane (one of N) is replaced by the low-pass component of the input image by a scaling factor 1/N, where the N is the number of used focal planes. In the example, N is 3, corresponding to scaling by ⅓.

The scaling operations with other constants (multiplying with 0.5 and 2) are used to prevent saturations in image processing software. Scaling down by 0.5 occurs in the first addition operation, which is made by applying 50% transparency for the overlaying image. Subtraction of low frequency components from each focal plane requires down scaling by 0.5, and multiplication of the result by 2 after the operation, correspondingly.

Note that the low frequency components of MFPs sum up (e.g., close enough) to the low-frequency component of the original image, so that the addition and subtraction operations preserve (e.g., close enough) the partition of unity for the MFP decomposition.

The implementation shown in FIG. 53 may cause some reduction of computational accuracy. In particular, some pixels may saturate to zero in the last subtraction phase and may not scale back when being multiplied by two. This may show up as slight contouring in some parts of the images, which is not caused by the disclosed example methods, in accordance with some embodiments, of redistribution.

Avoiding Use of Signed Pixels in the Variation

Figure 54:
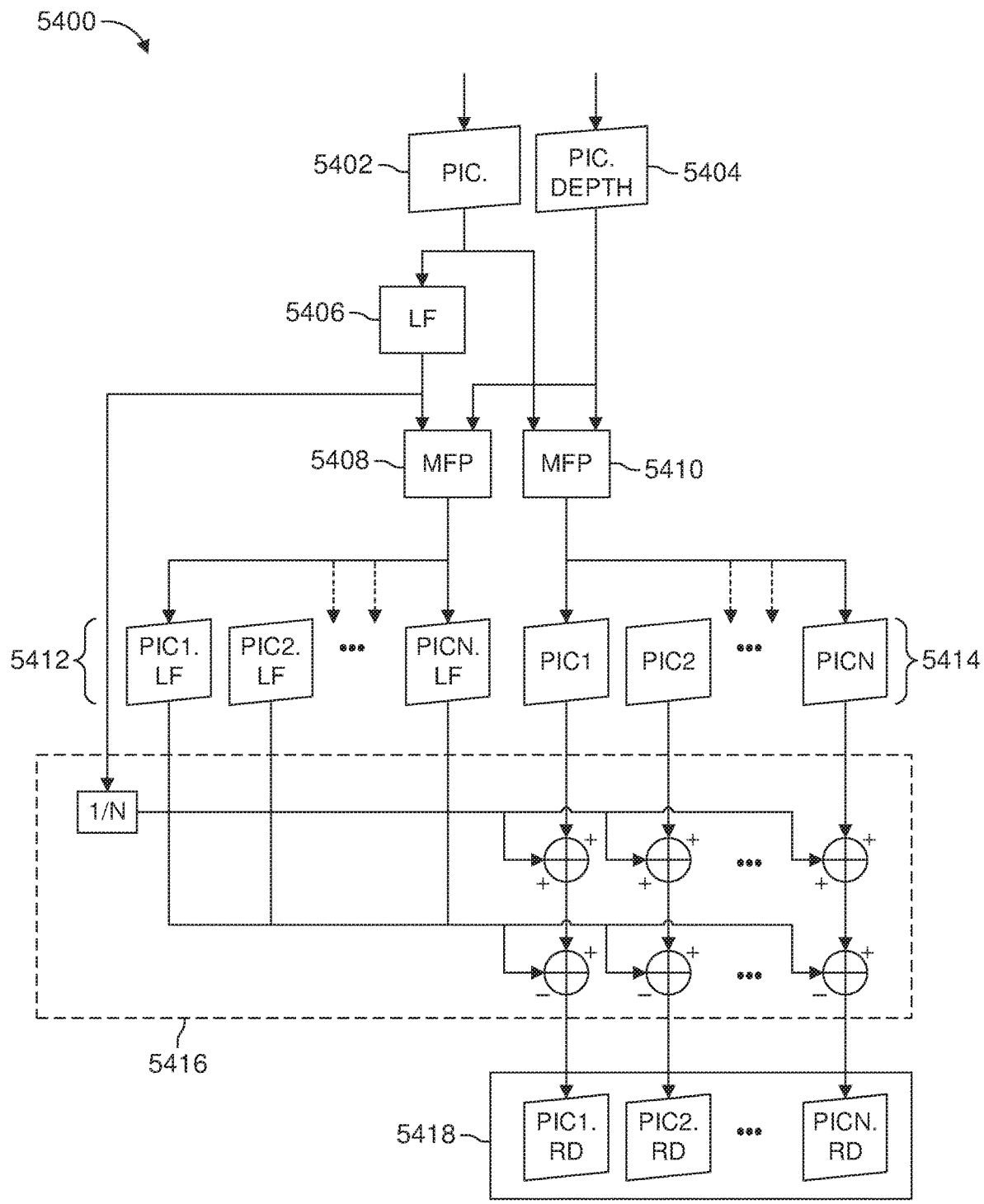
FIG. 54 is a flowchart illustrating an example process for generating redistributed focal plane images using low-pass filtering according to some embodiments.

FIG. 54 is a flowchart illustrating an example process for generating redistributed focal plane images using low-pass filtering according to some embodiments. In making simulations corresponding to FIG. 54, the procedure 5400 was applied to avoid using signed integers/pixels (or (signed) high frequency representations). FIG. 54 shows an alternate embodiment. For some embodiments, an image 5402 and picture depths 5404 are received by the process 5400. The picture 5402 may be filtered 5406 into high and low frequency components. The high and low frequency components may be used in combination with picture depth data to generate inputs to the MFP decomposition processes 5408, 5410. The picture may be decomposed into N layers 5412, 5414 for low and high frequency components. The decomposed layers 5412, 5414 may be redistributed 5416 and rendered 5418.

To avoid saturation in summations (keeping the result within 8-bit values reserved for image pixel), redistributed LFs 5416 are summed with 50% transparency. Scaling up is correspondingly made when subtracting low frequency planes (to result with redistributed planes). One alternate embodiment to the process shown in FIGS. 52A and 52B avoids processing with high frequency planes with signed representations. Some embodiments may use full accuracy (signed) computations for redistribution LFs 5416.

Systems and methods disclosed herein in accordance with some embodiments form monocular MFP stacks, which show reduced amount of disocclusions when used to produce stereoscopic 3D views. Some embodiments redistribute MFPs and shift the post processed MFPs to generate a disparity and baseline orientation. The resulting stereoscopic image may be displayed, e.g., on external screens and wearable displays, including those supporting natural accommodation.

Systems and methods disclosed herein in accordance with some embodiments may be used to produce stereoscopic content for services using stereoscopic displays.

Some embodiments enable development of stereoscopic displays, enabling easy and cost-effective way of producing free baseline (head-tilt independent) stereoscopic rendering, with relatively large adjustable disparity and motion parallax effects. These properties may be used with 3DoF+ applications.

Many MFP display implementations use multiplexing of MFPs in time or (image) space. By designing a suitable test scene with objects at different depths, and showing characteristic behavior at object edges, a redistribution algorithm may be recognized. Some embodiments may be recognized based on their ability to support stereopsis and motion parallax for users moving their head and themselves.

Some embodiments produce stereoscopic images, which may cause VAC if viewed on previous stereoscopic displays. MFPs formed by systems and methods disclosed herein in accordance with some embodiments may be rendered using MFP displays supporting natural accommodation.

Synthetic disparity (e.g., based on processing of MFPs (e.g., by shifting MFPs for both S3D and MFP displays)) is used in some embodiments. Systems and methods disclosed herein in accordance with some embodiments turn the accommodation-dependent properties of the MFPs (such as those properties that are problematic to visualize on print) to spatial disparity, which is visible on print, and shows that many properties of the corresponding MFPs are in the depth dimension.

Axial Motion Parallax

A common problem of many previous systems is that motion parallax is supported only for small sideways (typically horizontal) movements, and does not apply for axial movement. Multi-focal planes (MFPs) are an economical approximation of light-fields. Many previous MFP displays support only a single precise viewpoint and do not support viewpoint changes when a viewer is moving in the depth (axial) dimension. As such, the use in such previous systems is generally limited to fixed viewer locations.

Many previous 360-degree panorama rendering systems use orientation sensors to support viewing to different directions, but axial motion parallax is not supported. These three degrees of freedom (3DOF) systems constrain the user to changes in viewing direction only. Many six degrees of freedom (6DOF) systems, such as a computed automatic virtual environment (CAVE), are typically costly and not feasible for broadcast systems. The ability to bring small general user motion to a 3DOF system has been described as 3DOF+. In this application, in accordance with some embodiments, the term "natural 3D motion" refers to this 3DOF+ functionality.

Enabling a 3DOF+ system with reduced complexity and legacy 3DOF or 2D stereo content is a challenge addressed by systems and methods disclosed herein in accordance with some embodiments. An additional challenge is enabling natural accommodation of displayed content (avoiding vergence-accommodation conflict (VAC)) in these new 3DOF+ solutions.

Figure 55B:
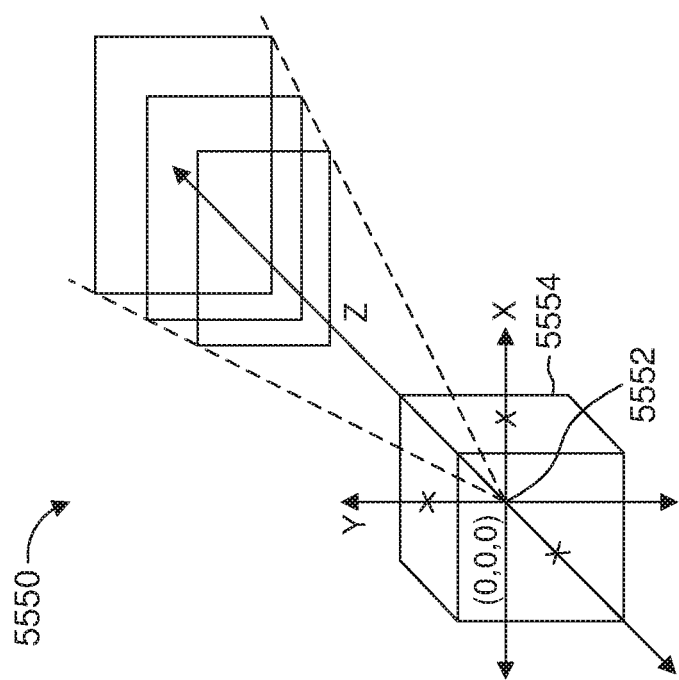
FIGS. 55A-55B are schematic perspective views illustrating example multi-focal planes rendered in space according to some embodiments.
Figure 55A:
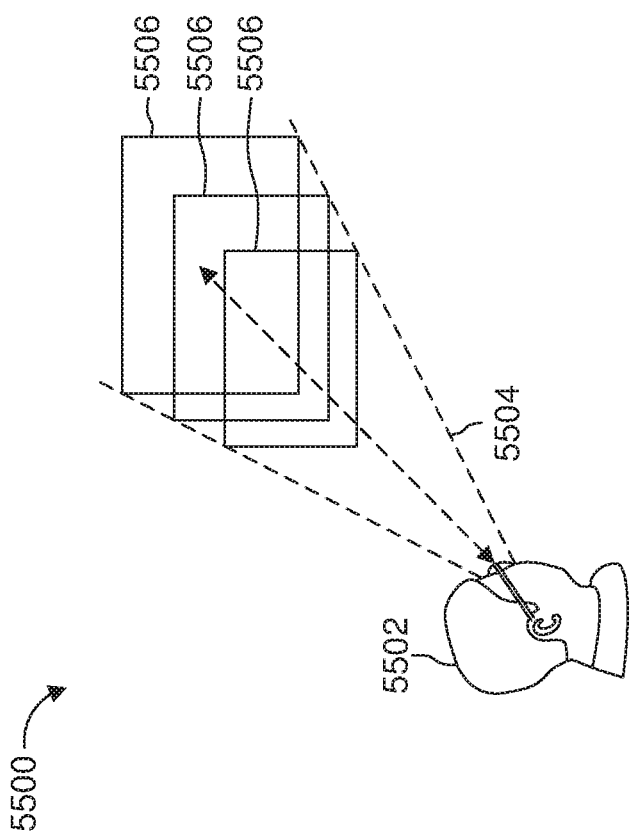

FIGS. 55A-55B are schematic perspective views 5500, 5550 illustrating example multi-focal planes rendered in space according to some embodiments. FIGS. 55A and 55B illustrate a nominal viewpoint 5504 shown by the dashed lines to the focal planes (MFPs) 5506 shown by the solid line rectangles. If a viewer 5502 moves, instead of seeing the information (focal planes) from the nominal origin viewpoint, a new viewpoint may be generated. Focal planes are an approximation of a 3D scene, and a new viewpoint may be generated, e.g., in a method similar in some respects to warping 3D models to a new orientation (cf. a virtual viewpoint generation block). In FIG. 55A, a user sees focal planes rendered in space by the user's MFP glasses. In FIG. 55B, motion parallax is supported for the user inside an example volume (dx, dy, dz) 5554 around a nominal viewpoint (0, 0, 0) 5552, such as the example cube shown.

Motion parallax varies the perspective to the focal planes around the nominal viewpoint (0, 0, 0). If the user moves away from the nominal point, focal plane images are seen from slightly varying viewpoints, and may simply be translated (shifted) and scaled accordingly to create correct MFP renderings. Each coordinate (x, y, and z) may be varied within certain limits to keep created distortions acceptable. Motion parallax may thus be supported inside a volume around a nominal viewpoint (such as the cube shown in FIG. 55B). A cube around a viewer's nominal position may be selected for supporting 3D motion parallax (and capturing user motions). For some embodiments, a sphere or other shape may be selected for supporting the capture of user motions for motion parallax.

FIGS. 56A-56C are schematic perspective views illustrating three examples of multi-focal planes shifted and scaled for different viewpoints according to some embodiments. A user's motions may change his or her viewpoint to the focal planes as shown by the changes in dashed lines. FIGS. 56A to 56C show a few example views 5600, 5630, 5660 for changing viewpoints 5602, 5632, 5662 inside a motion parallax cube 5604, 5634, 5664. Dashed lines indicate viewpoint changes to the focal plane stack. New viewpoints to the MFP stack may be created by transforming the MFPs accordingly. The mathematics for doing transformations may be similar in some respects to warping 3D models. For some embodiments, transformations may be approximated with other operations explained later.

Each 3D coordinate or voxel inside the cube represents a different viewpoint to a focal plane stack (or a pair of stacks for a stereoscopic display). For each of these viewpoints, a transformation of the original MFP stack (as viewed from the nominal viewpoint) is made. Thus, for each of the 3D viewpoints/voxels, there may be a unique MFP stack (reoriented and scaled by transformations). For some embodiments, a set of MFP stacks may be derived and stored in advance. These derived MFP stacks may be categorized by captured motion information.

Figure 57:
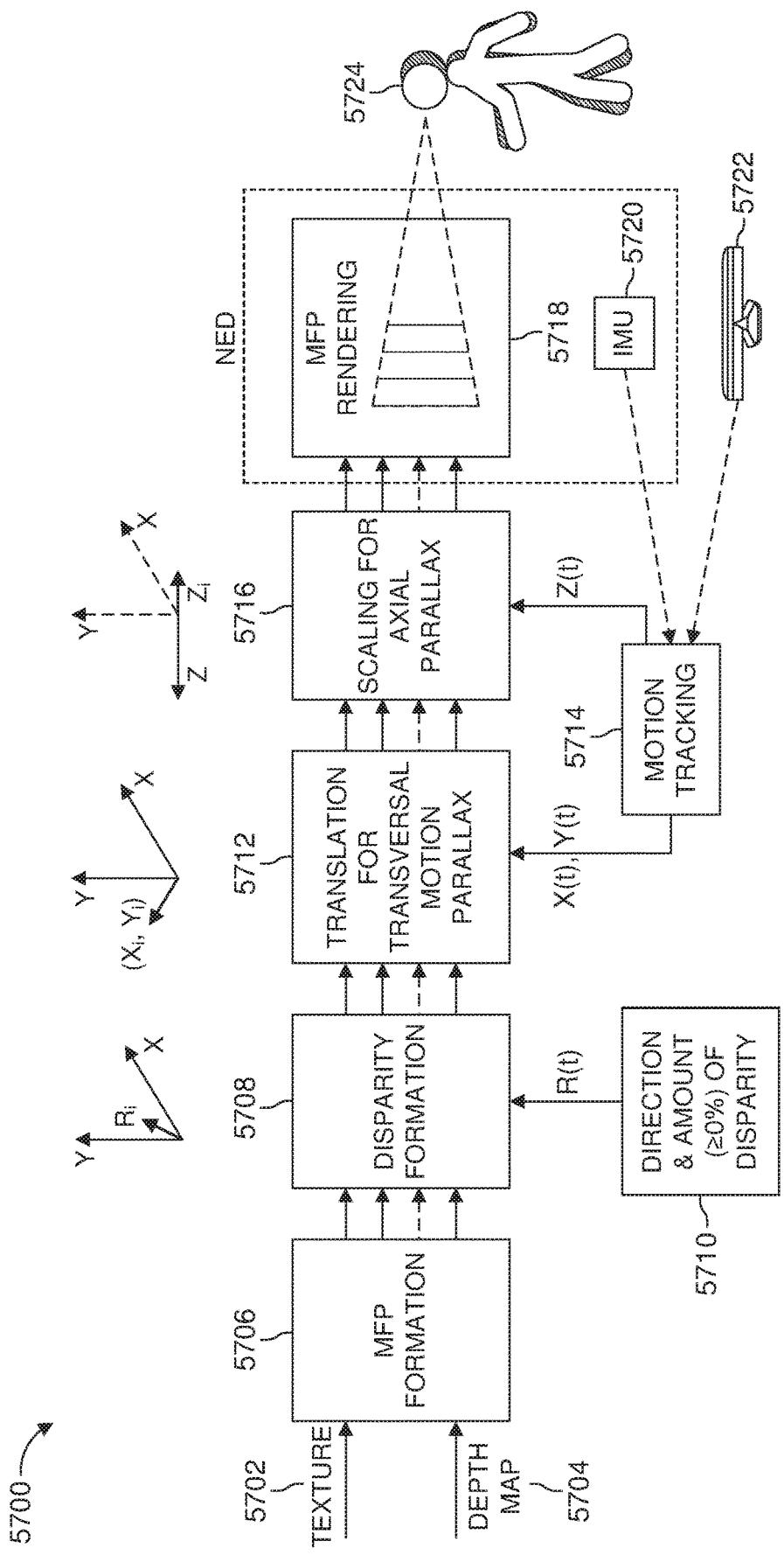
FIG. 57 is a process diagram illustrating an example process for generating multi-focal planes in a motion parallax system according to some embodiments.

FIG. 57 is a process diagram illustrating an example process for generating multi-focal planes in a motion parallax system according to some embodiments. FIG. 57 illustrates a process 5700 for monoscopic MFP formation, processing (e.g., synthesizing viewpoints for stereoscopy and motion parallax), and rendering. For simplicity, creating motion parallax effect is shown for only one viewer. For some embodiments, the system may include one or more wearable user terminals (such as a head mounted display, HMD), enabling each user to perceive motion parallax individually. Some embodiments may use, e.g., more distributed or more centralized architectures.

Texture 5702 and depth (video plus depth) 5704 signals are received as inputs to an MFP formation block 5706, which forms multi-focal planes (MFPs) using a depth map (video) captured from the scene. MFPs are sent to a disparity formation block 5708.

The disparity formation block 5708 creates synthesized stereoscopic viewpoints (or a disparity) using a specified baseline orientation and length (indicated by a vector $r_t$ in an x-y coordinate system, for example). Some embodiments may use a direction and amount (≥0%) of disparity 5710. Some embodiments may omit this stage, e.g., if stereoscopic input is used such that a separate texture and depth signal is used for each eye.

Motion detection and tracking (with, e.g., an inertial measurement unit (IMU) 5720 and/or Kinect-type 5718 of external sensor 5714) may be used to capture user motion with respect to a user's initial viewing position with the nominal viewing setup for the MFP rendering (sizes and distances of focal planes). In the example process 5700 and in other processes, other motion detection and tracking devices may be used instead or in addition. A transversal motion parallax block 5712 may shift the two stereoscopic viewpoints in both x- and y-dimensions. Focal planes in each MFP stack may be shifted by different amounts corresponding to their distances in depth.

An axial motion parallax module 5716 may adjust focal planes by scaling and/or sizing according to the measured axial motion relating the initial/nominal position and viewpoint. Different focal planes may be scaled differently because they correspond to different distances.

If viewing broadcast type of content, user motions may not typically affect the input stream (the viewpoint used in capturing the views). Therefore, after a user 5724 experiences motion parallax by body motions, the changed viewpoint may be migrated back to the nominal viewpoint by a chosen mechanism (delay, rate, trajectory, and time instants).

For some embodiments, motion tracking sensor readings of a position of a viewer may be measured relative to a focal plane display to generate head orientation information. For some embodiments, responsive to generating the head orientation information, motion parallax may be synthesized by altering one or more of the focal plane images.

Some previous devices use MFPs for viewpoint changes when supporting (free baseline) stereopsis and transversal motion parallax. The sections below describe axial motion parallax. Focal plane adjustments for intermediate or combined motion may be derived by applying these two cases. For example, axial motion parallax may be created by scaling one or more focal planes for some embodiments.

Figure 58:
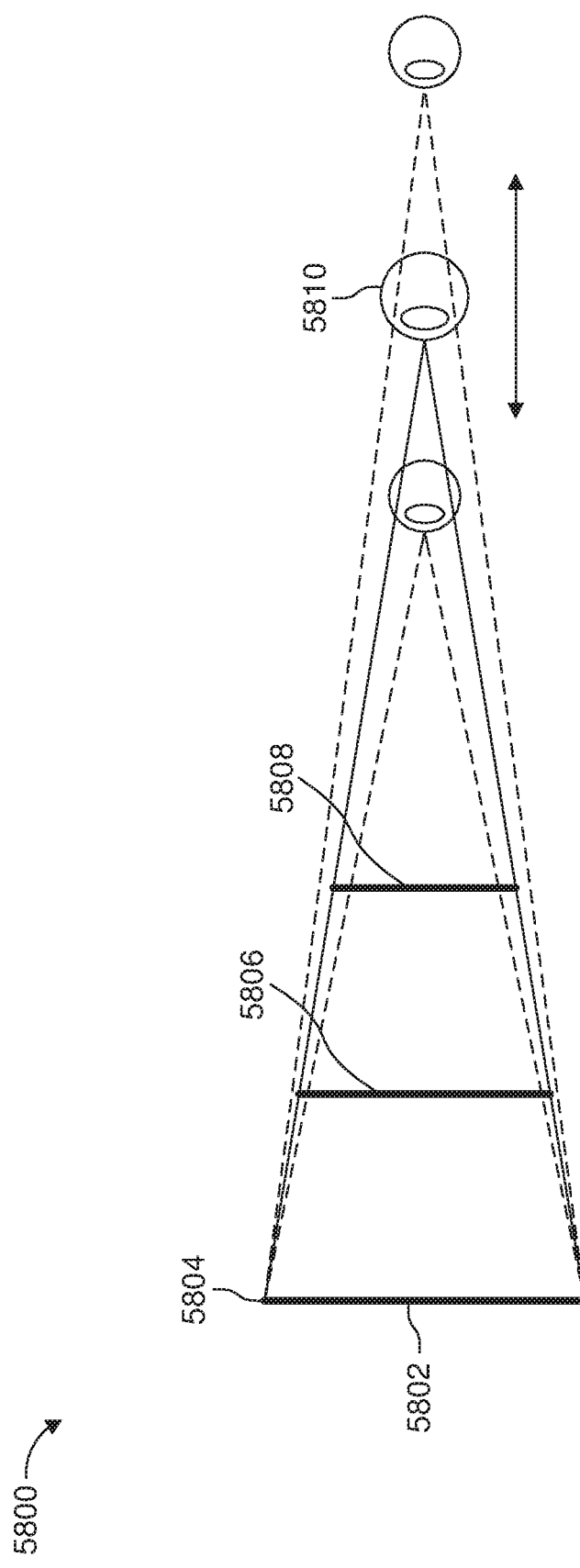
FIG. 58 is a schematic plan view illustrating example focal plane size scaling adjustments for axial movement according to some embodiments.

FIG. 58 is a schematic plan view illustrating example focal plane scaling for axial movement according to some embodiments. Although FIG. 58 is described with regard to a monoscopic viewpoint to an MFP stack during axial motion, a corresponding process may be performed with transformations for each viewpoint in a stereoscopic system or method. As with translational motion, a transformation of the focal images may be performed to handle axial motion. For the example monoscopic viewpoint environment 5800, if a viewer 5810 moves closer axially to the MFP stack, the edge of a focal plane 5808 may be adjusted to move (or shift) outwards. If the viewer 5810 moves further away axially from the MFP stack, the edge of a focal plane 5806 may be adjusted to move (or shift) inwards. The edge of a focal plane 5804 located at the zero parallax setting (ZPS) 5802 stays in place (or is not adjusted) if the viewer 5810 moves closer or further away axially from the MFP stack. The changes in viewpoint for a viewer 5810 due to axial movement are shown for two examples as dashed lines. FIG. 58 illustrates how the apparent sizes of MFPs change during axial motion. Three MFPs with equal amounts of separation are shown. Zero parallax setting (ZPS) 5802 is positioned at the furthest focal plane. The furthest focal plane does not shift if stereoscopic disparity or transversal parallax are created, and the furthest focal plane is not scaled if creating axial motion parallax. Single step axial movements are shown in the example monoscopic viewpoint environment 5800, but multiple axial step movements may be supported with a similar process that scales MFPs by an amount proportional to the number of axial steps moved by the viewer 5810.

If a viewer 5810 moves one step (such as one distance unit) closer axially to the MFP stack, the size of a focal plane 5808 may be adjusted one unit (such as one distance unit) bigger. If the viewer 5810 moves one step further away axially from the MFP stack, the size of a focal plane 5806 may be adjusted one unit smaller. The size of a focal plane 5804 located at the zero parallax setting (ZPS) 5802 stays the same size (e.g., or is unchanged) if the viewer 5810 moves closer or further away axially from the MFP stack. The changes in viewpoint for a viewer 5810 due to axial movement are shown for two examples as dashed lines.

For some embodiments, scaling transformation of one or more focal plane images may be approximated by adjusting the size of the focal plane symmetrically around its center, so that the aspect ratio of the image is preserved. As in producing stereoscopic disparity, small changes to motion parallax are obtained by small changes in focal plane image resolutions (increments or decrements up to a threshold, such as changes of 5 pixels). For some embodiments with higher resolution images, a higher threshold may be used.

If adjusting the image size, the top and bottom edges of the image may be moved in opposite directions by an amount (the vertical size of the image is changed by a number of pixels). Scaling factors for MFPs may change linearly as a function of depth, such as is shown in the example of FIG. 58. This linear change results in sets of transformed MFPs and a set of applicable viewing positions (focus points) along a viewing axis. The amount of adjustment depends on the position (distance) of the focal plane in depth, so that the farthest plane is not adjusted (as if the farthest plane is located at infinity away from the viewer). For some embodiments, the focal plane next to the furthest focal plane s scaled by one unit (or pixel multiply). The next closest focal plane may be scaled by two units in some embodiments. The amount of scaling for the rest of the focal planes may follow this paradigm for progressive closer focal planes for some embodiments.

An exemplary process for scaling MFPs in accordance with some embodiments is described below for the scaling of N focal planes (MFPs). For this description, the focal planes are separated by a uniform distance and use linear increments and decrements as a function of distance. For some embodiments, non-uniform separations may be used with non-linear increments and decrements as a function of distance. Non-linear scaling (linear in a dioptic scale) may be used to produce a linear perception by the user. Sizes of focal planes (or sets of MFPs) are obtained for a number of unequal steps along a viewing axis. This example process may, e.g., be used for verification of size adjustments. More exact geometrical operations may be performed for some embodiments.

If the viewer moves one step closer to the MFP stack, the farthest focal plane (FP1) is the zero parallax plane ("at infinity") and is not scaled (or adjusted by size). Hence, $FP_1$ is adjusted by 0 units. For the rest of the focal planes ($FP_2$, $FP_3$, ..., $FP_N$), each focal plane $FP_i$ is adjusted by (i−1) units larger for i ∈(2, 3, ..., N). This adjustment process may be repeated for each step closer to the MFP stack.

If the viewer moves one step further away from the MFP stack, the farthest focal plane (FP1) is the zero parallax plane ("at infinity") and is not scaled (or adjusted by size). Hence, $FP_1$ is adjusted by 0 units. For the rest of the focal planes ($FP_2$, $FP_3$, ..., $FP_N$), each focal plane $FP_i$ is adjusted by (i−1) units smaller for i ∈(2, 3, ..., N). This adjustment process may be repeated for each step further away from the MFP stack.

For some embodiments, the height of a focal plane may be increased in size by scaling the height by the increasing scaling factor shown in Eqn. 3:

$$\text{Increasing Scaling Factor} = \frac{V_{res} + N * (\text{unit size in pixels})}{V_{res}} \quad \text{Eqn. 3}$$

where $V_{res}$ is the vertical resolution of the focal plane. Similarly, the height of a focal plane may be decreased in size by scaling the height by the decreasing scaling factor shown in Eqn. 4:

$$\text{Decreasing Scaling Factor} = \frac{V_{res} + N * (\text{unit size in pixels})}{V_{res}} \quad \text{Eqn. 4}$$

where $V_{res}$ is the vertical resolution of the focal plane. Widths of focal planes for both increments and decrements are adjusted to preserve the aspect ratio prior to adjustment.

For some embodiments, moving by steps using the above described process, is not linear on a metric scale. Physical distances may depend on nominal viewing conditions, including the position, size, and distance of each focal plane (MFP). In addition, physical distances may depend on the (input) content properties, for example the chosen zero parallax setting (ZPS) and correspondence between the depth map with physical distances.

Using the exemplary process in accordance with some embodiments, the focal plane image resolution and unit size used may determine positions along a viewing axis, where the focal planes are seen aligned ("focused" to a viewpoint) after transformation. These points may be used for rendering content during user motion.

The higher the image resolution and the smaller the unit size, the smaller the differences between the determined axial (focused) positions. The unit size used with an image resolution may be verified experimentally and/or calculated from the geometry, so that the density of focus points supports perceiving fluent motion parallax.

Shifting and scaling artefacts may limit the axial parallax (motion) to a small amount that a user determines to be reasonable. This amount may be set to a small number of steps (or axial positions). Step positions and sizes (physical distances) may be approximated from the geometry (such as the geometry shown in FIG. 58).

For some embodiments, the nominal viewing position and focal plane distances are not set. For some embodiments, setting the unit size used for MFP size adjustments may determine the step positions and sizes (focal points and associated distances) in the axial direction. For some embodiments, the steps may be mapped linearly to distance without a degradation of naturalness as determined by a user.

For some embodiments, the motion parallax effect may not be calibrated to physical positions, such as if the conditions for 3D content productions (which may include disparity and depth range) are not standardized or set. Some users may be relatively insensitive to depth information regarding perception of the naturalness of (axial) motion parallax.

Figure 59A:
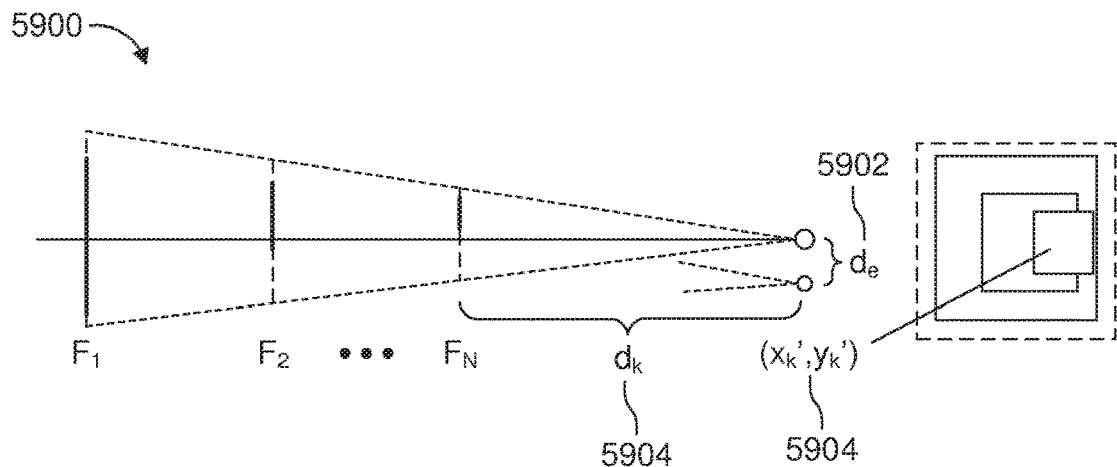
FIGS. 59A-59C are schematic plan views illustrating example transformations of example focal plane content during axial motion according to some embodiments.
Figure 59B:
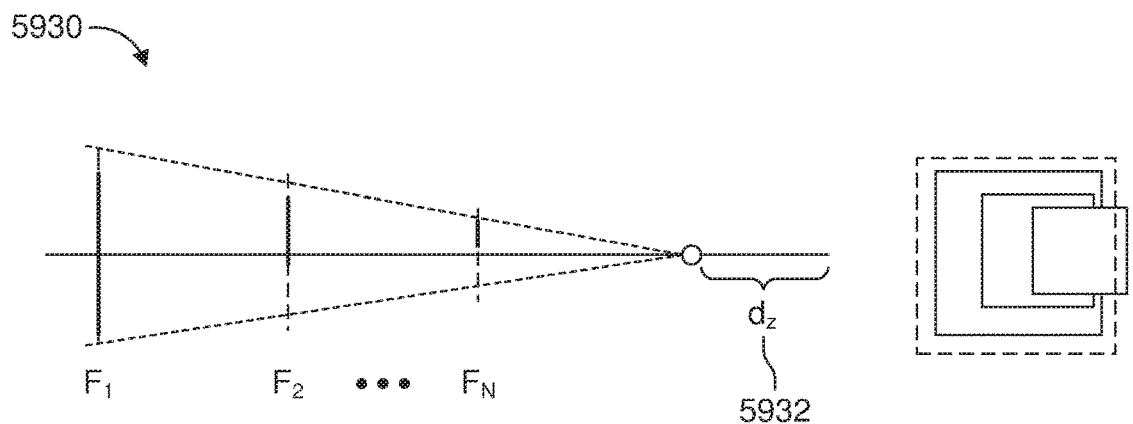
Figure 59C:
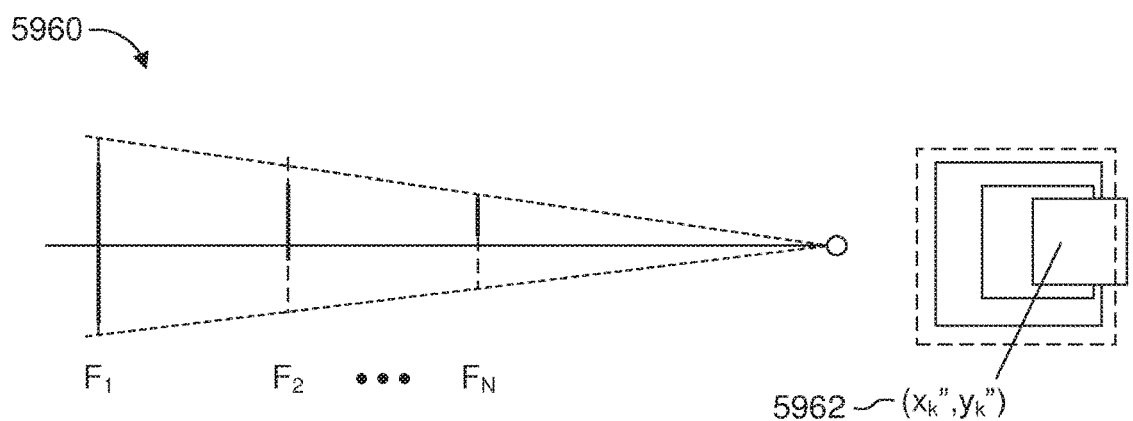

FIGS. 59A-59C are schematic plan views illustrating example transformations of example focal plane content during axial motion according to some embodiments. FIG. 59A shows an MFP configuration 5900 for a nominal "starting" point for an example disparity shift 5902 of the left eye of a viewer. A process similar to a process using the monoscopic view of FIG. 59A may be applied for scaling the right eye view in a stereoscopic viewer. Distance $d_k$ indicates the focal plane distance for a vector with k equal to 1, 2, ..., N. Distance $d_e$ indicates a disparity distance vector for an example MFP transformation (or translation). Coordinates ($x_k$, $y_k$) indicate the original coordinates of a pixel of focal plane k. Coordinates ($x_{k'}$, $y_{k'}$) 5904 indicate the coordinates of a pixel of the focal plane k after transformation (or translation for some embodiments) but before scaling. Coordinates ($x_{k'}$, $y_{k'}$) 5904 are shown on a focal plane $F_N$ for an example left eye viewpoint of three focal planes. FIGS. 59A to 59C show focal planes $F_1$, $F_2$, ..., $F_N$ for an example of N equal to three.

FIG. 59B shows an MFP configuration 5930 for axial motion of a viewer moving closer to the MFP stack. The viewer moves axially, shown by the motion vector $d_z$ 5932. The left eye viewpoint of the three focal planes shows that each focal plane is bigger in FIG. 59B than in FIG. 59A. The left eye viewpoint is translated due to the viewer moving closer to the MFP stack.

FIG. 59C shows an MFP configuration 5960 for focal plane transformations that approximate axial motion without changing focal plane distances. The left eye viewpoint of the three focal planes shows the changes to a pixel's coordinates after transformation. Coordinates ($x_{k''}$, $y_{k''}$) 5962 indicate the coordinates of a pixel of the focal plane k after transformation (or translation for some embodiments) and after scaling.

Keeping the earlier notions for the related parameters, and denoting coordinates of a pixel on focal plane k after scaling transformation by ($x_{k''}$, $y_{k''}$), scaling may be stated as shown in Eqn. 5:

$$(x_{k''}, y_{k''}) = S(x_{k'}, y_{k'}, d_z, d_e) \quad \text{Eqn. 5}$$

where S is a uniform scaling transformation using each focal plane center as a fixed point.

For axial motion, focal plane sizes may be adjusted to provide a user an illusion of a transformation of the physical space and coordinates via a rendered view of the environment. A focal plane rendering process may not change the accommodation distance if experiencing axial motion parallax. Correspondingly, there is no adjustment of the MFP display's optics or mechanics. This process differs from a real-world case, such that a viewer's accommodation distance changes corresponding to his or her distance from the focused object. However, no VAC is produced, and if the (supported) movements for experiencing motion parallax are small, the lack of accommodation changes does not degrade a users experience of naturalness.

Some embodiments may support a motion parallax effect for a conventional 2D display (instead of or in addition to MFP displays). Use of 2D displays may avoid the complexities of MFP displays but a user may suffer from VAC. Some embodiments may support a 2D display by summing two or more MFPs. Support for 2D displays are described in detail later.

If support for axial movement is provided with support for transversal (sideways) movement and free baseline (free head tilt) motion parallax, realistic 3D motion parallax around a nominal viewpoint using focal plane rendering may be provided without VAC.

In some embodiments, relative motion around a primarily fixed (nominal) viewpoint does not change the viewpoint without receiving new data for the new nominal viewpoint. The viewing setup may be comparable to viewing broadcast content, but the viewing setup disclosed herein in accordance with some embodiments may support user interaction by allowing small movements and corresponding viewpoint/parallax changes (such as 3DOF+ functionality).

Supported user functionality may not affect the nominal or inherent viewpoint of the received content. Small motion parallax may be supported in the same way for each viewing position in a user's environment, for example if the user changes his or her seat or walks around a room. If the user moves, the nominal viewpoint follows his or her average location. For some embodiments, the viewpoint returns to the nominal viewpoint (which may be with a delay after producing motion parallax for some embodiments). Returning to seeing from a nominal viewpoint may be based on manual input by the user and/or an automated policy.

Figure 60:
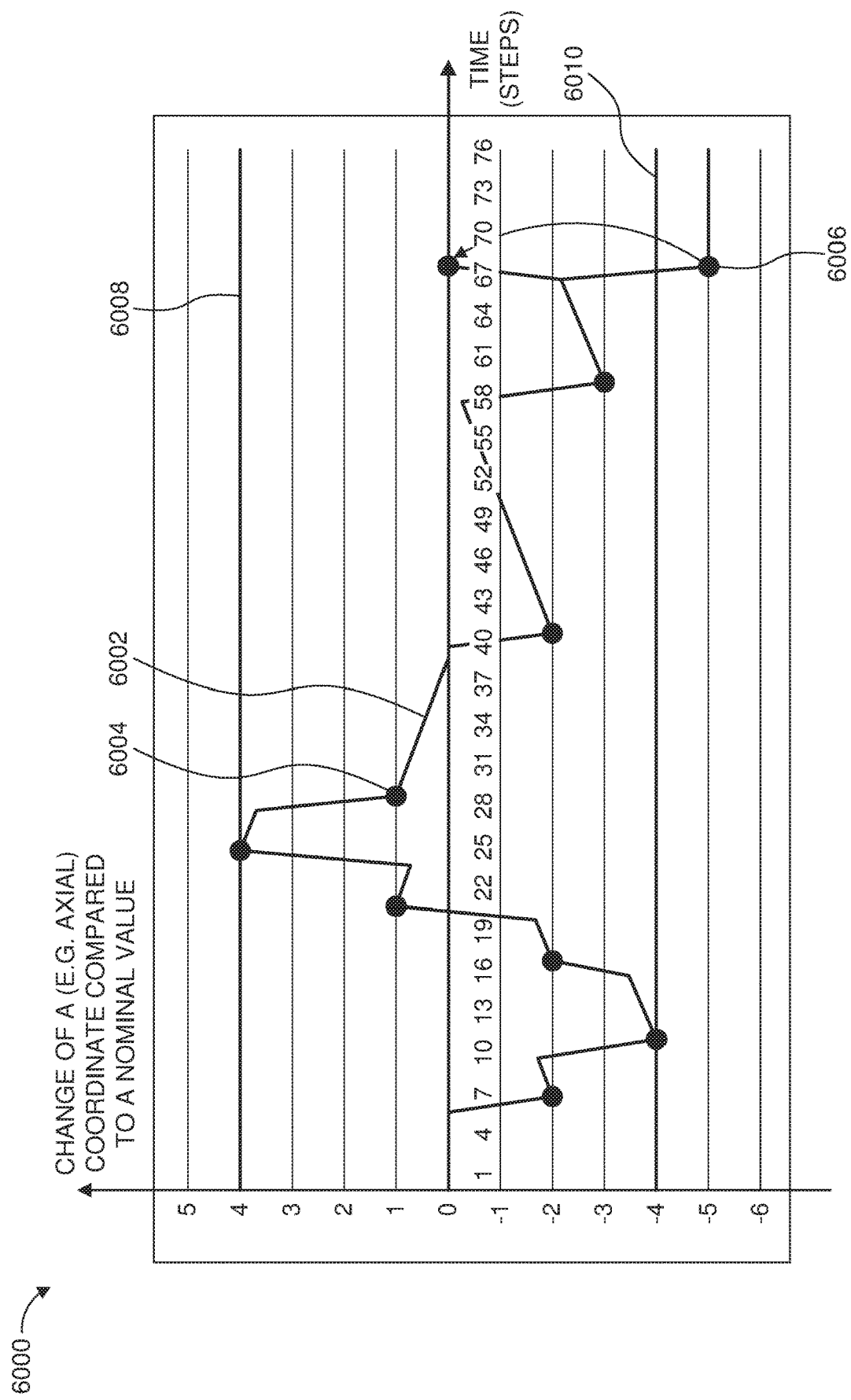
FIG. 60 is a graph showing an example tracking of viewpoint coordinates during user motion according to some embodiments.

FIG. 60 is a graph showing an example tracking of viewpoint coordinates during user motion according to some embodiments. Large position changes may be processed, for example, as a change in user's seating location, and may not be followed by a small adjustment of parallax. Instead, the viewpoint may be returned back to a nominal viewpoint for the received content without any change of parallax. Small motion may be handled with a corresponding virtual viewpoint change. If the small motion changes are more permanent, e.g., a user resting his or her body against a backrest, the nominal viewpoint returns to the nominal viewpoint with some rate of change for some embodiments.

The graph in FIG. 60 illustrates an exemplary control policy for controlling viewpoint coordinates (e.g., axial) during user motion. FIG. 60 shows changes in coordinates compared to a nominal value at different time steps. For the example graph 6000, the zero line represents the nominal value, and the graph's trace has measured difference values 6004 compared to the nominal value. Between time steps 28 and 40 (6002), the coordinate value decreases towards 0. At time step 67 (6006), user movement goes outside the maximum and minimum parallax limits 6008, 6010, and tracking of user movement is reset to zero. A viewpoint control process similar to the example viewpoint control process used in regard to FIG. 60 may be used for each axis (e.g., one axial and two transversal coordinate values) of a coordinate system.

For some embodiments, the coordinates may be saturated to a maximum (or minimum) and letting each coordinate system axis drift towards zero after user motion stops (e.g., after a viewer sits in a different chair). For some embodiments, a users viewpoint may be returned to a nominal viewpoint if user motions go outside maximum and minimum limits and if the user's viewing direction goes outside maximum and minimum limits. For some embodiments, a user changing his or her viewing direction appears as transversal (x-y) shifts of focal planes, and the user's viewpoint may be returned to a nominal viewpoint after the motion stops or exceeds a maximum or minimum. It will be understood that the process of returning the users viewpoint to a nominal viewpoint may be a manual interaction process, an automated process, or a combination manual and automated process. Applicable policies for controlling 3D motion parallax may be developed in accordance with some embodiments.

For some embodiments, the described process for synthesizing stereoscopic or shifted viewpoints from monoscopic MFP stacks may be extended to other configurations, such as motion parallax using true (e.g., as opposed to synthesized) stereoscopic MFP stacks, motion parallax using synthesized stereoscopic MFP stacks, motion parallax using projection and rendering of MFPs on 2D displays, and MFP formation that is a combination true stereoscopic MFP stacks, synthesized stereoscopic MFP stacks, and MFPs used with 2D displays.

Figure 61:
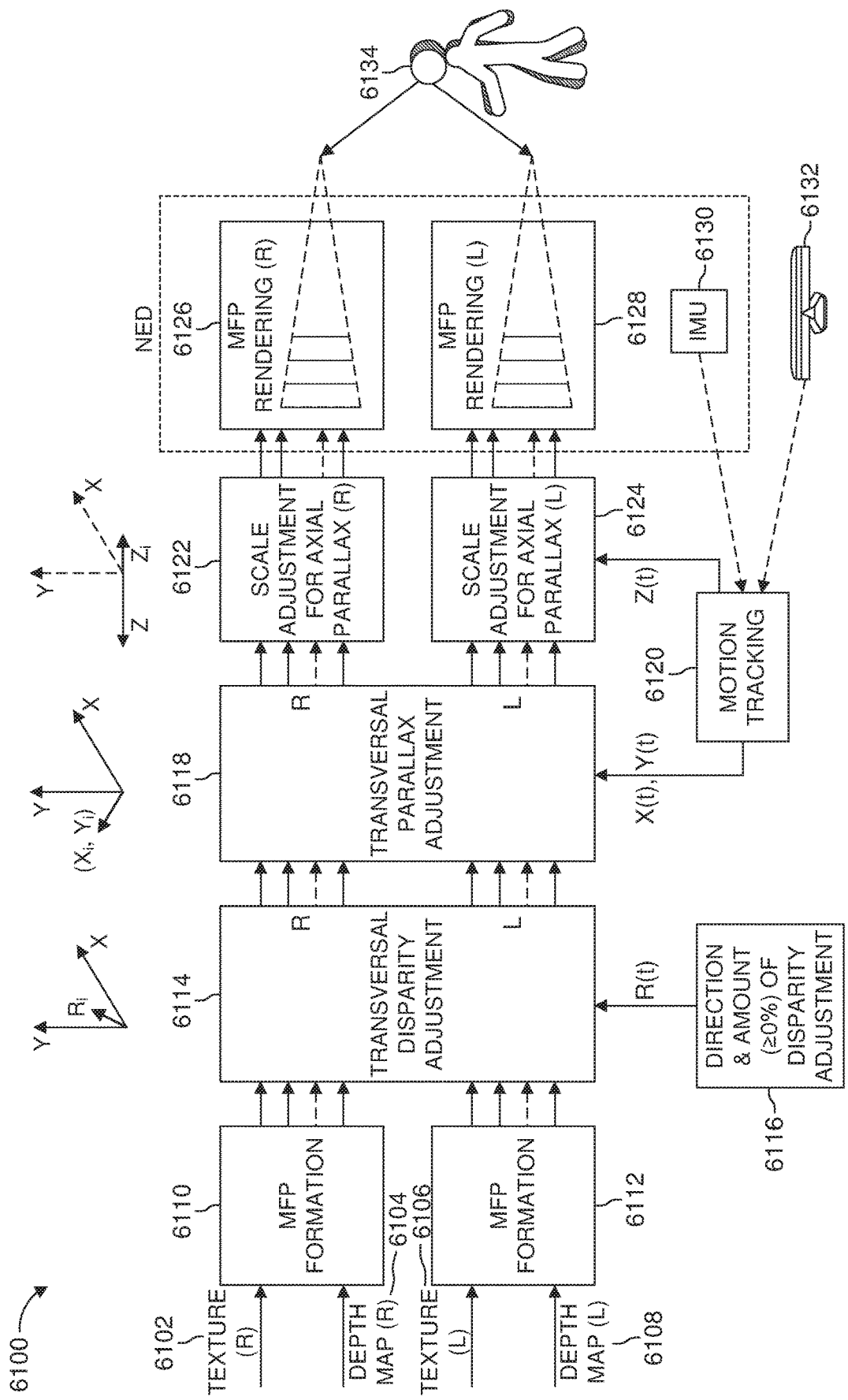
FIG. 61 is a process diagram illustrating an example process for generating a true stereo set of multi-focal planes according to some embodiments.

FIG. 61 is a process diagram illustrating an example process for generating a true stereo set of multi-focal planes according to some embodiments. FIG. 61 shows a motion parallax MFP generation and rendering process 6100 using true stereo inputs. A right eye MFP formation process 6110 receives a texture 6102 and a depth map 6104 for the right eye. A left eye MFP formation process 6112 receives a texture 6102 and a depth map 6108 for the left eye. For some embodiments, MFPs for the right and left eyes are sent to a transversal disparity adjustment process 6114. Disparity adjustments for direction and amount (4%) 6116 may be received by the transversal disparity adjustment process 6114 to adjust viewpoint separation of the MFPs. The use of stereoscopic MFP inputs may restrict re-orienting and adjusting of the baseline MFPs. Rendering of MFPs are anchored to a position and direction in space. Adjusted MFPs for left and right eyes are sent to a transversal parallax adjustment process 6118. A motion tracking process 6120 may send user motion data to the transversal parallax adjustment process 6118 and to scale adjustment for axial parallax processes 6122, 6124. Motion data may be expressed as x(t) and y(t) data captured with respect to a nominal viewpoint and direction for the MFPs anchored in space. For some embodiments, for example, an inertial motion unit (IMU) 6130 and/or a Kinect-type unit 6132 may be used to measure motion data. The transversal parallax adjustment process 6118 may translate MFPs for transversal motion parallax (e.g., horizontal viewpoint changes for parallax). Focal planes may be scaled with respect to each other for axial parallax from the new viewpoint. Transversal parallax adjusted MFPs for right and left eyes may be received by the scale adjustment for axial parallax processes 6122, 6124. Scaled MFPs for the right eye may be received by an MFP rendering process 6126. Likewise, scaled MFPs for the left eye may be received by an MFP rendering process 6128. The MFPs are rendered and displayed for the new viewpoint/perspective for true stereoscopic viewing by the user 6134. For some embodiments, synthesized motion parallax may include scaling multi-focal planes relative to each other using information indicating axial motion of the user/viewer (such as motion tracking data).

Figure 62:
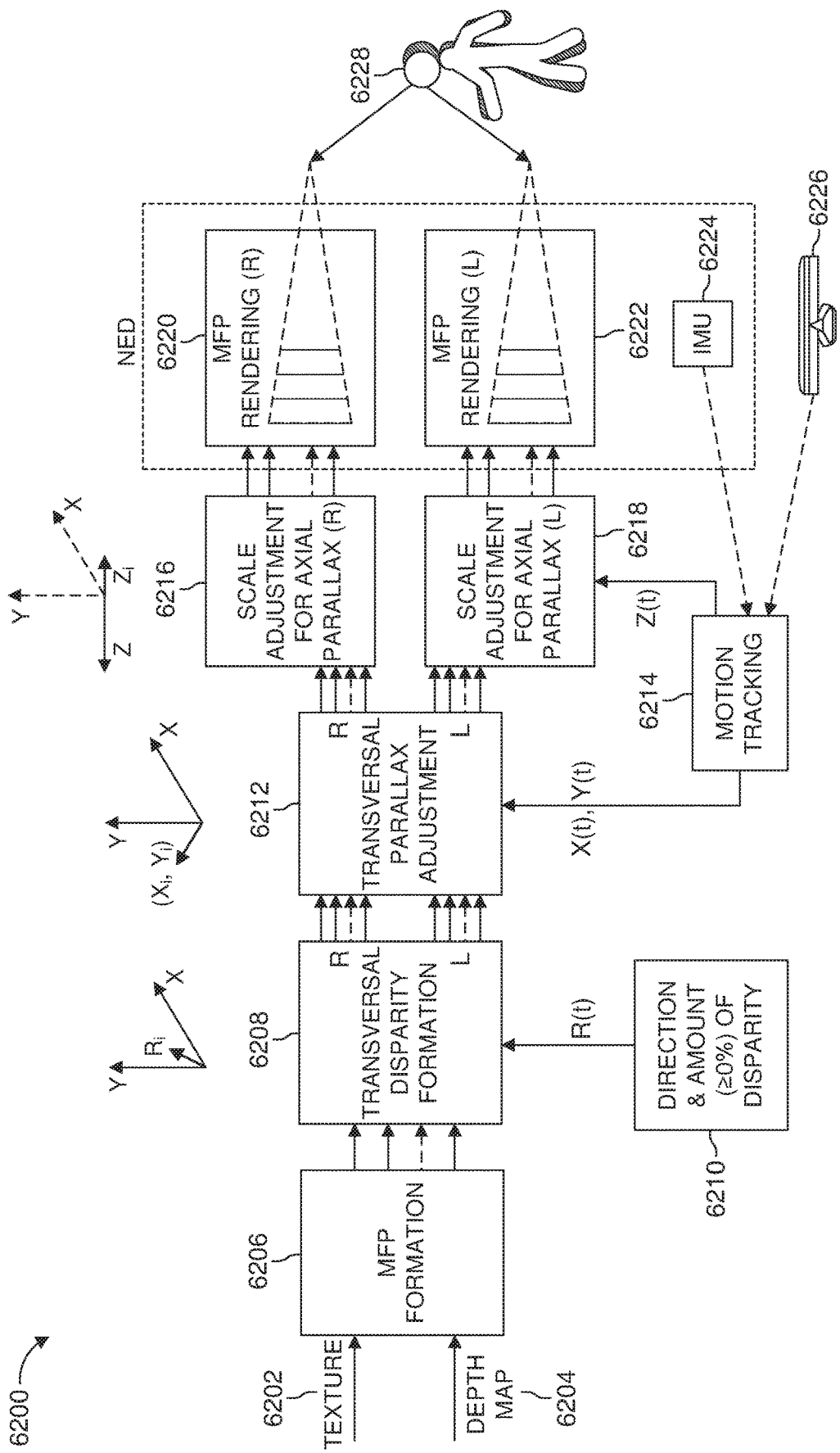
FIG. 62 is a process diagram illustrating an example process for generating a synthesized stereo set of multi-focal planes according to some embodiments.

FIG. 62 is a process diagram illustrating an example process for generating a synthesized stereo set of multi-focal planes according to some embodiments. FIG. 62 shows a motion parallax MFP generation and rendering process 6200 for generating synthesized stereo MFP stacks. An MFP formation process 6206 receives a texture 6202 and a depth map 6204 for a monoscopic view. MFPs are sent to a transversal disparity formation process 6208. Disparity adjustments for direction and amount (0%) 6210 may be received by the transversal disparity adjustment process

6208 to adjust viewpoint separation of the MFPs. Rendering of MFPs are anchored to a position and direction in space. The transversal disparity formation process 6208 generates MFPs for the left and right eyes (e.g., with a baseline orientation), which are sent to a transversal parallax adjustment process 6212. For some embodiments, any baseline orientation before transversal or axial viewpoint changes may be selected to support disparity formation. A motion tracking process 6214 may send user motion data to the transversal parallax adjustment process 6212 and to scale adjustment for axial parallax processes 6216, 6218. Motion data may be expressed as x(t) and y(t) data captured with respect to a nominal viewpoint and direction for the MFPs anchored in space. For some embodiments, e.g., an inertial motion unit (IMU) 6224 and/or a Kinect-type unit 6226 may be used to measure motion data. The transversal parallax adjustment process 6212 may translate MFPs for transversal motion parallax (e.g., horizontal viewpoint changes for parallax). Focal planes may be scaled with respect to each other for axial parallax from the new viewpoint. Transversal parallax adjusted MFPs for right and left eyes may be received by the scale adjustment for axial parallax processes 6216, 6218. Scaled MFPs for the right eye may be received by an MFP rendering process 6220. Likewise, scaled MFPs for the left eye may be received by an MFP rendering process 6222. The MFPs are rendered and displayed for the new viewpoint/perspective for synthesized stereoscopic viewing by the user 6228. Capturing a monoscopic view may use less bandwidth in transmission. Further, if synthesizing two viewpoints in the receiver, the two viewpoints may be formed at a selected baseline orientation and an amount of disparity and supporting stereopsis for any head tilt and personal preferences for depth perception. Some artefacts may be generated in synthesizing the views, but these artefacts may be reduced by using redistribution and/or extension of focal planes.

Figure 63:
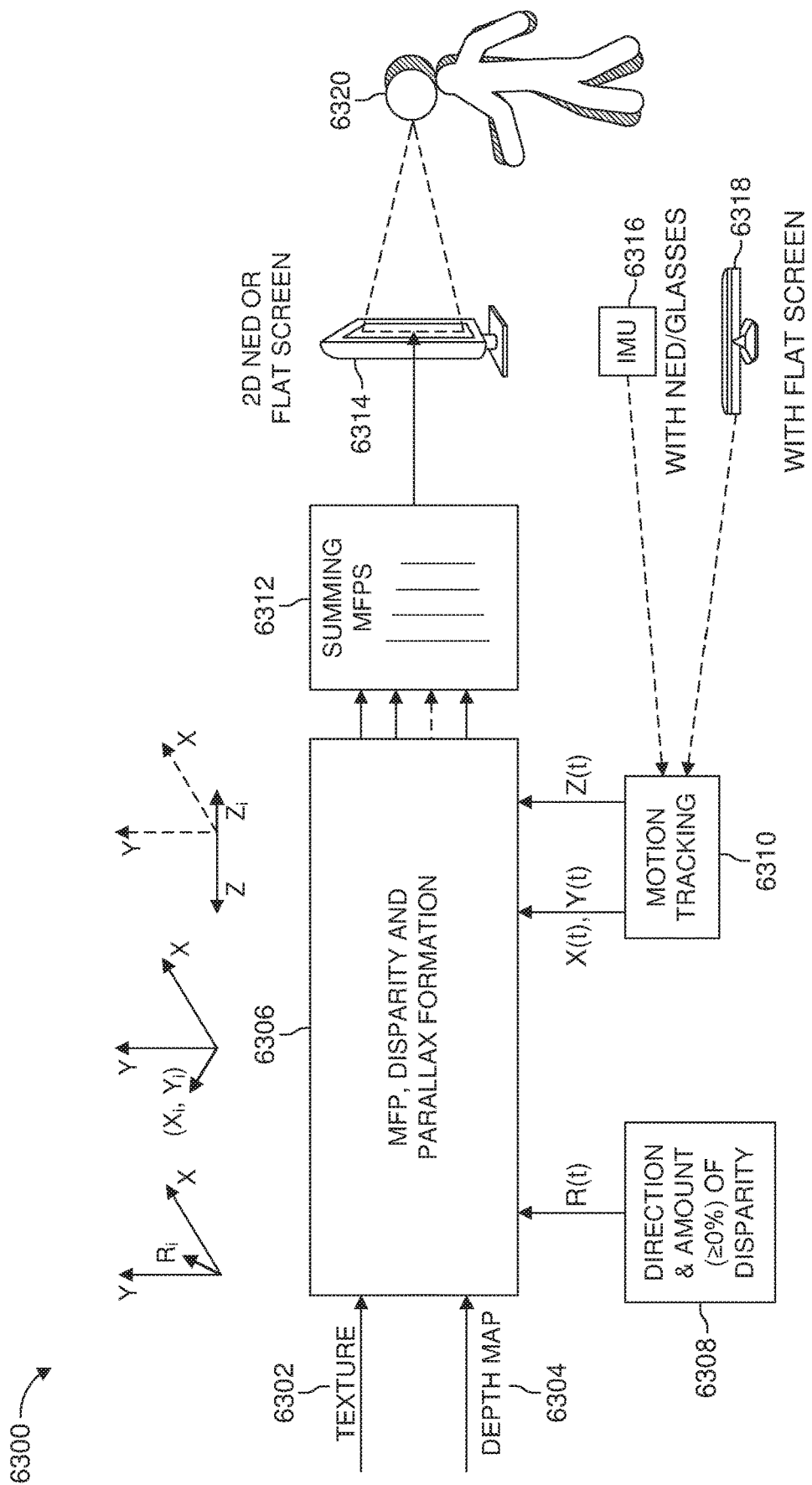
FIG. 63 is a process diagram illustrating an example process for generating and summing a set of multi-focal planes for a two-dimensional display according to some embodiments.

FIG. 63 is a process diagram illustrating an example process for generating and summing a set of multi-focal planes for a two-dimensional display according to some embodiments. FIG. 63 shows a motion parallax MFP generation and rendering process 6300 for generating and summing MFP stacks for a 2D display. An MFP, disparity, and parallax formation process 6306 receives a texture 6302 and a depth map 6304 for a monoscopic view. Disparity adjustments for direction and amount (≥0%) 6308 may be received by the MFP, disparity, and parallax formation process 6306 to adjust viewpoint separation of the MFPs. MFPs may be generated relative to a position and direction in space. A motion tracking process 6310 may send user motion data to the MFP, disparity, and parallax formation process 6306. Motion data may be expressed as x(t), y(t), and z(t) data captured with respect to a nominal viewpoint and direction for the MFPs anchored in space. For some embodiments, e.g., an inertial motion unit (IMU), e.g., with near-eye display (NED) glasses 6316 and/or a Kinect-type unit, e.g., with a flat screen 6318 may be used to measure motion data. For some embodiments, the MFP, disparity, and parallax formation process 6306 may perform one or more of the following processes, including: forming MFPs, adjusting MFPs for transversal disparity, adjusting MFPs for transversal motion parallax (horizontal viewpoint changes for parallax), and scaling for axial parallax. Focal planes may be scaled with respect to each other for axial parallax from the new viewpoint. The MFPs are summed by a summing MFPs process 6312. The summed MFPs are rendered and displayed by a 2D NED or flat screen 6314 for viewing by the user 6320. For some embodiments, a 2D display may lack support for natural accommodation but show a motion parallax effect that follows user motions. For some embodiments, a stereoscopic three dimension (S3D) display may be used to render and display the summed MFPs.

Figure 64:
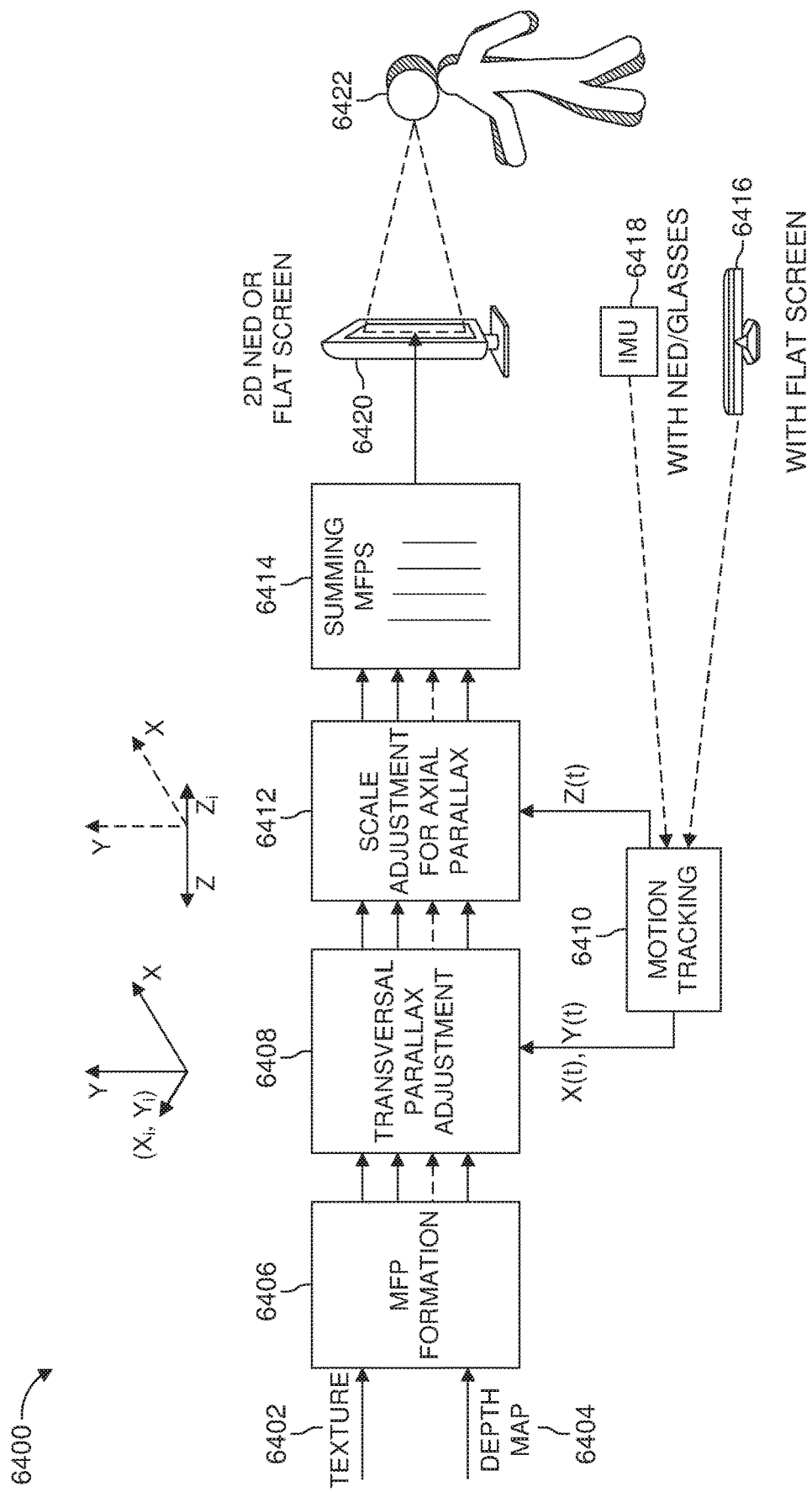
FIG. 64 is a process diagram illustrating an example process for generating and summing a set of multi-focal planes for a monocular 2D display according to some embodiments.
Figure 65:
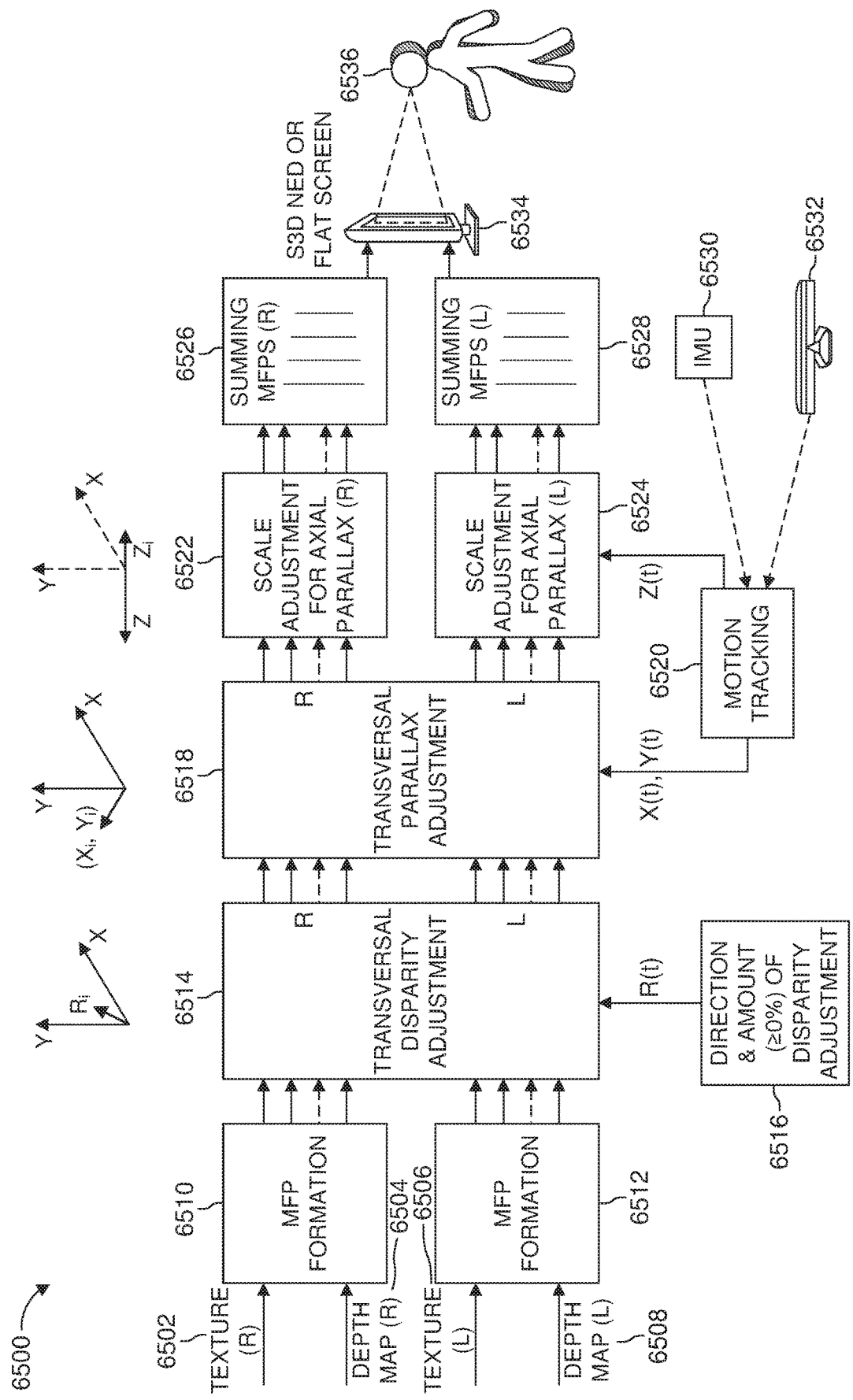
FIG. 65 is a process diagram illustrating an example process for generating and summing a set of multi-focal planes for a true stereo stereoscopic three-dimensional (S3D) display according to some embodiments.
Figure 66:
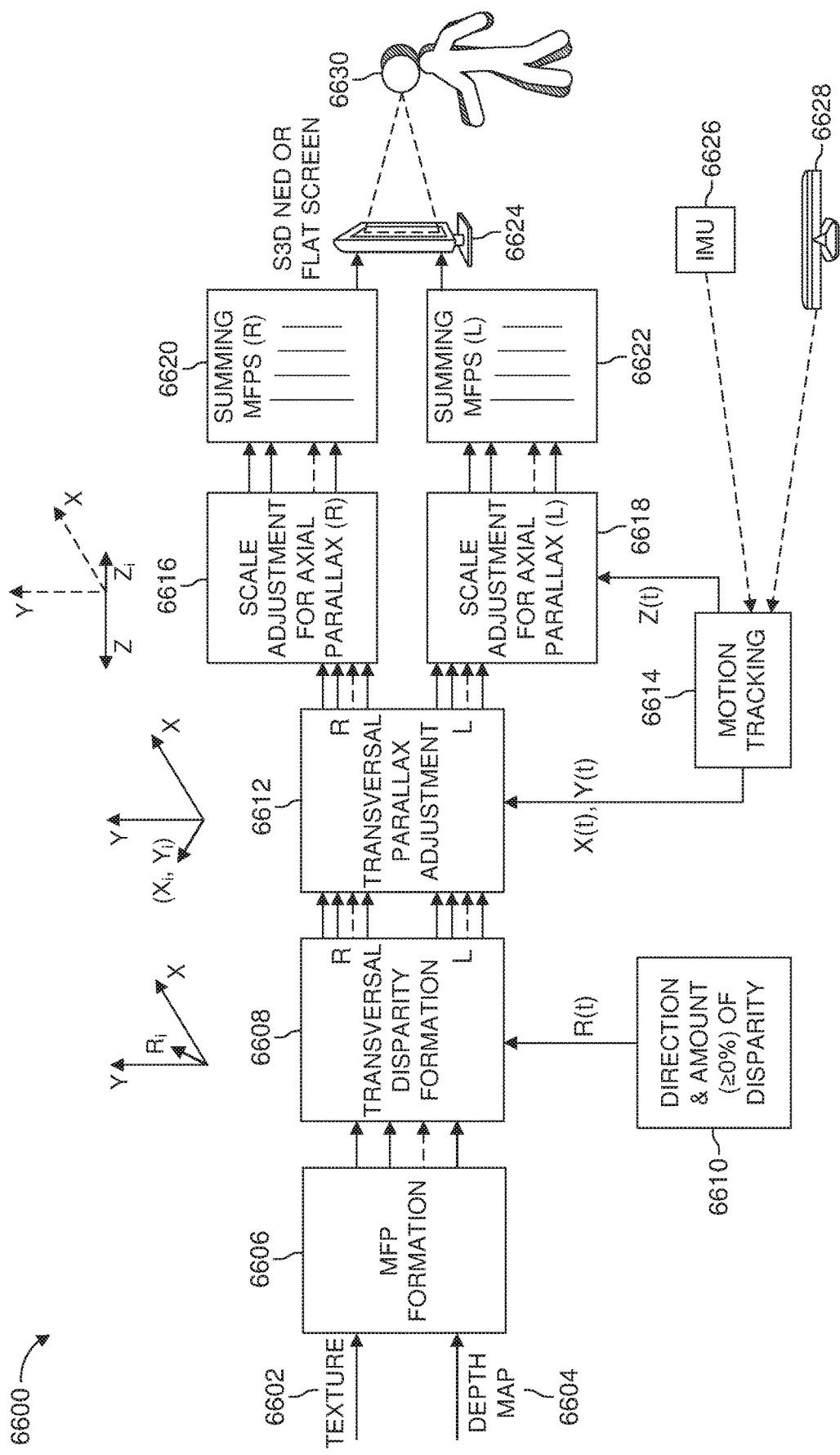
FIG. 66 is a process diagram illustrating an example process for generating and summing a set of multi-focal planes for a synthesized stereo stereoscopic three-dimensional (S3D) display according to some embodiments.

FIGS. 64, 65, and 66 illustrate some embodiments for projecting and summing MFPs to a 2D display. FIG. 64 is a process diagram illustrating an example process for generating and summing a set of multi-focal planes for a monocular 2D display according to some embodiments. FIG. 64 shows a motion parallax MFP generation and summing process 6400. An MFP formation process 6406 receives a texture 6402 and a depth map 6404 for a monoscopic view. MFPs are sent to a transversal parallax adjustment process 6408. Adjusted MFPs are sent to a transversal parallax adjustment process 6408. A motion tracking process 6410 may send user motion data to the transversal parallax adjustment process 6408 and to a scale adjustment for axial parallax process 6412. Motion data may be expressed as x(t) and y(t) data captured with respect to a nominal viewpoint and direction for the MFPs anchored in space. For some embodiments, an inertial motion unit (IMU) 6418 and/or a Kinect-type unit 6416 may be used to measure motion data. The transversal parallax adjustment process 6408 may translate MFPs for transversal motion parallax (horizontal viewpoint changes for parallax). Focal planes may be scaled with respect to each other for axial parallax from the new viewpoint. Transversal parallax adjusted MFPs may be received by the scale adjustment for axial parallax process 6412 for scaling of the MFPs. Scaled MFPs may be received by a summing MFPs process 6414. The MFPs are summed by a summing MFPs process 6414. The summed MFPs are rendered and displayed by a 2D NED or flat screen 6420 (monocular 2D display) for viewing by a user 6422.

FIG. 65 is a process diagram illustrating an example process for generating and summing a set of multi-focal planes for a true stereo stereoscopic three-dimensional (S3D) display according to some embodiments. In some embodiments, baseline changes may be supported with limitations for a true stereoscopic 3D input. The input stereoscopic viewpoint (e.g., baseline orientation) may impart some restrictions to later viewpoint changes (e.g., transversal or axial changes). FIG. 65 shows a motion parallax MFP generation and summing process 6500 using true stereo inputs. A right eye MFP formation process 6510 receives a texture 6502 and a depth map 6504 for the right eye. A left eye MFP formation process 6512 receives a texture 6502 and a depth map 6508 for the left eye. For some embodiments, MFPs for the right and left eyes are sent to a transversal disparity adjustment process 6514. Disparity adjustments for direction and amount (≥0%) 6516 may be received by the transversal disparity adjustment process 6514 to adjust viewpoint separation of the MFPs. The use of stereoscopic MFP inputs may restrict re-orienting and adjusting of the baseline MFPs. MFPs may be generated relative to a position and direction in space. Adjusted MFPs for left and right eyes are sent to a transversal parallax adjustment process 6518. A motion tracking process 6520 may send user motion data to the transversal parallax adjustment process 6518 and to scale adjustment for axial parallax processes 6522, 6524. Motion data may be expressed as x(t) and y(t) data captured with respect to a nominal viewpoint and direction for the MFPs anchored in space. For some embodiments, an inertial motion unit (IMU) 6530 and/or a Kinect-type unit 6532 may be used to measure motion data. The transversal parallax adjustment process 6518 may translate MFPs for transversal motion parallax (horizontal viewpoint changes for parallax). Focal planes may be scaled with respect to each other for axial parallax from the new viewpoint. Transversal parallax adjusted MFPs for right and left eyes may be received by the scale adjustment for axial parallax processes 6522, 6524. Scaled MFPs for the right eye may be received by a summing MFPs process 6526 for the right eye. The MFPs for the right eye are summed by the summing MFPs process 6526 for the right eye. Likewise, scaled MFPs for the left eye may be received by a summing MFPs process 6528 for the left eye. The MFPs for the left eye are summed by the summing MFPs process 6528 for the left eye. The summed MFPs for both the right and left eyes are sent to a 2D NED or flat screen 6534 (monocular 2D display) for rendering and displaying to a user 6536.

FIG. 66 is a process diagram illustrating an example process for generating and summing a set of multi-focal planes for a synthesized stereo stereoscopic three-dimensional (S3D) display according to some embodiments. FIG. 66 shows a motion parallax MFP generation and summing process 6600. An MFP formation process 6606 receives a texture 6602 and a depth map 6604 for a monoscopic view. MFPs are sent to a transversal disparity formation process 6608. Disparity adjustments for direction and amount (≥0%) 6610 may be received by the transversal disparity adjustment process 6608 to adjust viewpoint separation of the MFPs. MFPs may be generated relative to a position and direction in space. The transversal disparity formation process 6608 generates MFPs for the left and right eyes, which are sent to a transversal parallax adjustment process 6612. A motion tracking process 6614 may send user motion data to the transversal parallax adjustment process 6612 and to scale adjustment for axial parallax processes 6616, 6618. Motion data may be expressed as x(t) and y(t) data captured with respect to a nominal viewpoint and direction for the MFPs anchored in space. For some embodiments, an inertial motion unit (IMU) 6626 and/or a Kinect-type unit 6628 may be used to measure motion data. The transversal parallax adjustment process 6612 may translate MFPs for transversal motion parallax (horizontal viewpoint changes for parallax). Focal planes may be scaled with respect to each other for axial parallax from the new viewpoint. Transversal parallax adjusted MFPs for right and left eyes may be received by the scale adjustment for axial parallax processes 6616, 6618. Scaled MFPs for the right eye may be received by a summing MFPs process 6620 for the right eye. The MFPs for the right eye are summed by the summing MFPs process 6620 for the right eye. Likewise, scaled MFPs for the left eye may be received by a summing MFPs process 6622 for the left eye. The MFPs for the left eye are summed by the summing MFPs process 6622 for the left eye. The summed MFPs for both the right and left eyes are sent to an S3D NED or flat screen 6624 for rendering and displaying to a user 6630. Support for a motion parallax effect with 2D display data may be provided by summing MFPs to generate 2D display data that may be displayed by external stereoscopic or monoscopic displays.

For some embodiments using monoscopic displays, an external motion tracking sensor may be used to track user motions, and users may not be wearing shutter glasses. For some embodiments using stereoscopic three-dimensional (S3D) displays, a sensor (e.g., an IMU) for tracking user motions may be embedded in shutter glasses or alike. For some embodiments using S3D displays, some vergence-accommodation (VAC) mismatch may be produced. If the viewing distance is long compared to the display size (cf. normal viewing distances to a stereoscopic TV, for example), this mismatch is small. For some embodiments, displaying of oriented focal plane images may include combining (such as summing) shifted focal plane images to generate a stereoscopic image pair.

Figure 67:
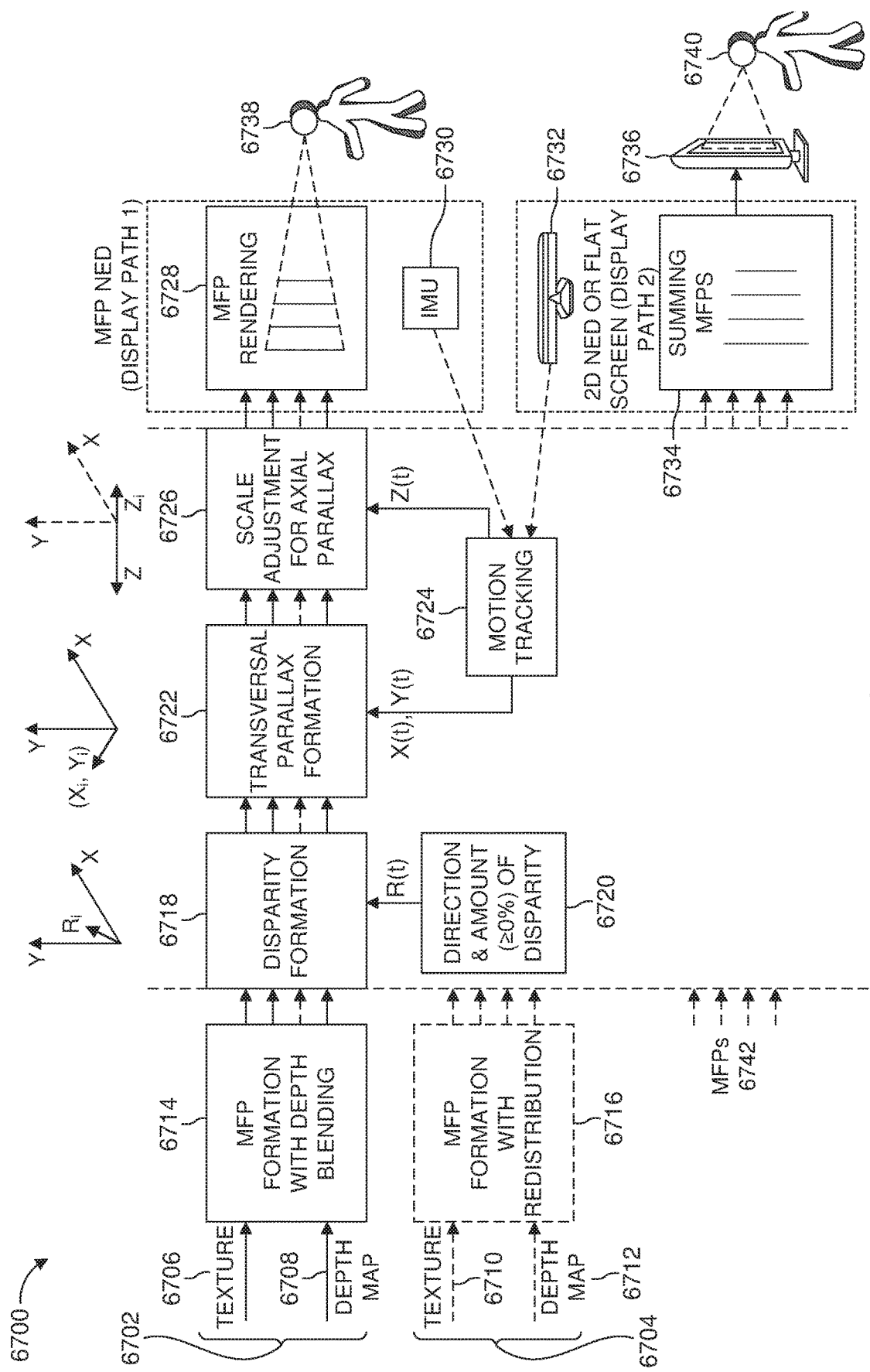
FIG. 67 is a process diagram illustrating an example process for generating multi-focal planes with front-end processing paths and display-end paths according to some embodiments.

FIG. 67 is a process diagram illustrating an example process for generating multi-focal planes with front-end processing paths and display-end paths according to some embodiments. FIG. 67 shows a motion parallax MFP generation and summing process 6700 using true stereo inputs. For some embodiments of a front-end process 6702, a texture 6706 and a depth map 6708 may be received by an MFP formation with depth blending process 6714. MFPs may be generated using depth blending (weighting) to reduce quantization effects of MFPs in the depth dimension as described earlier. For some embodiments of a front-end process 6704, a texture 6710 and a depth map 6712 may be received by an MFP formation with redistribution process 6716. MFPs may be generated using MFP redistribution as described earlier.

For some embodiments, depth blended and/or redistributed MFPs may be sent to a disparity formation process 6718. Disparity adjustments for direction and amount (≥0%) 6720 may be received by the disparity formation process 6718 to adjust viewpoint separation of the MFPs. Adjusted MFPs may be sent to a transversal parallax formation process 6722. A motion tracking process 6724 may send user motion data to the transversal parallax formation process 6722 and to a scale adjustment for axial parallax process 6726. Motion data may be expressed as x(t) and y(t) data captured with respect to a nominal viewpoint and direction for the MFPs anchored in space. For some embodiments, an inertial motion unit (IMU) 6730 and/or a Kinect-type unit 6732 may be used to measure motion data. The transversal parallax formation process 6722 may translate MFPs for transversal motion parallax (horizontal viewpoint changes for parallax). The scale adjustment for axial parallax process 6726 may receive translated MFPs for scaling. Focal planes may be scaled with respect to each other for axial parallax from the new viewpoint. For some embodiments, the front-end may include direct input of focal planes 6742 (e.g., without a depth map) formed with a known method, such as a method disclosed in Narain, and one or more of the processing stages 6718, 6720, 6722, 6724, 6726 may be used as described above.

For some embodiments of a display path 1, scaled MFPs may be received by an MFP rendering process 6728 for displaying to a user 6738. For some embodiments of a display path 2, scaled MFPs may be received by a summing MFPs process 6734 for summing the received MFPs. Summed MFPs may be received by a 2D NED or flat screen display 6736 for rendering and displaying the content to a user 6740.

FIGS. 68A-68J are illustrations showing an example series of right and left images for axial movement between each set image pairs (e.g., FIGS. 68C and 68D) according to some embodiments. FIGS. 68A-68J show a series of crossed-eyes stereograms during axial motion, using the arrangement shown in FIG. 58, and the focal plane size adjustment process described above. FIGS. 68A to 68J are modified versions of an image and its depth map found on the webpage File:2D plus depth.png, WIKIPEDIA, //commons.wikimedia.org/w/index.php?curid=5489771 (last accessed Feb. 22, 2019). Three MFPs with linear depth blending are used for the example sequence of FIGS. 68A to 69J. A unit size of 2 pixels is used for image scaling adjustments. The test image used is a flower with a resolution of 157×436 pixels. For low resolution focal plane images, a user may find a unit size of 2 pixels to be reasonable. Higher resolution focal plane images may use a larger unit size.

After forming a monocular MFP stack, stereoscopic disparity is synthesized by shifting the focal planes horizontally. For the example sequence of crossed-eye stereograms, the three planes from back to front (back, mid, and front) are shifted, respectively, by 0, 2, and 4 pixels. Shifting is made to the right for the left eye view 6810, 6830, 6850, 6870, 6890, and to the left for the right eye view 6800, 6820, 6840, 6860, 6880. The total synthesized disparity corresponds to 1.8% of the image width. After shifting for stereoscopic disparity, the focal planes are scaled for creating axial motion parallax, as illustrated in FIG. 67. Viewing top to bottom the sequence in FIGS. 68A to 68J corresponds to moving further away from the scene. All views in FIGS. 68A to 68J are formed by shifts from one monoscopic MFP stack. Transversal parallax is not illustrated in the example.

Applying the exemplary procedure described above for the scaling of a three focal plane test images, the vertical resolution heights listed in Tables 1 and 2 are obtained for five axial motions (+2, +1, 0, −1, and −2 steps) centered around the nominal viewing point $d_0$. The actual scaling factors may be obtained by dividing the table values by Vres.

TABLE 1

| | Focal Plane (and Pixel Shift for Disparity) | $d_{+2}$ | $d_{+1}$ | $d_0$ | $d_{-1}$ | $d_{-2}$ |
|---|---|---|---|---|---|---|
| Left | $FP_{back}$ (0 right) | $V_{res}$ | $V_{res}$ | $V_{res}$ | $V_{res}$ | $V_{res}$ |
| | $FP_{mid}$ (2 right) | $V_{res}+4$ | $V_{res}+2$ | $V_{res}$ | $V_{res}-2$ | $V_{res}-4$ |
| | $FP_{front}$ (4 right) | $V_{res}+8$ | $V_{res}+4$ | $V_{res}$ | $V_{res}-4$ | $V_{res}-8$ |

TABLE 2

| | Focal Plane (and Pixel Shift for Disparity) | $d_{+2}$ | $d_{+1}$ | $d_0$ | $d_{-1}$ | $d_{-2}$ |
|---|---|---|---|---|---|---|
| Right | $FP_{back}$ (0 left) | $V_{res}$ | $V_{res}$ | $V_{res}$ | $V_{res}$ | $V_{res}$ |
| | $FP_{mid}$ (2 left) | $V_{res}+4$ | $V_{res}+2$ | $V_{res}$ | $V_{res}-2$ | $V_{res}-4$ |
| | $FP_{front}$ (4 left) | $V_{res}+8$ | $V_{res}+4$ | $V_{res}$ | $V_{res}-4$ | $V_{res}-8$ |

Table 3 shows vertical resolution adjustments relative to an axial position $d_i$. Horizontal resolutions are adjusted to preserve the aspect ratio prior to adjustment. The unit size for scaling is two pixels (corresponding focal plane edges being shifted symmetrically by one pixel). The sizes for both left and right eye views (focal plane images) are the same in the nominal viewpoint d0 (157×436 pixels for this example). During motion, sizes remain unchanged (157×436 pixels) for the furthest focal planes PFback, which is processed as being at infinity.

As shown in Table 3, for axial motion (positions $d_i$), scaling is the same for both the left and right eye focal planes (shifted for disparity). For the original test image, Vres=157 pixels. After scaling, vertical resolutions for both the left and right focal planes (FP1, FP2, FP3) for five different viewpoints are shown in Table 3. Position $d_0$ is the nominal viewpoint.

TABLE 3

| Focal Plane (Left or Right) | $d_{+2}$ | $d_{+1}$ | $d_0$ | $d_{-1}$ | $d_{-2}$ |
|---|---|---|---|---|---|
| $FP_1$ | 157 | 157 | 157 | 157 | 157 |
| $FP_2$ | 161 | 159 | 157 | 155 | 153 |
| $FP_3$ | 165 | 161 | 157 | 153 | 149 |

Figure 68A:
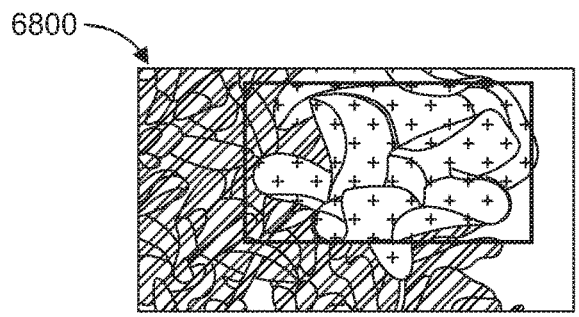
FIGS. 68A-68J are illustrations showing an example series of right and left images for axial movement between each set image pairs (e.g., FIGS. 68C and 68D) according to some embodiments.
Figure 68B:
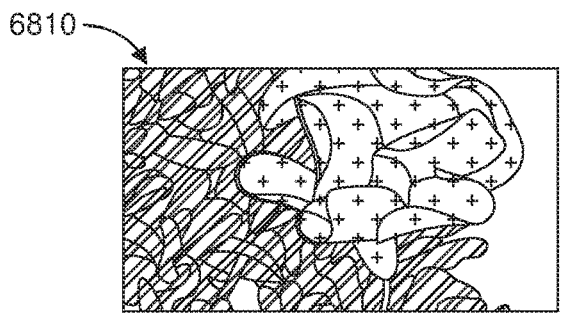
Figure 68C:
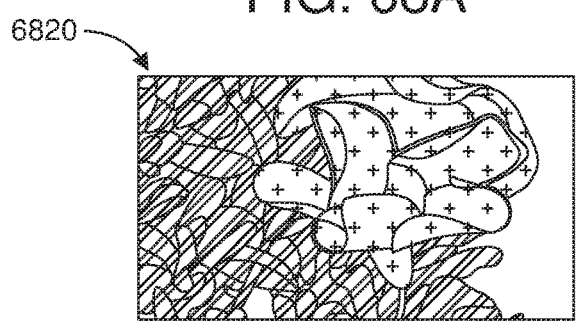
Figure 68D:
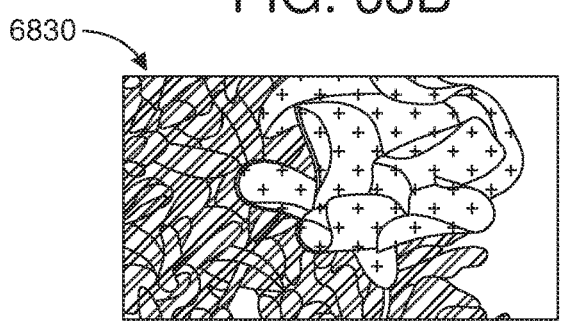
Figure 68E:
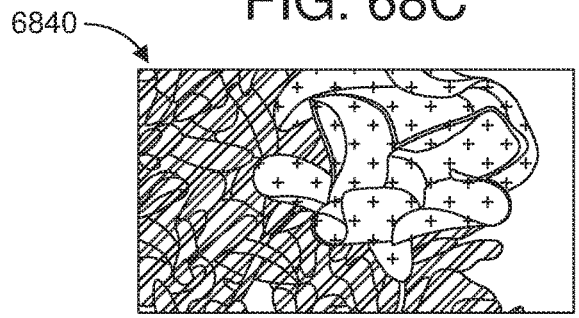
Figure 68F:
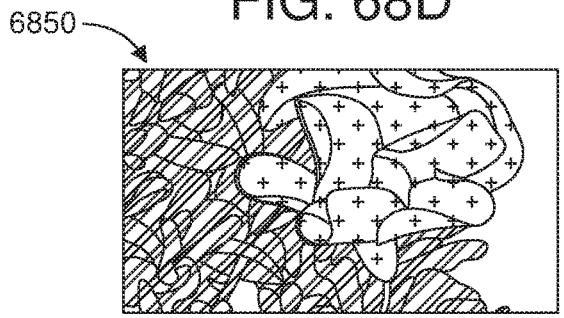
Figure 68G:
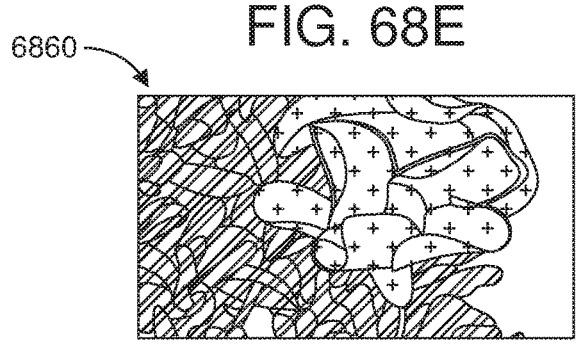
Figure 68H:
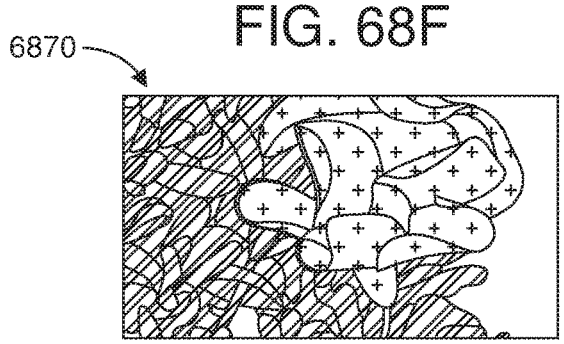
Figure 68I:
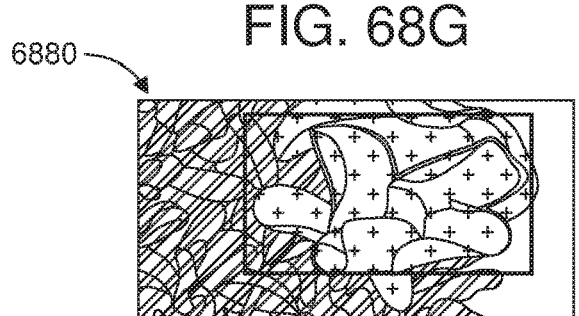
Figure 68J:
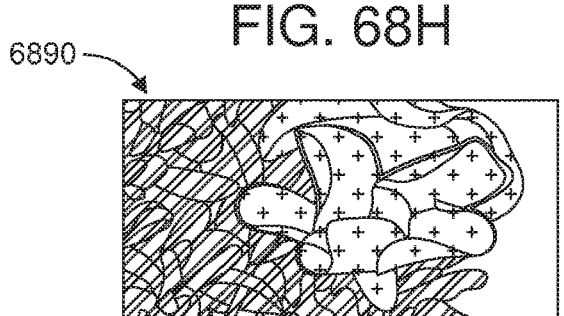

The actual scaling factors for focal plane sizes are obtained by dividing the values in Table 3 by $V_{res}$=157. By applying these scaling values to the three focal planes of the test image, a sequence of cross-eyed stereograms is obtained for axial motion, shown in FIGS. 68A-68J. Viewing top to bottom the sequence in FIGS. 68A to 68J corresponds to moving further away from the scene. A black rectangle is shown in FIGS. 68A and 68I to give a reference for scaling. Each row pair (e.g., FIGS. 68C and 68D) corresponds to a position along the same viewing direction (or axis). FIGS. 68A to 68J demonstrate a motion parallax effect.

The step sizes in the axial direction (physical distances corresponding to each row of FIGS. 68A-68J, such as FIGS. 68C and 68D form a row showing one crossed-eye stereo view of the sequence) may be determined by the resolution and unit size used. The example shows axial parallax (based on scaling of focal planes) of a stereo pair with synthesized disparity (based on shifting focal planes by chosen amounts). Transversal parallax may be created by applying the same (or a similar) transformation as for forming (transversal) disparity. Any 3D motion, combining transversal and axial components, may be determined by applying the transformations (or approximations for some embodiments) used in the example.

If viewing focal planes from a nominal position, the focal planes may all be seen inside the same solid/spatial angle. As the unadjusted focal plane resolutions are the same, one pixel occupies the same solid angle and the focal planes to perceived MFP renderings (or projections, as shown in FIGS. 68A-68J) may be summed. If adjusting the focal plane sizes for synthesized motion parallax, the resolutions and sizes may be adjusted before summing. The pixels may shift by sub-pixel amounts with respect to each other. To make summing of corresponding pixels accurate, interpolation of images may be performed to obtain sub-pixel values.

For the sequence shown in FIGS. 68A-68J, the zero parallax setting for the stereograms and the vanishing point for axial motion parallax is the furthest focal plane. Axial motion parallax may be expanded by adjusting the sizes of all focal planes. This situation corresponds to placing the zero parallax plane behind all of the focal planes and using derived scaling factors for one focal plane lower, e.g., using the scaling factors of $FP_2$ for $FP_1$ as shown in Table 2. The result is a stronger motion parallax effect with smaller user motions.

Figure 69:
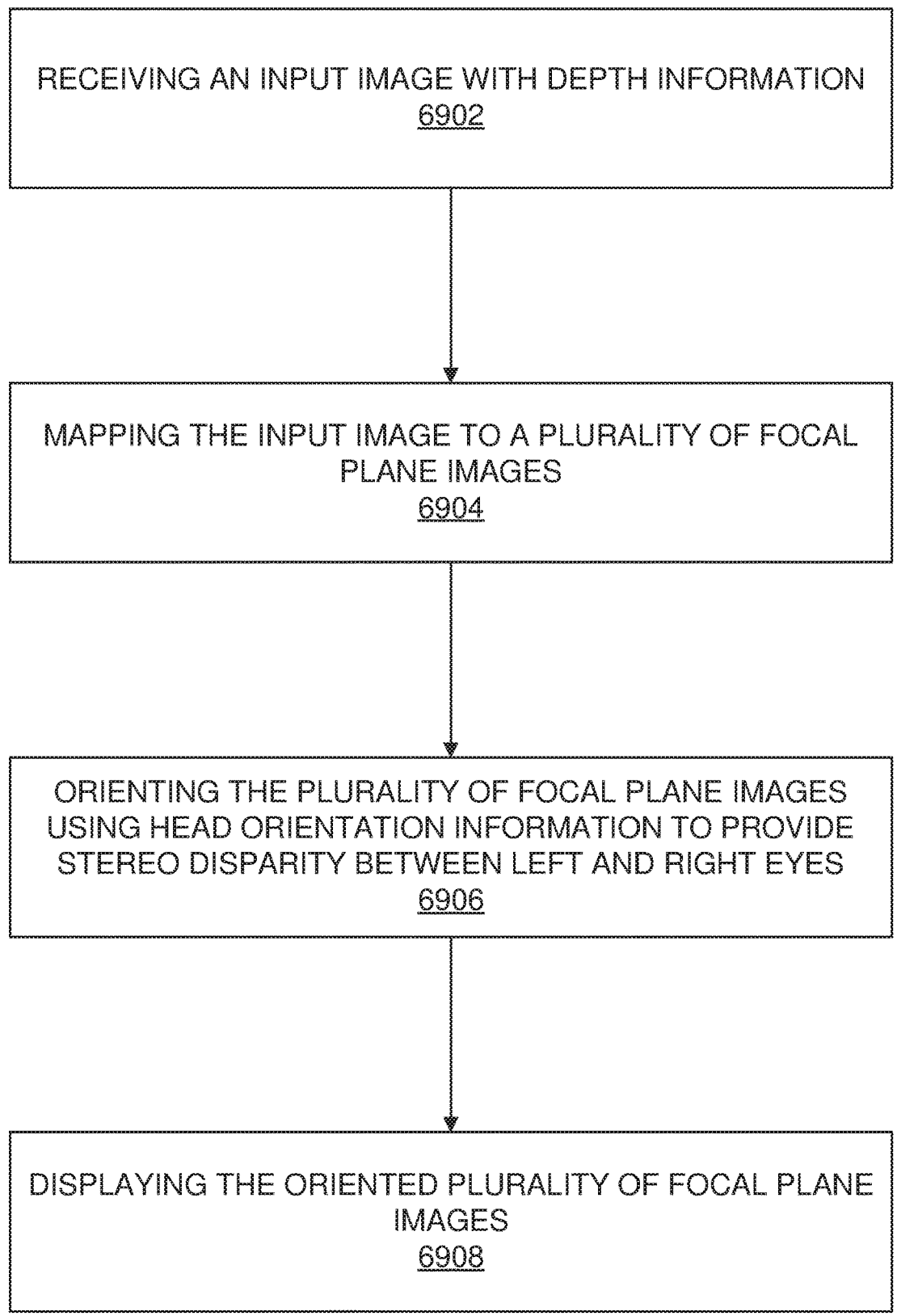
FIG. 69 is a flowchart illustrating an example process according to some embodiments.
Figure 71:
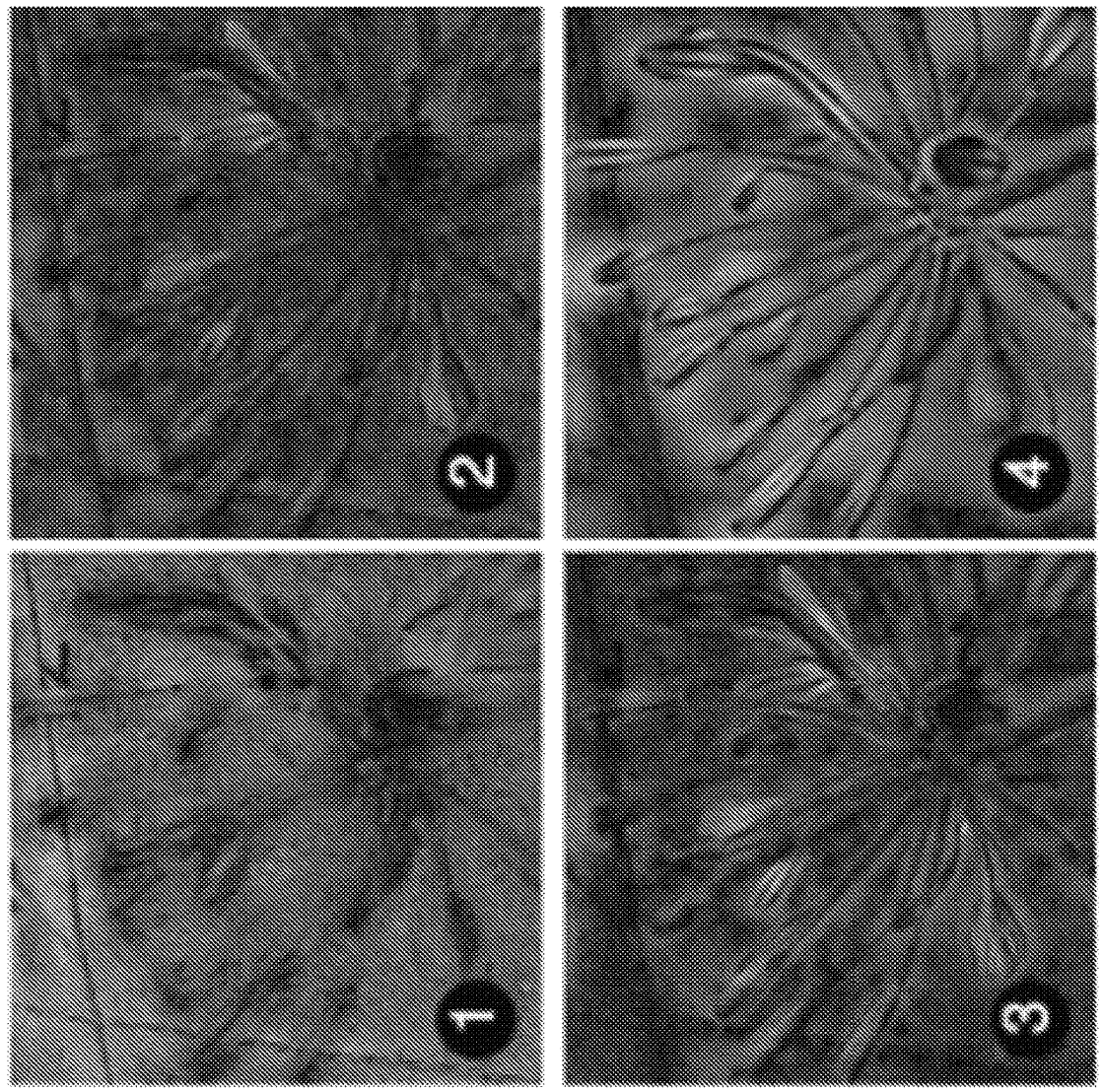
Figure 73:
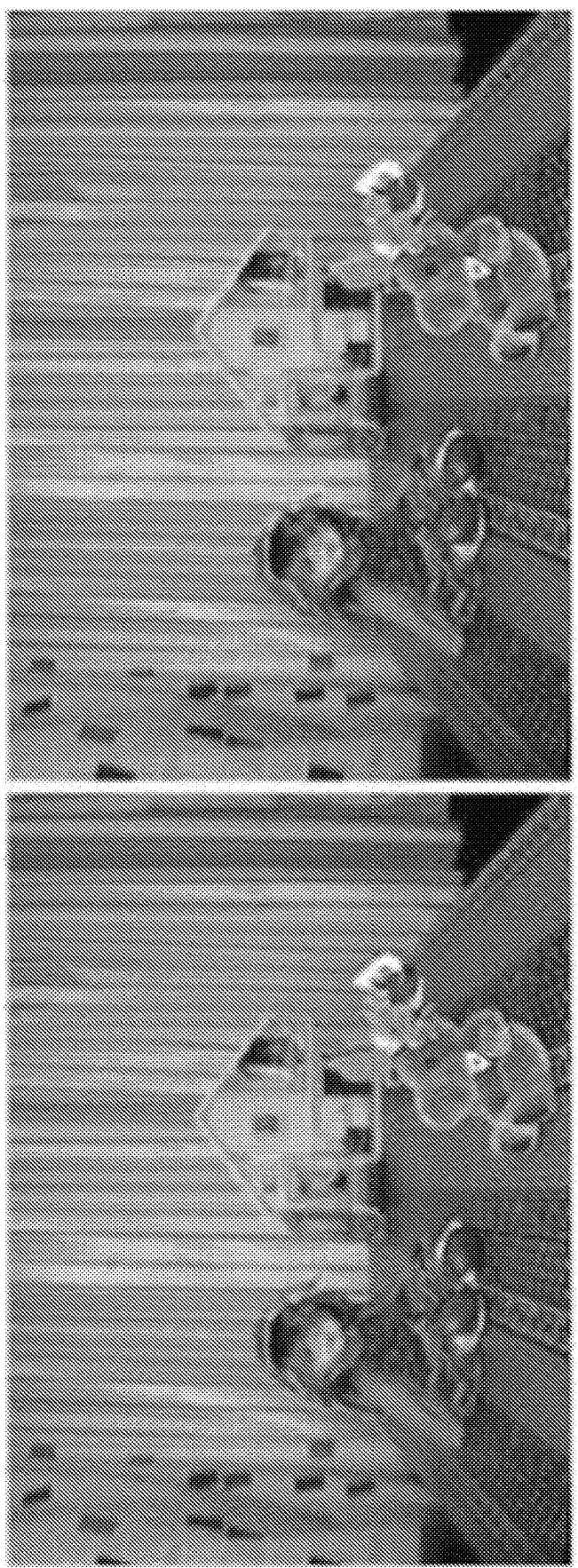
Figure 74:
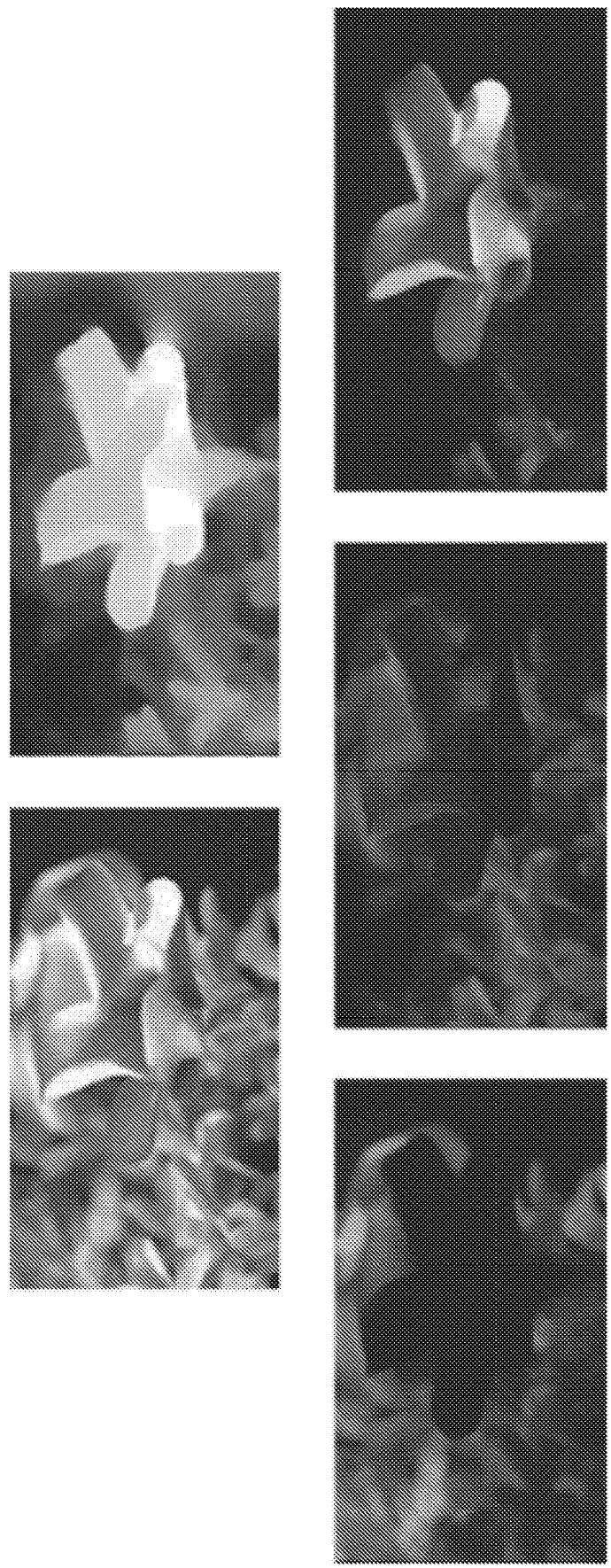
Figure 75:
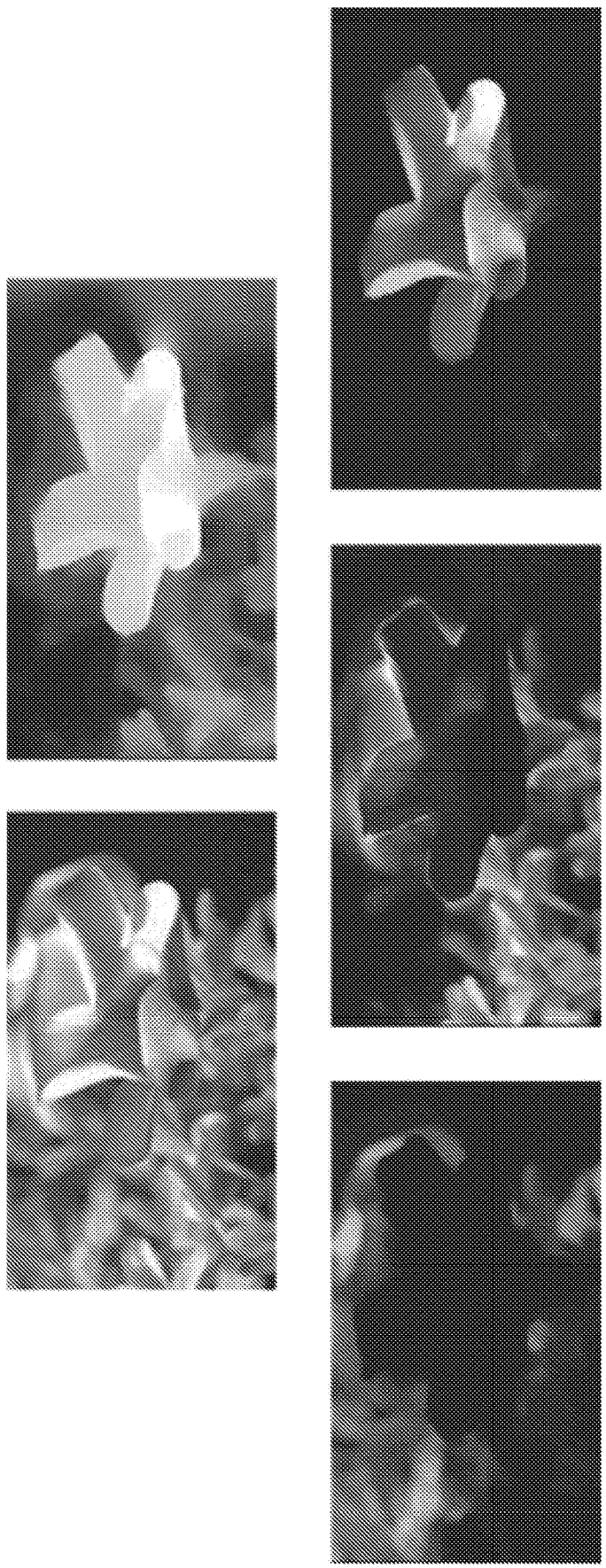
Figure 76:
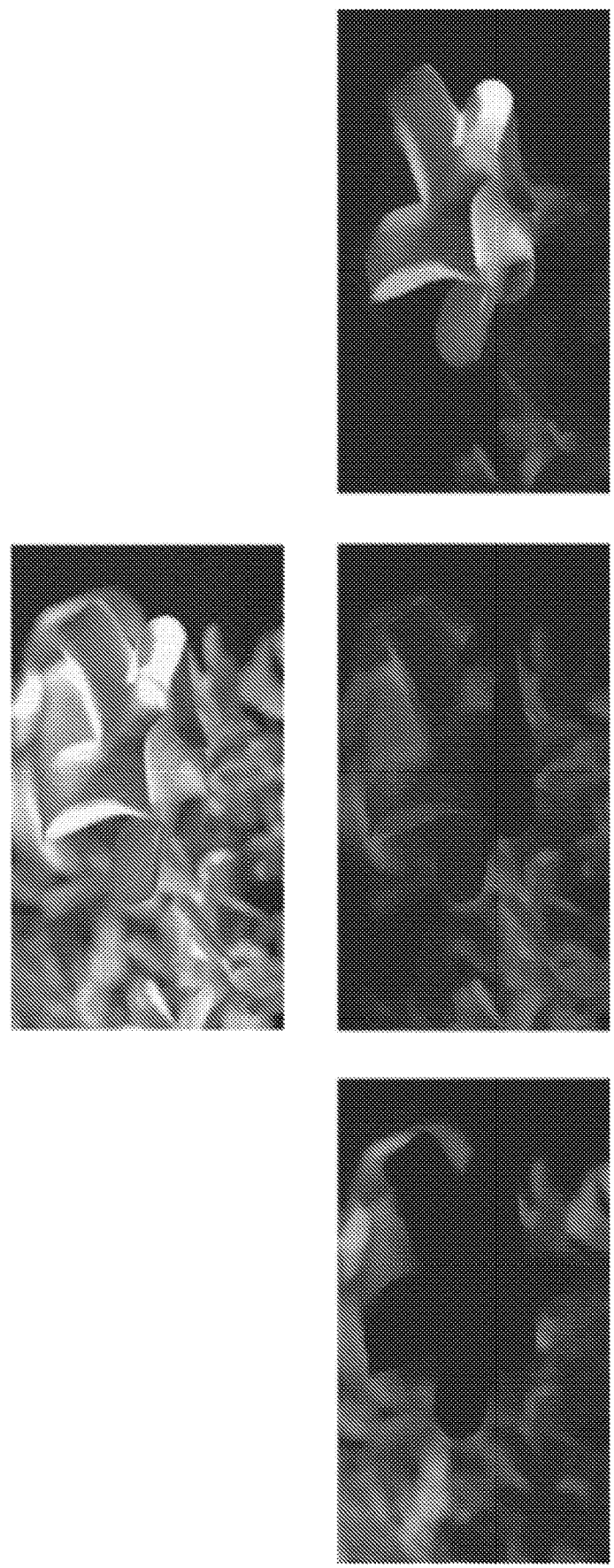
Figure 80:
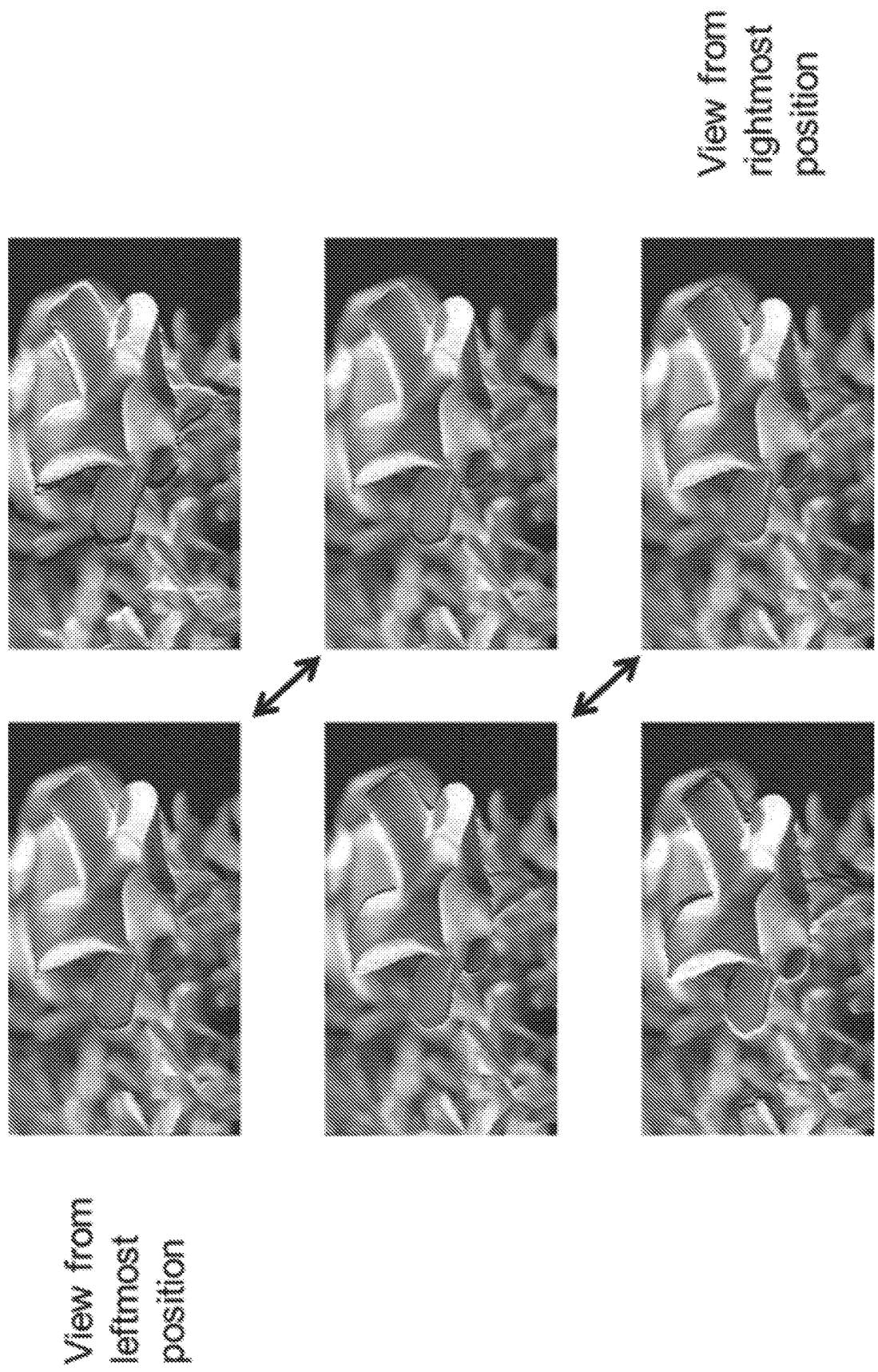
Figure 81:
Figure 83:
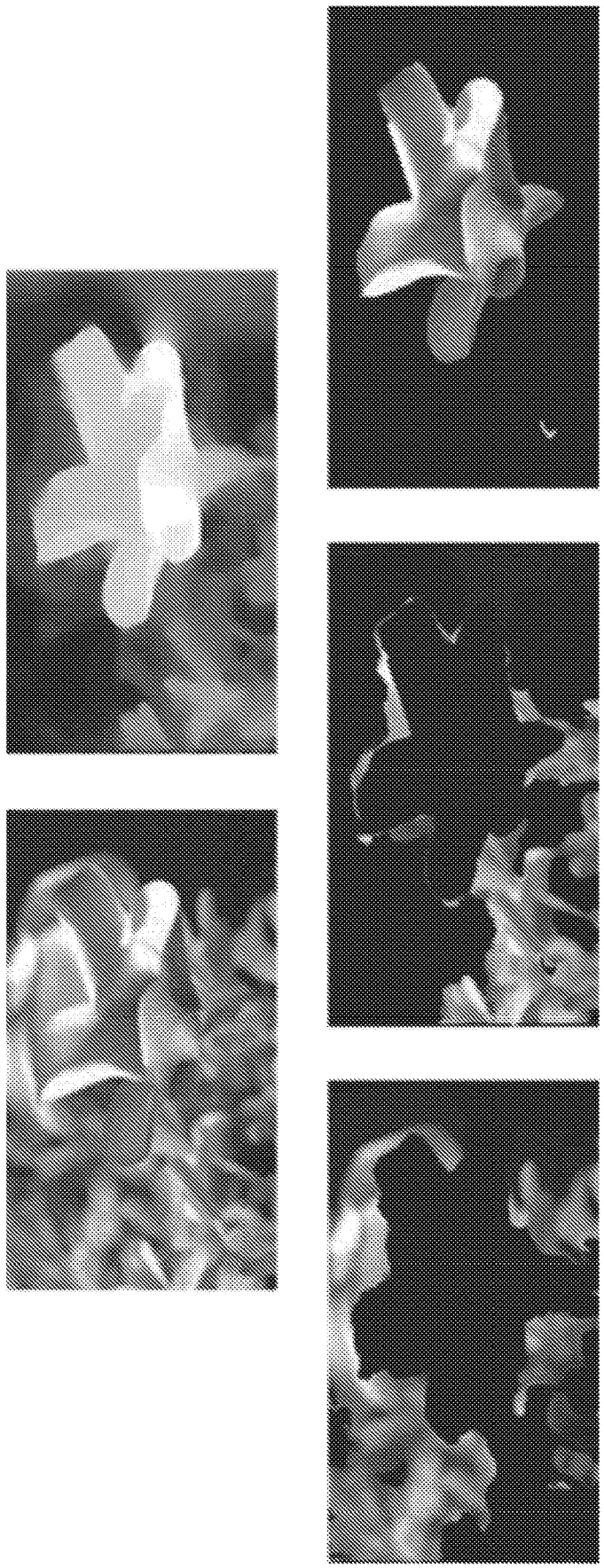
Figure 84:
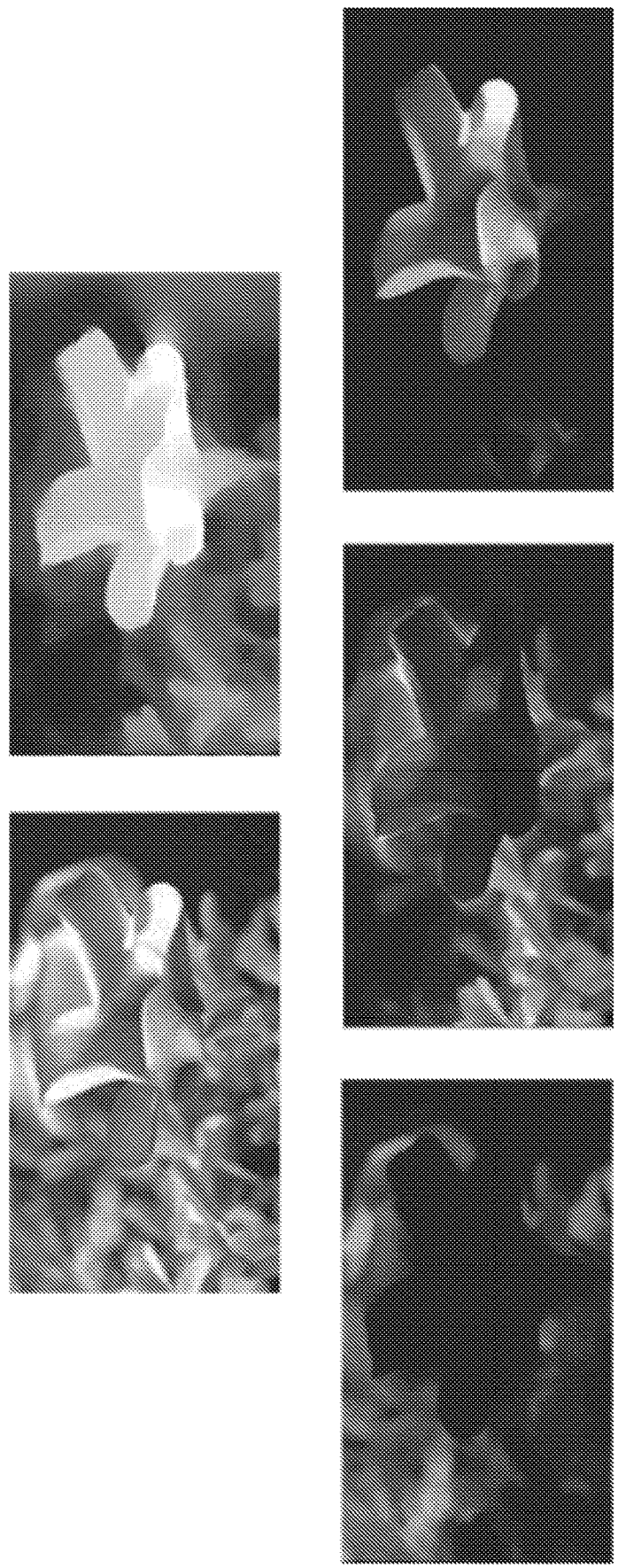
Figure 85:
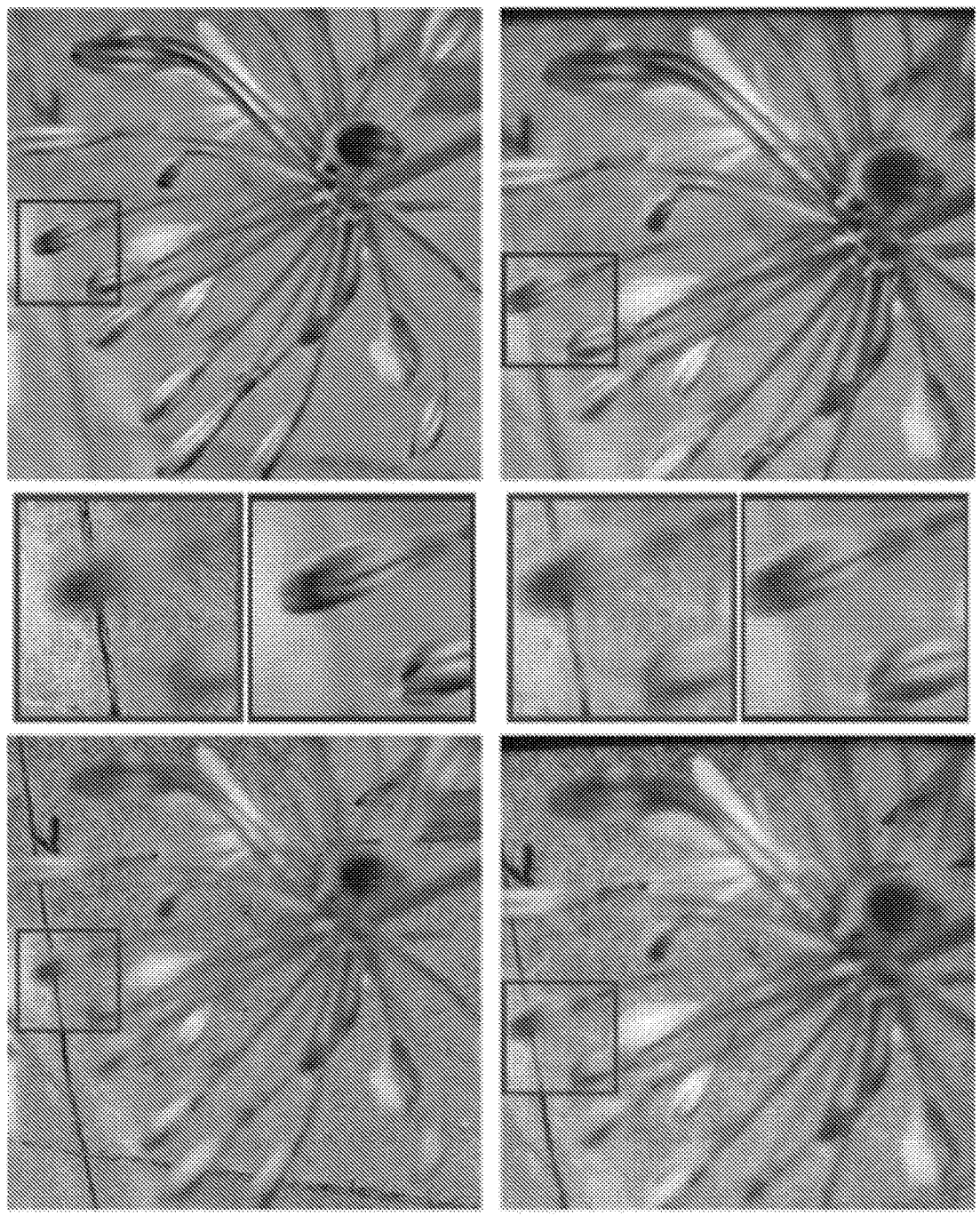
Figure 86:
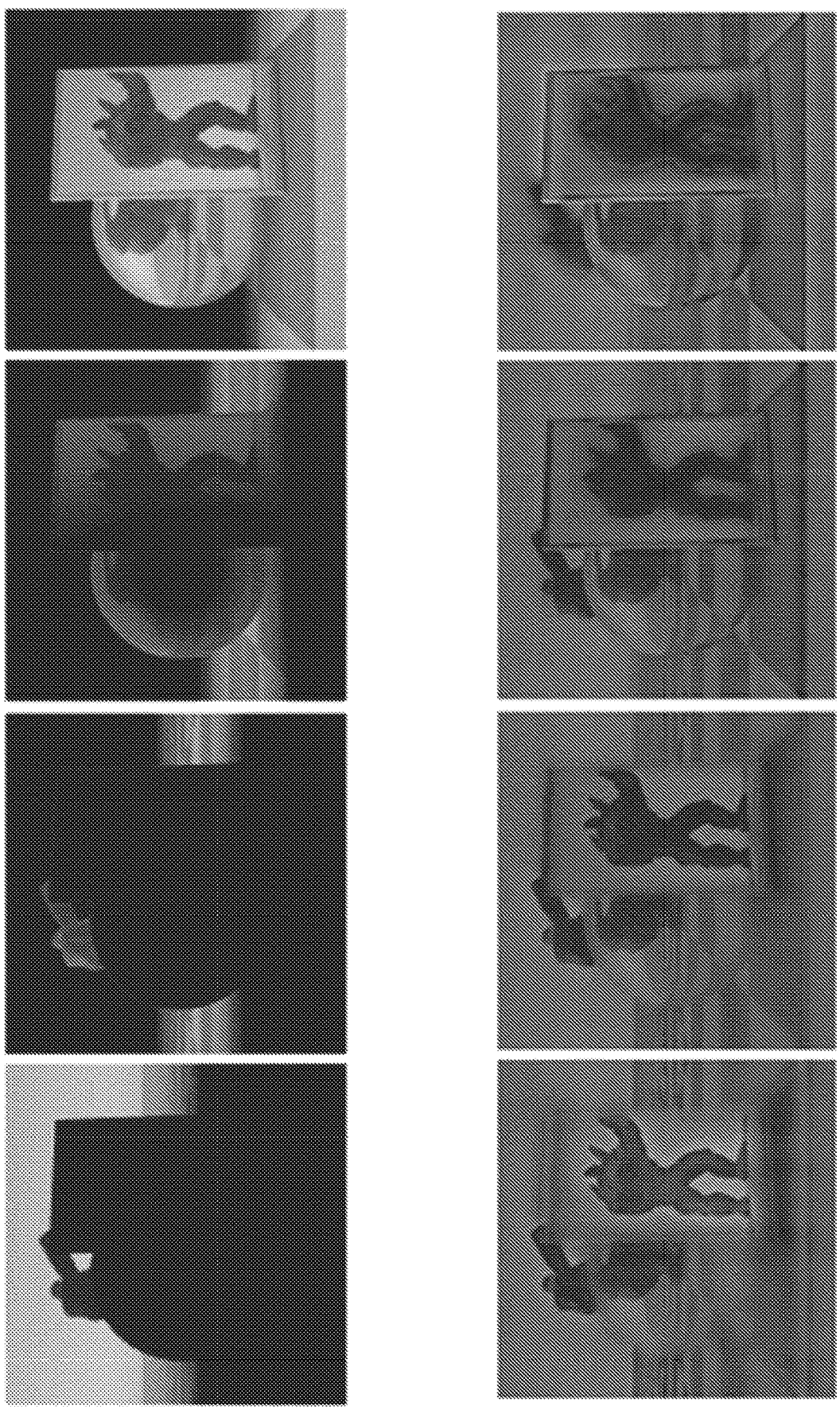

FIG. 69 is a flowchart illustrating an example process according to some embodiments. Some embodiments of a process 6900 may include receiving 6902 an input image with depth information. The process 6900 may further include mapping 6904 the input image to a plurality of focal plane images. The process 6900 may further include orienting 6906 the plurality of focal plane images using head orientation information to provide stereo disparity between left and right eyes. The process 6900 may further include displaying 6908 the oriented plurality of focal plane images. Some embodiments may include an device with one or more motion tracking sensors, a processor, and a non-transitory computer-readable medium storing instructions that are operative, when executed on the processor, to perform the process 6900. For some embodiments, the process 6900 may be performed by a device that has a multi-focal plane (MFP) display.

FIG. 70 is a flowchart illustrating an example process according to some embodiments. Some embodiments of a process 7000 may include receiving 7002 a description of three-dimensional (3D) content. The process 7000 may further include receiving 7004, from a tracker, information indicating motion of a viewer relative to his or her real-world environment. The process 7000 may further include responsive to receiving the information indicating motion of the viewer, synthesizing 7006 motion parallax by altering multi-focal planes formed using the 3D content including, for example, texture and depth information. The process 7000 may further include rendering 7008 an image to the multi-focal plane display using the altered multi-focal plane rendering. Some embodiments may include a device with one or more motion tracking sensors, a processor, and a non-transitory computer-readable medium storing instructions that are operative, when executed on the processor, to perform the process 7000. For some embodiments, the process 7000 may be performed by a device that has a multi-focal plane (MFP) display.

While the methods and systems in accordance with some embodiments are discussed in the context of virtual reality (VR) and augmented reality (AR), some embodiments may be applied to mixed reality (MR), augmented reality (AR), and virtual reality (VR) contexts as well. Also, although the term "head mounted display (HMD)" is used herein in accordance with some embodiments, some embodiments may be applied to a wearable device (which may or may not be attached to the head) capable of, e.g., VR, AR, and/or MR for some embodiments.

For some embodiments, the term "disparity vector" refers to, e.g., the maximum separation (with direction) of corresponding pixels in a synthetic stereoscopic pair formed by shifting and projecting MFPs. Due to geometry, the maximum shift occurs for the focal plane closest to a viewer. The amount and direction of this maximum shift is called the "disparity vector".

In literature, spatial separation of each corresponding pixel of two images (left and right) may be expressed by a luminance value. This is commonly called a "disparity image". In this application, in some embodiments, differing with literature, a "disparity image" is, e.g., an MFP stack skewed by an amount (which may be indicated by a disparity vector), projected, and summed to a viewing point.

For some embodiments, 3D content includes, e.g., depth maps and texture images. For some embodiments, texture images include projections of a 3D model and/or content to a selected viewpoint. For some embodiments, rendering to an MFP display may be for monoscopic (e.g., monoscopic MFP stack), true stereo (e.g., two monoscopic MFP stacks for right and left eye point, correspondingly), or synthetic stereo (e.g., synthesized, two MFP stacks by shifting) formats.

An example method in accordance with some embodiments may include: receiving an input image with depth information; mapping the input image to a plurality of focal plane images using the depth information; orienting the plurality of focal plane images using head orientation information to provide stereo disparity between left and right eyes; and displaying the oriented plurality of focal plane images.

In some embodiments of the example method, at least receiving the input image and displaying the oriented plurality of focal plane images are performed by a multi-focal plane (MFP) display.

In some embodiments of the example method, orienting the plurality of focal plane images may include rotating one or more of the plurality of focal plane images.

In some embodiments of the example method, rotating one or more of the plurality of focal plane images may include rotating a disparity vector for one or more of the focal plane images in relation to a vector parallel to a horizon.

In some embodiments of the example method, orienting the plurality of focal plane images may include shifting one or more of the plurality of focal plane images.

In some embodiments of the example method, shifting one or more of the plurality of focal plane images may include scaling a disparity vector for the respective one or more focal plane images.

In some embodiments of the example method, shifting one or more of the plurality of focal plane images may include rotating one or more of the plurality of focal plane images relative to a fixed origin.

In some embodiments of the example method, shifting one or more of the plurality of focal plane images comprises moving one or more of the plurality of focal plane images by an offset relative to a fixed origin.

Some embodiments of the example method may further include processing the plurality of focal plane images to handle image disparities (e.g., to reduce disocclusions or holes) caused by shifting the focal plane images.

In some embodiments of the example method, processing the plurality of focal plane images may include filtering one or more of the focal plane images.

In some embodiments of the example method, processing the plurality of focal plane images comprises: determining depth blending weights for at least one of the plurality of focal plane images; and generating at least one of the plurality of focal plane images using the respective depth blending weights.

In some embodiments of the example method, generating at least one of the plurality of focal plane images comprises multiplying at least one of a plurality of textures by the respective depth blending weights.

In some embodiments of the example method, displaying the oriented plurality of focal plane images may include combining shifted focal plane images to generate a stereoscopic image pair.

Some embodiments of the example method may further include measuring motion tracking sensor readings of a position of a viewer relative to a real-world environment to generate the head orientation information.

Some embodiments of the example method may further include responsive to generating the head orientation information, synthesizing motion parallax by altering one or more of the plurality of focal plane images.

In some embodiments of the example method, the synthesized motion parallax may include scaling one or more of the plurality of focal plane images relative to each other using the head orientation information, and the head orientation information may indicate axial motion.

Some embodiments of the example method may further include: filtering the input image for low frequency content; and redistributing the low frequency content to the plurality of focal plane images.

Some embodiments of the example method may further include: filtering the input image for high frequency content; and decomposing the high frequency content to the plurality of focal plane images.

An example apparatus in accordance with some embodiments may include: a processor; and a non-transitory computer-readable medium storing instructions that are operative, when executed on the processor, to perform one of the example methods described above.

An example method in accordance with some embodiments may include: receiving a description of three-dimensional (3D) content; receiving, from a tracker, information indicating motion of a viewer relative to a real-world environment; responsive to receiving the information indicating motion of the viewer, synthesizing motion parallax by altering multi-focal planes of the 3D content; and rendering an image to the multi-focal plane display using the altered multi-focal plane rendering.

In some embodiments of the example method, the synthesized motion parallax may include scaling the multi-focal planes relative to each other using the information indicating motion of the viewer, and the motion of the viewer may be axial.

An example apparatus in accordance with some embodiments may include: a processor; and a non-transitory computer-readable medium storing instructions that are operative, when executed on the processor, to perform one of the example methods described above.

An example method in accordance with some embodiments may include: determining a plurality of focal plane images mapped to an input image; orienting the plurality of focal plane images using head orientation information to provide stereo disparity between left and right eyes; and displaying the oriented plurality of focal plane images.

In some embodiments of the example method, determining the plurality of focal plane images comprises receiving the plurality of focal plane images.

In some embodiments of the example method, determining the plurality of focal plane images comprises mapping the input image to the plurality of focal plane images to generate the plurality of focal plane images.

An example apparatus in accordance with some embodiments may include: a processor; and a non-transitory computer-readable medium storing instructions that are operative, when executed on the processor, to perform one of the example methods described above.

An example method in accordance with some embodiments may include: receiving three-dimensional (3D) video content; receiving a viewer orientation signal; determining image data for one or more focal planes of a display using the 3D video content and the viewer orientation signal; and rendering one or more focal plane images to the display using the image data.

An example apparatus in accordance with some embodiments may include: a processor; and a non-transitory computer-readable medium storing instructions that are operative, when executed on the processor, to perform the example method described above.

An example method in accordance with some embodiments may include: receiving a description of capabilities of a multifocal plane (MFP) display; receiving three-dimensional (3D) video content; receiving a viewer orientation signal; computing image data for one or more focal planes of the MFP display using the 3D video content and the viewer orientation signal; and rendering one or more MFP images to the MFP display using the computed image data.

In some embodiments of the example method, the 3D video content may include one or more texture images and corresponding depth maps.

Some embodiments of the example method may further include filtering the depth map.

In some embodiments of the example method, computing image data for one or more focal planes may include: extracting one or more images from the 3D video content; calculating depth blending weights for one or more focal planes; generating one or more MFP weight maps by remapping the depth map by the depth blending weights; multiplying one or more images by each MFP weight map to form each focal plane image; and perform spatial shifts for each focal plane image.

In some embodiments of the example method, the description of capabilities of the MFP display may include number and position of focal planes.

In some embodiments of the example method, computing image data for one or more focal planes may include: computing one or more MFP images for one or more focal planes of the MFP display using the 3D video content; and shifting one or more computed MFP images.

In some embodiments of the example method, shifting one or more computed MFP images may include scaling a disparity vector for one or more of the MFP images.

In some embodiments of the example method, shifting one or more computed MFP images may include rotating a disparity vector for one or more of the MFP images in relation to a vector parallel to a horizon.

In some embodiments of the example method, shifting one or more computed MFP images may include translating one or more of the MFP images.

In some embodiments of the example method, computing image data for one or more focal planes may include: computing one or more MFP images for one or more focal planes of the MFP display using the 3D video content; 3D warping one or more computed MFP images; and performing hole filling on one or more computed MFP images.

An example method in accordance with some embodiments may include: receiving three-dimensional video content; computing one or more multifocal plane (MFP) images for a number and position of multifocal planes using the three-dimensional video content; receiving a viewer orientation signal; computing one or more disparity images for each view of a stereoscopic display using the one or more MFP images and the viewer orientation signal; and rendering the one or more disparity images to the stereoscopic display.

In some embodiments of the example method, the three-dimensional video content may include one or more texture images and corresponding depth maps.

Some embodiments of the example method may further include filtering the depth map.

In some embodiments of the example method, computing image data for one or more focal planes may include: extracting one or more images from the 3D video content; calculating depth blending weights for one or more focal planes; generating one or more MFP weight maps by remapping the depth map by the depth blending weights; multiplying one or more images by each MFP weight map to form each focal plane image; and perform spatial shifts for each focal plane image.

In some embodiments of the example method, rendering the one or more disparity images to the stereoscopic display includes adding up each spatially shifted focal plane to generate a stereoscopic image pair for each of the one or more disparity images.

Some embodiments of the example method may further include: receiving one or more pixel values corresponding to one or more pixels within one of the multifocal plane (MFP) images; and adjusting the one or more pixel values by a corresponding distance in the depth map.

In some embodiments of the example method, the description of capabilities of the MFP display may include number and position of focal planes.

In some embodiments of the example method, the viewer orientation signal may indicate a tilt of the viewer and computing one or more disparity images for each view of the stereoscopic display may use a rotated disparity vector corresponding to the indicated tilt of the viewer.

In some embodiments of the example method, computing one or more MFP images for a number and position of multifocal planes may include: computing one or more MFP images for each focal plane position using the 3D video content; 3D warping one or more computed MFP images; and performing hole filing on one or more computed MFP images.

An example method in accordance with some embodiments may include: receiving three-dimensional video content; computing one or more multifocal plane (MFP) images for a number and position of multifocal planes using the three-dimensional video content; measuring motion tracking sensor readings of a motion tracking sensor; generating a viewer orientation signal from the motion tracking sensor readings; computing one or more disparity images for each view of a shutter glasses display using the one or more MFP images and the viewer orientation signal; and rendering the one or more disparity images to the shutter glasses display.

An example device in accordance with some embodiments may include: one or more motion tracking sensors; a processor; and a non-transitory computer-readable medium storing instructions that are operative, when executed on the processor, to perform the processes of: receiving three-dimensional video content; computing one or more multifocal plane (MFP) images for a number and position of multifocal planes using the three-dimensional video content; measuring motion tracking sensor readings of a motion tracking sensor; generating a viewer orientation signal from the motion tracking sensor readings; computing one or more disparity images for each view of shutter glasses display using the one or more MFP images and the viewer orientation signal; and rendering the one or more disparity images to the shutter glasses display.

An example device in accordance with some embodiments may include: a processor; and a non-transitory computer-readable medium storing instructions that are operative, when executed on the processor, to perform the processes of: receiving a description of capabilities of a multifocal plane (MFP) display; receiving three-dimensional video content; receiving a viewer orientation signal; computing image data for one or more focal planes of the MFP display using the three-dimensional video content and the viewer orientation signal; and rendering one or more MFP images to the MFP display using the computed image data.

An example method in accordance with some embodiments may include: receiving three-dimensional (3D) video content; filtering the 3D video content into high and low frequency content; decomposing the high frequency content into one or more high frequency computed images; redistributing the low frequency content to the one or more high frequency computed images to generate one or more redistributed focal planes; and rendering one or more multifocal plane images corresponding to the one or more redistributed focal planes.

In some embodiments of the example method, the 3D video content may include one or more texture images and corresponding depth maps.

In some embodiments of the example method, decomposing the high frequency content into one or more high frequency computed images may include: computing image data for one or more focal planes of an MFP display using the high frequency content; and decomposing the computed image data into one or more high frequency computed images.

In some embodiments of the example method, computing image data for one or more focal planes may include: extracting one or more images from the 3D video content; calculating depth blending weights for one or more focal planes; generating one or more MFP weight maps by remapping the depth map by the depth blending weights; multiplying one or more images by each MFP weight map to form each focal plane image; and performing spatial shifts for each focal plane image.

In some embodiments of the example method, the depth blending weights may be a box filter.

In some embodiments of the example method, the depth blending weights may be a linear ramp.

In some embodiments of the example method, the depth blending weights may be a polynomial function.

In some embodiments of the example method, the depth blending weights may be a sinusoidal function.

In some embodiments of the example method, redistributing the low frequency content to the one or more high frequency computed images may include: dividing the pixel values of the low frequency content by N; and combining the divided low frequency content with each of N high frequency computed images to generate one or more redistributed focal planes, wherein N is a positive integer.

An example method in accordance with some embodiments may include: receiving three-dimensional (3D) video content; computing image data for N focal planes of the MFP display using the 3D video content; low-pass filtering the 3D video content to generate low frequency 3D video content; dividing the pixel values of the low frequency 3D video content by N; redistributing the divided low frequency 3D video content to the N focal planes of computed image data to generate N redistributed images; and rendering N sets of MFP images to the MFP display using the N redistributed images, wherein N is a positive integer.

In some embodiments of the example method, the three-dimensional video content may include one or more texture images and corresponding depth maps.

In some embodiments of the example method, redistributing the divided low frequency 3D video content may include: low-pass filtering each of the N focal planes of computed image data; summing the divided low frequency video content with each of N focal planes of computed image data to generate N sets of summed image data; and subtracting each of N sets of low-pass filtered computed image data from the respective summed image data to generate N sets of redistributed image data.

In some embodiments of the example method, computing image data for N focal planes may include: extracting N images from the 3D video content; calculating depth blending weights for N focal planes; generating N multifocal plane (MFP) weight maps by remapping the depth map by the depth blending weights; multiplying N images by each MFP weight map to form each focal plane image; and performing spatial shifts for each of N focal plane images, wherein N is a positive integer.

In some embodiments of the example method, the depth blending weights may be a box filter.

In some embodiments of the example method, the depth blending weights may be a linear ramp.

In some embodiments of the example method, the depth blending weights may be a polynomial function.

In some embodiments of the example method, the depth blending weights may be a sinusoidal function.

In some embodiments of the example method, redistributing the low frequency content to the one or more high frequency focal planes may include: dividing the pixel values of the low frequency content by N; and combining the divided low frequency content with each of N sets of high frequency computed image data to generate one or more sets of redistributed image data, wherein N is a positive integer.

An example device in accordance with some embodiments may include: a processor; and a non-transitory computer-readable medium storing instructions that are operative, when executed on the processor, to perform the processes of: receiving three-dimensional (3D) video content; filter the 3D video content into high and low frequency content; computing image data for one or more focal planes of the MFP display using the high frequency content; decomposing the computed image data into N sets of high frequency computed image data; dividing the pixel values of the low frequency content by N; redistributing the divided low frequency content to the N high frequency computed images; and rendering N sets of MFP images to the MFP display using the N redistributed images, wherein N is a positive integer.

An example method in accordance with some embodiments may include: receiving three-dimensional (3D) video content; filtering the 3D video content into high and low frequency content; decomposing the high frequency content into one or more high frequency focal planes; redistributing the low frequency content to the one or more high frequency focal planes to generate one or more redistributed focal planes; and rendering one or more multifocal plane images using the one or more redistributed focal planes.

An example method in accordance with some embodiments may include: receiving an image represented as texture plus depth; forming a first decomposition into a plurality of N focal plane images based on a value of a depth plane of the image; creating a scaled low frequency representation by applying a low pass filter to the texture image and scaling the pixel values by dividing by N; and computing, for each of the plurality of N focal plane images, a plurality of redistributed focal plane images which may include: computing a low pass representation of the respective focal plane image; adding the scaled low frequency representation to the respective focal plane image to generate an adjusted focal plane image; and subtracting the computed low pass representation of the respective focal plane image from the adjusted focal plane image to generate a redistributed focal plane image.

In some embodiments of the example method, the plurality of redistributed focal plane images may be rendered to a multifocal plane display.

In some embodiments of the example method, the plurality of redistributed focal plane images may be used as an input to produce stereo pair projections to a stereoscopic display.

An example method in accordance with some embodiments may include: receiving an image represented as a multifocal plane stack of images composed of a plurality of N focal plane images based on a value of a depth plane of the image; creating a scaled low frequency representation by applying a low pass filter to the image and scaling the pixel values by dividing by N; and computing, for each of the plurality of N focal plane images, a plurality of redistributed focal plane images which may include: computing a low pass representation of the respective focal plane image; adding the scaled low frequency representation to the respective focal plane image to generate an adjusted focal plane image; and subtracting the computed low pass representation of the respective focal plane image from the adjusted focal plane image to generate a redistributed focal plane image.

In some embodiments of the example method, the plurality of redistributed focal plane images may be rendered to a multifocal plane display.

In some embodiments of the example method, the plurality of redistributed focal plane images may be used as input to produce stereo pair projections to a stereoscopic display.

An example method in accordance with some embodiments may include: computing image data for one or more focal planes of an MFP display using three-dimensional video content and a viewer orientation signal; and rendering one or more MFP images to the MFP display using the computed image data.

An example device in accordance with some embodiments may include: a processor; and a non-transitory computer-readable medium storing instructions that are operative, when executed on the processor, to perform the processes of: computing image data for one or more focal planes of an MFP display using three-dimensional video content and a viewer orientation signal; and rendering one or more MFP images to the MFP display using the computed image data.

An example method in accordance with some embodiments may include rendering to a multi-focal plane display, creating stereoscopic video responsive to user head orientation.

An example method in accordance with some embodiments may include receiving 3-D video content including a depth map.

An example method in accordance with some embodiments may include receiving 3-D video content consisting of texture images.

An example method in accordance with some embodiments may include receiving an orientation signal from a viewer.

An example method in accordance with some embodiments may include receiving a description of the multifocal plane display capabilities (including number and position of focal planes).

An example method in accordance with some embodiments may include computing image data for the planes of the multifocal plane display using the orientation signal.

An example method in accordance with some embodiments may include computing image data for a chosen number and position of multifocal planes.

An example method in accordance with some embodiments may include computing disparity images (or, e.g., images with disparity) for individual views of the stereoscopic display using multifocal planes and the orientation signal.

An example method in accordance with some embodiments may include rendering the multifocal plane/disparity images to the display.

Table 4 shows a mapping of grayscale versions of native images to black and white line drawings for FIGS. 71-92.

TABLE 4

| Figure with Grayscale Version of Native Image | Figure Rendered as Black and White Line Drawing |
|---|---|
| 71 | 2B |
| 72 | 14 |
| 73 | 16A-16B |
| 74 | 21B-21F |
| 75 | 22B-22F |
| 76 | 28A-28D |
| 77 | 29A-29B |

TABLE 4-continued

| Figure with Grayscale Version of Native Image | Figure Rendered as Black and White Line Drawing |
|---|---|
| 78 | 31A-31F |
| 79 | 35 |
| 80 | 36 |
| 81 | 38C |
| 82 | 39A-39C |
| 83 | 42B-42F |
| 84 | 43B-43F |
| 85 | 44 |
| 86 | 45A-45H |
| 87 | 46A-46B |
| 88 | 48A-48F |
| 89 | 49A-49B |
| 90 | 50A-50B |
| 91 | 51A-51B |
| 92 | 68A-68J |

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
generating a plurality of focal plane images using a description of three-dimensional (3D) content;
arranging the plurality of focal plane images in space;
receiving information indicating head movement of a user relative to a real world environment;
responsive to receiving the information indicating head movement of the user, synthesizing motion parallax by shifting and rotating one or more of the plurality of focal plane images in order to generate views for the user, the views comprising motion parallax information, wherein rotating one or more of the plurality of focal plane images comprises rotating one or more of the plurality of focal plane images relative to a fixed origin; and
displaying the plurality of focal plane images shifted and rotated to generate the views for the user.

2. The method of claim 1, wherein displaying the plurality of focal plane images is performed by a multi-focal plane (MFP) display.

3. The method of claim 1, wherein shifting and rotating one or more of the plurality of focal plane images provides stereo disparity between left and right eyes.

4. The method of claim 1, wherein rotating one or more of the plurality of focal plane images comprises rotating a disparity vector for one or more of the focal plane images in relation to a disparity vector parallel to a horizon.

5. The method of claim 1, further comprising processing the plurality of focal plane images to reduce image disparities caused by rotating one or more of the plurality of focal plane images.

6. The method of claim 1, wherein shifting one or more of the plurality of focal plane images comprises scaling a disparity vector for the respective one or more focal plane images.

7. The method of claim 1, wherein shifting one or more of the plurality of focal plane images comprises moving one or more of the plurality of focal plane images by an offset relative to the fixed origin.

8. The method of claim 1, further comprising processing the plurality of focal plane images to reduce image disparities caused by shifting the focal plane images.

9. The method of claim 8, wherein processing the plurality of focal plane images comprises filtering one or more of the focal plane images.

10. The method of claim 8, wherein processing the plurality of focal plane images comprises:
determining depth blending weights for at least one of the plurality of focal plane images; and
generating at least one of the plurality of focal plane images using the respective depth blending weights.

11. The method of claim 10, wherein generating at least one of the plurality of focal plane images comprises multiplying at least one of a plurality of textures by the respective depth blending weights.

12. The method of claim 1, wherein displaying the plurality of focal plane images comprises combining shifted focal plane images to generate a stereoscopic image pair.

13. The method of claim 1, further comprising measuring motion tracking sensor readings of a position of the user relative to the real-world environment to determine the head movement of the user.

14. The method of claim 13,
wherein synthesizing motion parallax comprises spatially scaling one or more of the plurality of focal plane images relative to each other using the determined head movement of the user, and
wherein the determined head movement of the user indicates axial motion.

15. The method of claim 1, further comprising:
obtaining an input image from the description of the 3D content;
filtering the input image for low frequency content; and
redistributing the low frequency content from the filtered input image to the plurality of focal plane images.

16. The method of claim 1, further comprising:
obtaining an input image from the description of the 3D content;

filtering the input image for high frequency content; and
decomposing the high frequency content from the filtered input image to the plurality of focal plane images.

17. A device comprising:
a processor; and
a non-transitory computer-readable medium storing instructions operative, when executed by the processor, to cause the device to:
generate a plurality of focal plane images using a description of three-dimensional (3D) content;
arrange the plurality of focal plane images in space;
receive information indicating head movement of a user relative to a real world environment;
responsive to receiving the information indicating head movement of the user, synthesize motion parallax by shifting and rotating one or more of the plurality of focal plane images in order to generate views for the user, the views comprising motion parallax information, wherein rotating one or more of the plurality of focal plane images comprises rotating one or more of the plurality of focal plane images relative to a fixed origin; and
display the plurality of focal plane images shifted and rotated to generate the views for the user.

18. A method comprising:
generating a plurality of focal plane images using a description of three-dimensional (3D) content;
receiving, from a tracker, information indicating motion of a viewer relative to a real-world environment;
responsive to receiving the information indicating motion of the viewer, synthesizing motion parallax by shifting and rotating one or more of the plurality of focal plane images in order to generate views for the viewer, the views comprising motion parallax information, wherein rotating one or more of the plurality of focal plane images comprises rotating one or more of the plurality of focal plane images relative to a fixed origin; and
rendering an image to a multi-focal plane (MFP) display using the shifted and rotated focal plane images.

19. The method of claim 1, wherein displaying the plurality of focal plane images is performed by a two-dimensional (2D) display.

20. The method of claim 18, wherein shifting and rotating one or more of the plurality of focal plane images provides stereo disparity between left and right eyes.

21. The method of claim 18, wherein rotating one or more of the plurality of focal plane images comprises rotating a disparity vector for one or more of the focal plane images in relation to a disparity vector parallel to a horizon.

22. The method of claim 18, wherein shifting one or more of the plurality of focal plane images comprises moving one or more of the plurality of focal plane images by an offset relative to the fixed origin.

23. The method of claim 18, wherein rendering the image to the multi-focal plane (MFP) display comprises combining shifted focal plane images to generate a stereoscopic image pair.

24. The method of claim 18, further comprising measuring motion tracking sensor readings of a position of the viewer relative to the real-world environment to determine the motion of the viewer.

25. The method of claim 24,
wherein synthesizing motion parallax comprises spatially scaling one or more of the plurality of focal plane images relative to each other using the determined motion of the viewer, and
wherein the determined motion of the viewer indicates axial motion.

26. An apparatus comprising:
a processor; and
a non-transitory computer-readable medium storing instructions operative, when executed by the processor, to cause the device to:
generate a plurality of focal plane images using a description of three-dimensional (3D) content;
receive, from a tracker, information indicating motion of a viewer relative to a real-world environment;
responsive to receiving the information indicating motion of the viewer, synthesize motion parallax by shifting and rotating one or more of the plurality of focal plane images in order to generate views for the viewer, the views comprising motion parallax information,
wherein rotating one or more of the plurality of focal plane images comprises rotating one or more of the plurality of focal plane images relative to a fixed origin; and
render an image to a multi-focal plane (MFP) display using the shifted and rotated focal plane images.

27. The apparatus of claim 26, further comprising the multi-focal plane (MFP) display.

* * * * *